US012654775B2

(12) United States Patent
Nysse et al.

(10) Patent No.: US 12,654,775 B2
(45) Date of Patent: Jun. 16, 2026

(54) FRAME ASSEMBLY FOR A UTILITY VEHICLE

(71) Applicant: Polaris Industries Inc., Medina, MN (US)

(72) Inventors: Brian N. Nysse, Wyoming, MN (US); Craig Hawes, Wyoming, MN (US); Nick Levin, Wyoming, MN (US); Lauren E. Frank, Wyoming, MN (US); Tyler J. Kramer, Wyoming, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 19/235,222

(22) Filed: Jun. 11, 2025

(65) Prior Publication Data

US 2025/0304171 A1 Oct. 2, 2025

Related U.S. Application Data

(63) Continuation of application No. 18/215,901, filed on Jun. 29, 2023, now Pat. No. 12,330,710, which is a continuation-in-part of application No. 18/132,475, filed on Apr. 10, 2023, now Pat. No. 12,337,683.

(60) Provisional application No. 63/329,543, filed on Apr. 11, 2022.

(51) Int. Cl.
B62D 21/03 (2006.01)
B62D 65/02 (2006.01)
(52) U.S. Cl.
CPC .......... B62D 21/03 (2013.01); B62D 65/024 (2013.01)

(58) Field of Classification Search
CPC .......... B60R 2022/4891; B62D 21/183; B62D 23/005; B60G 3/20
See application file for complete search history.

(56) References Cited

U.S. PATENT DOCUMENTS

| | | | | |
|---|---|---|---|---|
| 9,004,510 B2 * | 4/2015 | Leonard | ................ | B62D 61/12 |
| | | | | 280/124.147 |
| 9,623,912 B2 * | 4/2017 | Schlangen | ............. | B62D 25/20 |
| 9,789,909 B2 * | 10/2017 | Erspamer | ................ | B60N 2/68 |
| 10,994,645 B2 * | 5/2021 | Deckard | ................ | B60J 5/0487 |
| 12,202,542 B2 * | 1/2025 | Hendriks | ................ | B60K 1/04 |
| 2006/0219462 A1 * | 10/2006 | Martin | ................... | B62D 21/02 |
| | | | | 180/292 |
| 2011/0148144 A1 * | 6/2011 | Kosuge | ................... | B60P 3/423 |
| | | | | 296/183.1 |
| 2013/0049318 A1 * | 2/2013 | Kwon | ...................... | B60G 3/20 |
| | | | | 280/124.139 |

(Continued)

FOREIGN PATENT DOCUMENTS

| | | | | | |
|---|---|---|---|---|---|
| AU | 2016231463 A1 * | 10/2016 | | ............... | B60K 5/12 |
| AU | 2014227985 B2 * | 5/2017 | | .......... | B60N 2/6009 |

(Continued)

*Primary Examiner* — Nicole T Verley

(74) *Attorney, Agent, or Firm* — Merchant & Gould P.C.

(57) ABSTRACT

A utility vehicle includes a modular frame which allows the vehicle to be customized for particular applications. The modular frame includes at least a main frame section, a front frame section, and a rear frame section. The main frame section is configured to remain consistent throughout any application of the utility vehicle and is configured to receive various iterations of the rear frame section and the front frame section.

15 Claims, 138 Drawing Sheets

(56) References Cited

U.S. PATENT DOCUMENTS

| | | | | |
|---|---|---|---|---|
| 2014/0067215 A1* | 3/2014 | Wetterlund | ............. | G06F 17/00 |
| | | | | 701/69 |
| 2014/0224561 A1* | 8/2014 | Shinbori | ............... | B60G 7/001 |
| | | | | 180/253 |
| 2014/0224563 A1* | 8/2014 | Shinbori | ................ | B60R 21/13 |
| | | | | 180/291 |
| 2014/0265285 A1* | 9/2014 | Erspamer | ............ | B62D 23/005 |
| | | | | 280/783 |
| 2018/0065465 A1* | 3/2018 | Ward | ....................... | B62D 5/04 |
| 2021/0269096 A1* | 9/2021 | Erspamer | ............... | B60N 2/012 |

FOREIGN PATENT DOCUMENTS

| | | | | | | |
|---|---|---|---|---|---|---|
| CA | 2517662 | C | * | 11/2009 | .............. | B62K 5/01 |
| CA | 3003854 | A1 | * | 9/2019 | | |
| CN | 209833775 | U | * | 12/2019 | | |
| CN | 216185715 | U | * | 4/2022 | | |
| IT | 202100010361 | A1 | * | 10/2022 | ............. | H10F 19/85 |
| JP | 2004314939 | A | * | 11/2004 | ............. | B62K 19/00 |
| JP | 2000233655 | A | * | 8/2020 | ............. | B60K 17/04 |
| KR | 20130022105 | A | * | 3/2013 | ............. | B60R 21/13 |
| WO | WO-2013116459 | A1 | * | 8/2013 | ........... | B62D 23/005 |
| WO | WO-2014130611 | A2 | * | 8/2014 | ........... | B62D 23/005 |
| WO | WO-2014143953 | A2 | * | 9/2014 | ........... | B62D 21/183 |
| WO | WO-2015023749 | A1 | * | 2/2015 | ............. | B60R 7/06 |
| WO | WO-2022232437 | A1 | * | 11/2022 | ............. | E02F 9/085 |

* cited by examiner

FRAME ASSEMBLY FOR A UTILITY VEHICLE

CROSS-REFERENCE TO RELATED APPLICATIONS

The present application is a continuation of U.S. patent application Ser. No. 18/215,901, filed Jun. 29, 2023, which is a continuation-in-part of U.S. patent application Ser. No. 18/132,475, filed on Apr. 10, 2023, and entitled "UTILITY VEHICLE," which claims priority to U.S. Provisional Patent Application Ser. No. 63/329,543, filed on Apr. 11, 2022, and entitled "UTILITY VEHICLE," the complete disclosures of which are expressly incorporated by reference herein.

TECHNICAL FIELD

The present application relates to a utility vehicle and, more particularly, to a utility vehicle with modular chassis.

BACKGROUND

Vehicles configured for off-road travel, such as utility vehicles and all-terrain vehicles, may require various configurations to be able to support accessories, passengers, or other components of the vehicle. Depending on the application of the vehicle, it may be required that the vehicle is configured with various capabilities for towing large/heavy loads, supporting cargo or other accessories, airlift travel, and cargo transport. As such, there is a need for a vehicle platform that includes a modular frame assembly such that various sub-frame portions may be attached to a main frame portion without modifications to the main frame portion.

SUMMARY

In one embodiment of the present disclosure, a frame assembly for a utility vehicle comprises a front frame section; a main frame section coupled to the front frame section; and a rear frame section coupled to the main frame section. The rear frame section comprises at least a forward member; a rearward member spaced apart from the forward member; an upper member coupled to the forward and rearward members; and a lower member coupled to the forward and rearward members. The forward member, the rearward member, the upper member, and the lower member form a closed portion of the rear frame section, and the closed portion couples to the main frame section.

In another embodiment of the present disclosure, a method of assembly a frame for a utility vehicle comprises providing a front frame section; providing a main frame section; coupling the front frame section to the main frame section; providing a rear frame section including a forward member, a rearward member, an upper member, and a lower member; coupling the upper member to the forward and rearward members; coupling the lower member to the forward and rearward members to define a closed portion of the rear frame section; and coupling the closed portion of the rear frame section to the main frame section.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 111 is an exemplary control diagram for operation of the actuator of FIG. 107;

FIG. 112 is an exemplary control diagram for operation of the actuator of FIG. 107;

FIG. 113 is a hinge assembly of the present disclosure;

FIG. 114 is a cross-section of the hinge assembly of FIG. 113;

FIG. 115 is a cross-section of the hinge assembly of FIG. 113 in a stopped position;

FIG. 116 is a perspective view of a cargo box coupled to a frame of a vehicle of the present disclosure;

FIG. 117 is an exploded view of a coupling assembly of the cargo box of FIG. 116;

FIG. 118 is a perspective view of a panel adjacent a hood of a vehicle of the present disclosure;

FIG. 119 is a perspective view of a latching assembly of the cargo box of FIG. 116;

FIG. 120 is a perspective view of an inlet to an area below a cargo area;

FIG. 121 is a front perspective view of a cooling assembly below a cargo area;

FIG. 122 is a rear perspective view of the cooling assembly of FIG. 121;

Figure 1:
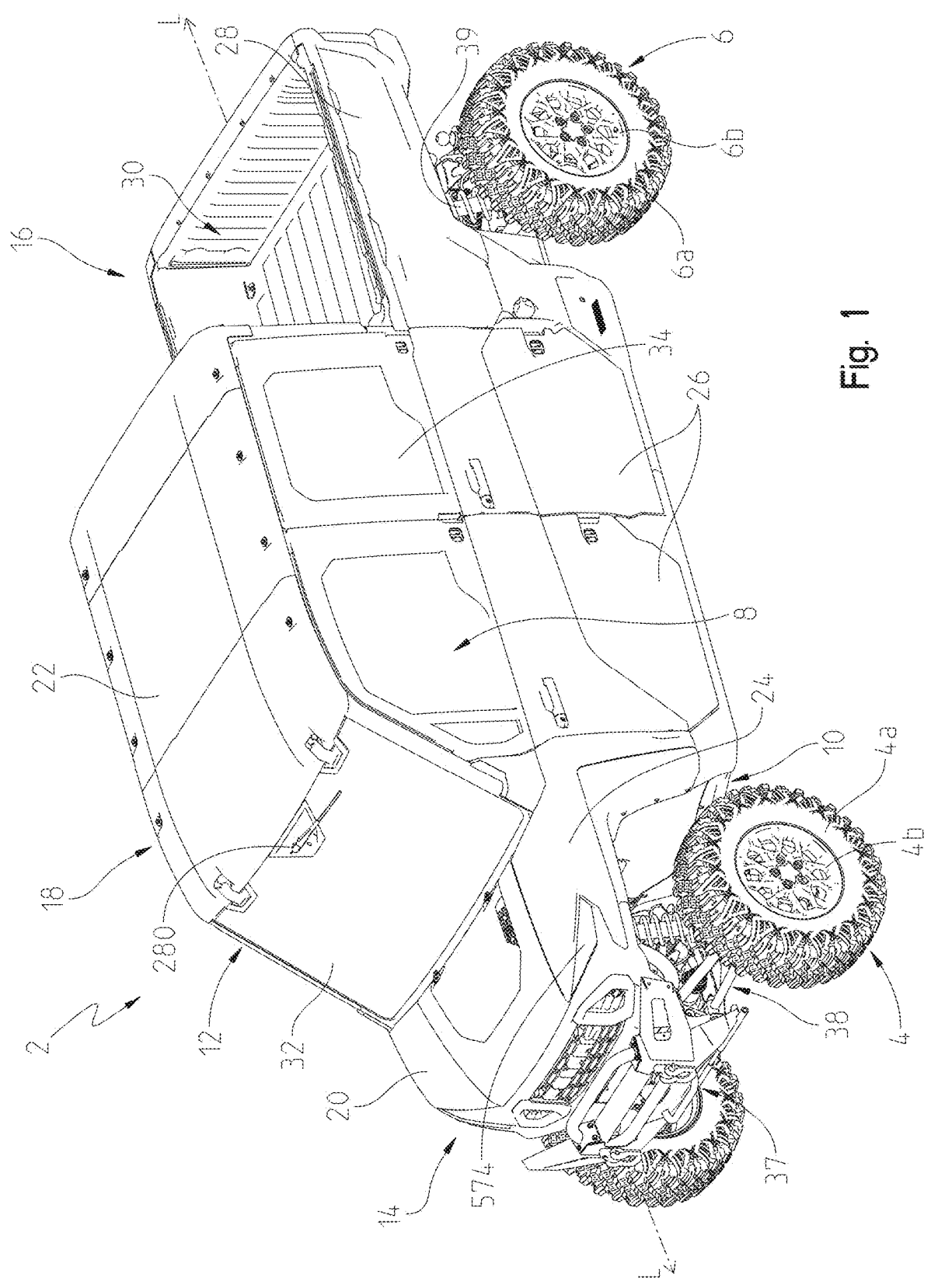
FIG. 1 is a front left perspective view of a utility vehicle of the present disclosure.
Figure 2:
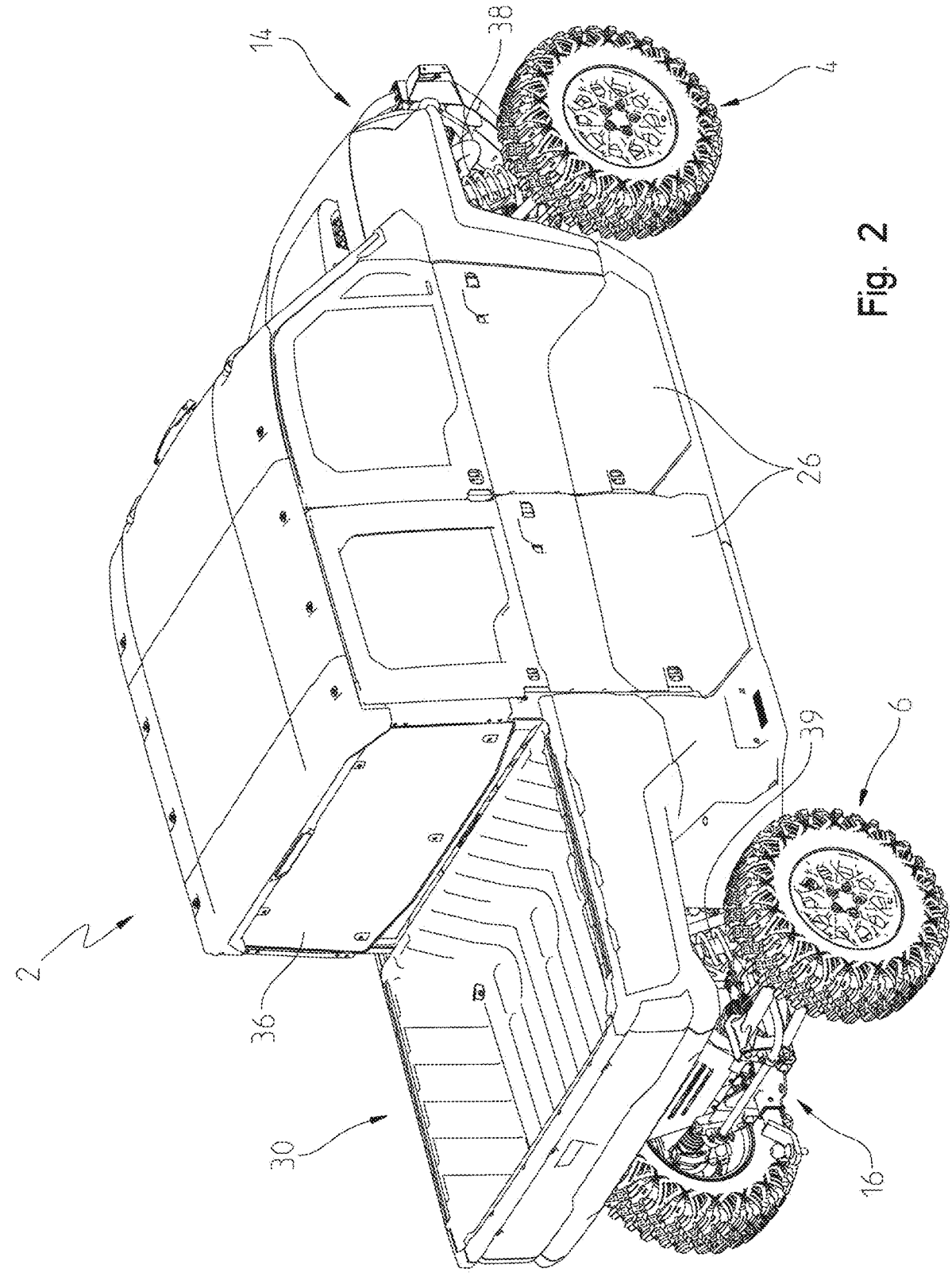
FIG. 2 is a rear right perspective view of the vehicle of FIG. 1.
Figure 3:
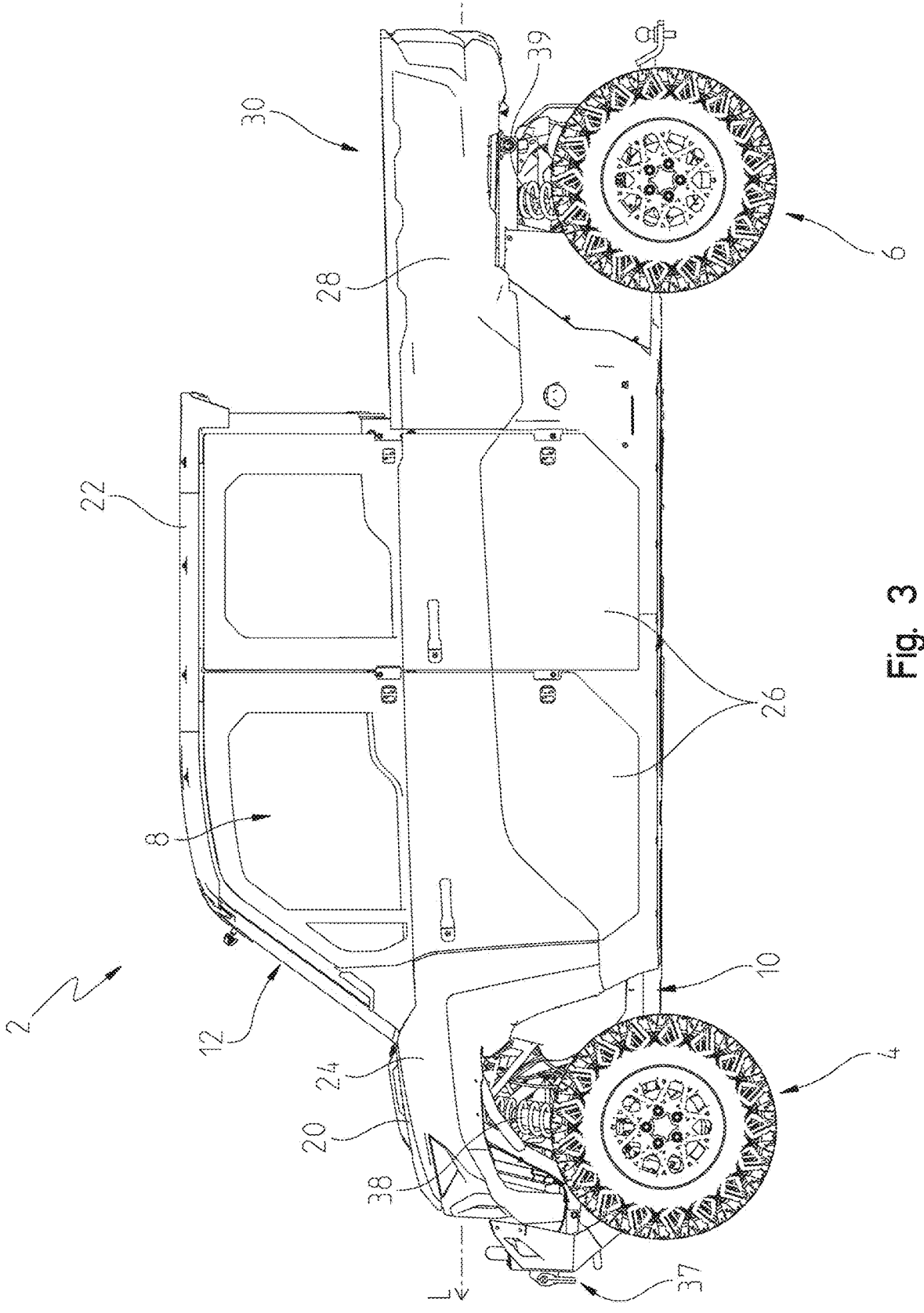
FIG. 3 is a left side view of the of the vehicle of FIG. 1.
Figure 4:
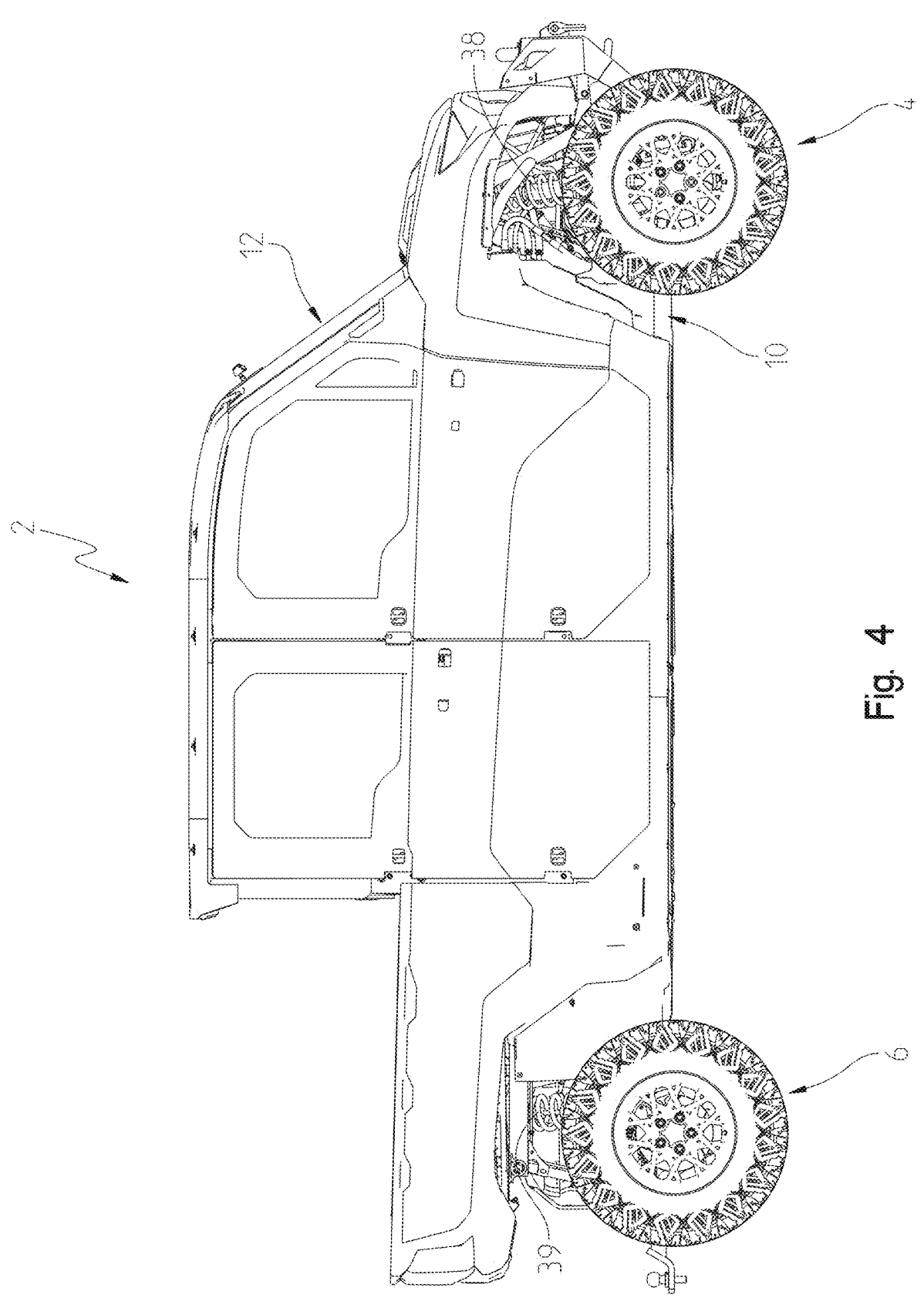
FIG. 4 is a right side view of the vehicle of FIG. 1.
Figure 5:
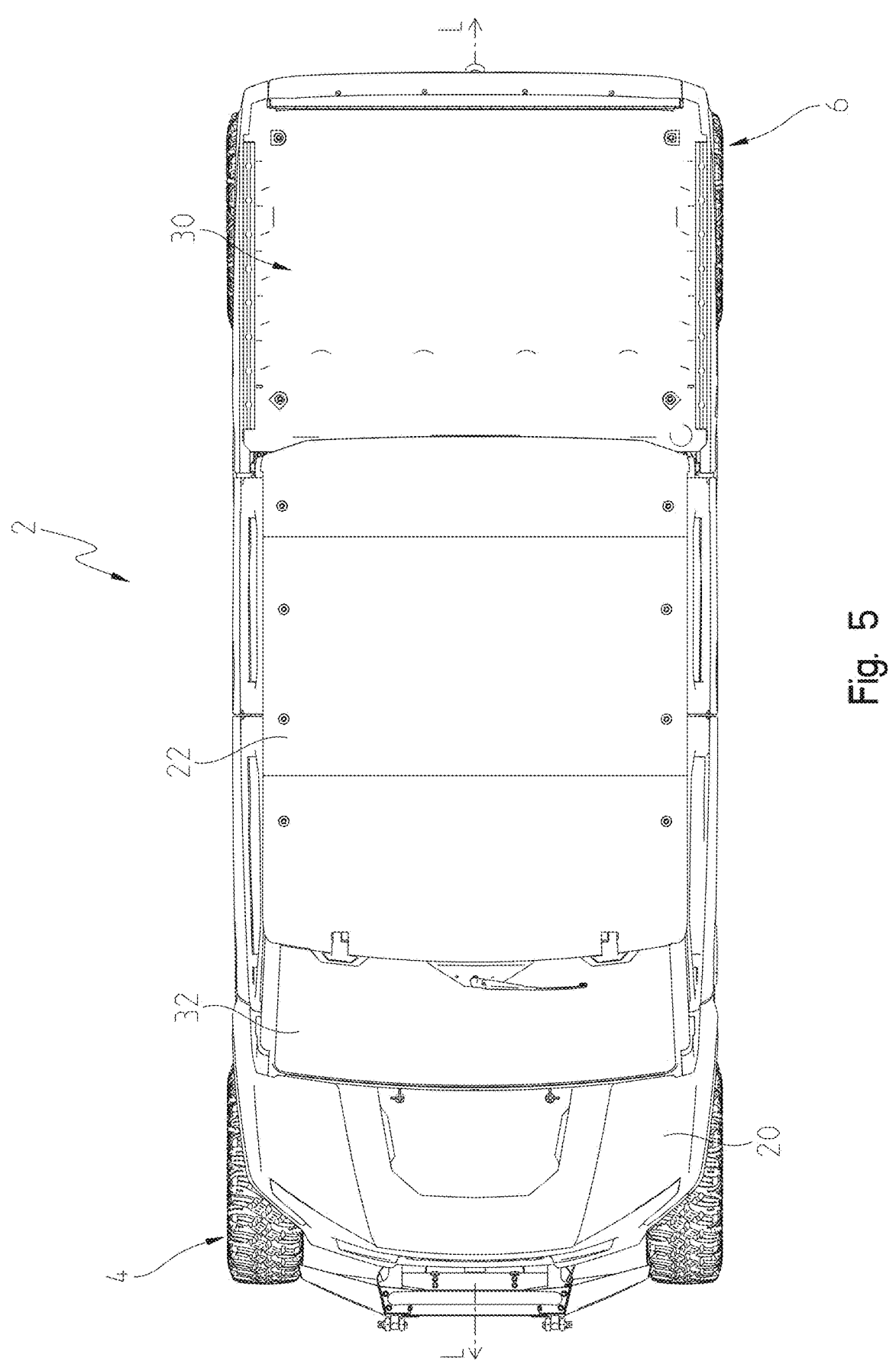
FIG. 5 is a top view of the vehicle of FIG. 1.
Figures 6, 7:
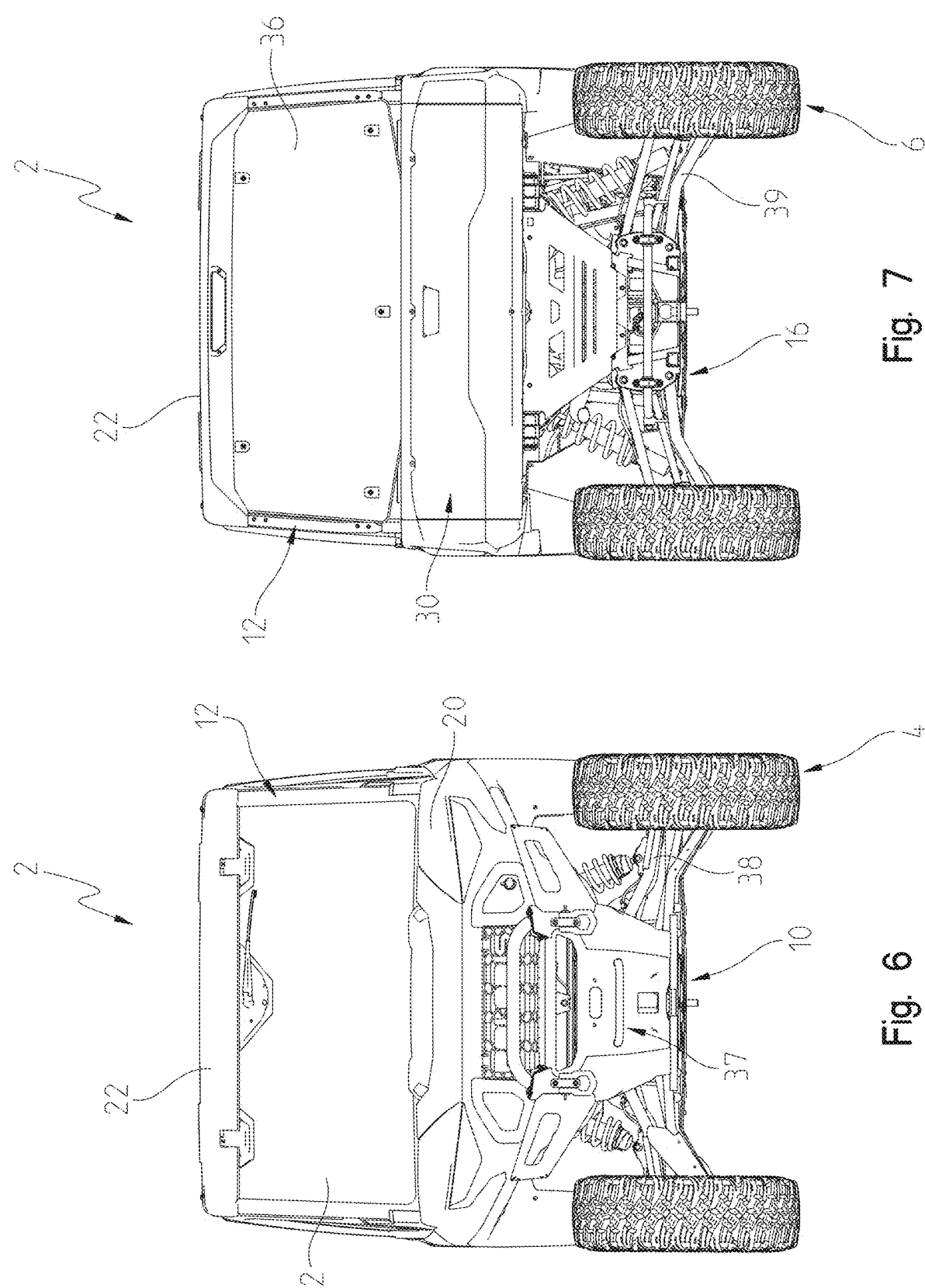
FIG. 6 is a front view of the vehicle of FIG. 1.
FIG. 7 is a rear view of the vehicle of FIG. 1.
Figure 121:
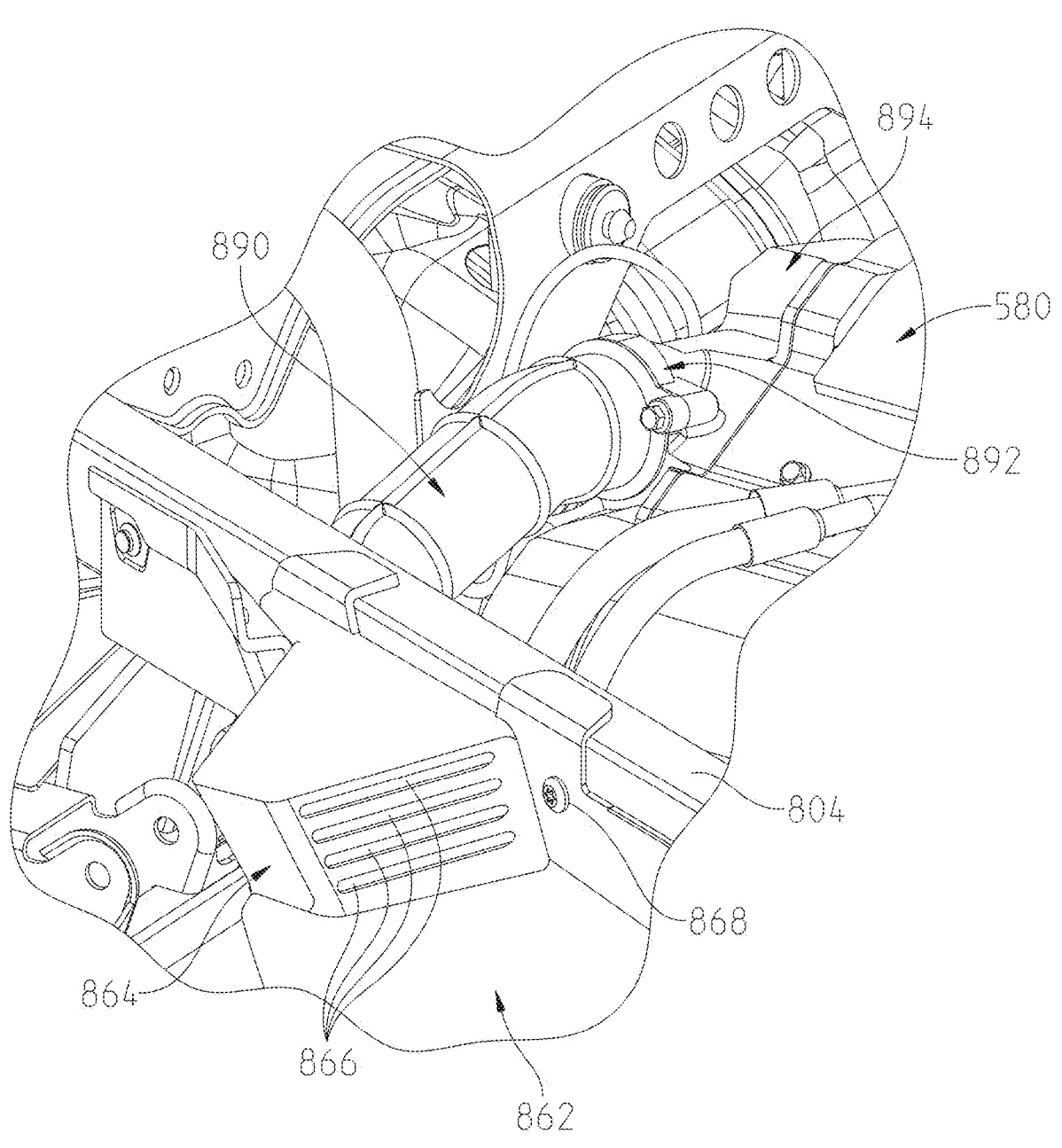
Figure 122:
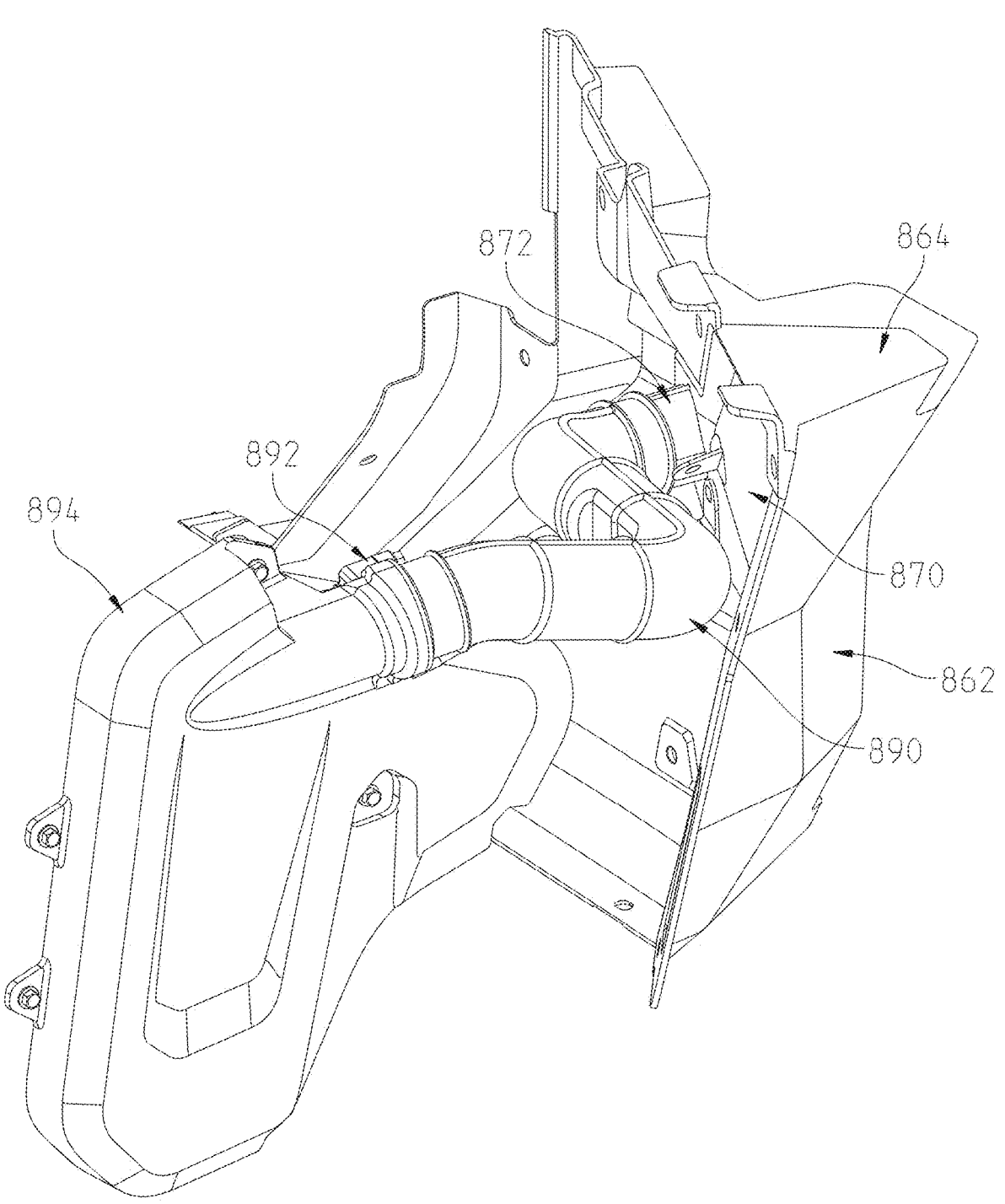
Figure 123:
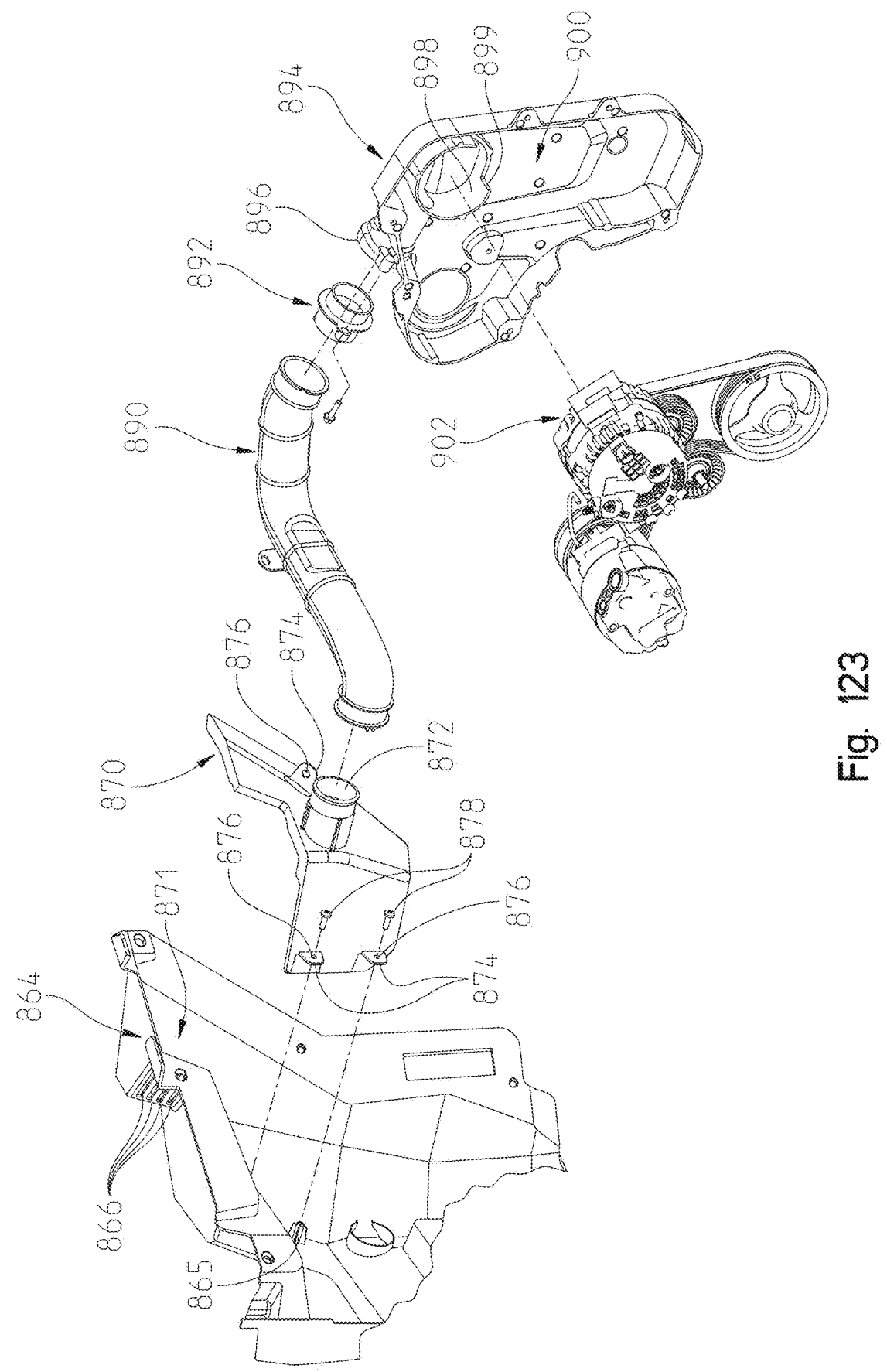
Figure 124:
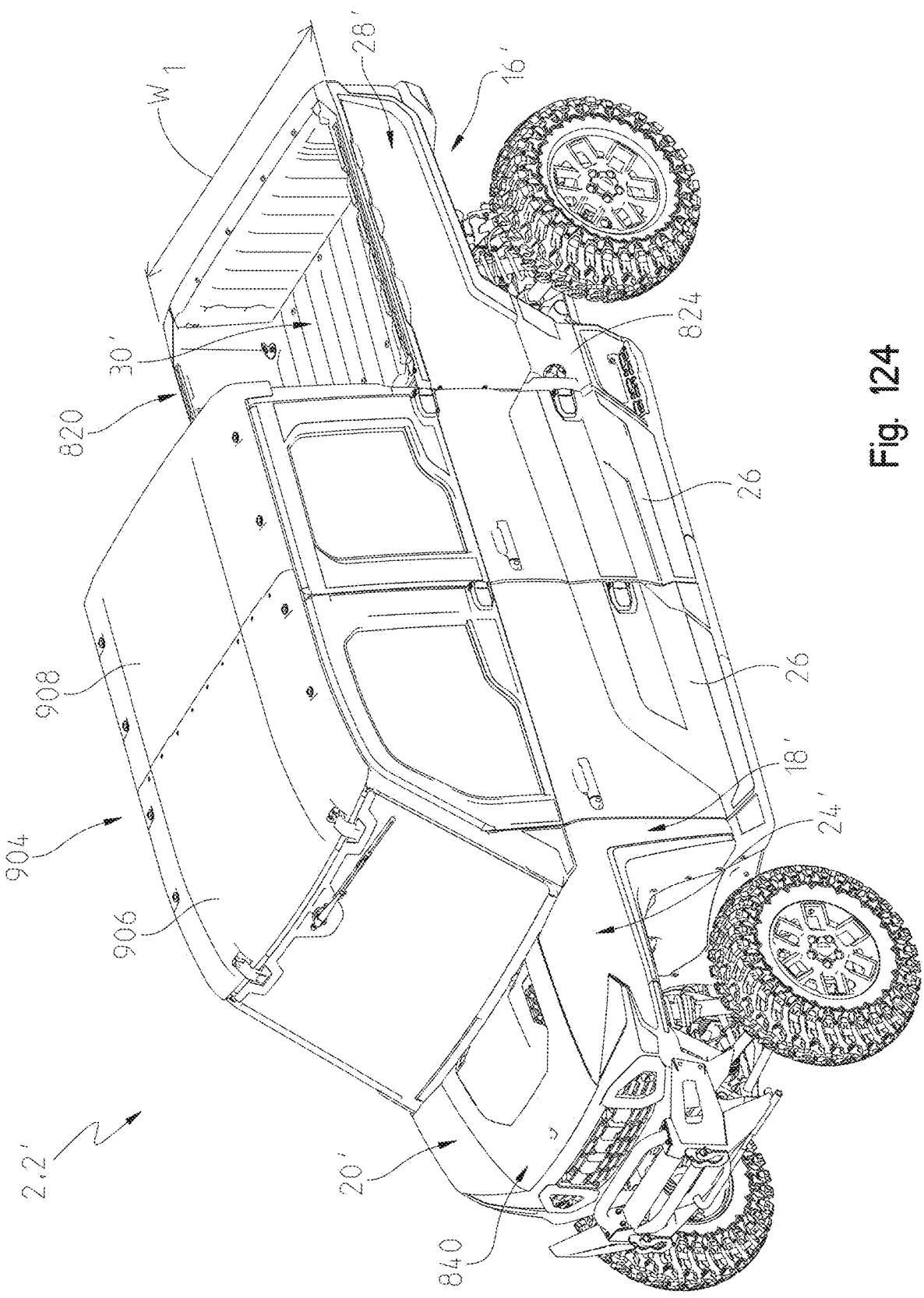
Figure 125:
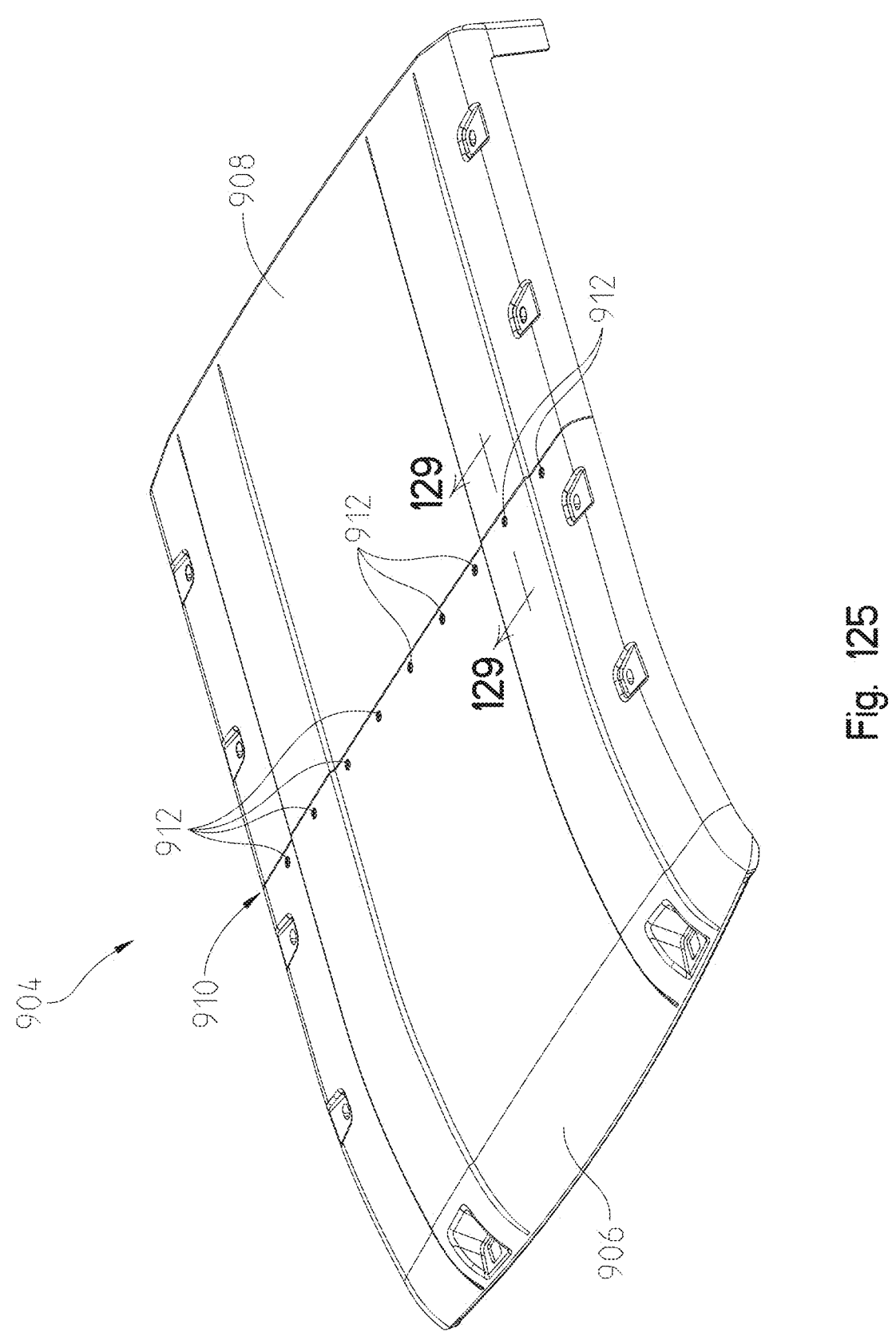
Figure 126:
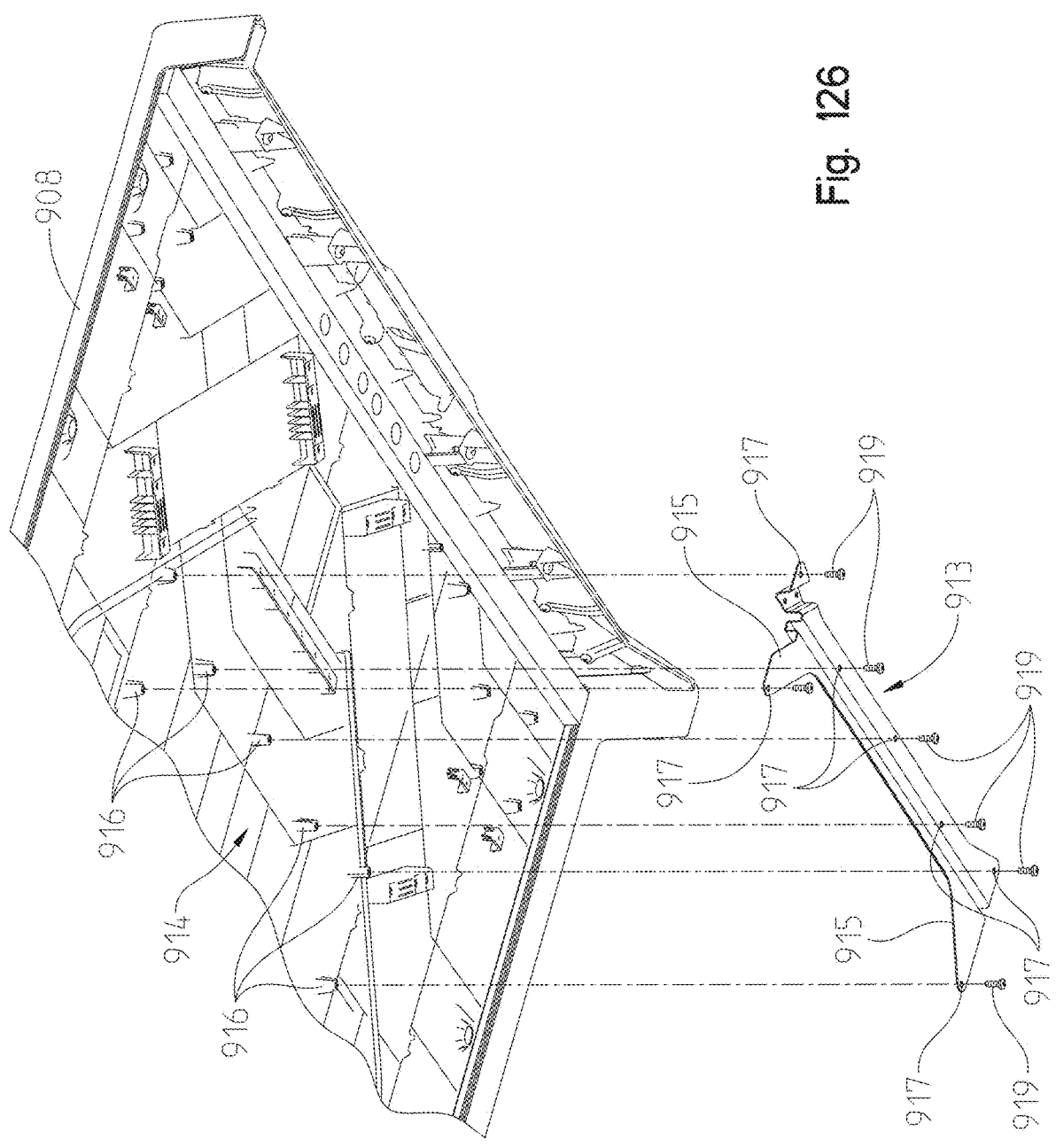
Figure 127:
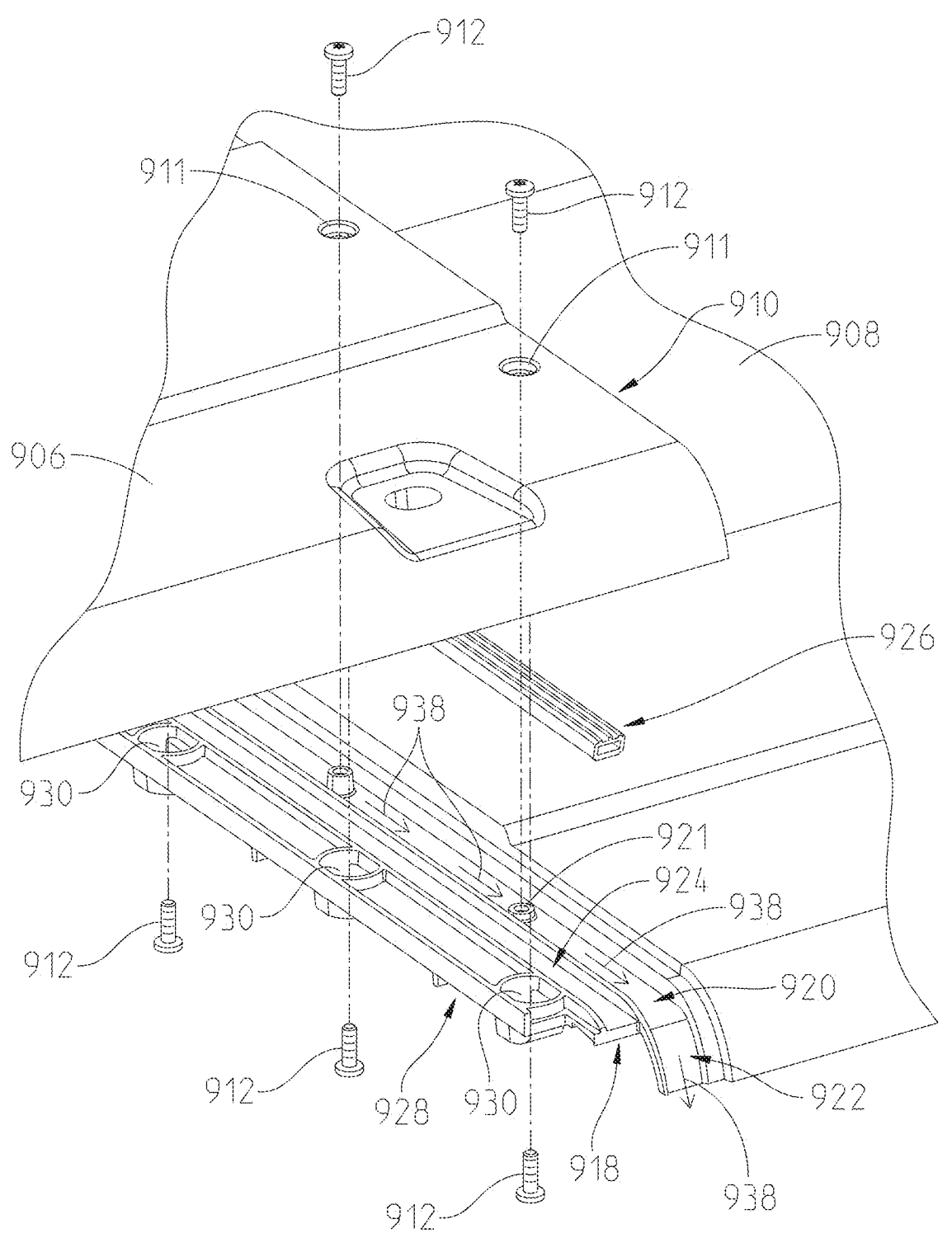
Figure 128:
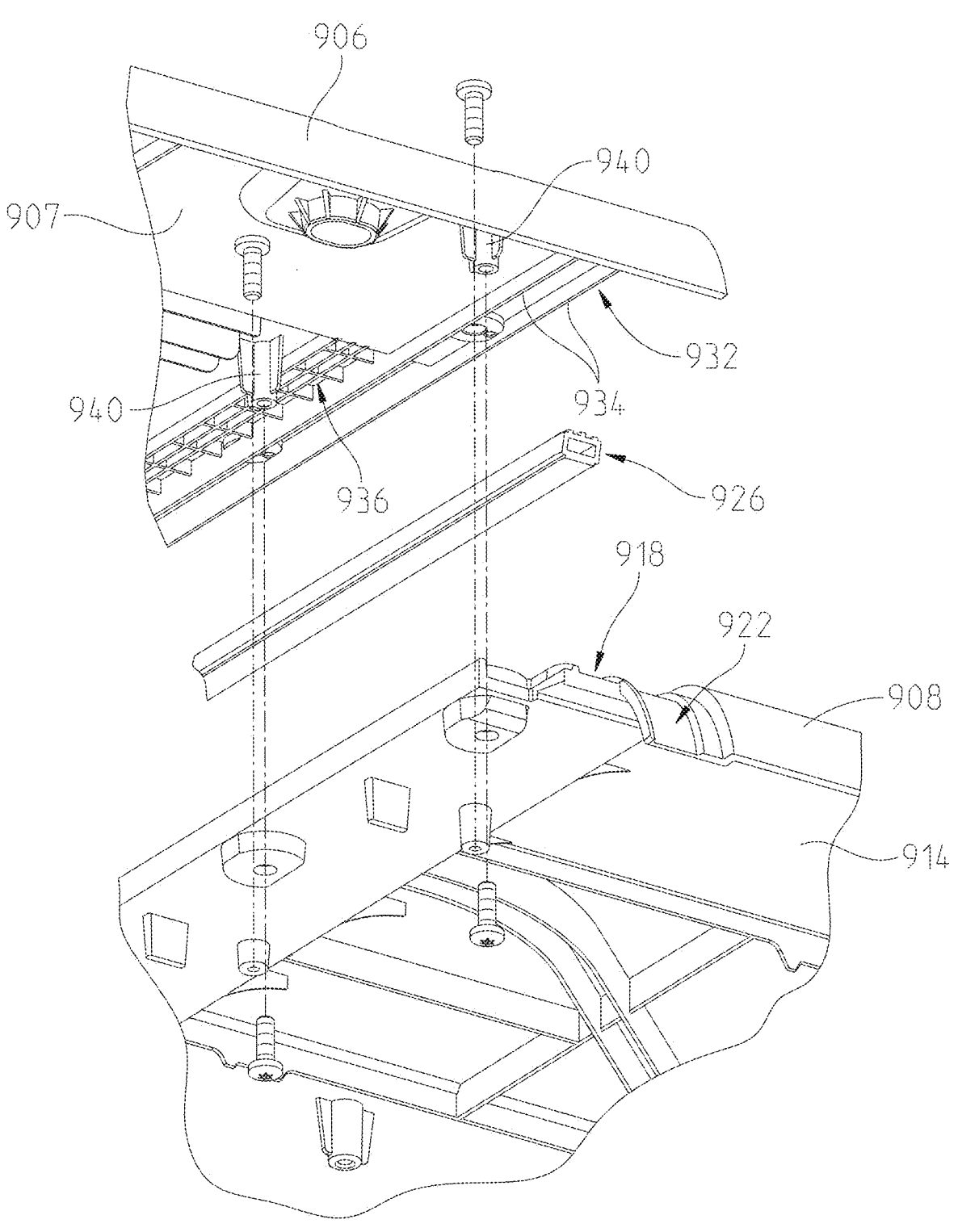
Figure 129:
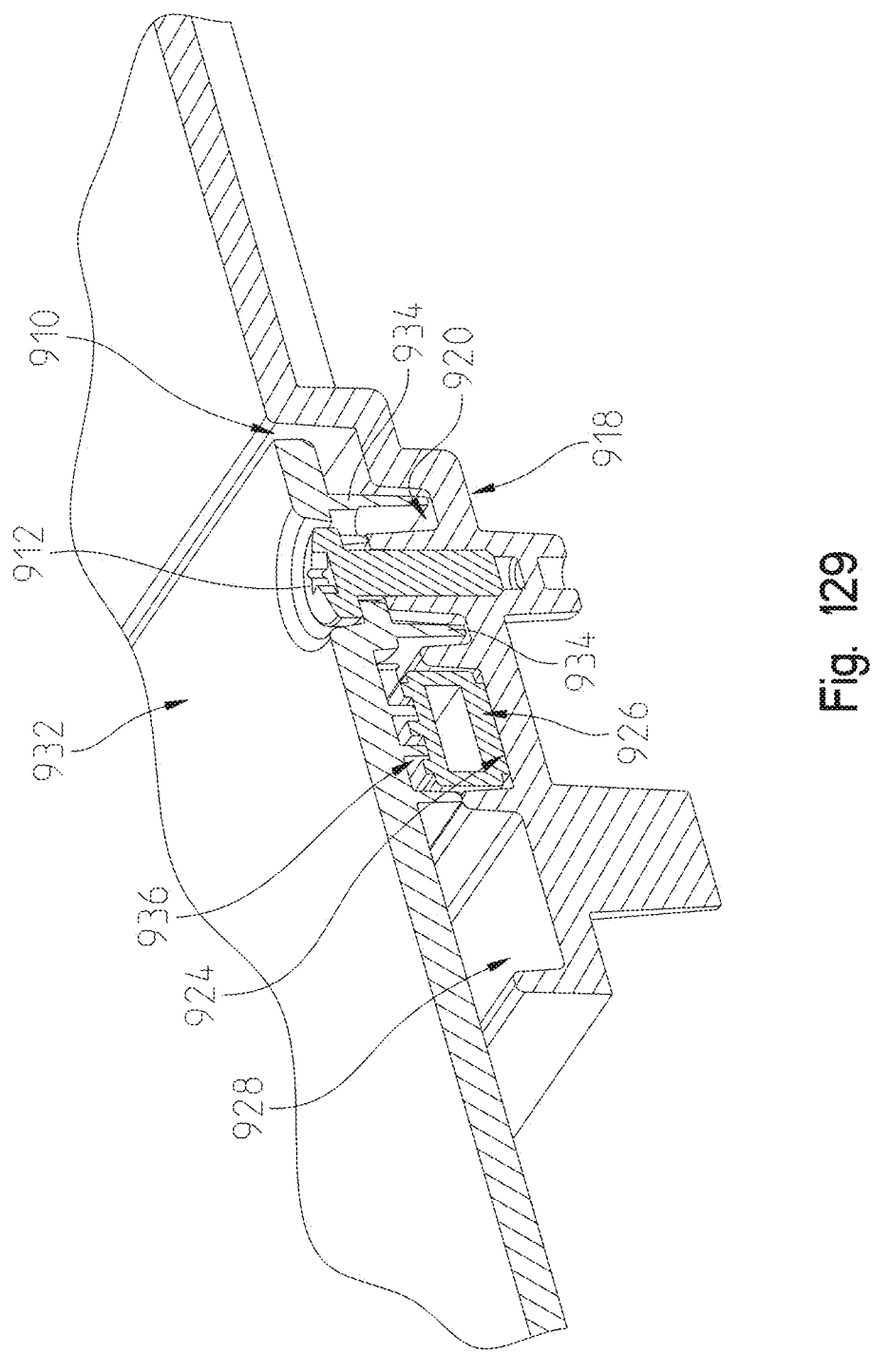
Figure 130:
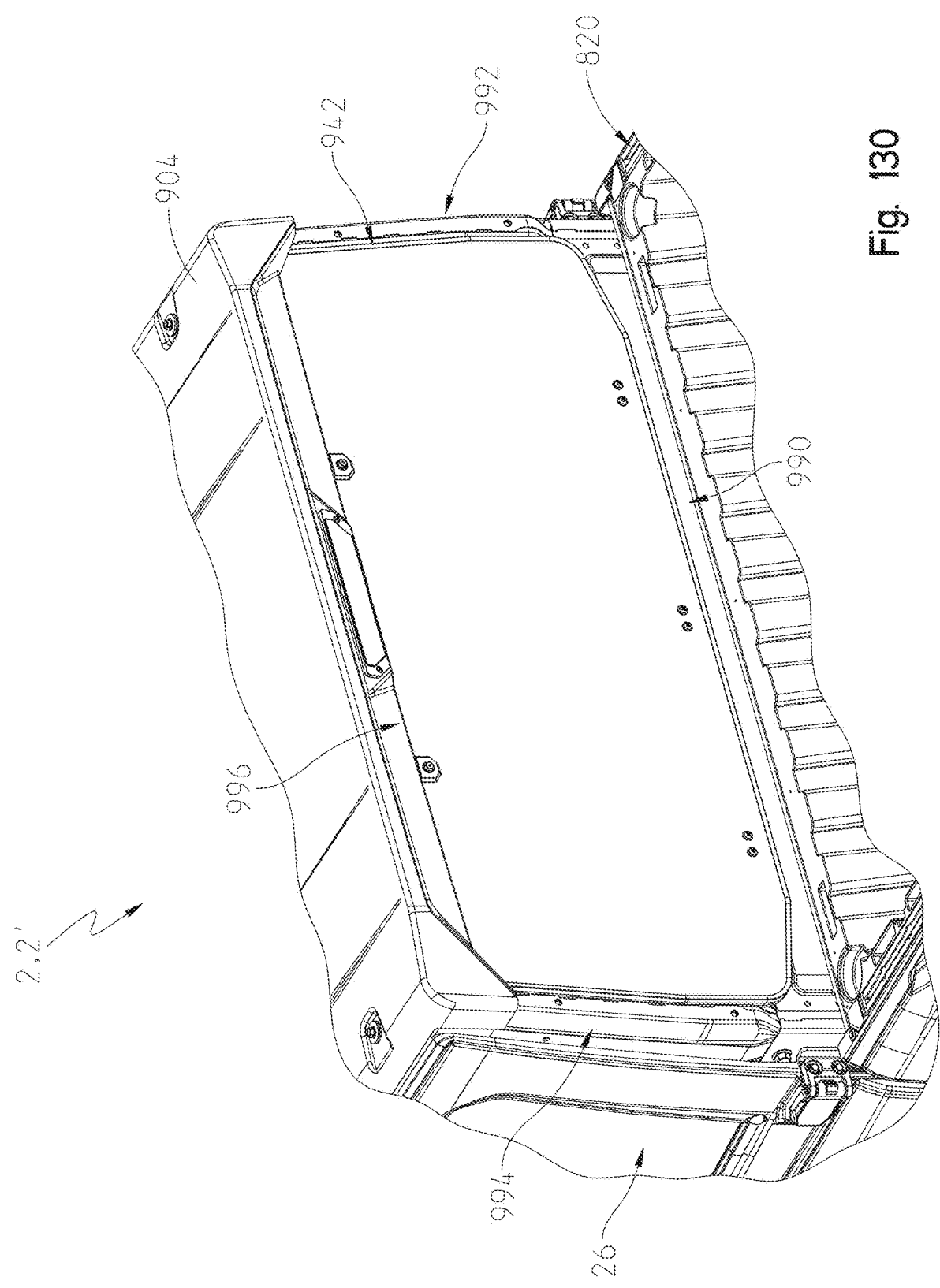
Figure 131:
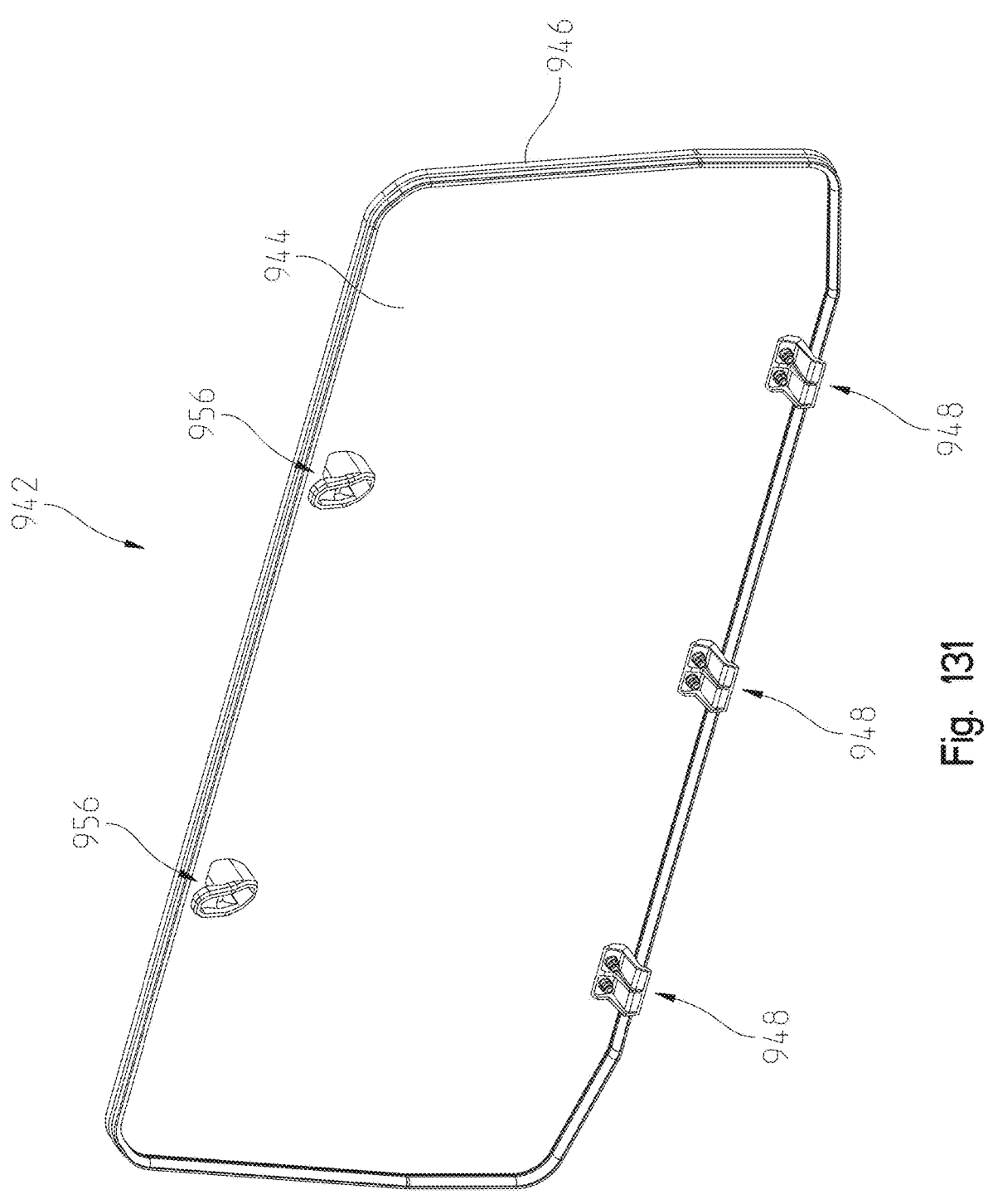
Figure 132:
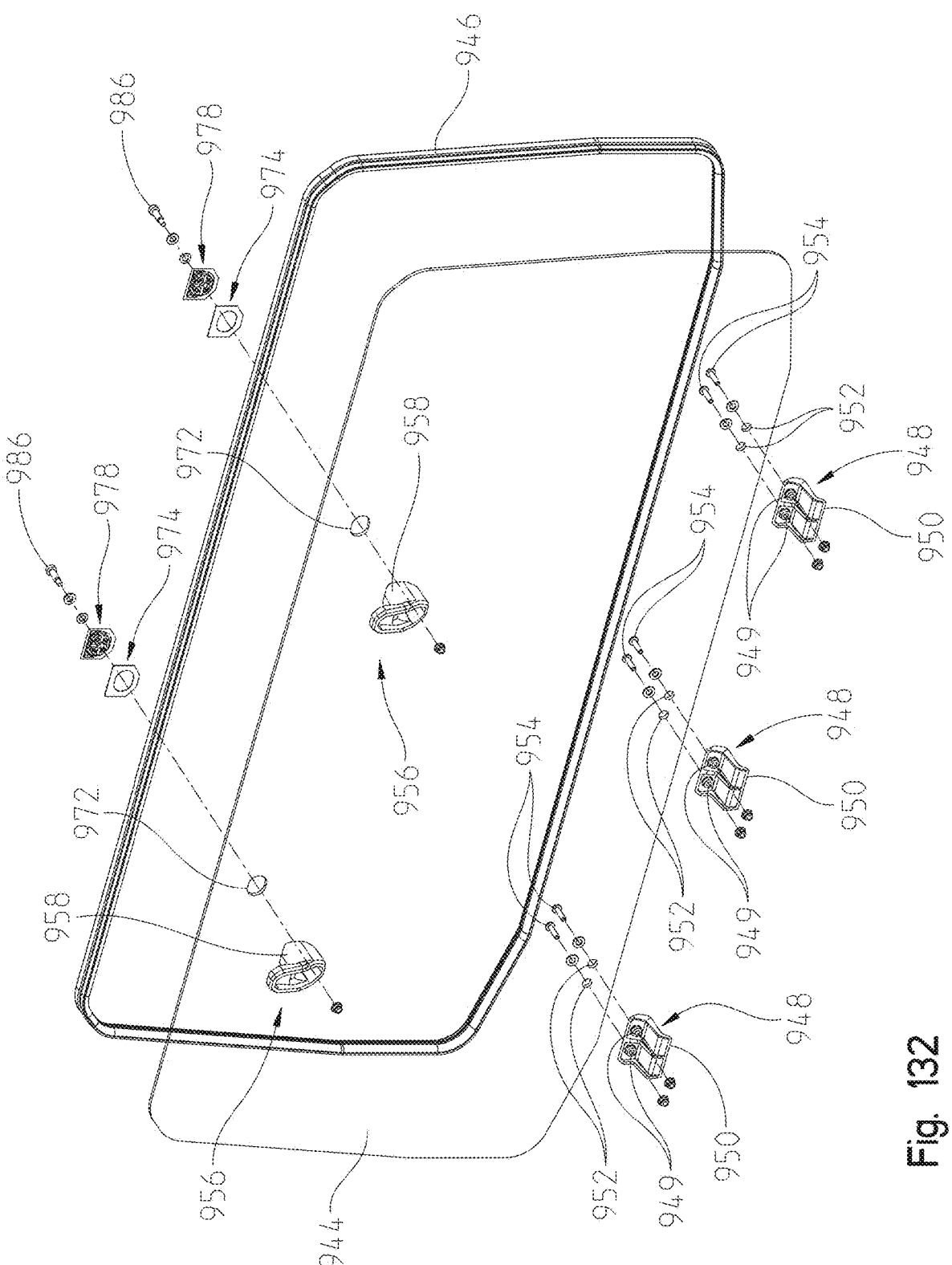
Figure 133:
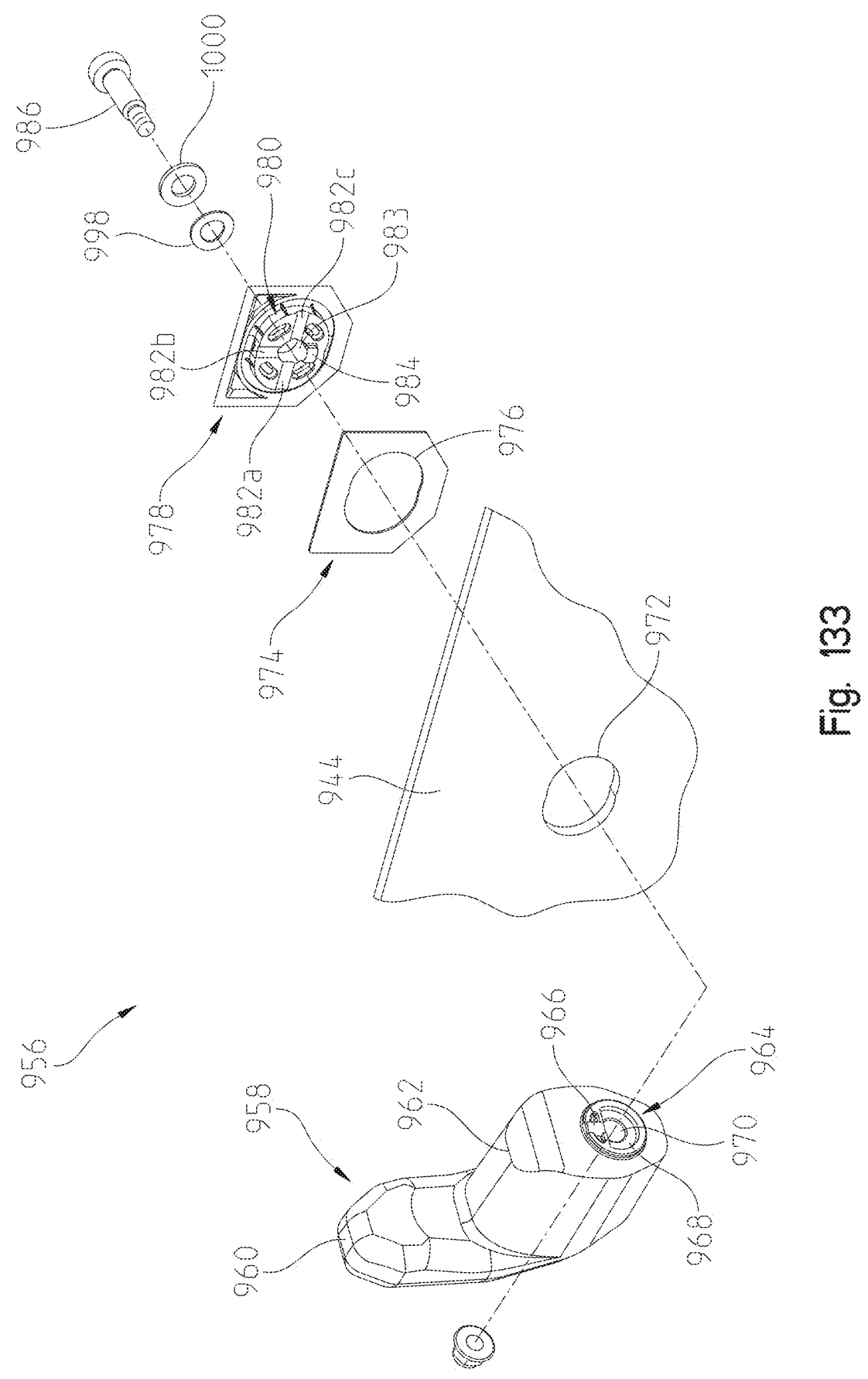
Figure 134:
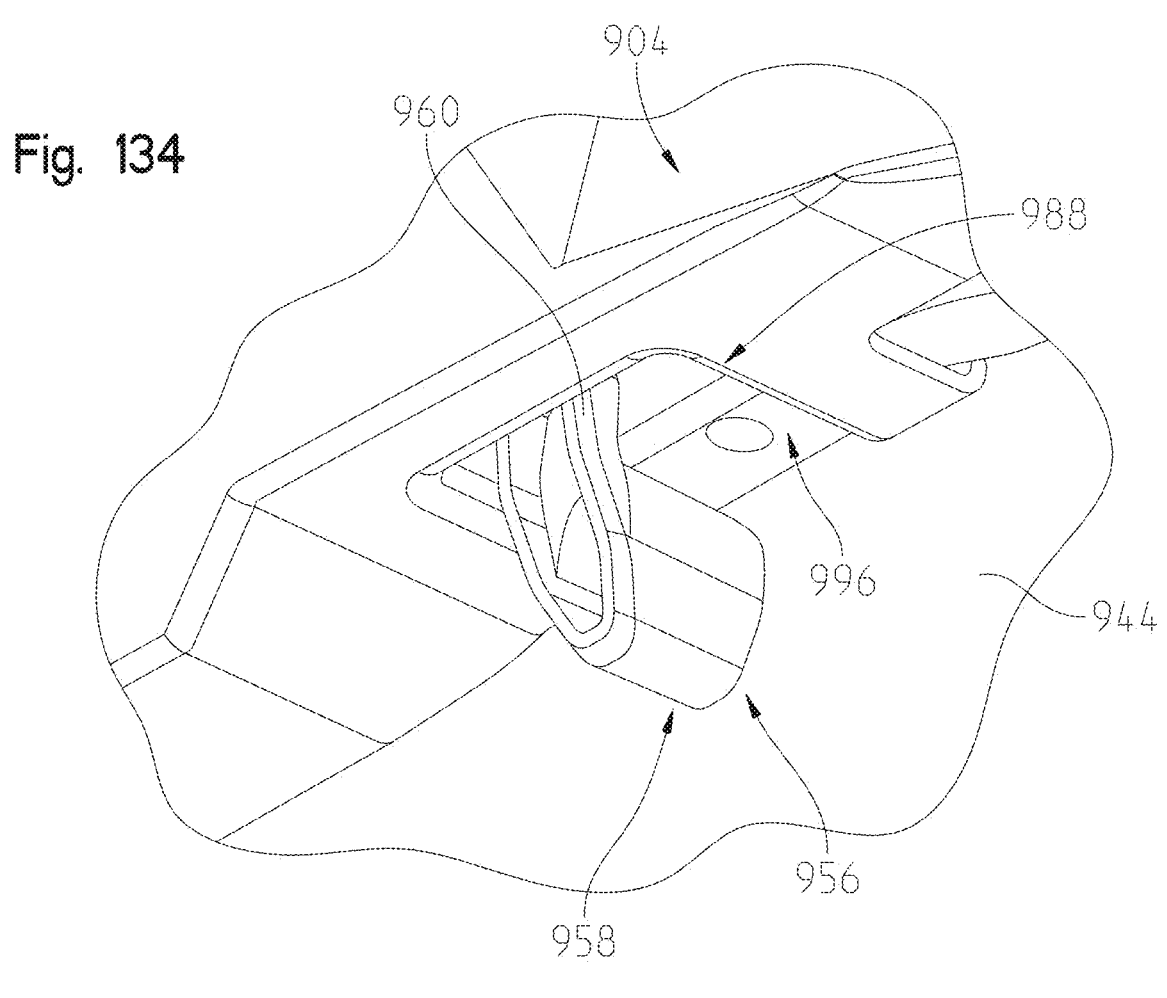
Figure 135:
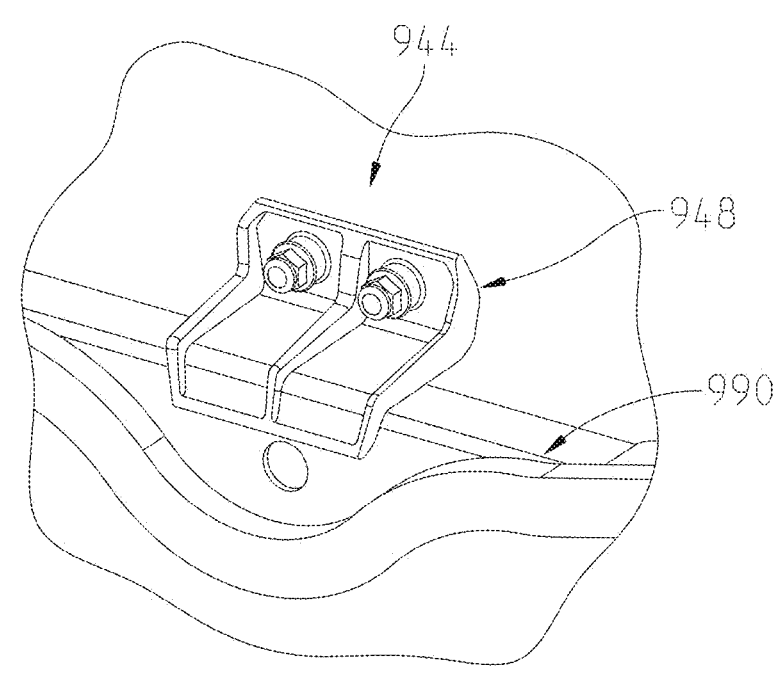
Figure 136:
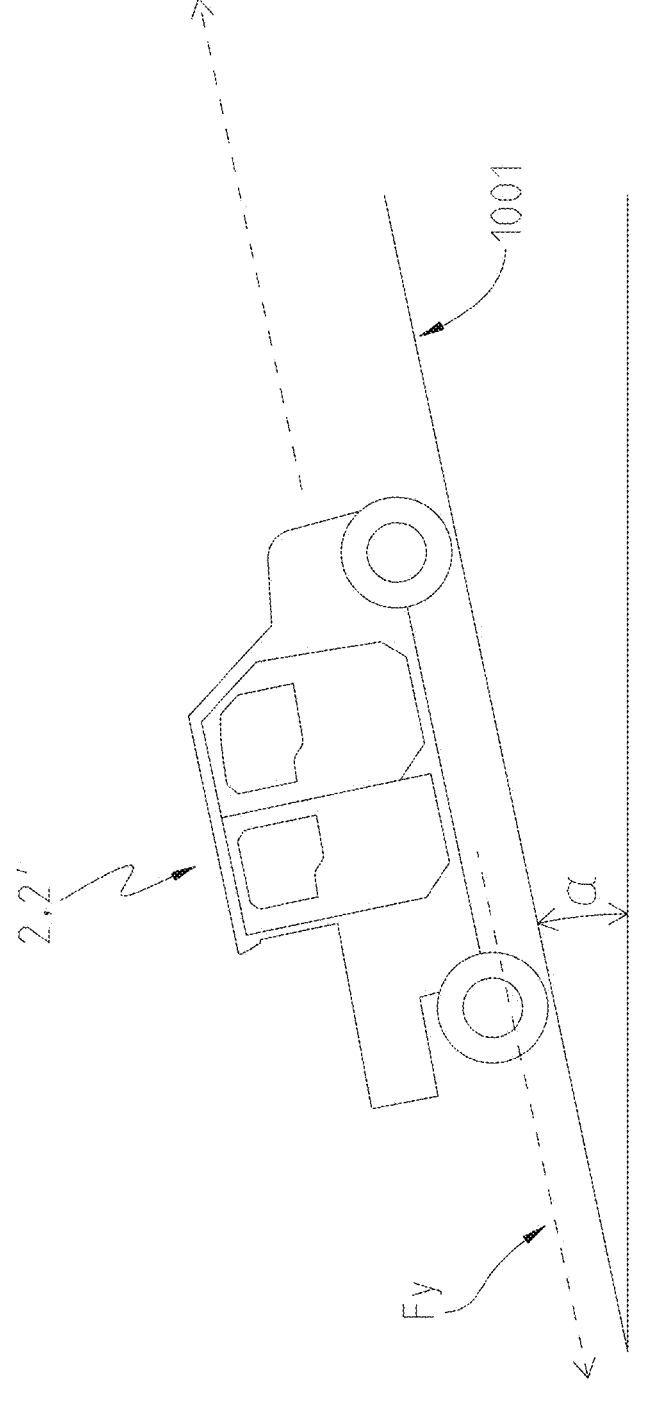
Figure 137:
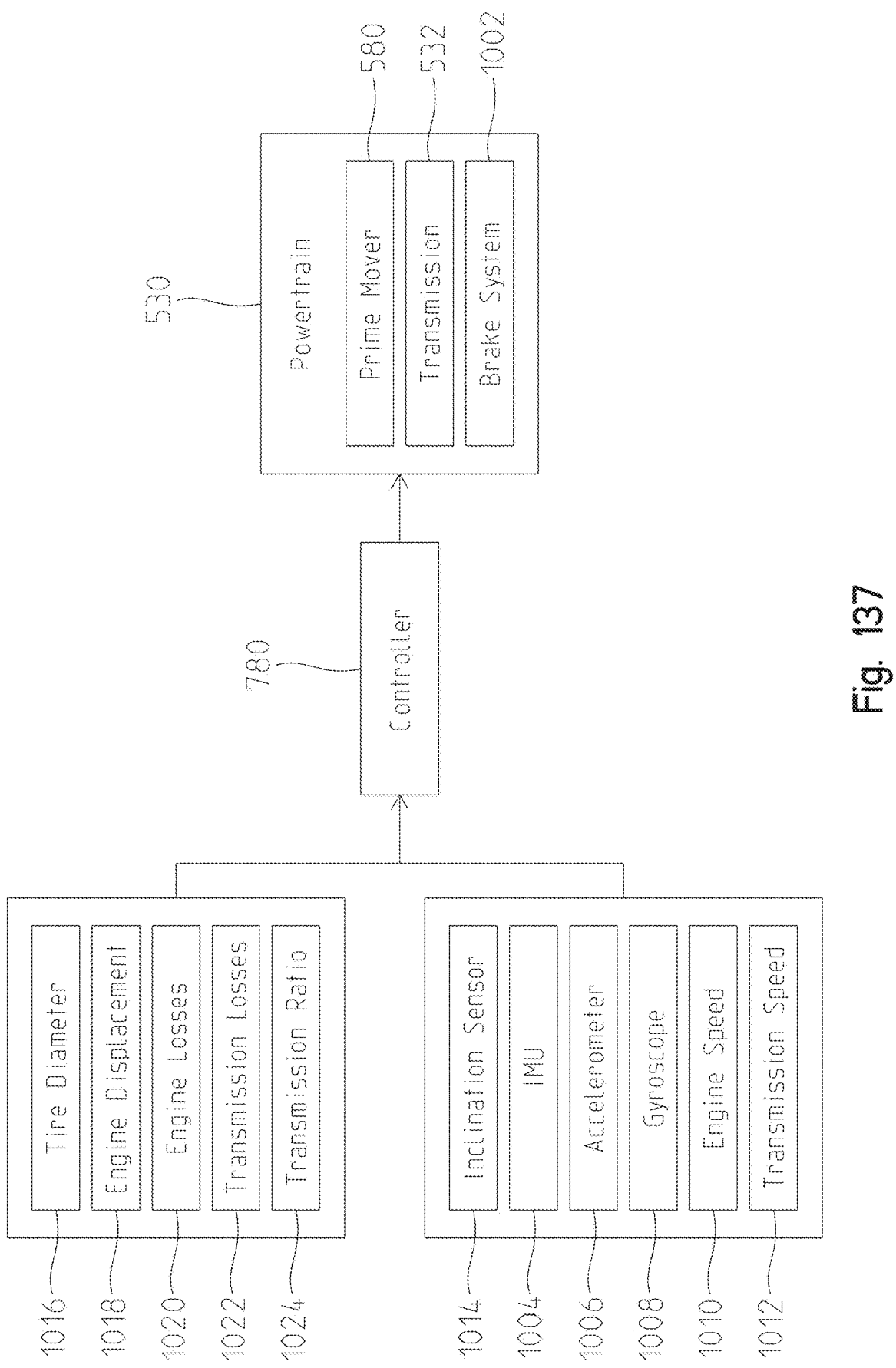
Figure 138:
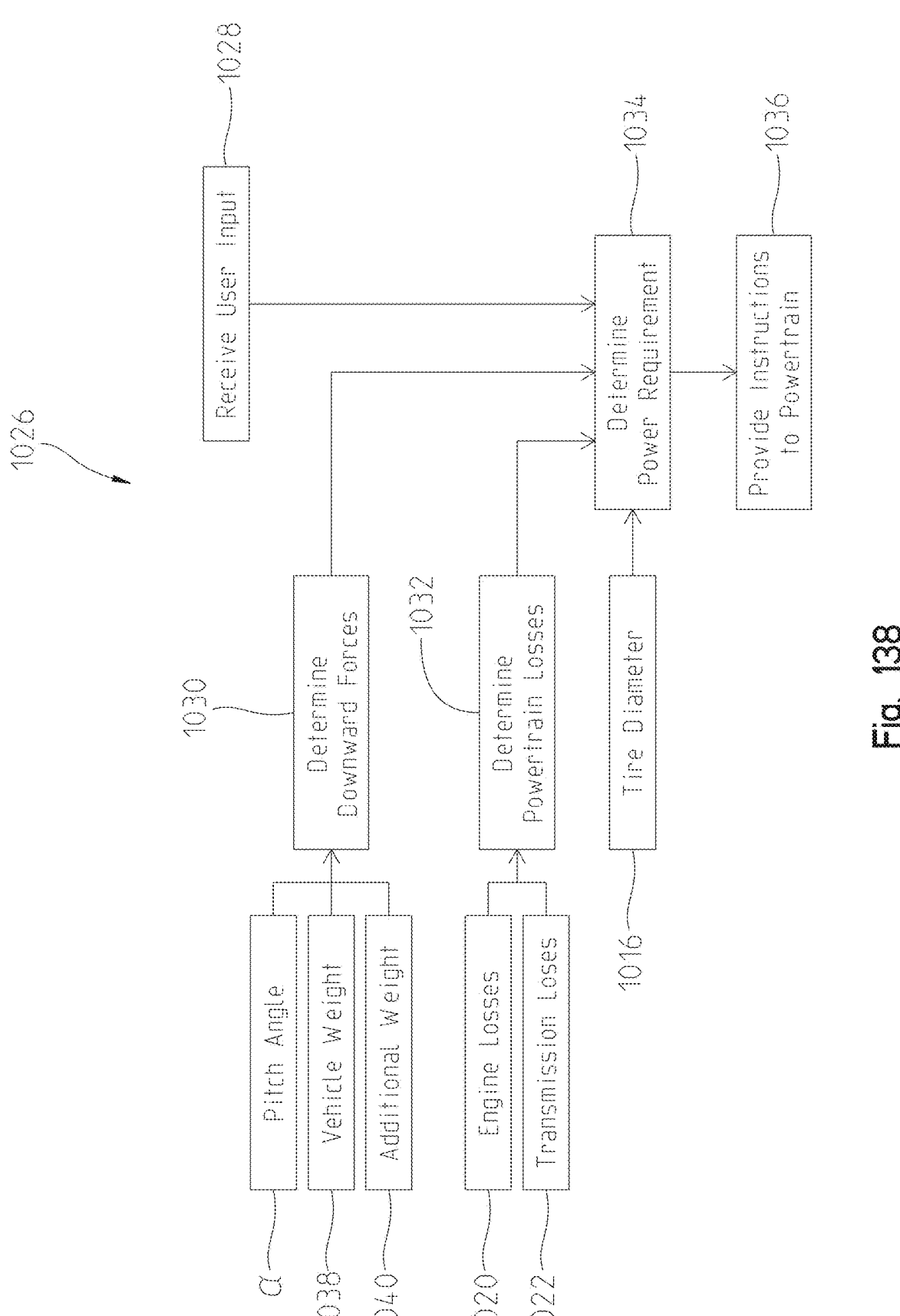
Figure 139:
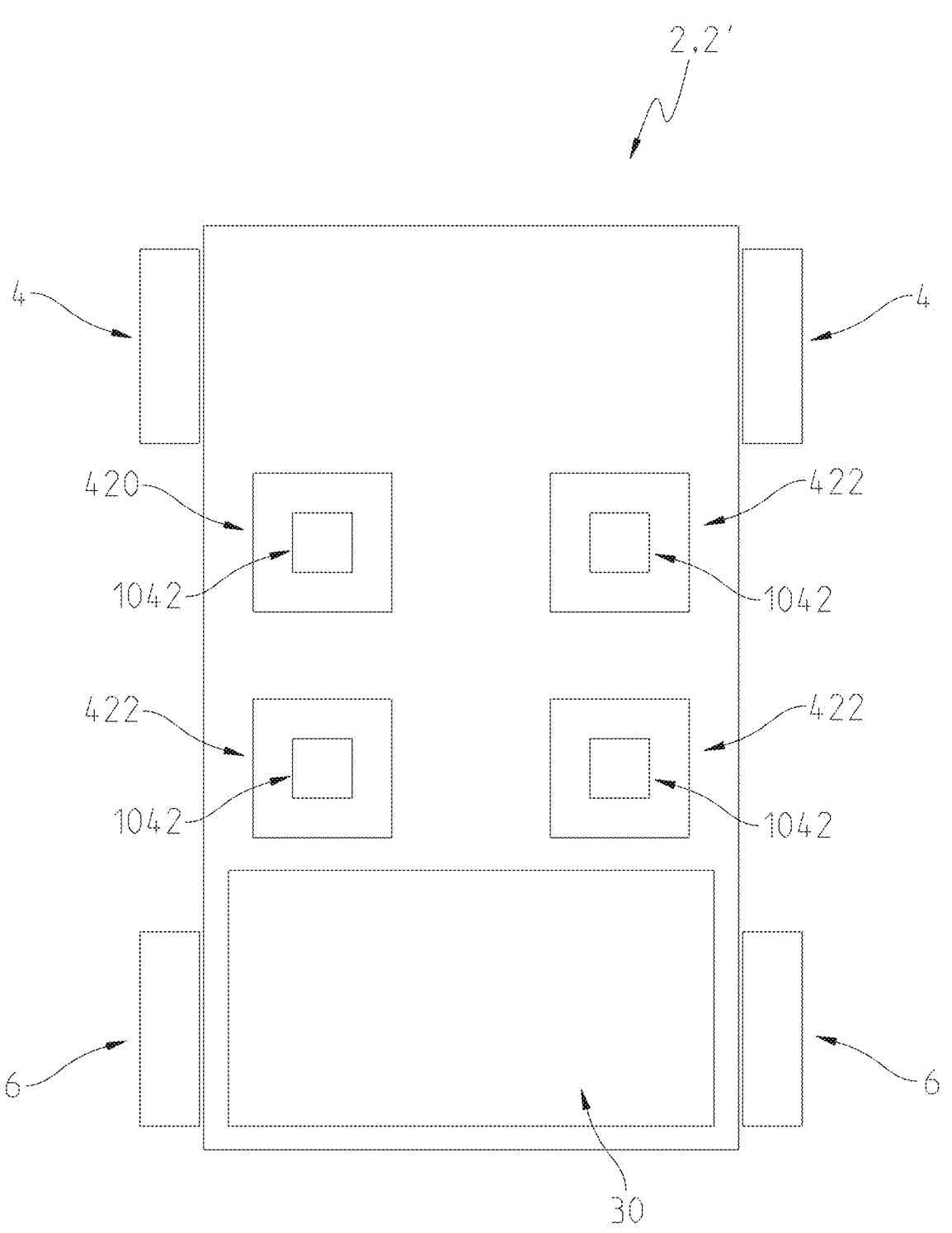
Figure 140:
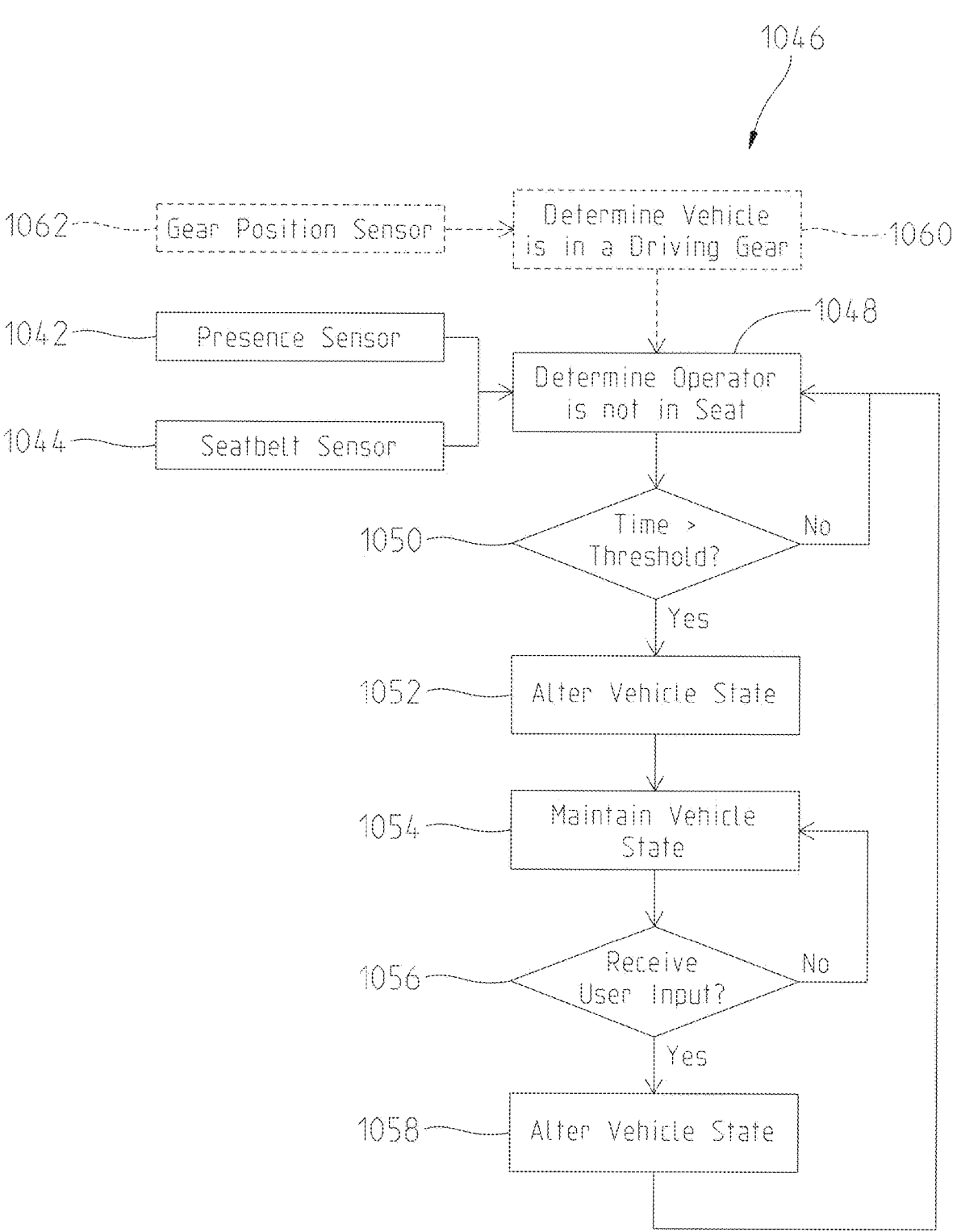
Figure 141:
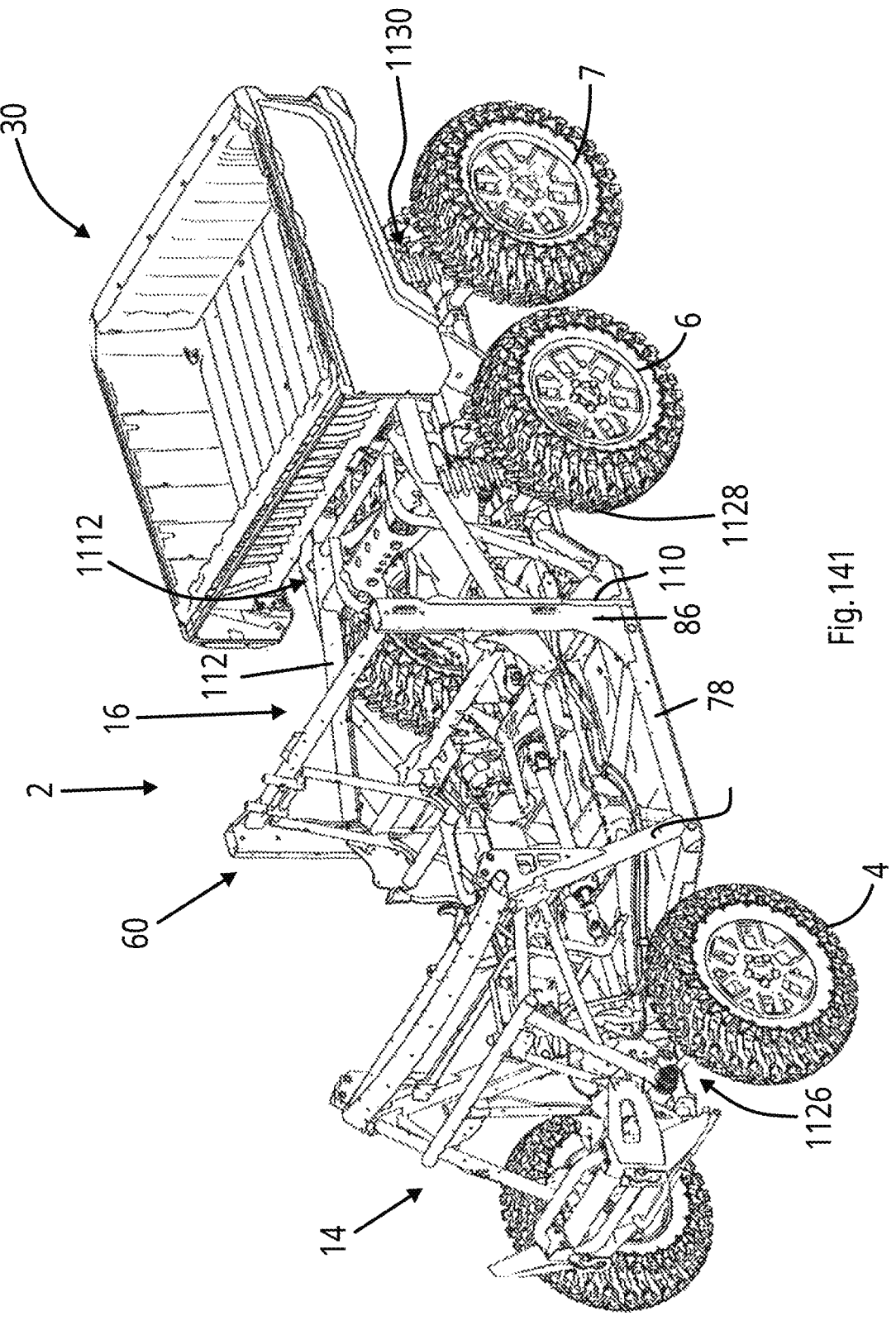
Figure 142:
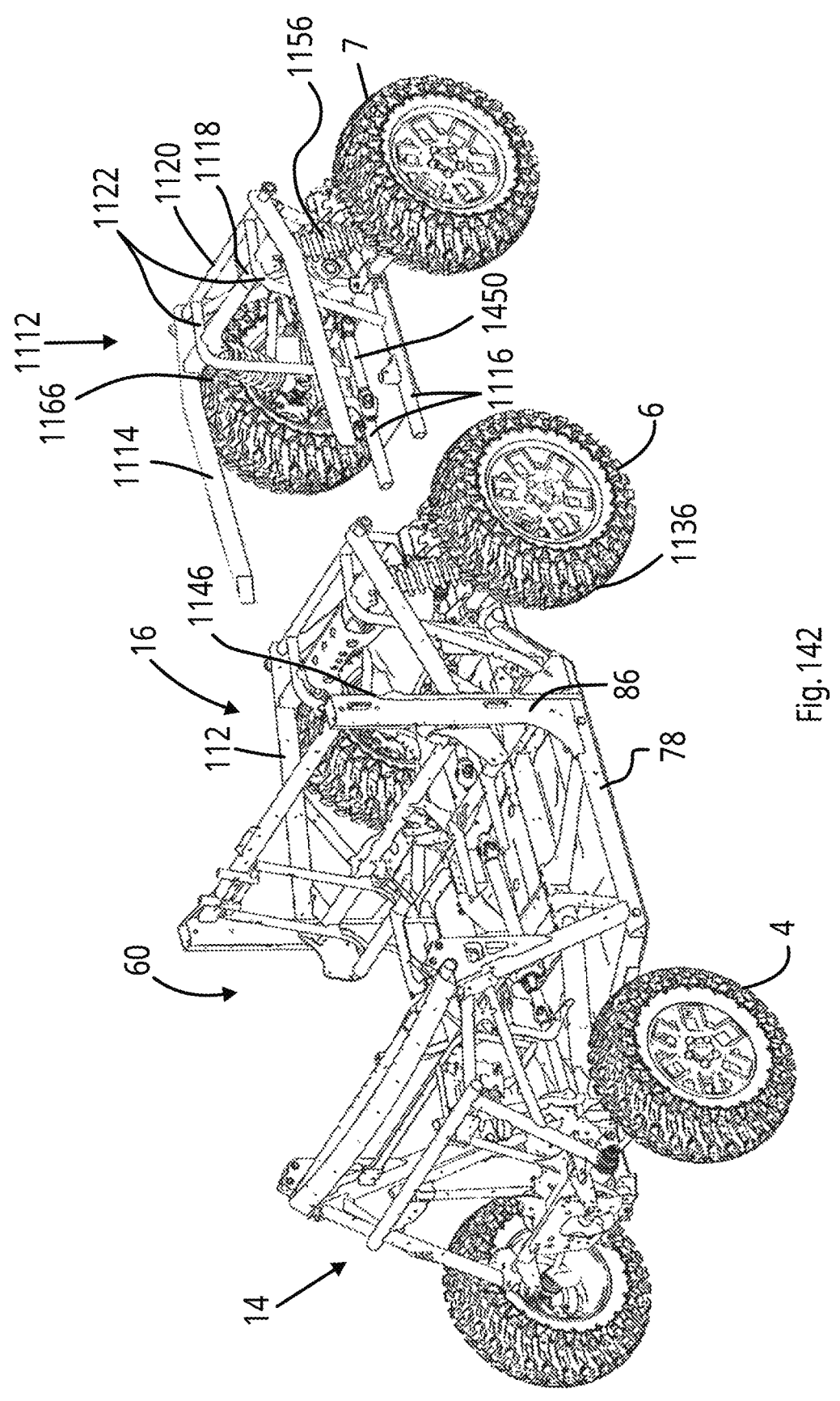
Figure 143:
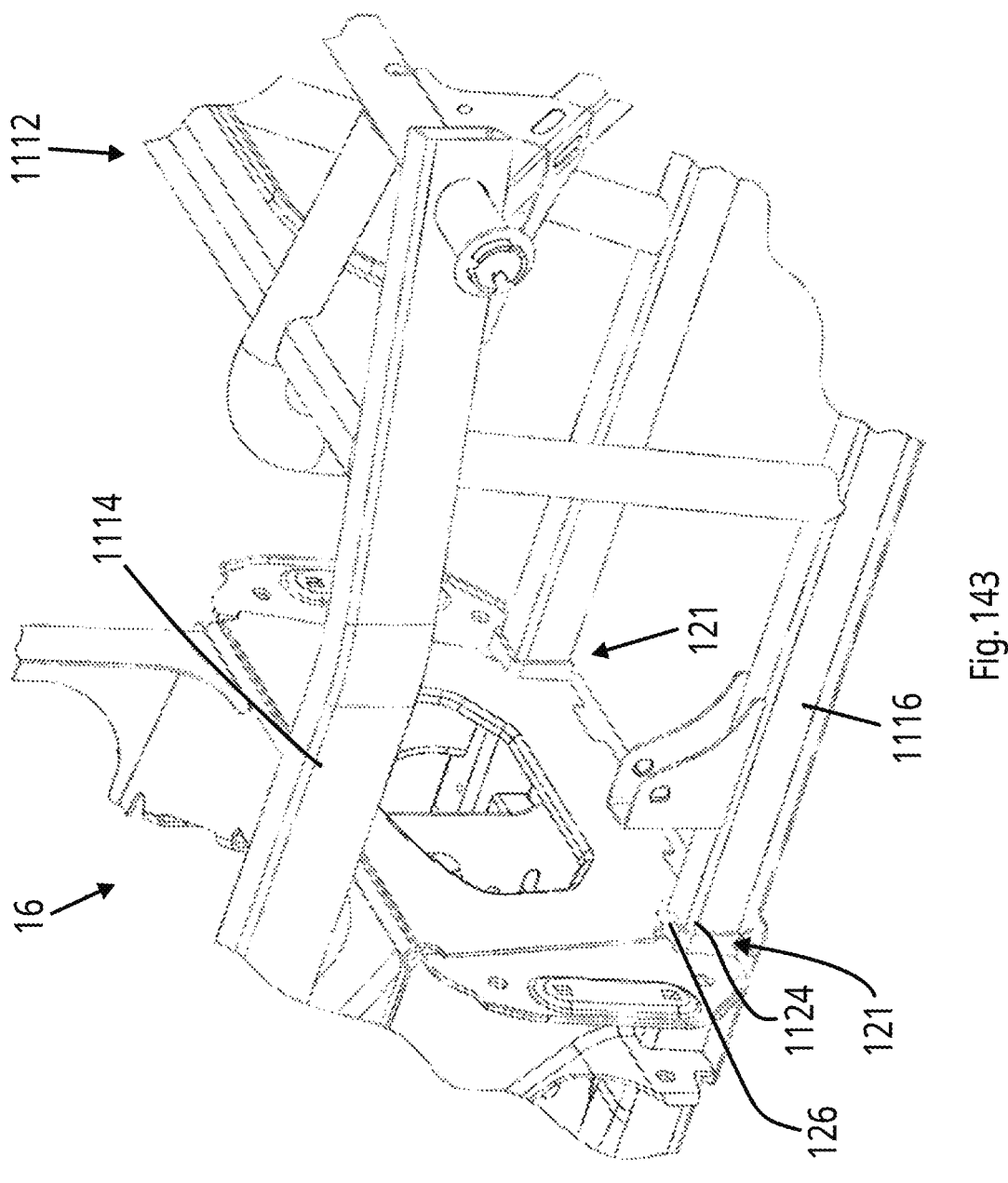
Figure 144:
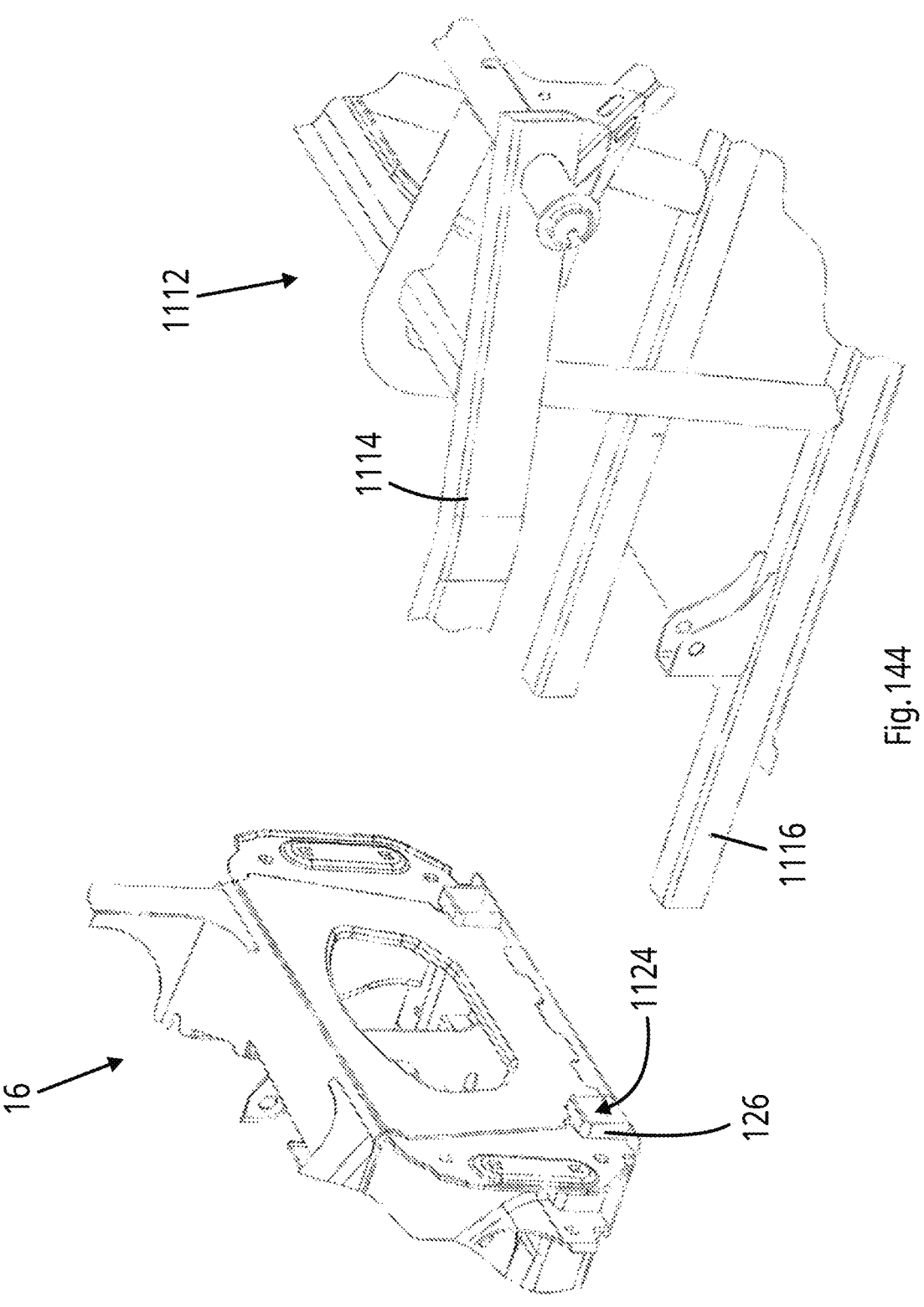
Figure 145:
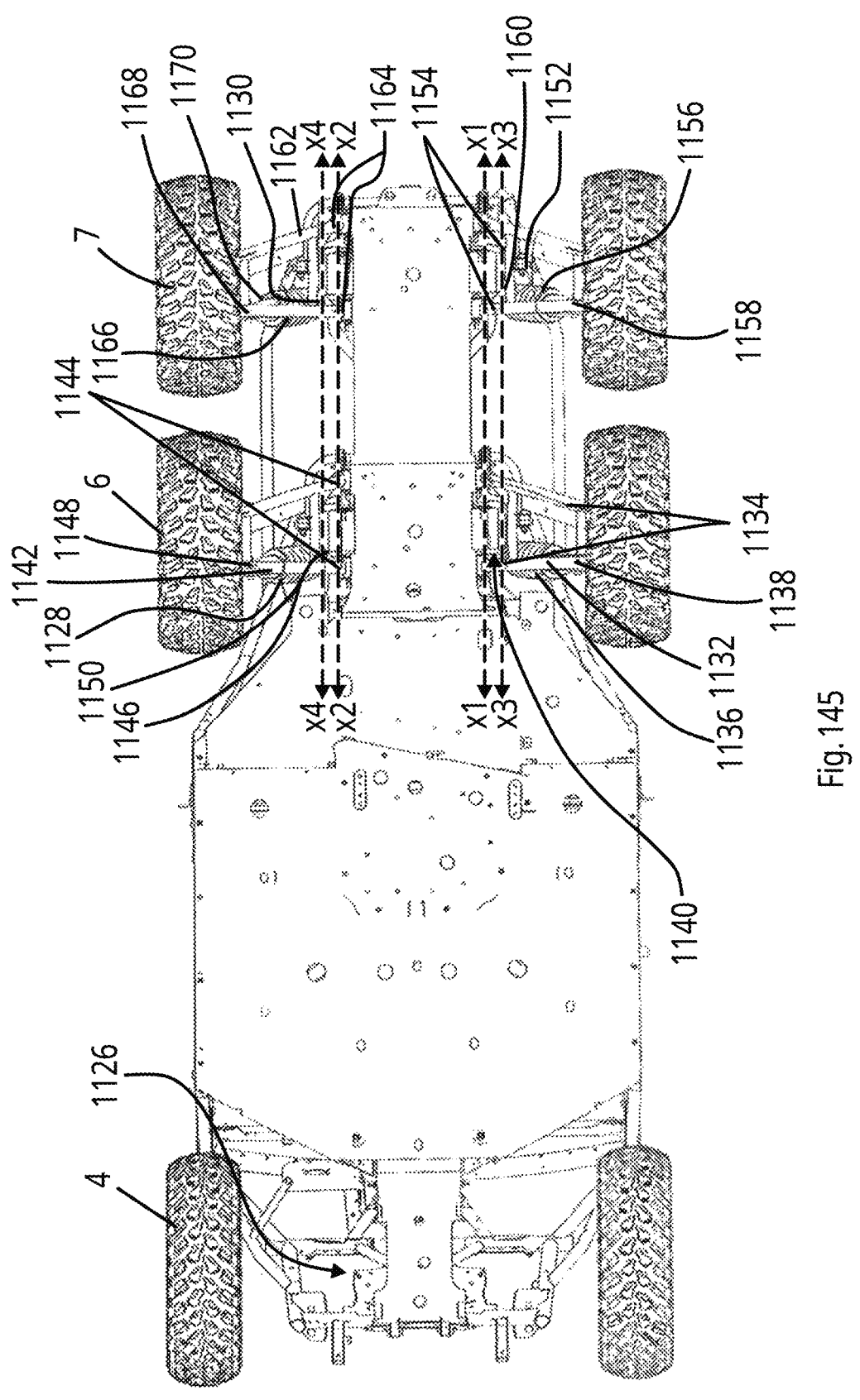
Figure 146:
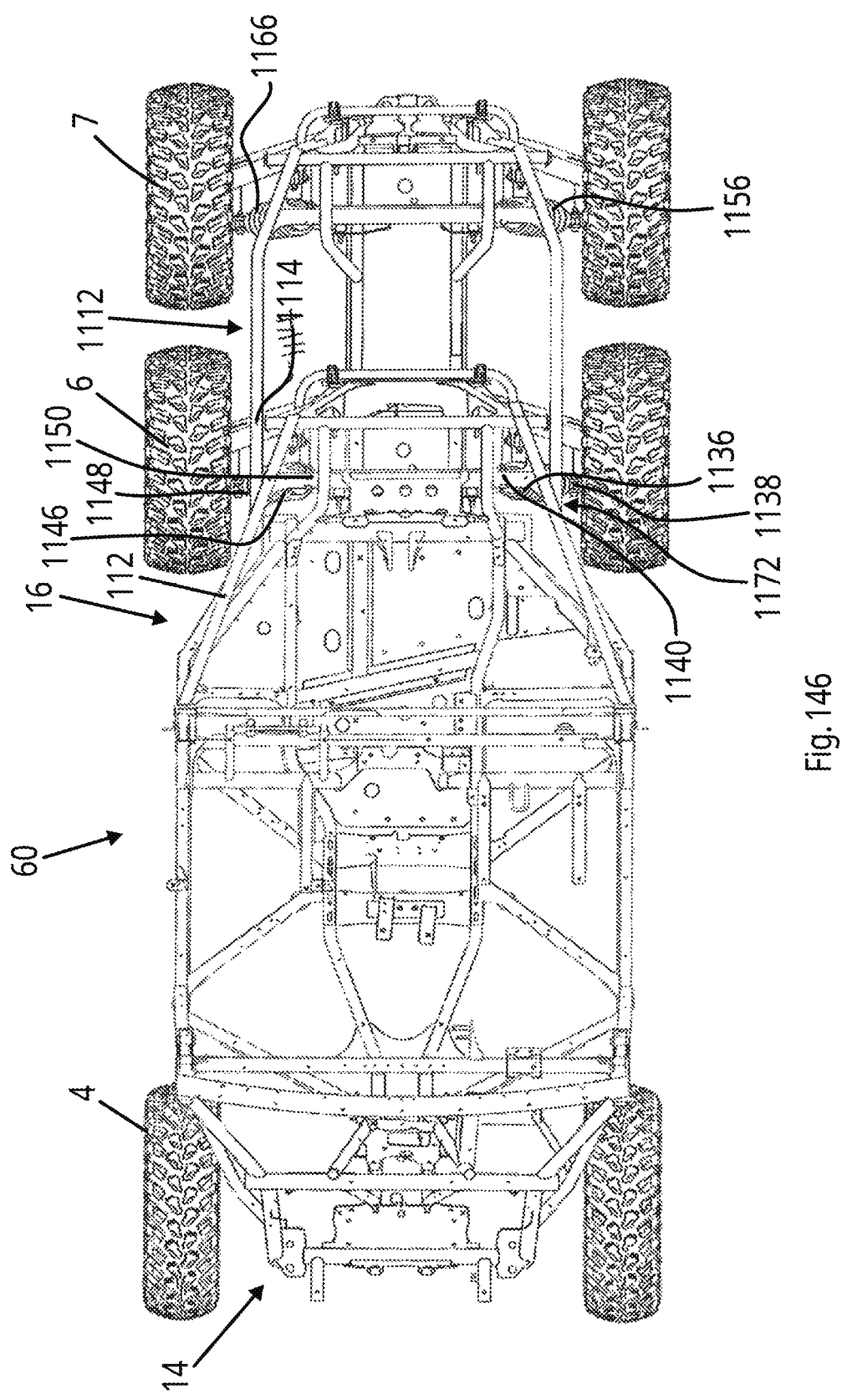
Figure 147:
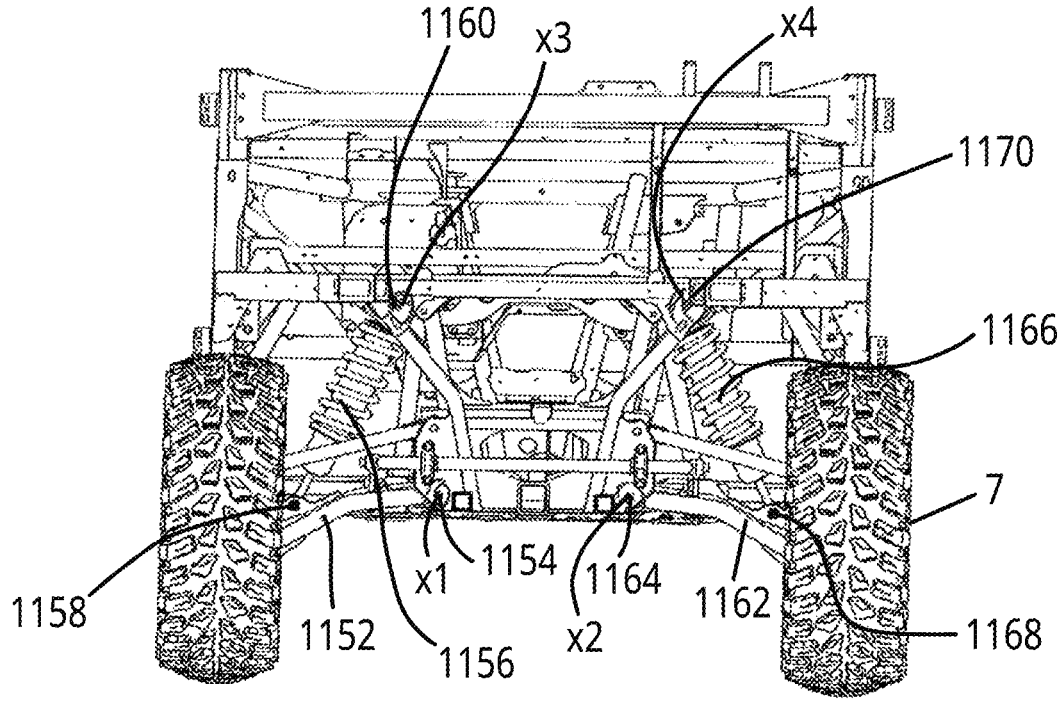

FIG. 123 is an exploded view of the cooling assembly of FIG. 121;

FIG. 124 is a perspective view of an alternative vehicle of the present disclosure;

FIG. 125 is a perspective view of a roof of the present disclosure;

FIG. 126 is a perspective view of a portion of the roof of FIG. 125 with a support member;

FIG. 127 is an exploded view of the roof of FIG. 125 showing a coupling joint;

FIG. 128 is an exploded view of the roof of FIG. 125 showing the coupling joint of FIG. 127;

FIG. 129 is a cross-section view of the roof of FIG. 125 showing the coupling joint of FIG. 127, taken along line 129-129 of FIG. 125;

FIG. 130 is a perspective view of a rear windshield of a vehicle of the present disclosure;

FIG. 131 is a perspective view of the rear windshield of FIG. 130;

FIG. 132 is an exploded view of the rear windshield of FIG. 130;

FIG. 133 is an exploded view of a coupling assembly of the rear windshield of FIG. 130;

FIG. 134 is a perspective view of the coupling assembly of FIG. 133 coupled to a frame of a vehicle of the present disclosure;

FIG. 135 is a perspective view of a hook assembly of the rear windshield of FIG. 130;

FIG. 136 is a schematic view of a vehicle on an inclined terrain;

FIG. 137 is a control schematic for controlling systems of a vehicle of the present disclosure;

FIG. 138 is a process diagram for controlling a powertrain of a vehicle of the present disclosure;

FIG. 139 is a schematic view of a vehicle of the present disclosure;

FIG. 140 is a process diagram for altering a vehicle state of the present disclosure;

FIG. 141 is a front left perspective view of the vehicle of FIG. 1 with an extended lower frame assembly FIG. 142 is a partially exploded view of the vehicle of FIG. 141;

FIG. 143 is rear left perspective view of a portion of the lower frame assembly of FIG. 141;

FIG. 144 is an exploded view of the portion of the lower frame assembly of FIG. 143;

FIG. 145 is a bottom view of the vehicle of FIG. 141;

FIG. 146 is a top view of the vehicle of FIG. 141;

FIG. 147 is a rear view of the vehicle of FIG. 141; and

Figure 148:
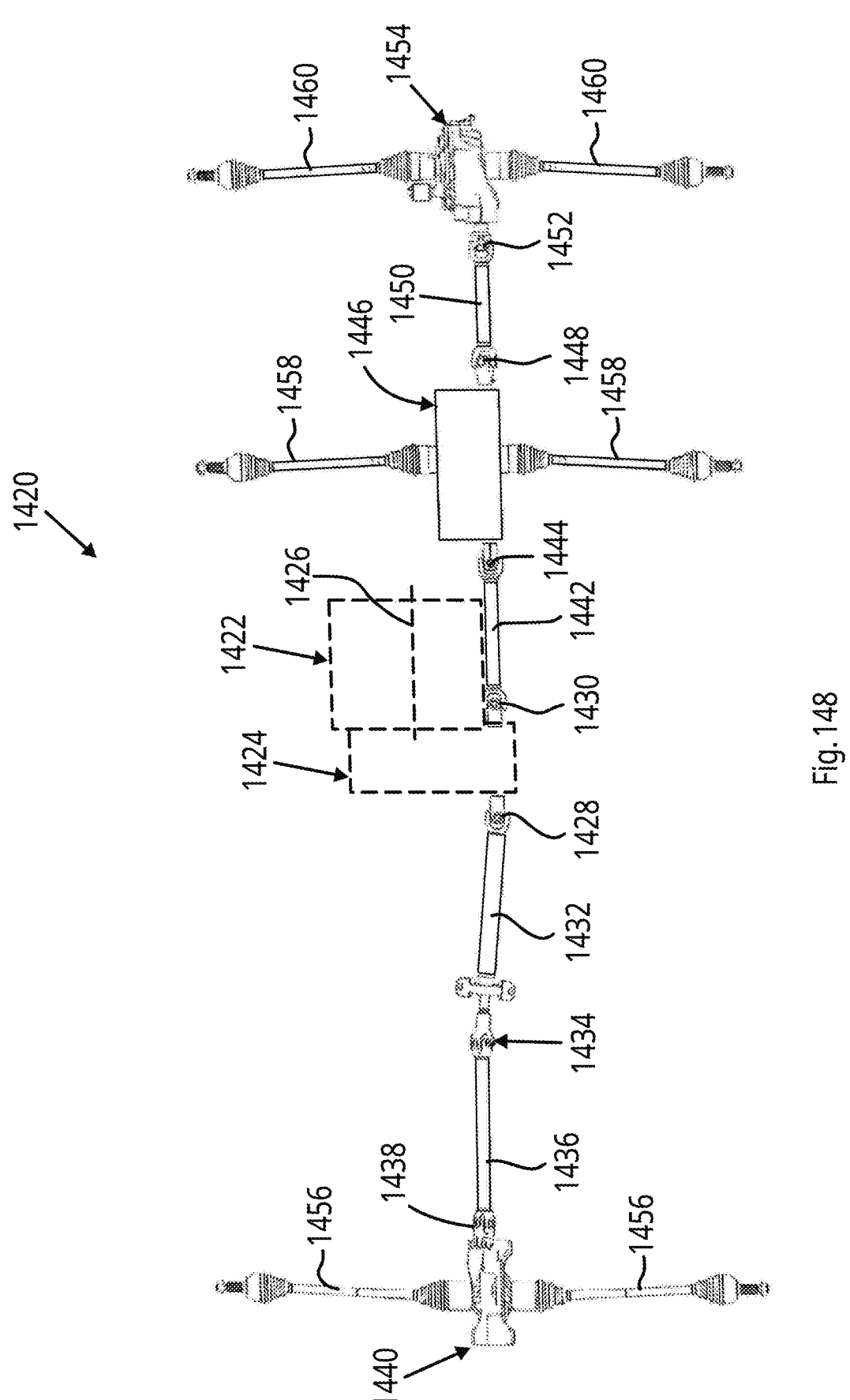

FIG. 148 is a top view of an embodiment of a powertrain assembly of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, two- or three-wheeled motorcycles, snowmobiles, personal transporter vehicles, and golf carts.

Referring to FIGS. 1-7, an illustrative embodiment of a utility vehicle 2 is shown which is configured to traverse a variety of off-road terrains, including mud, rocks, dirt, sand, and other trail or off-road conditions. Vehicle 2 may be referred to as a utility vehicle ("UTV"), an all-terrain vehicle ("ATV"), or a side-by-side vehicle ("SxS") and is configured for travel over various terrains or surfaces. Vehicle 2 may be configured for military, industrial, agricultural, or recreational applications.

Vehicle 2 includes a plurality of ground-engaging members, including front ground-engaging members 4 and rear-ground engaging members 6, where front ground-engaging members 4 are illustratively shown as having front tires 4a and front wheels 4b and rear ground-engaging members 6 are illustratively shown as having rear tires 6a and rear wheels 6b.

Figure 8A:
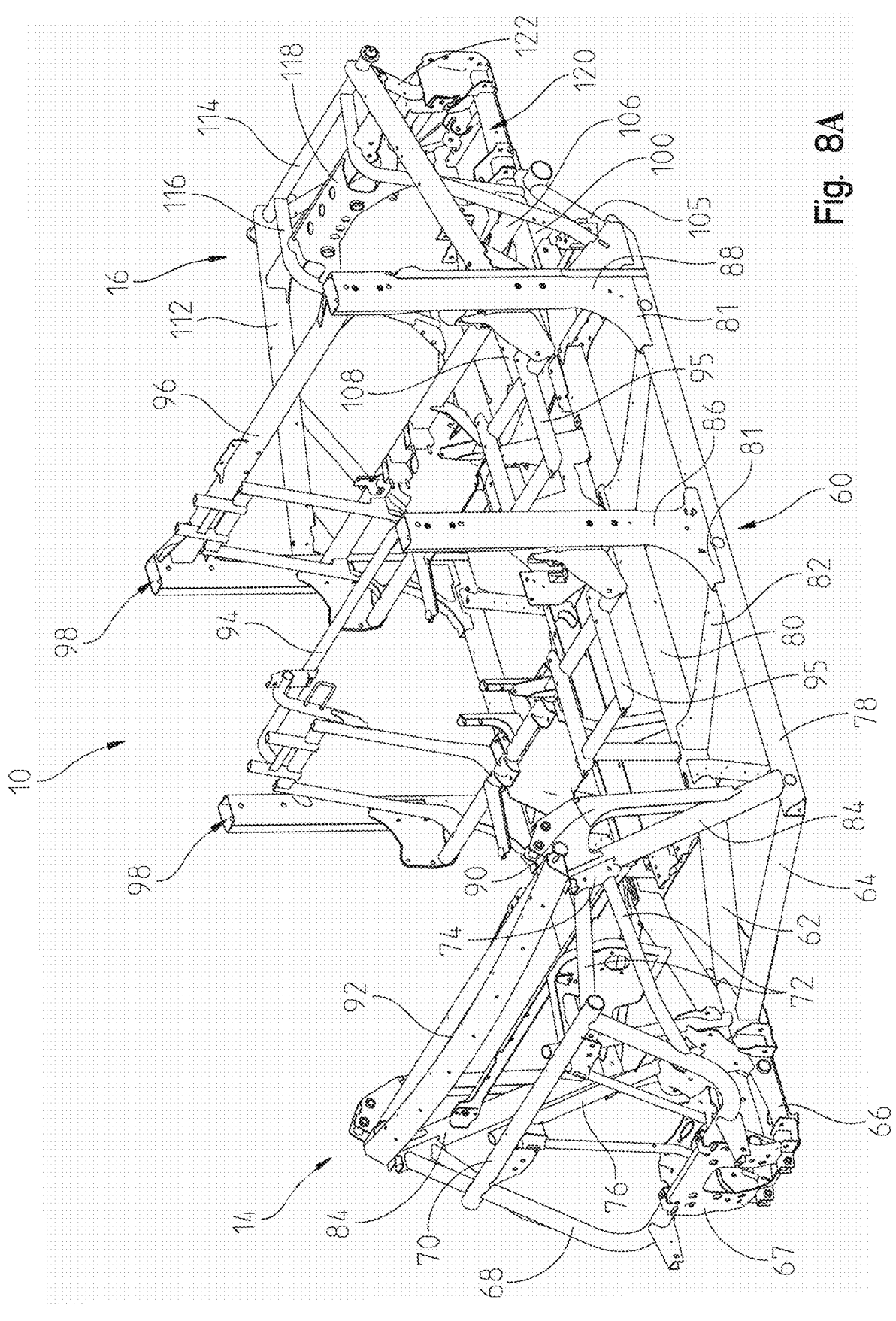
FIG. 8A is a front left perspective view of a lower frame assembly of the utility vehicle of FIG. 1.
Figure 8B:
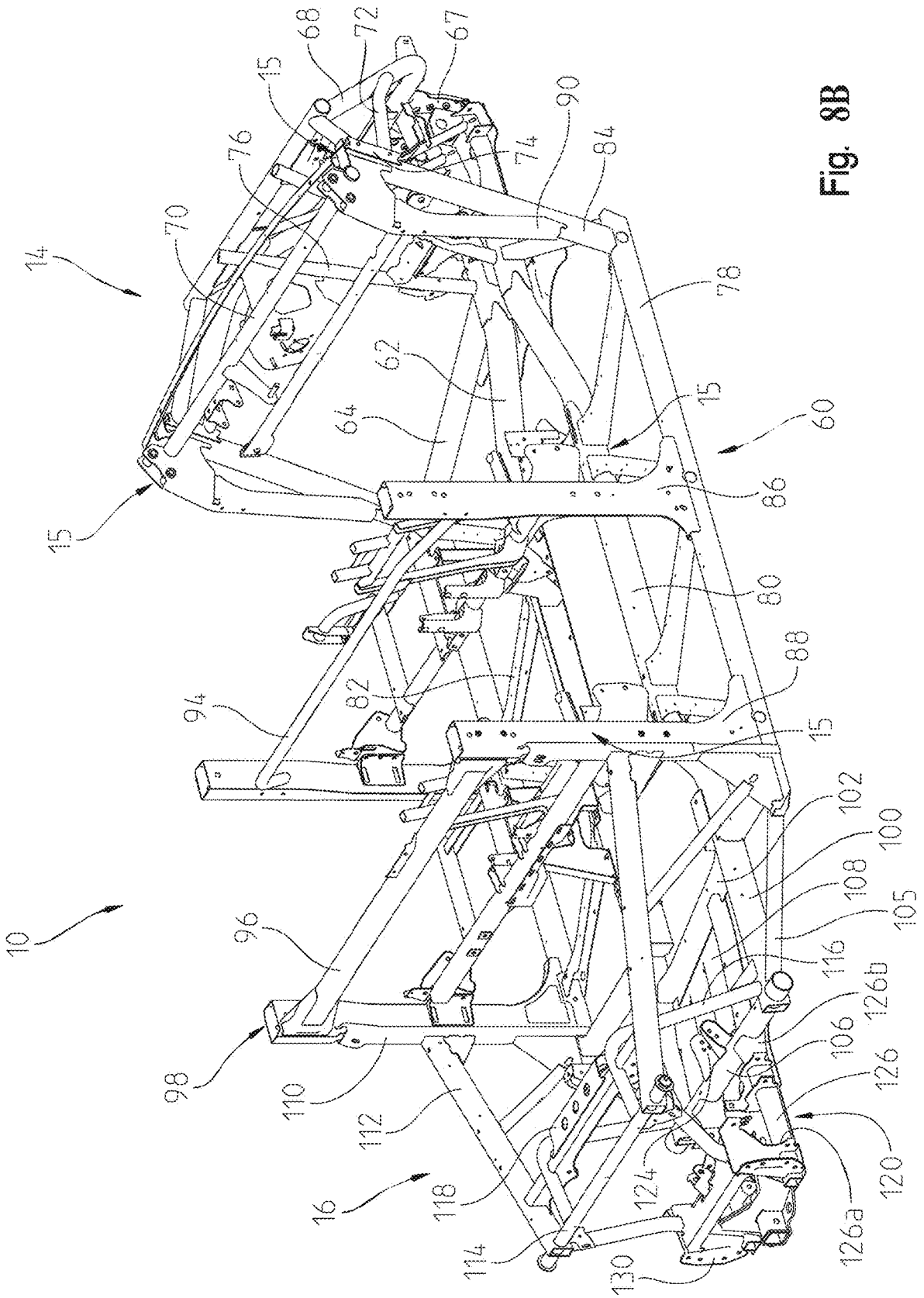
FIG. 8B is a rear right perspective view of the lower frame assembly of FIG. 8A.

Ground-engaging members 4, 6 are configured to support a frame assembly on the ground surface. The frame assembly includes a lower frame assembly 10 and an upper frame assembly 12 coupled to lower frame assembly 10. An operator area 8 or cab may be defined between frame assemblies 10, 12 to support an operator or driver and one or more passengers positioned laterally adjacent and/or rearward of the operator. Frame assemblies 10, 12 extend along a longitudinal axis L of vehicle 2. Lower frame assembly 10 includes a front frame portion or section 14 which may be further characterized as a front frame sub-assembly, an intermediate or main frame portion or section 60 (FIG. 8), and a rear frame portion or section 16 which may be further characterized as a rear frame sub-assembly coupled to main frame 60.

Frame assemblies 10, 12 may be configured to support a plurality of body panels 18 which, illustratively, may include a hood 20, a roof 22, front fenders or side panels 24, doors 26, and/or rear fenders 28. Lower frame assembly 10 also supports a cargo area 30 at rear frame section 16. Various body panels 18 may enclose operator area 8, such as roof 22 and doors 26, and may be sealed against portions of lower and upper frame assemblies 10, 12 when assembled on vehicle 2. Alternatively, roof 22 and doors 26 may be removed or not included on vehicle 2 when desired by the operator. A front windshield 32, door windows 34, and/or a rear windshield 36 (FIG. 2) may further enclose operator area 8 when desired by the operator.

Front suspension assembly 38 is operably coupled to portions of front frame section 14 and front ground-engaging members 4 while rear suspension assembly 39 is operably coupled to portions of rear frame section 16 and rear ground-engaging members 6. Upper and lower frame assemblies 10, 12 also may support a plurality of accessories, for example, lower frame assembly 10 may support a winch assembly 37, as shown in FIG. 1.

A brake system 1002 may include a plurality of brake assemblies and each ground engaging member 4, 6 comprises a brake assembly. A brake input (i.e., a brake pedal) may be provided within the operator area 8, and an input to the brake input engages brake system 1002 and slows vehicle 2 by slowing ground engaging members 4, 6.

Figure 9:
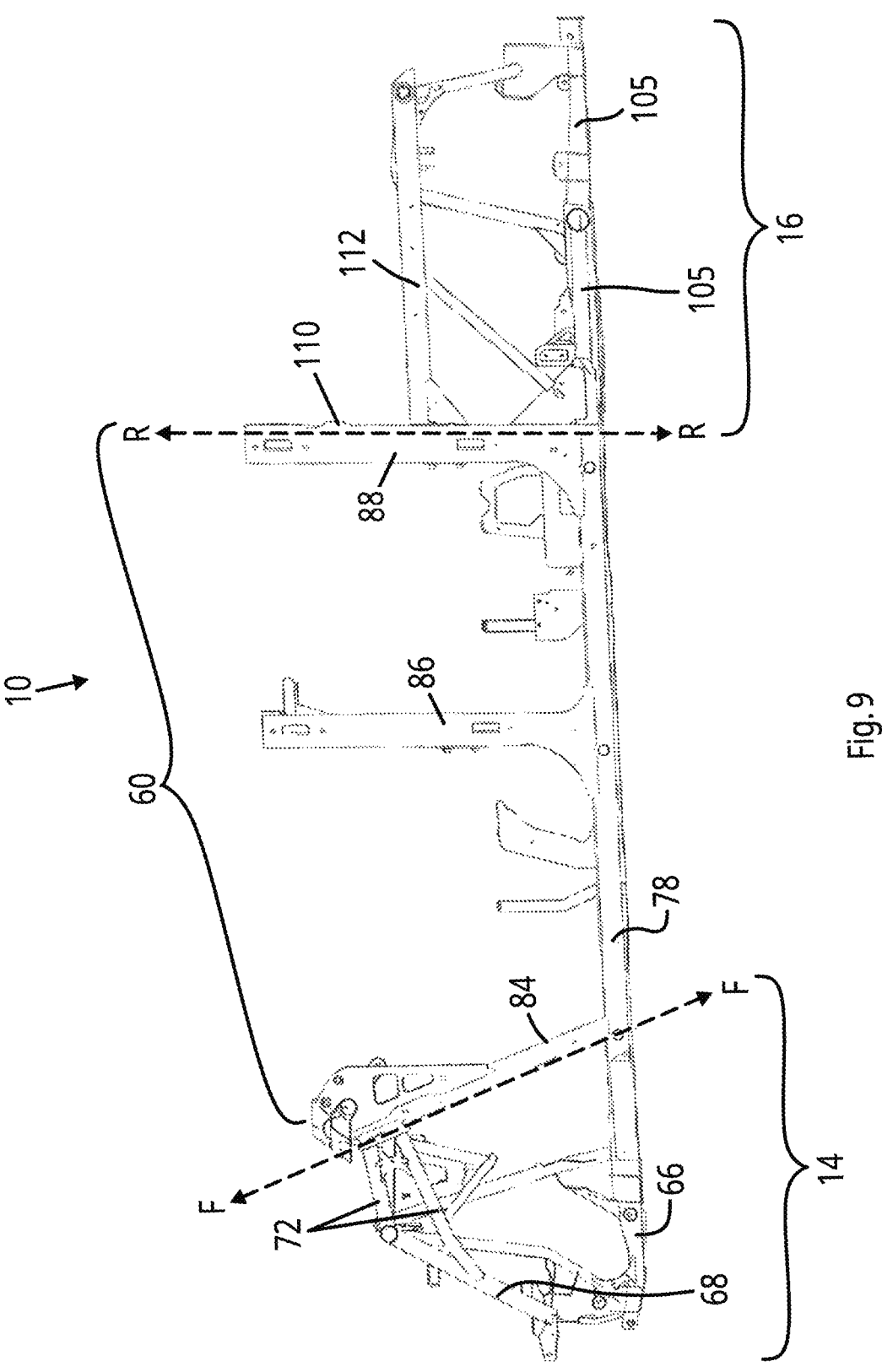
FIG. 9 is a left side view of the lower frame assembly of FIG. 8A.
Figure 10:
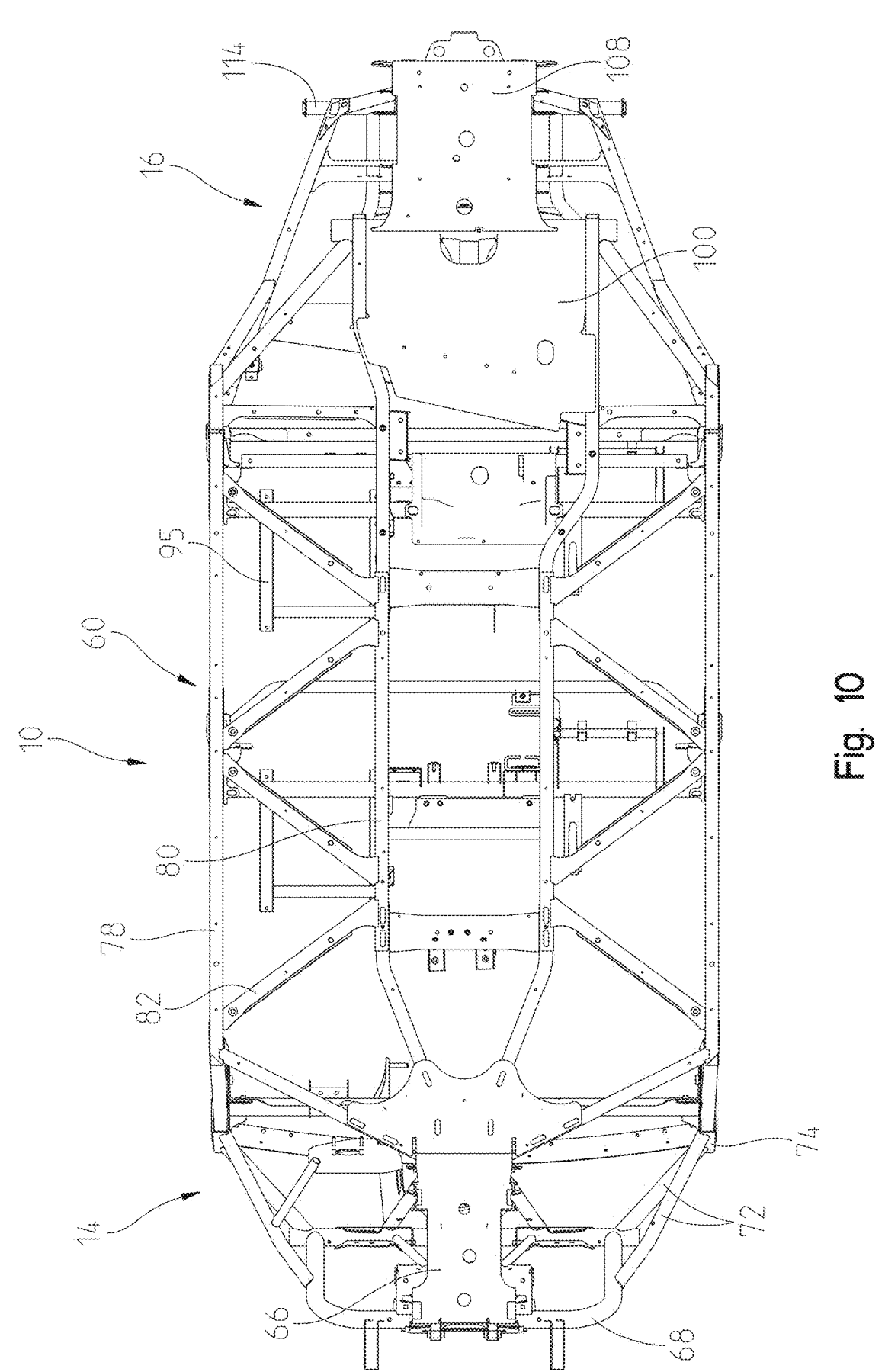
FIG. 10 is a bottom view of the lower frame assembly of FIG. 8A.

Referring now to FIGS. 8-13, lower frame assembly 10 will be described in more detail. As disclosed herein, lower frame assembly 10 extends along longitudinal axis L (FIG. 1) between front frame section 14 and rear frame section 16. Front and rear frame sections 14, 16 may be coupled to each other through main or intermediate frame section 60. As shown in FIG. 9, front frame section 14 may be removably coupled to main frame section 60 along a plane F which is angled while rear frame section 16 may be removably coupled to main frame section 60 along a plane R which is generally vertical. In this way, and as disclosed further herein, main frame section 60 remains fully intact and is configured to receive various embodiments of front and/or rear frame sections 14, 16 along planes F and R, respectively, depending on the application of vehicle 2, without modification to main frame section 60. In various embodiments, main frame section 60 may be configured as one weldment, front frame section 14 is configured as a separate weldment, and rear frame section 16 is configured as another separate weldment. These various frame weldments may be joined together during the manufacture of vehicle 2 to form lower frame assembly 10. The joining together of the various frame sections occurs at chassis nodes designed to allow for attachment of each separate frame section to other frame sections without modification to the frame sections. Additional weldments also may be added, for example by coupling with rear frame section 16, to extend the length of lower frame assembly 10. In this way, the modularity of lower frame assembly 10 allows for various embodiments of vehicle 2 without modification to main frame section 60.

Front frame section 14 includes lower longitudinally-extending frame members 62, lower laterally-extending frame members 64, a mounting plate 66 coupled to both frame members 62 and 64, forward upstanding members 68 which generally extend upwardly from a forward mounting plate 67, and a cross-member 70 extending laterally between forward upstanding members 68. Forward upstanding member 68 and/or cross-member 70 also may be coupled to upper longitudinally-extending members 72. Front frame section 14 may further include rearward upstanding members 76 positioned generally rearward of cross-member 70 and in contact with an upper surface of mounting plate 66.

The combination of at least members 68, 70, and 76 may define a front sub-frame assembly of front frame section 14. This sub-frame assembly extends forwardly of other frame components of front frame section 14 and, therefore, may be the portion of front frame section 14 which receives an impact if vehicle 2 contacts an object (e.g., tree, rock, etc.). However, the sub-frame provides a load path between front frame section 14 and various components of upper frame assembly 12 and/or intermediate frame section 60 to improve the structural performance of frame assemblies 10, 12 by resisting a twisting load that may be applied to front frame section 14. In other words, this sub-frame configuration strengthens front frame section 14 and provides a load path to dissipate the load throughout lower frame assembly 10 and inhibit twisting of portions of frame assemblies 10, 12 (e.g., front frame section 14).

Referring still to FIGS. 8A-13, upper longitudinally-extending members 72 may include first and second members 72 on both the right and left sides of front frame section 14 and both the first and second members 72 may be coupled together at brackets 74. The left and right side of front frame section 14 each includes one bracket 74. Front frame section 14 is positioned forwardly of operator area 8 and is configured to support various components of vehicle 2, such as winch assembly 37, front suspension assembly 38, portions of powertrain assembly (e.g., a front gearcase or differential), portions of a steering assembly, a radiator and/or other components of a cooling assembly, and others.

Longitudinally-extending frame members 62 are configured to be coupled (removably or permanently) with inner longitudinally-extending frame members 80 of intermediate frame portion 60. Laterally-extending frame members 64 are configured to be coupled (removably or permanently) with outer longitudinally-extending frame members 78 of intermediate frame portion 60. Frame members 78, 80 of intermediate frame portion 60 may be coupled together through various laterally-extending braces 82.

Illustratively, braces 82 are positioned in a diagonal configuration relative to each other and relative to longitudinally-extending members 78, 80 instead of being positioned perpendicularly to longitudinally-extending members 78, 80. As shown, braces 82 generally define a lattice structure with adjacent braces 82 defining a triangular configuration. Compared to frame assemblies with only longitudinal and lateral frame members positioned at approximately 90 degrees to each other, this lattice configuration increases the torsional rigidity of lower frame assembly 10 which also decreases noise and vibration in lower frame assembly 10. Because of the reduced noise and vibration in lower frame assembly 10, handling of vehicle 2 may be improved. More particularly, the lattice configuration of braces 82 increases the stiffness of lower frame assembly 10 by reducing bending and torsional loading in intermediate frame section 60.

Additionally, braces 82 may have varying cross-sectional profiles and/or cross-sectional sizes. Braces 82 may be configured to support various components of vehicle 2, such as a fuel tank, battery(ies), conduit routings, etc., however, it is preferred to maintain a consistent seat height and floor height to allow for different applications and embodiments of vehicle 2. In order to provide the flexibility desired to locate such components on vehicle 2 based on the configuration of vehicle 2 but not impact seat or floor height, the varying cross-sectional of braces 82 accommodates differently-sized vehicle components without needing to raise the seat height or lower the floor height. Braces 82 may include enlarged ends which attach to other members of frame assembly 10 and the enlarged ends improve the welded connection to these other frame members. It may be appreciated the braces 82 also may be coupled to a floor or skid plate of vehicle 2 (e.g., skid plate 108 disclosed in further detail herein).

Intermediate frame portion 60 further includes forward upstanding members 84, intermediate upstanding members 86, and rearward upstanding members 88. Illustratively, both upstanding members 86 and 88 have a generally C-shaped foot 81 coupled to longitudinally-extending members 72 and the shape of foot 81 transitions the loads and minimizes abrupt changes in stiffness. At the opposing end from foot 82, each of at least upstanding members 86, 88 may include an open receiving end 98 configured to couple with a portion of upper frame assembly 12, as disclosed further herein. Forward upstanding members 84 are coupled to front frame section 14 through brackets 74 of upper longitudinally-extending members 72 along plane F (FIG. 9). Referring to FIG. 11D, brackets 74 are configured to extend along a forward surface of upstanding members 84 and extend partially along the inner and outer lateral surfaces of upstanding members 84 such that brackets 84 are partially wrapped around upstanding members 84. A recess 1108 of bracket 74 receives a portion of upstanding members 84 and allows for the position of front frame section 14 to be adjusted relative to intermediate frame section 60. Because upstanding members 84 are included within intermediate frame section 60 while brackets 74 are included within front frame section 14, the position of front frame section 14 can be adjusted longitudinally (i.e., the fore/aft direction) and/or vertically relative to intermediate frame section 60 to allow for manufacturing tolerances or specific modularity applications of vehicle 2. For example, the adjustability of front frame section 14 relative to intermediate frame section 60 may accommodate changes to the front suspension of vehicle 10 or variations in the manufacturing (e.g., weld) fixture.

Forward upstanding member 84 also may be coupled with an extension 90 which extends adjacent upstanding member 84 along a portion of the length of upstanding member 84. Forward upstanding members 84 may be coupled together through a cross-member 92 while rearward upstanding members 88 may be coupled together through a cross-member 96. A handhold bar 94 may be coupled to intermediate upstanding members 86 and is configured for rear passengers to grab onto during operation, ingress, or egress of vehicle 2.

Figure 75:
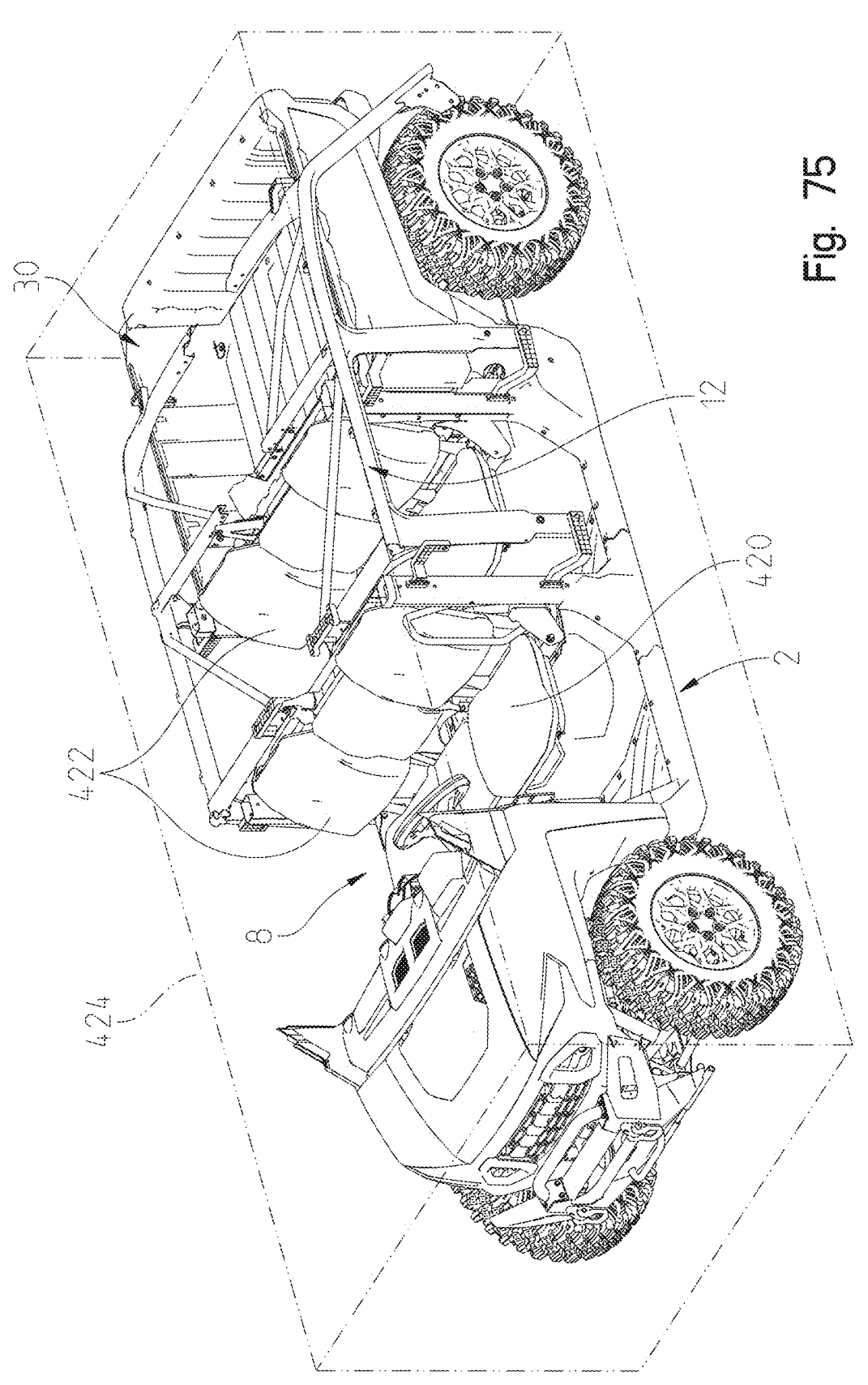
FIG. 75 is a schematic view of a cargo container configured to receive the vehicle of FIG. 1 for transport.

Intermediate frame portion 60 may include seat frames 95 for supporting the operator seat 420 (FIG. 75) and at least one passenger seat 422 (FIG. 75). Illustratively, vehicle 2 may be configured to support at least three passengers. Seat frames 95 are generally positioned longitudinally between front frame section 14 and rear frame section 16.

Rear frame section 16 is coupled to intermediate frame section 60 through at least longitudinally-extending members 100 which are configured to be removably or permanently coupled to inner longitudinally-extending members 80. Longitudinally-extending members 100 may be coupled to each other through at least one cross-member, illustratively cross-members 102, 104, and 106. A rear skid plate or lower mounting plate 108 also may extend between longitudinally-extending members 100 and are configured to support a portion of the powertrain assembly of vehicle 2, such as a prime mover, or an engine 580 (FIG. 96), batteries, a motor, a transmission 532 (FIG. 90), etc. Longitudinally-extending members 100 also are coupled to a rear drive mount assembly 120 which defines the rearwardmost extent of lower frame assembly 10 and is configured to support a rear drive or differential 164 (FIG. 18) of the powertrain assembly.

Additionally, an engine mount 124 may be supported on cross-member 106. Other engine mounts may be included on other portions of rear frame section 16. Details of engine 580 may be disclosed in U.S. patent application Ser. No. 16/875,448, filed May 15, 2020, and entitled "OFF-ROAD VEHICLE" (PLR-15-29110.01P-US) and U.S. patent application Ser. No. 16/875,494, filed May 15, 2020, and entitled "OFF-ROAD VEHICLE" (PLR-15-29110.02P-US), the complete disclosures of which are expressly incorporated by reference herein. To minimize the wheelbase of vehicle 2, accommodate an oil pan for engine 580 when the oil pan is laterally offset from longitudinal axis L, support engine mount 124 and/or other engine mounts or isolates, and have pivot locations for rear suspension assembly 39 which are narrow (e.g., pivot locations for rear control arms), lower frame assembly 10 has a large difference in lateral width over a short longitudinal length. Lower frame assembly 10 is configured to accommodate the above-listed features by utilizing cross-member 106. Cross-member 106 is configured to transfer torsion in a fore/aft direction and a lateral direction. Cross-member 106 extends laterally and is coupled to longitudinally-extending frame members, such as frame members 100. Other frame members, such as frame members 126 which partially define rear drive mount assembly 120 and/or otherwise are coupled thereto, also may be coupled with cross-member 106. Illustratively, at least frame members 100 have a first cross-sectional profile while cross-member 106 has a second cross-sectional profile. In one embodiment, cross-member 106 has a circular cross-sectional profile and frame members 100 have a rectangular cross-sectional profile. Other frame members, such as frame members 126 may have a circular cross-sectional profile. In this way, cross-member 106 is configured to couple with and support components of lower frame assembly 10 with different cross-sectional profiles which allows rear frame section 16 to support the location of the oil pan for the engine, support the configuration of rear suspension assembly 39, and maintain a narrow wheelbase for vehicle 2.

Various mounts for rear suspension assembly 39 attach to generally U-shaped channel frame members which transition gradually to cross-member 106. More particularly, and referring to FIGS. 14, 15, 18, and 19, frame members 126 may be configured as these U-shaped channel members. Frame members 126 have a longitudinal length which tapers outwardly and, therefore, is wider at its front end 126b compared to its rear end 126a. Illustratively, the lateral width of front end 126b is greater than the lateral width of rear end 126a and front end 126b is coupled to cross-member 106. Rear end 126a is coupled to or includes a suspension mount 130 while front end 126b includes a suspension mount 128. Suspension mounts 128, 130 are configured to pivotably support a lower control arm 132 of rear suspension assembly 39.

Figure 14:
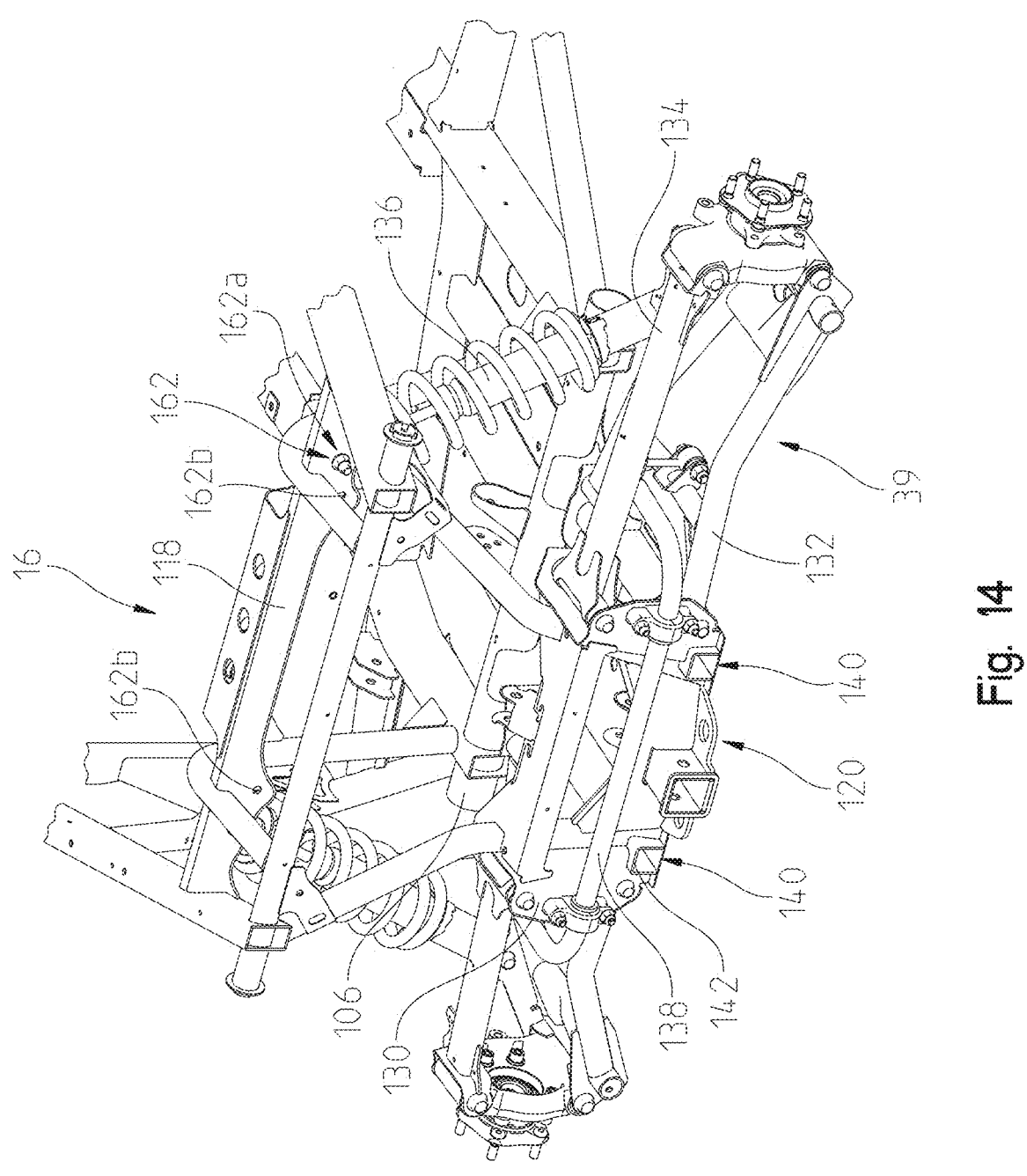
FIG. 14 is a rear right perspective view of a rear frame section of the lower frame assembly of FIG. 8A and a rear suspension assembly.

Suspension mount 130 includes an upper portion which also pivotably supports an upper control arm 134 of rear suspension assembly 39. Upper and lower control arms 134, 132 are operably coupled to wheel hubs 139 and a torsion or sway bar 138. As shown in FIG. 14, suspension mount 130 is configured to couple with torsion bar 138 and, illustratively, at least a portion of torsion bar 138 is positioned longitudinally rearward of suspension mount 130 such that various brackets configured to couple torsion bar 138 to suspension mount 130 are positioned along a rearward surface of suspension mount 130. In this way, the mount for torsion bar 138 is integrated into the same mount for upper and lower control arms 134, 132. As such, the clamp load of upper and lower control arms 134, 132 at suspension mount 130 may create the stiffness for mounting torsion bar 138. In other words, the configuration of suspension mount 130 as both the mount for control arms 132, 134 and torsion bar 138 may increase the stiffness for mounting torsion bar 138, thereby allowing the operator to tune vehicle 2.

Additionally, rear frame section 16 is configured to support linear force elements 136, illustratively shock absorbers, of rear suspension assembly 39. Referring still to FIGS. 11-11C and 14-19, brace 118 of rear frame section 16 may be a one-piece frame member configured to support shock absorbers 136. Because brace 118 may be one piece, brace 118 may improve shock load sharing capabilities across the entirety of brace 118, thereby resulting in lower stresses on the welds coupling brace 118 to frame members 112 and 116. When the stress at the welds is reduced, the durability of rear frame section 16 may be improved. Brace 118 is configured to couple to an upper shock mount 158 of shock absorber 136 at mounting aperture 162. Brace 118 is configured to accommodate two shock mounting positions-a first or outboard position for heavy loading and hauling at a mounting aperture 162a, 162b and a second or inboard position for normal (or non-heavy loading or hauling) operation of vehicle 2 at a mounting aperture 162b. This form feature in brace 118 is configured such that it clears shock absorber 136 at both the first and second positions. Brace 118 may be welded to frame members 112 and/or 116 adjacent both the upper and lower portions of thereof to increase bending stiffness of brace 118. Additionally, the one-piece configuration of brace 118 minimizes the height of cargo area 30, optimizes the sizing of the frame members comprising rear frame section 16, improves manufacturing tolerances, and/or may increase the pivot width of cargo area 30 which decreases undesired movement (e.g., wobble) of the cargo box.

Figure 16:
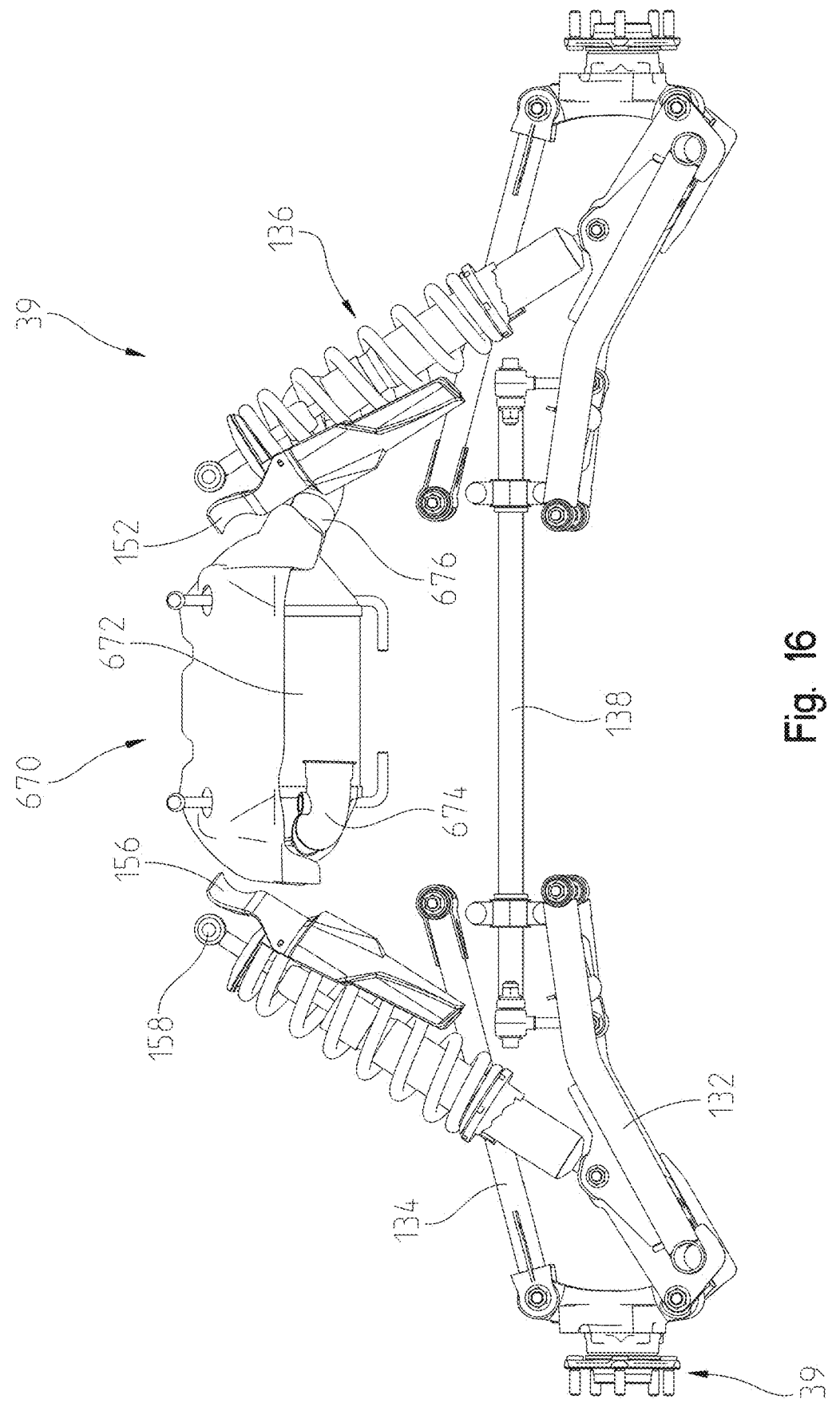
FIG. 16 is a front view of the rear suspension assembly of FIG. 15.
Figure 17:
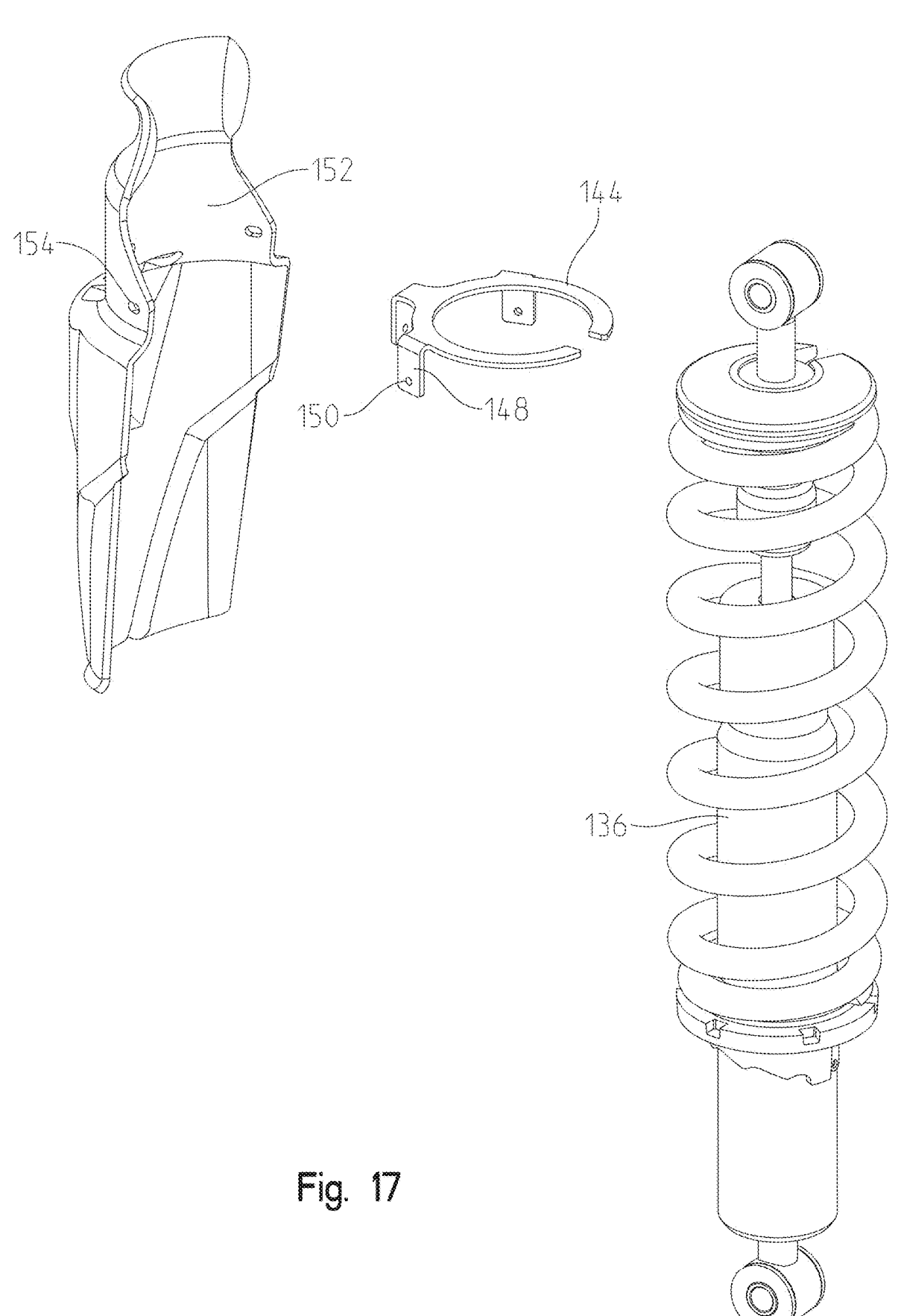
FIG. 17 is an exploded view of a shock absorber of the rear suspension assembly of FIG. 16.

With respect to FIGS. 16 and 17, a spring bracket 144 may be included at an upper end 146 of shock absorber 136. Spring bracket 144 includes tabs 148 and mounting holes 150. Additionally, a shield 152 may be configured to mount to spring bracket 144 and protect shock absorber 136 and its assembled components. Shield 152 includes mounting holes 154 which are configured to align with mounting holes 150 on spring bracket 144. A removable fastener may be provided at mounting holes 150, 154 to secure shield 152 to spring bracket 144. Additionally, tabs 148 may receive a portion of shield 152 to further couple with shield 152. Shield 152 moves with the motion of shock absorber 136 and, as such, protects it at all ranges of motion. Shield 152 is comprised of a thermally-appropriate material given that shock absorber 136 and, therefore, shield 152 may be positioned generally adjacent heat-producing components, such as engine 580, exhaust conduits 674, 676, muffler 672, etc. For example, shield 152 may be formed of or coated with any thermally-appropriate material, such as, for example, a metal, an alloy, a steel alloy, aluminum, an aluminum alloy, a thermal resistant polymer, a thermal barrier coating, or other material resistant to thermal degradation at temperatures at or near the position of shocks 136.

As shown best in FIG. 16, shield 152 includes an upper portion 156 that has a shape generally complementary to that of muffler 672 of an exhaust assembly 670 of vehicle 2. Upper portion 156 extends to a position at least adjacent upper shock mount 158 of shock absorber 136 such that shield 152 thermally protects upper shock mount 158 from the heat of muffler 672. In addition to protecting upper shock mount 158, the vertical length of shield 152 is configured to protect eyelet bushings, jounce bumpers, and shock caps in the same manner.

Referring still to lower frame assembly 10 (FIGS. 11-11C), rear frame section 16 further includes upstanding members 110 which are configured to be coupled to rearward upstanding members 88 of intermediate frame section 60 and are coupled to lower outer frame members 105 of rear frame section 16. Lower outer frame members 105 may be generally coplanar with frame members 100 such that the lower extent of rear frame section 16 generally lies within a laterally-extending plane that includes both members 100, 105. As shown particularly in FIG. 11C, upstanding members 110 are configured to extend laterally along rear surfaces of upstanding members 88 and extend partially forward along inner and outer lateral surfaces of upstanding members 88. In embodiments where intermediate frame section 60 includes only upstanding members 86 (FIG. 11C (e.g., 2-seater embodiments of vehicle 2)) and does not include upstanding members 88 (FIG. 11B (e.g., at least 3-seater embodiments of vehicle 2)), rear frame section 16 couples to upstanding members 86 instead. In this way, upstanding members 110 partially wrap around a portion of upstanding members 86, 88. Each of members 86a, 86b, 88a, 88b includes a corner radius 1100 that may facilitate alignment with upstanding members 110 so as to be considered a lead-in for attaching rear frame section 16 to intermediate frame section 60. Because corner radius 1100 is rounded, stresses at that location of lower frame assembly 10 may be transitioned between various frame members, such as upstanding members 86, 88 and 110.

Because upstanding members 88 are included within intermediate frame section 60 while upstanding members 110 are included within rear frame section 16, the position of rear frame section 16 can be adjusted longitudinally (i.e., in the fore/aft direction) and/or vertically relative to intermediate frame section 60 to allow for manufacturing tolerances or specific modularity applications of vehicle 2. For example, the adjustability of rear frame section 16 relative to intermediate frame section 60 may accommodate changes in the wheel base of vehicle 10 or variations in the manufacturing (e.g., weld) fixture.

Figure 11:
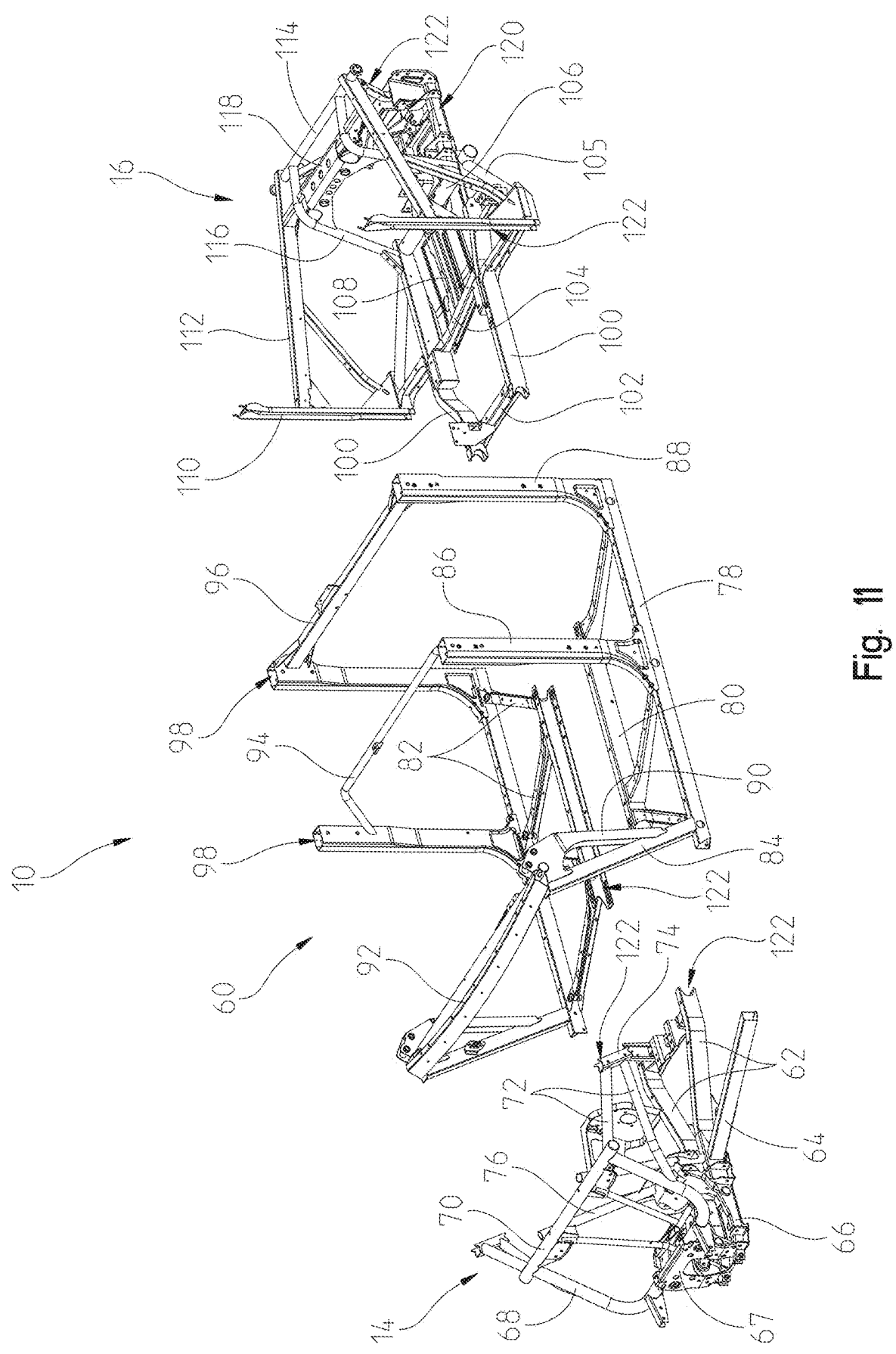
FIG. 11 is a partially exploded view of the lower frame assembly of FIG. 8A.
Figure 11A:
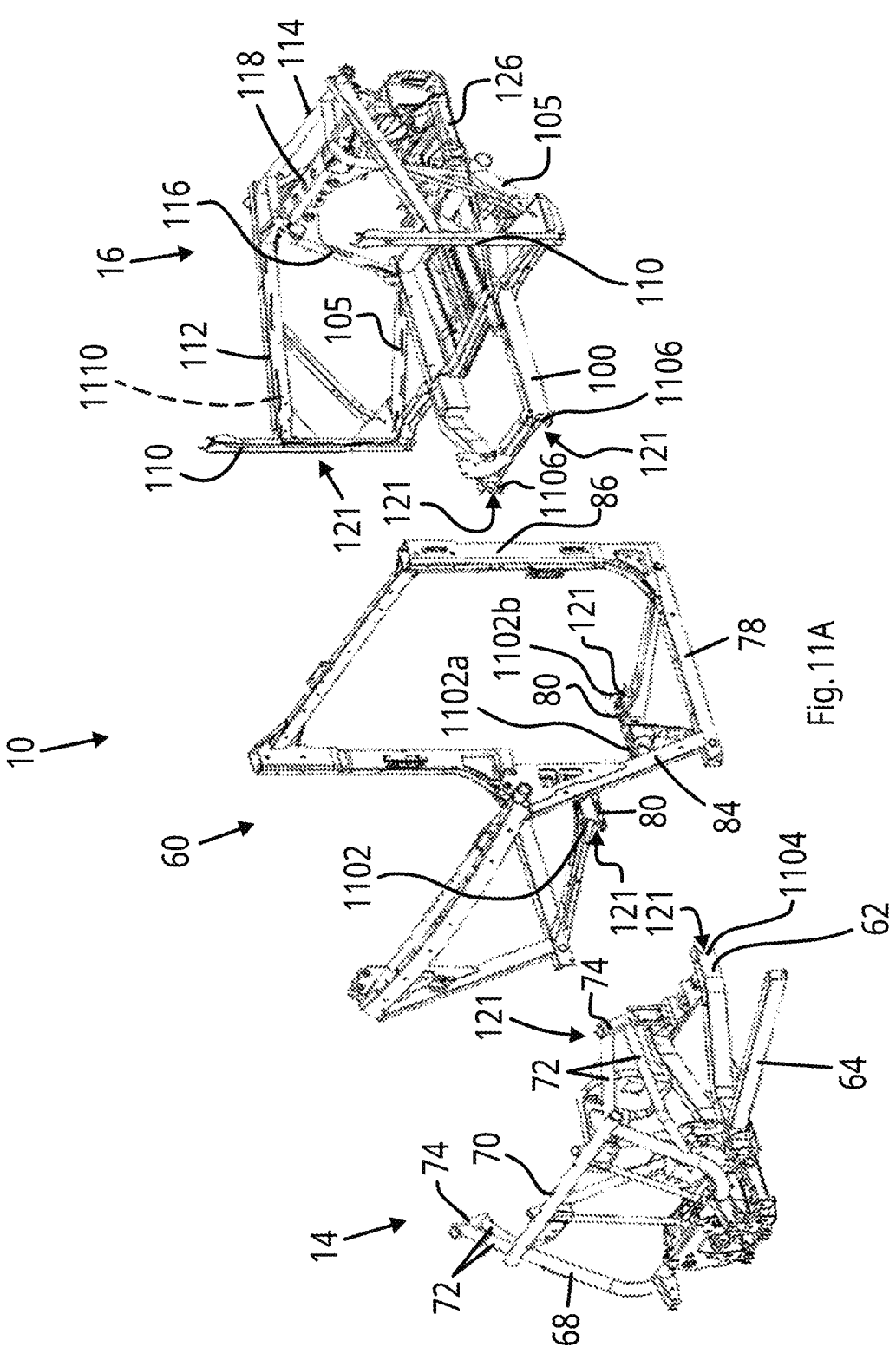
FIG. 11A is an exploded view of the lower frame assembly of a further example of the vehicle of FIG. 1.
Figure 11B:
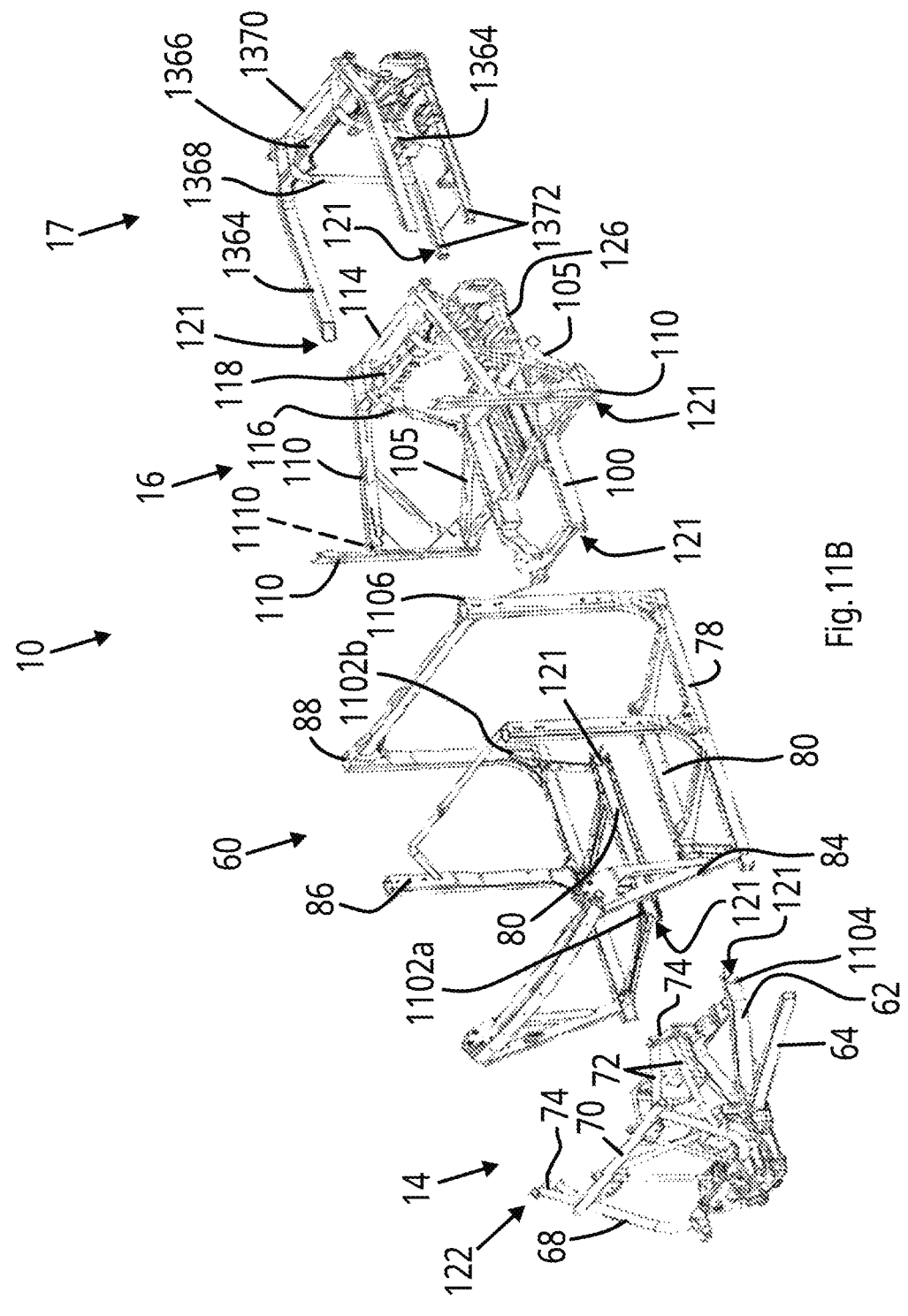
FIG. 11B is an exploded view of the lower frame assembly of a further example of the vehicle of FIG. 1.

Additional lead-ins are shown in FIGS. 11-11B, where intermediate frame section 60 includes recessed portions 1102a, 1102b at the front and rear ends of longitudinally-extending members 80. Illustratively, recessed portions 1102 are curved and may have a semi-circular or other arcuate shape, although other configurations of recessed portions 1102 are possible. Recessed portions 1102 facilitate alignment of longitudinally-extending members 80 of intermediate frame section 60 with longitudinally-extending members 100 of rear frame section 16 and longitudinally-extending members 62 of front frame section 14. More particularly, longitudinally-extending members 62 include rear recessed portions 1104 configured to align with front recessed portions 1102a of intermediate frame section 60 while longitudinally-extending members 100 of rear frame section 16 include recessed portions 1106 configured to align with rear recessed portions 1102b of intermediate frame section 60.

Figure 11C:
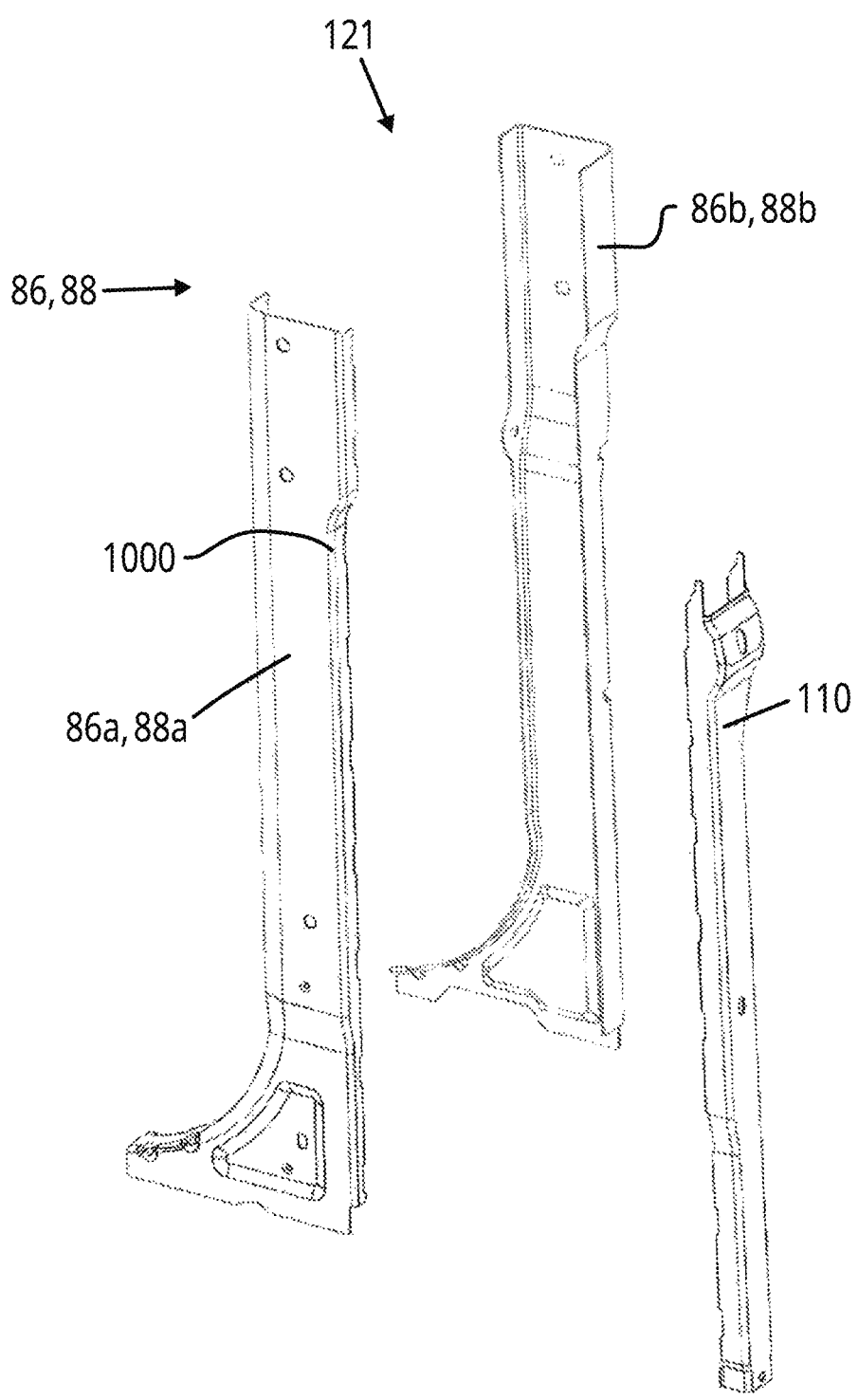
FIG. 11C is an exploded view of a portion of the lower frame assembly shown in FIGS. 8A-11B.
Figure 11D:
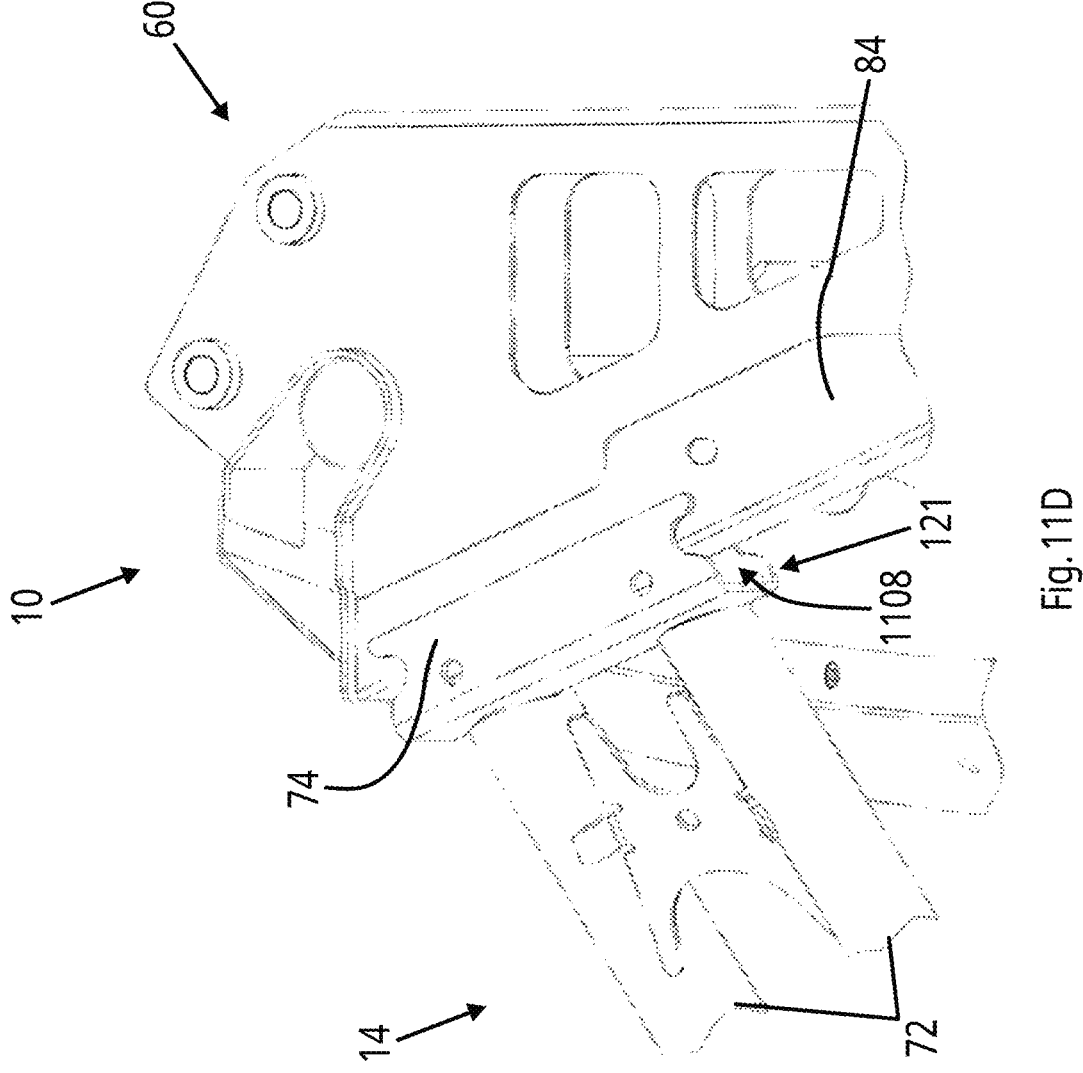
FIG. 11D is a left front perspective view of a portion of a front frame portion of the lower frame assembly of FIGS. 8A-11B.
Figure 12:
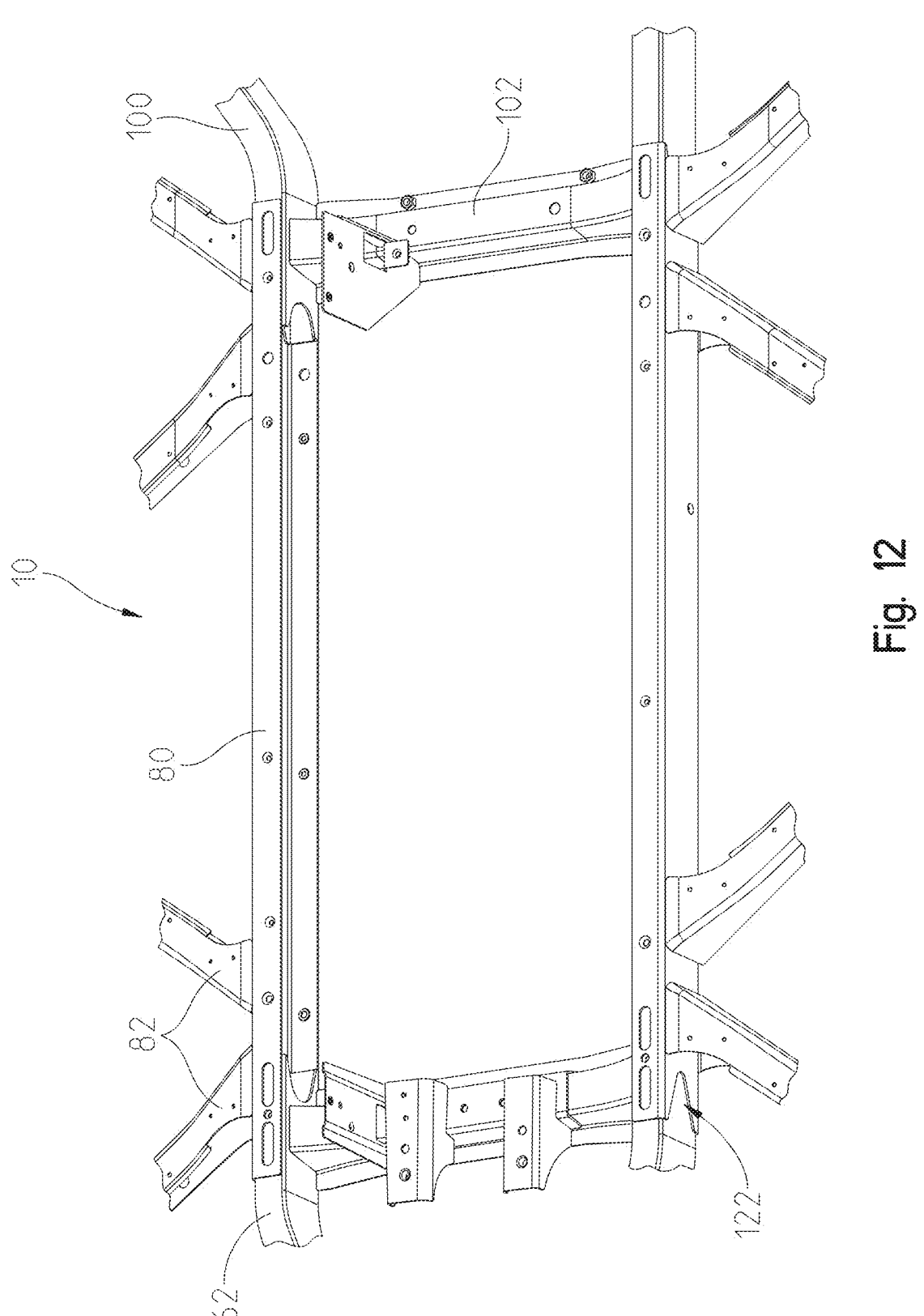
FIG. 12 shows a portion of the lower frame assembly of FIG. 8A.
Figure 13:
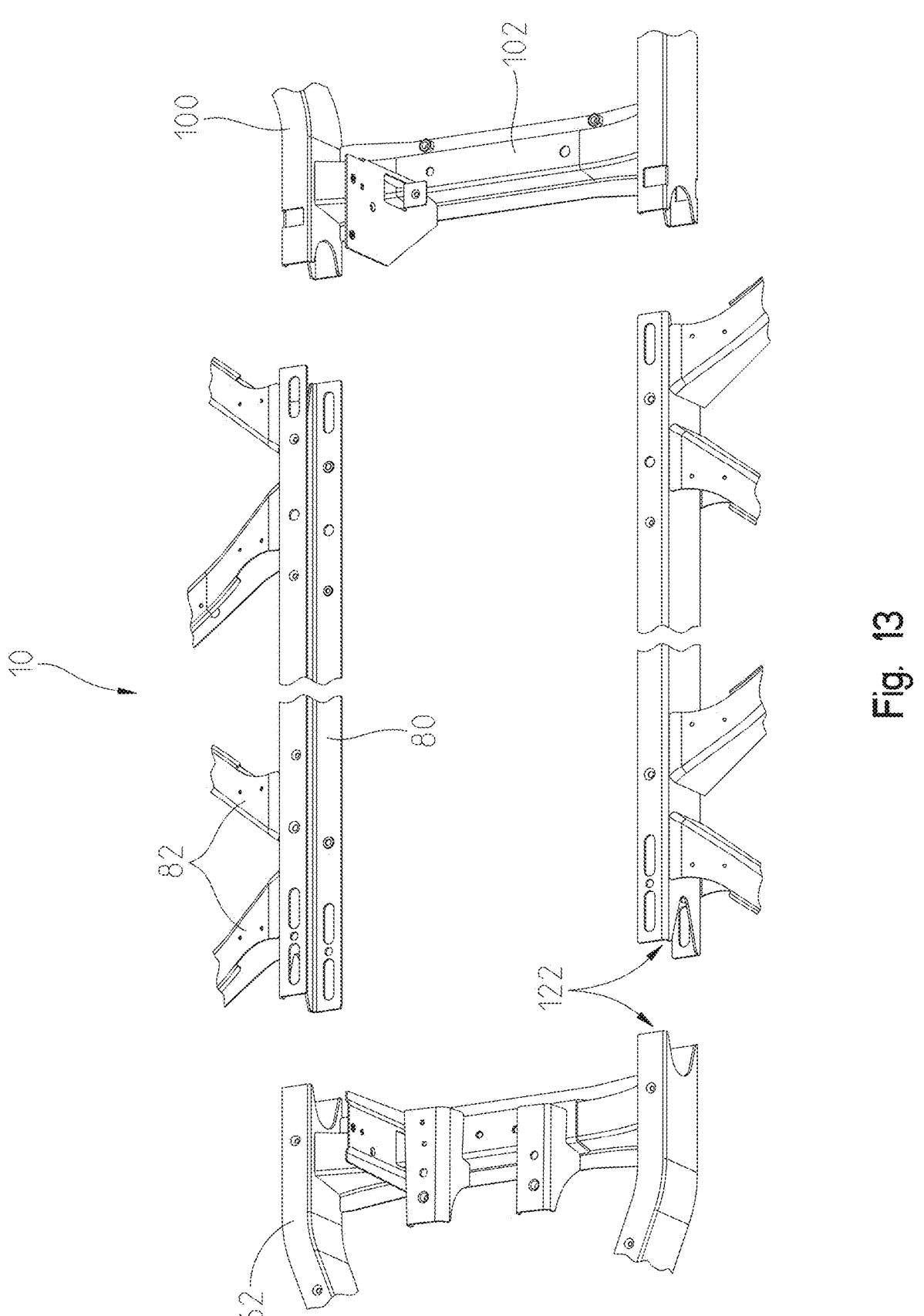
FIG. 13 is an exploded view of the portion of the lower frame assembly of FIG. 12.

As is understood by at least FIGS. 11-11C, intermediate frame section 60 is a separate weldment or section of lower frame assembly 10 relative to front or rear frame sections 14, 16 and, as such, the connection locations of intermediate frame section 60 to front and rear frame sections 14, 16 are configured to be fully contained within each of these frame sections. In this way, intermediate frame section 60 may remain the same while being configured to couple with multiple embodiments of front and rear frame sections 14, 16 to allow for customization of vehicle 2. In other words, it is not necessary to modify intermediate frame section 60 if the application of vehicle 2 necessitates different embodiments of front and/or rear frame sections 14, 16. Additionally, because upper frame assembly 12 couples with intermediate frame section 60, the configuration of upper frame assembly 12 is not modified based on the configuration of various front and rear frame sections 14, 16.

Referring still to FIGS. 11-11C, upper outer frame members 112 extend rearwardly from upstanding members 110 and are coupled together through at least cross-member 114. Upper outer frame members 112 also are coupled to rear drive mount assembly 120 through frame members 116 which extend generally vertically between frame members 112 and mount assembly 120. Cross-member 114 is coupled to longitudinally-extending members 100 through frame members 116. Frame members 116 may be coupled together through a brace or bracket 118 which extends laterally therebetween.

As shown in at least FIGS. 11A and 11B, various frame members of rear frame section 14 may generally define a closed structure 1110 on both the right and left sides of rear frame section 14. Illustratively, the closed structure 1110 is defined at its upper extent by upper outer frame members 113, at its forward extent by upstanding members 110, at its lower extent by lower outer frame members 105, and at its rearward extent by frame members 116 and brace 118, thereby defining a generally square or rectangular shape such as that of a box. In this way, this closed structure 1110 of rear frame section 14 is configured such that none of these frame members are cantilevered from another frame member and, instead, are supported by other frame members of rear frame section 16 at both of its ends. In this way, when upstanding members 110 couple rear frame section 16 to intermediate frame section 60, there are no cantilevered frame members of rear frame section 16 which couple directly with intermediate frame section 60, which allows for increased strength of lower frame assembly 10, ease of assembly of lower frame assembly 10, and the ability to easily connect various embodiments of rear frame section 16 to intermediate frame section 60. Instead, only upstanding members 110 contact intermediate frame section 60 when rear frame section 16 is coupled to intermediate frame section 60 and the remaining components of the closed structure 1110 (i.e., frame members 105, 116, 118, 113) are spaced apart from intermediate frame section 60 by upstanding members 110. In view of the foregoing, it may be appreciated that rear frame section 16 is coupled to intermediate frame section 60 after closed structure 1110 has been defined and, furthermore, may be coupled to intermediate frame section 60 after the entirety of rear frame section 16 has been assembled together.

By connecting upper and lower frame members 113, 105 with upstanding member 110 to form closed structure 1110, the strength of at least upstanding member 88 of intermediate frame portion 60 may be increased, stress concentrations at the connections to upstanding member 88 may be reduced, assembly of lower frame assembly 10 may be reduced by because the number of connection/coupling interfaces is reduced and the weld tolerances are improved. Further, the channel-type shape of upstanding member 110, which illustratively is a general U-shape, creates an adaptable surface for interfacing rear frame portion 16 with intermediate frame portion 60. Such an adaptable interface can accept numerous frame shapes, geometries, and number of members without necessitating a change to the interface. In other words, it is a frame construction that does not require a specific frame geometry to couple with other frame subassemblies.

Figure 15:
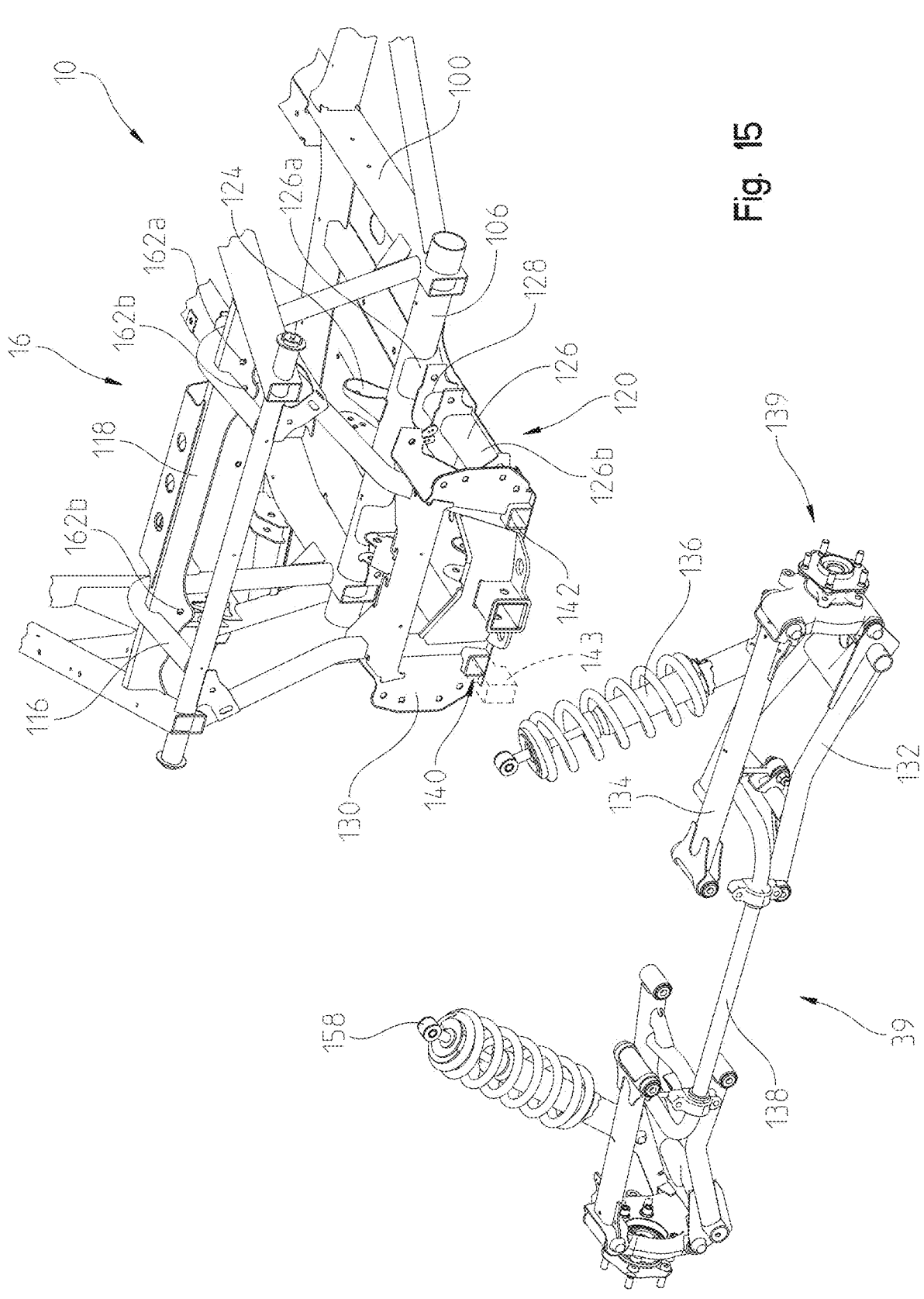
FIG. 15 is a partially exploded view of the rear frame section and rear suspension assembly of FIG. 14.

Referring still to FIGS. 11-14 and as further show in FIGS. 15 and 16, various connections between portions of lower frame assembly 10 may be defined as frame or chassis nodes 121. Illustratively, chassis nodes 121 may be apparent at the connection between bracket 74 of front frame section 14 and upstanding member 84 of intermediate frame section 60 (e.g., along plane F (FIG. 9)), the connections between longitudinally-extending frame members 80 of intermediate frame section 60 and frame members 62 and 100 of front and rear frame sections 14 and 16, respectively, and the connection between upstanding members 86, 88 and 110 of intermediate and rear frame sections 60 and 16, respectively. More particularly, these chassis nodes 121 may be bolted joints, castings, or tube-to-tube joints which incorporate slip planes to reduce tolerance stack and improve the fit and finish of lower frame assembly 10 during manufacture and assembly thereof. In one embodiment, as shown in FIGS. 8A-13, bracket 74, longitudinally-extending members 62, 80, 100, and upstanding members 110 include or are defined as C-shaped channels 122, which may be stamped channels, such that channels 122 are configured to receive other frame members. For example, bracket 74 is configured as a C-shaped bracket and/or includes a C-shaped channel 122 which is configured to receive a forward portion of upstanding member 84 and extend around a portion of upstanding member 84 such that bracket 74 overlaps with a portion of upstanding member 84. Similarly, the channel configuration of longitudinally-extending members 80 is configured to receive longitudinally-extending frame members 62, 100 such that a portion of frame members 80 extends around and overlaps with a portion of frame members 62, 100. Also, upstanding member 110 is configured with a C-shaped channel 122 which receives a rearward surface of upstanding member 88 and, therefore, extends around and overlaps with a portion of upstanding member 88.

This channel configuration allows for various frame members to slip along the length of a connecting frame member to adjust for any necessary manufacturing tolerances and to create a natural reinforcement of lower frame assembly 10 at these connection or joint locations because these chassis nodes 121 are configured to transfer a large load.

Chassis nodes 121 are provided at various connections between frame sections 14, 60, and 16 because this allows for modularity of lower frame assembly 10 and the ability to easily attach a different configuration of frame sections 14, 60, and/or 16 to existing frame sections without the need to redesign one or more portions of the frame. Illustratively, chassis nodes 121 may be shown at least at locations 15 (FIG. 8B) at various intersections between frame sections 14, 60, and 16. More particularly, various prior art frame assemblies may be configured as a single weldment and/or discrete sections welded together. In such an instance, the welded connection of the frame assembly creates a permanent frame connection and does not allow for certain frame sections to be modified or interchanged with other frame sections. However, the configuration of lower frame assembly 10, which is made possible by the chassis node locations and designs, allows for any of frame sections 14, 60, and 16 to be interchanged with other frame sections without affecting the design and configuration of other frame components.

For instance, and referring to FIGS. 14 and 15, rear frame section 16 may be interchanged with or coupled to a different frame section to support 6 people and/or 6 wheels of vehicle 2 such that lower frame assembly 10 may include additional seating rearward of operator area 8. In this embodiment, a third axle may be added to vehicle 2 by attaching additional frame components for such an axle at mounting locations 140. Mounting locations 140 are defined by frame members 142 which are illustratively shown as two U-shaped channel stampings coupled to lower mounting plate 108. Frame members 142 and lower mounting plate 108 create a boxed section open to the rear of vehicle 2 which may be sized to receive additional frame members at mounting locations 140. For example, the additional frame members may slide into frame members 142 and could be permanently or removably coupled thereto to increase the length of lower frame assembly 10 and, therefore, support a third axle, additional wheels, and additional seating. In one embodiment, the additional frame members are shown as frame members 143 (FIG. 15) and may be 1.0-2.0 inch (2.54 cm-5.08 cm) square tubes. In this way, chassis nodes 121 of lower frame assembly 10 allow for modular assembly and additional frame components which increases the configurability of vehicle 2 (e.g., cab size, rows seating, number of axels, or the like) based on the application and operator preferences for vehicle without the need to redesign or provide different components of frame assembly 10.

Figure 18:
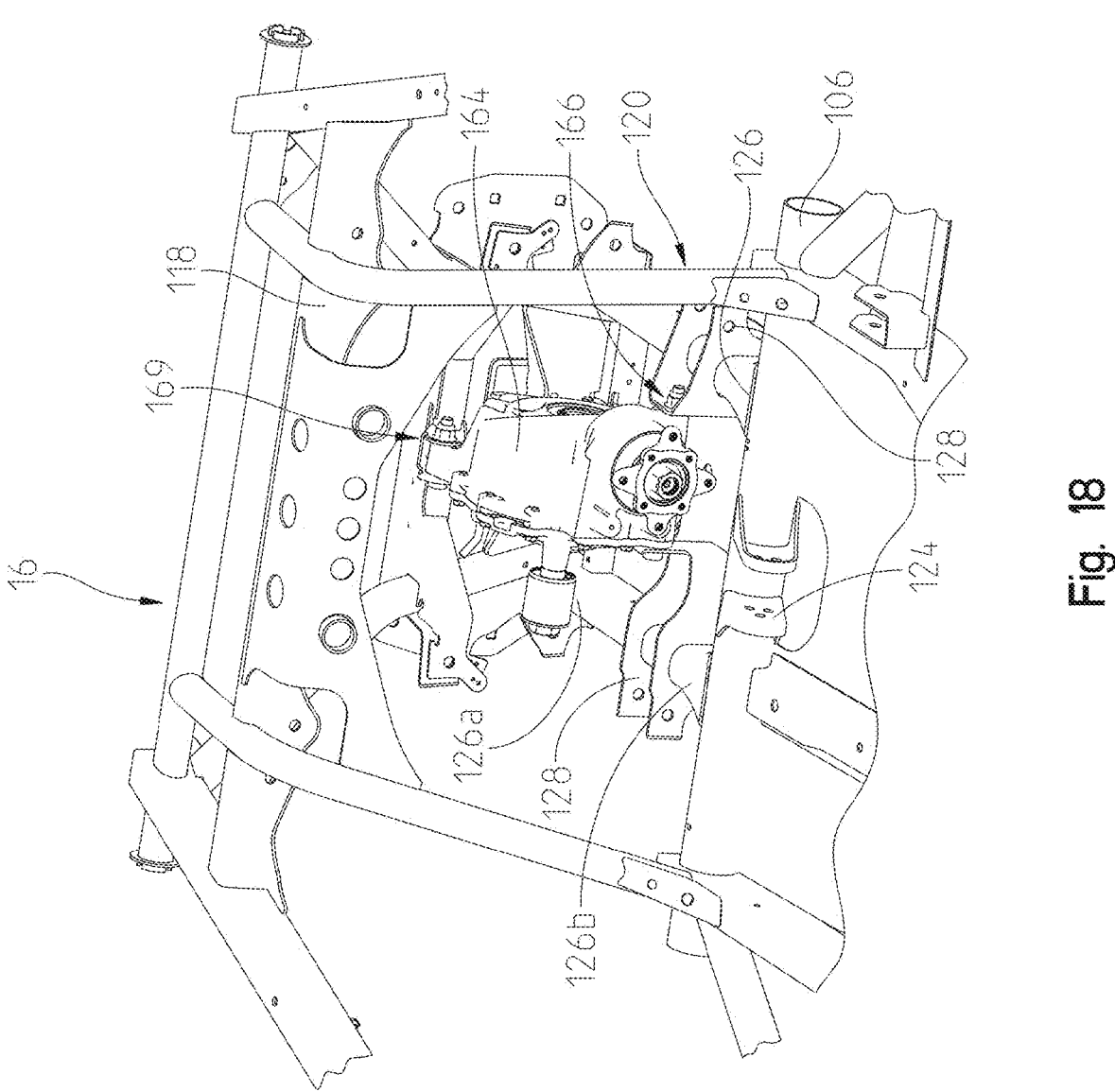
FIG. 18 is a front left perspective view of the rear frame section of FIG. 14.
Figure 19:
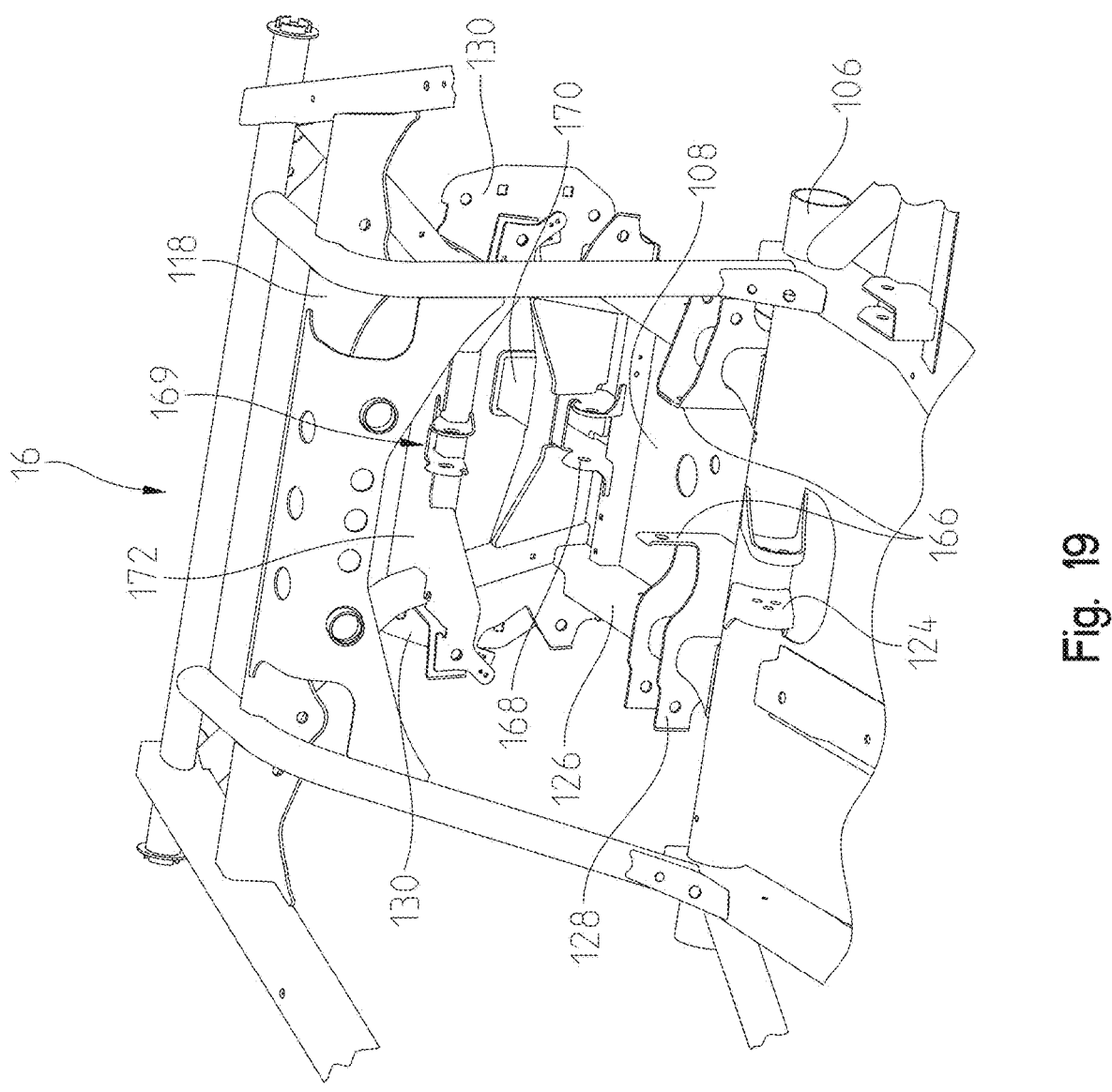
FIG. 19 is a further front left perspective view of the rear frame section of FIG. 18 with a front differential removed.
Figure 20:
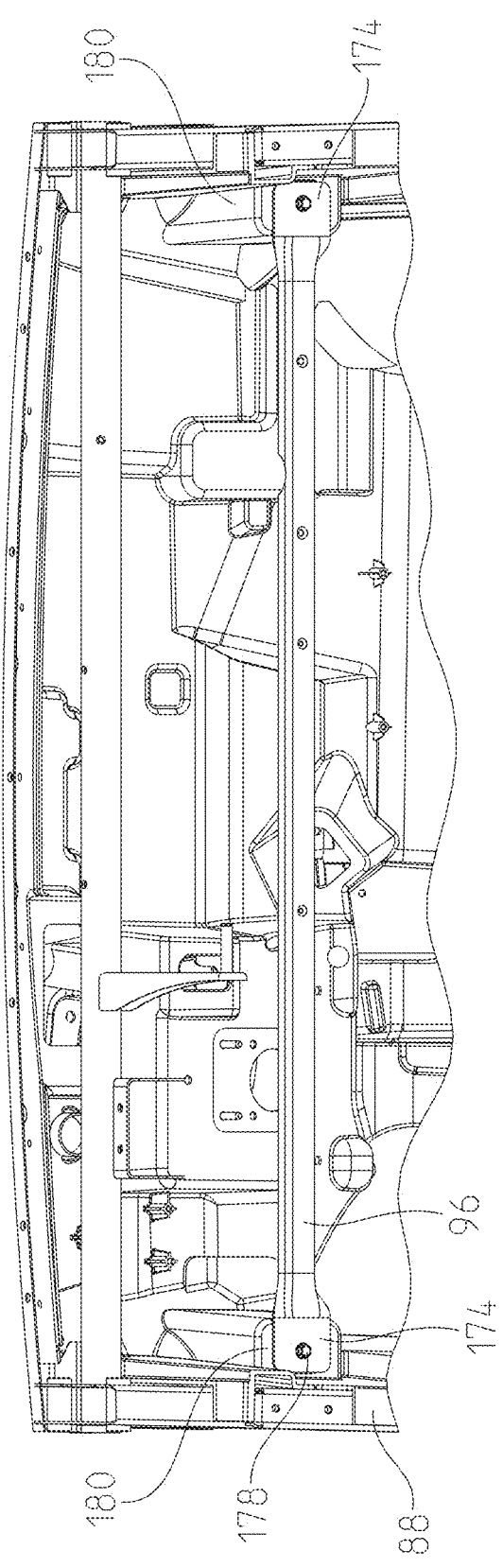
FIG. 20 is a front view of a portion of the lower frame assembly of FIG. 8A.
Figure 21:
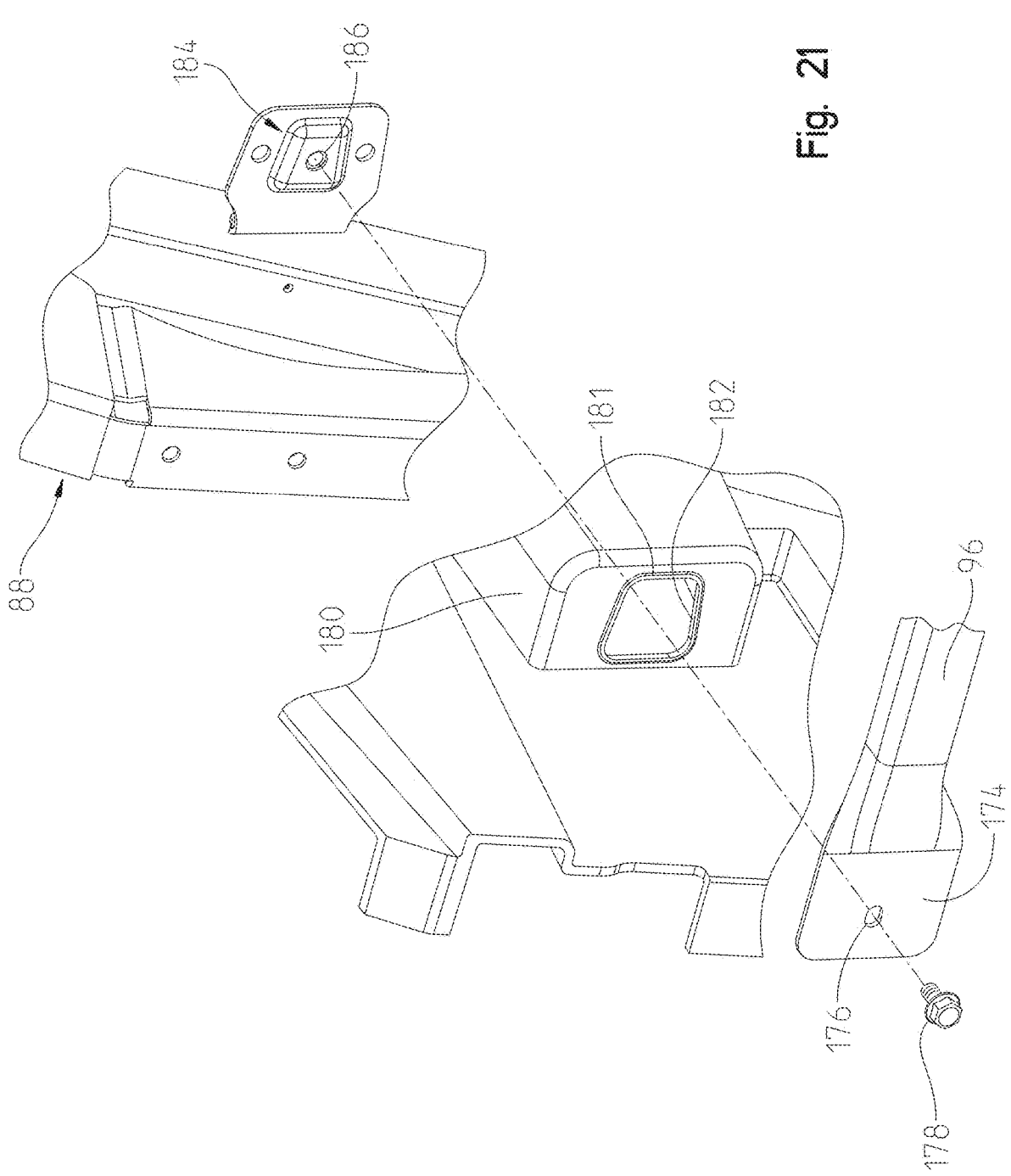
FIG. 21 is an exploded view of the portion of the lower frame assembly of FIG. 20.
Figure 22:
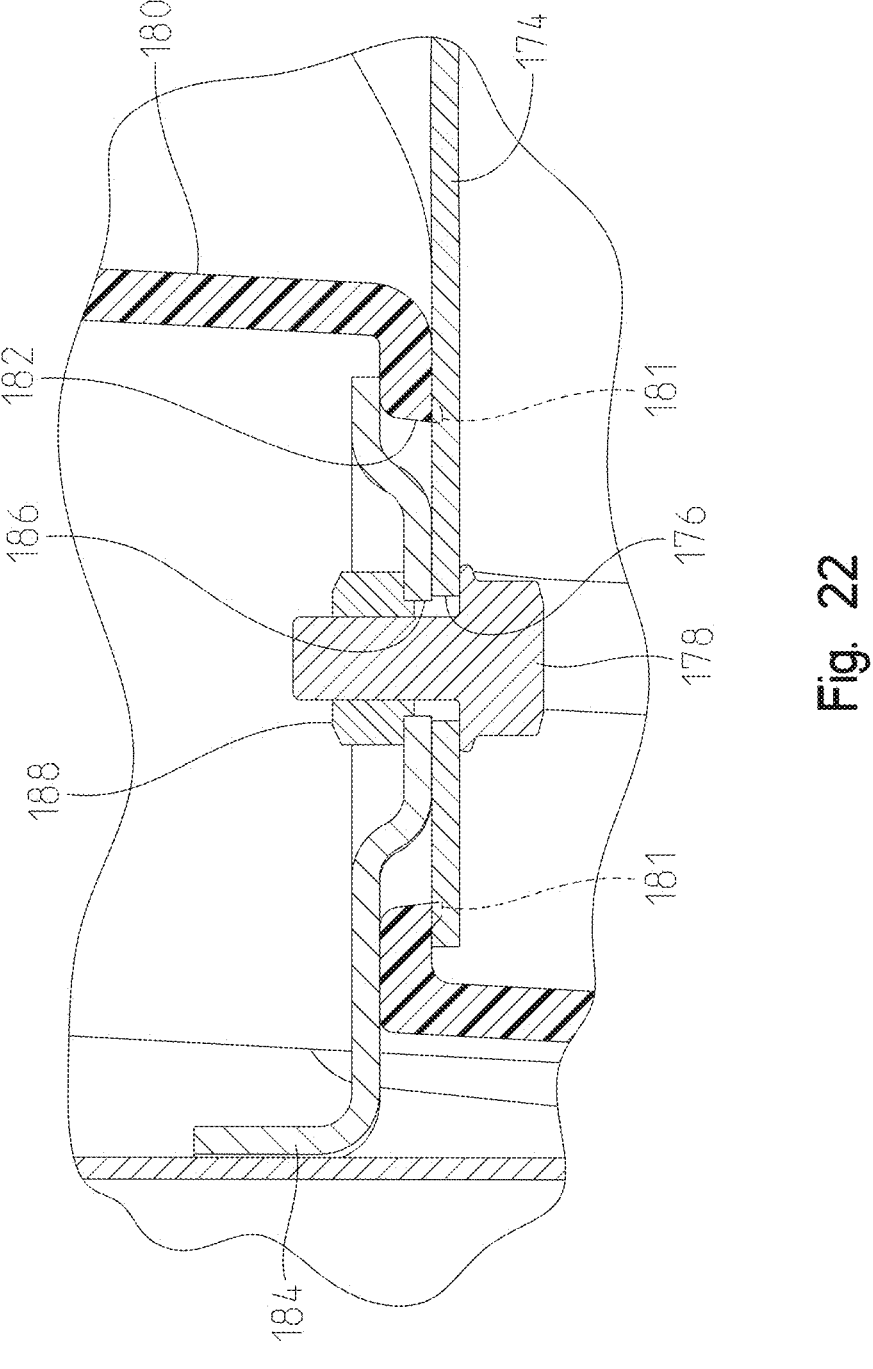
FIG. 22 is a cross-sectional view of the portion of the lower frame assembly of FIG. 20.
Figure 23:
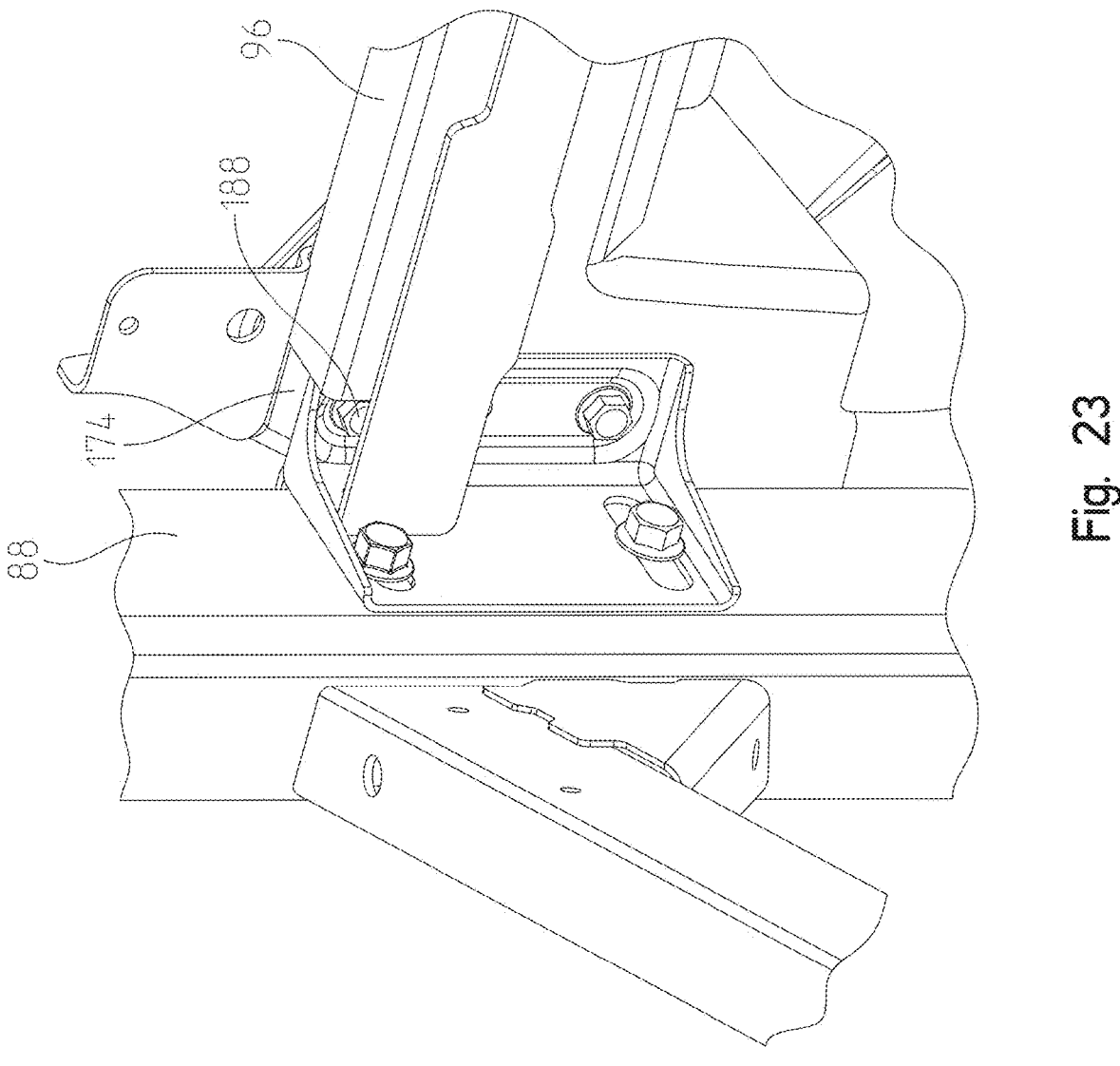
FIG. 23 is a perspective view of the portion of the lower frame assembly of FIG. 20.
Figure 24:
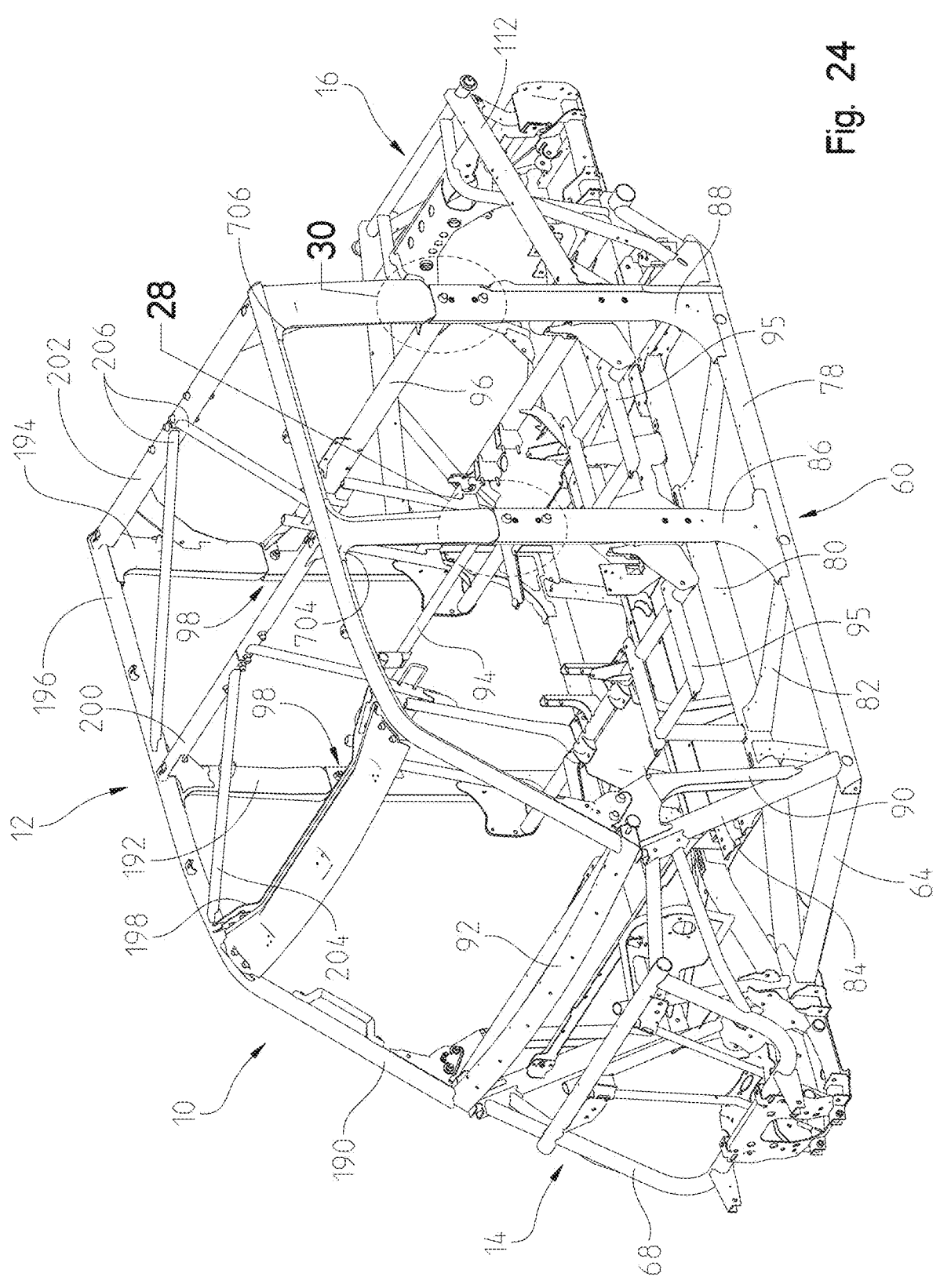
FIG. 24 is a front left perspective view of the lower frame assembly of FIG. 8A coupled to an upper frame assembly.
Figure 25:
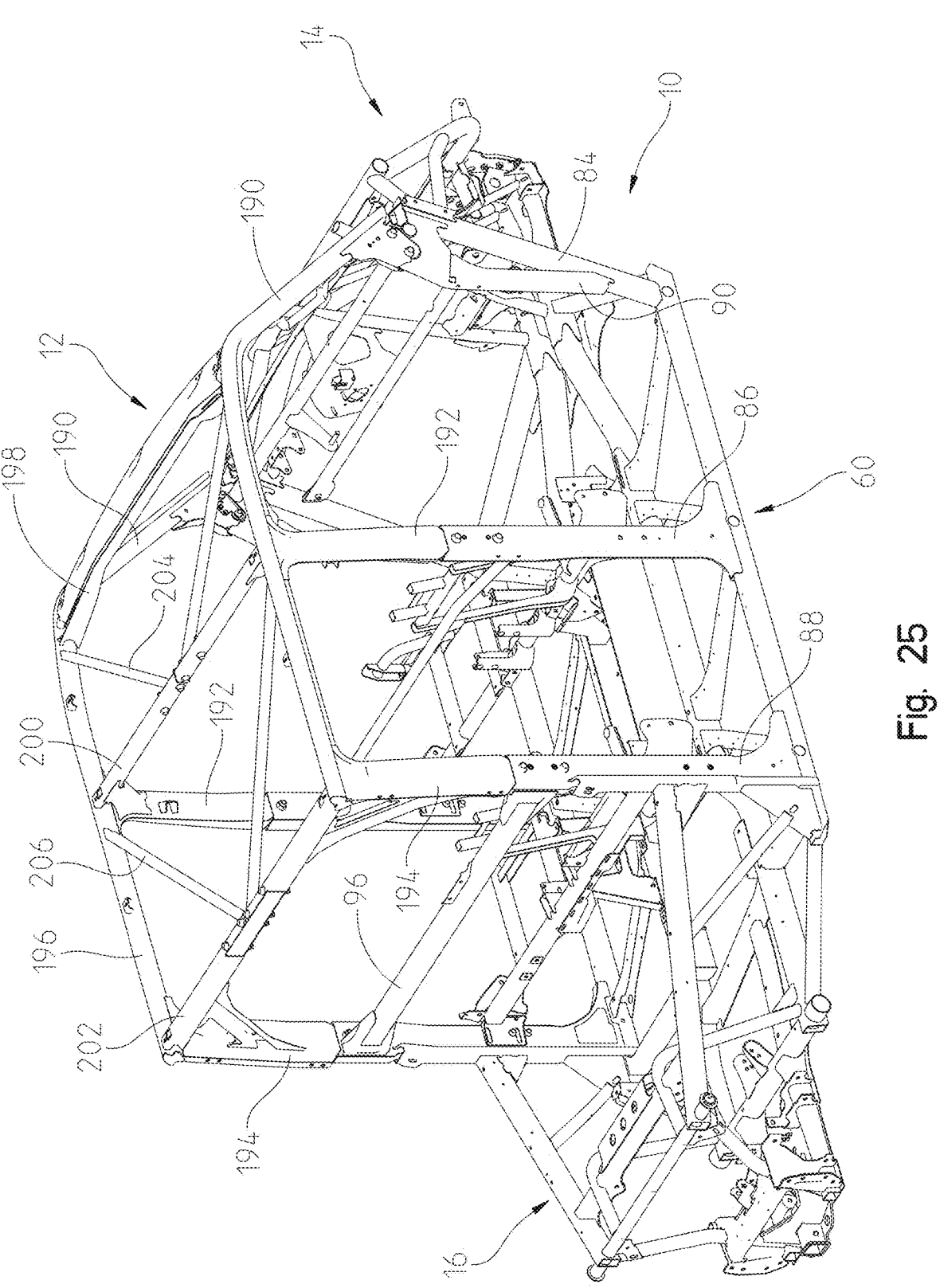
FIG. 25 is a rear right perspective view of the lower and upper frame assemblies of FIG. 24.
Figure 26:
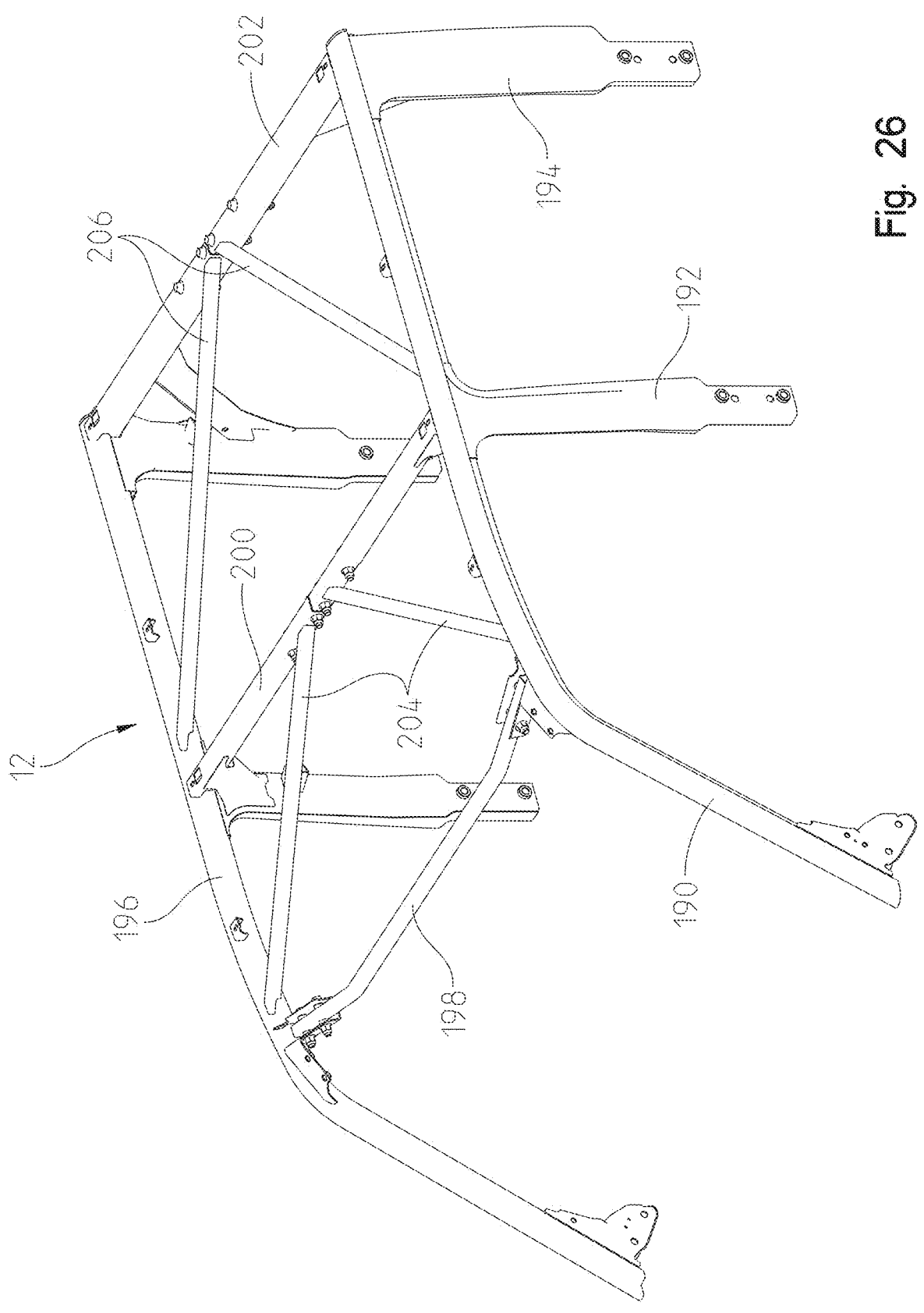
FIG. 26 is a front left perspective view of the upper frame assembly of FIG. 24.

Referring to FIGS. 18 and 19, the powertrain assembly of vehicle 2 may include a rear differential or gearbox 164 (FIG. 18) which is supported on at least lower mounting plate 108. Rear frame section 16 further includes additional supports or mounts for rear differential 164 which are illustratively shown at mounting locations 166, 168, and 169. As shown best in FIG. 19, mounting location 166 is on suspension mount 128 for lower control arm 132 and, more particularly, is along the inner surface of suspension mount 128. In this way, suspension mount 128 is configured to support both lower control arm 132 and rear differential 164.

Mounting location 168 is longitudinally rearward of mounting location 166 and may be positioned generally along a vertical plane extending through longitudinal axis L of vehicle 2. Both mounting locations 166 and 168 are configured to support a lower portion of rear differential 164. In one embodiment, mounting location 168 defines a bracket at the longitudinally forward end of a hitch receiver 170 such that hitch receiver 170 can both couple with rear differential 164 and be attached to a hitch for a trailer hitch.

Mounting location 169 is configured to support an upper portion of rear differential 164 and is positioned at a vertical height greater than that of mounting locations 166, 168. In one embodiment, mounting location 169 also may be positioned along a vertical plane extending through longitudinal axis L and, therefore, may be positioned directly above a portion of mounting location 168. As shown best in FIG. 19, mounting location 169 may define a bracket supported on brace 172. Brace 172 is configured to include or couple with suspension mounts 130 such that brace 172 may support both suspension mount 130 and mounting location 169. In various embodiments, mounting location 169 may be laterally aligned with the mounting location for upper control arm 134 on suspension mount 130.

It may be appreciated that brace 172, mounts 128, and hitch receiver 170 are dual purpose components of lower frame assembly 10 because brace 172, mounts 128, and hitch receiver 170 simultaneously support multiple components of vehicle 2. Additionally, mounting locations 166, 168, 169 are located near structural load paths which increase load transfer efficiency while maintaining ease of assembly and serviceability of rear differential 164.

Referring to FIGS. 141-147, because lower frame assembly 10 of vehicle 2 can accommodate various additional frame sections, one embodiment of vehicle 2 includes a rear accessory frame section 1112 coupled to rear frame section 16. Illustratively, rear accessory frame section 1112 supports cargo area 30, however, rear accessory frame section 1112 also may support seating, various accessory mounts, or any other vehicle application, assembly, or component. Rear accessory frame section 1112 is coupled to rear frame section 16 through at least upper longitudinally-extending frame members 1114 and lower longitudinally-extending frame members 1116. In particular, upper longitudinally-extending frame members 1114 are configured to couple with frame members 112 of rear frame section 16 and lower longitudinally-extending frame members 1116 are configured to couple with frame members 126 of rear frame section 16. As shown in FIGS. 143 and 144, lower longitudinally-extending frame members 1116 may have a generally square cross-section which is received within an open channel 1124 of frame members 126 of rear frame section 16. Illustratively, channels 1124 have a cross-sectional shape complementary to that of lower longitudinally-extending frame members 1116. The coupling of rear frame section 16 and rear accessory frame section 1112 occurs at chassis nodes 121 defined at the coupling points between frame members 112, 1114 and frame members 126, 1116, thereby allowing various embodiments of rear accessory frame section 1112 to be coupled with any embodiment of rear frame section 16 without the need to modify either frame section to accommodate the coupling therebetween.

Rear accessory frame section 1112 further includes a brace 1118 extending between upper longitudinally-extending frame members 1114 and a cross-member 1120 also extending between upper longitudinally-extending frame members 1114. Inner upstanding members 1122 are further coupled to both brace 1118 and cross-member 1120 and extend downwardly to also couple with lower longitudinally-extending frame members 1116.

Still referring to FIGS. 141-147, lower frame assembly 10 includes a first suspension location 1126, a second suspension location 1128, and a third suspension location 1130. Illustratively, first suspension location 1126 is a front or first suspension location for coupling a front or first suspension assembly between frame front frame section 14 and ground engaging members 4. Additionally, second suspension location 1128 is a second or middle or first rear suspension location for coupling a second suspension assembly between rear frame section 16 and ground engaging members 6. Third suspension location 1130 is a second rear suspension location for coupling a third or rearwardmost suspension assembly between rear accessory frame section 1112 and ground engaging members 7. In embodiments, the suspension assemblies positioned at second and third suspension locations 1128 and 1130 may be identical such that common assemblies and components can be used on both frame sections 16, 1112.

The second suspension assembly may include a first or left control arm 1132 coupled between ground engaging member 6 and rear frame section 16 at mounting points 1134. A first shock absorber 1136 is coupled between a first shock mounting point 1138 on first control arm 380 and a second shock mounting point 1140 on rear frame section 16. The second suspension assembly also includes a second or right control arm 1142 coupled between ground engaging member 6 on the right side of vehicle 2 and rear frame section 16 at mounting points 1144. A second shock absorber 1146 of the second suspension assembly is coupled between a first shock mounting point 1148 on second control arm 1142 and a second shock mounting point 1150 on rear frame section 16.

The third or rearwardmost suspension and third suspension location 1130 includes a first or left control arm 1152 coupled between ground engaging member 7 and rear accessory frame section 1112 at mounting points 1154. A third shock absorber 1156 is coupled between a first shock mounting point 1158 on first control arm 1152 and a second shock mounting point 1160 on rear accessory frame section 1112. The third suspension assembly also includes a second or right control arm 1162 coupled between ground engaging member 7 on the right side of vehicle 2 and rear accessory frame section 1112 at mounting points 1164. A fourth shock absorber 1166 is coupled between a shock mounting point 1168 on second control arm 1162 and a shock mounting point 1170 on rear accessory frame section 1112.

Referring to FIGS. 145 and 146, each of mounting points 1134, 1154 are positioned along an axis line X1 and mounting points 1144, 1164 are positioned along an axis line X2. Further, mounting points 1140, 1160 are positioned along an axis line X3 and mounting points 1150, 1170 are positioned along an axis line X4. In embodiments, each of axes X1, X2, X3, X4 are parallel to each other. In embodiments, each of axes X1, X2 are laterally intermediate axes X3, X4.

Referring to FIG. 146, longitudinally extending frame members 1114 couple to longitudinally extending frame members 112 at a position 1172 which is longitudinally forward of shock absorbers 1136, 1146 and, more particularly, is longitudinally forward of mounting points 1138, 1140, 1148, 1150. In other embodiments, position 1172 may be longitudinally rearward of shock absorbers 1136, 1146 or position 1172 may be at the same longitudinal position of shock absorbers 1136, 1146 such that position 1172 is laterally aligned with shock absorbers 1136, 1146.

Referring now to FIGS. 20-23, various portions and frame members of lower frame assembly 10 may be configured to couple to each other with a joint that passes through a body panel (e.g., a plastic body panel such as the dashboard assembly or rear close-off panels adjacent or rearward of the rear seating within operator area 8 (FIG. 3)). The body panel may act as a close-off to seal dust and airflow from the outside (e.g., ambient air) to the inside of vehicle 2. More particularly, and using cross-member 96 and upstanding member 88 (FIGS. 8A and B) as an example, various frame members such as cross-member 96 include a flange 174 having an aperture 176 configured to receive a fastener 178. Cross-member 96 may be coupled to another frame member, such as upstanding member 88 through a body panel 180 and using a bolted joint defined by a bracket 184 and flange 174. Body panel 180 includes a rib 181 generally surrounding an opening 182 that allows this joint between cross-member 96 and upstanding member 88 to seal when the joint is tightened. Illustratively, rib 181 provides a flat surface to form the seal when in contact with flange 174. Rib 181 provides an interference fit around opening 182 of body panel 180 to prevent air from flowing through the cab of vehicle 2 at this location. However, rib 181 is soft enough to deform until the bolted joint is fully seated. As such, this allows for a bolted joint that is less likely to loosen than if body panel 180 was integral to the bolted joint. In one embodiment, flange 174 and bracket 184 of the bolted joint are comprised of steel such that the bolted joint is a steel-to-steel bolted joint.

Aperture 176 of flange 174 is configured to align with an aperture 186 of bracket 184 to receive fastener 178. Fastener 178 extends through aperture 176 and opening 182 of body panel 180 to be received within aperture 186 of bracket 185 and couple with a second fastener 188 to couple together cross-member 96 and upstanding member 88 through body panel 180. While cross-member 96 and upstanding member 88 are disclosed herein with respect to the bolted joint, any of the frame members and body panels of vehicle 2 may utilize the configuration of the bolted joint to allow for a sealed coupling.

Referring now to FIGS. 24-52, upper frame assembly 12 is disclosed in more detail. Upper frame assembly 12 includes forward upstanding members 190, intermediate upstanding members 192, and rearward upstanding members 194. Longitudinally-extending members 196 extend between forward upstanding members 190 and rearward upstanding members 194. In one embodiment, longitudinally-extending members 196 may be integrally formed with any of upstanding members 190, 192, 194 or may be removably coupled to any of upstanding members 190, 192, 194.

As shown in FIGS. 24-27, upstanding members 192 and 194 illustratively have a rectangular cross-sectional profile. Typical frame member at these locations may be tubular structures with gussets and/or additional tubes at the ends thereof to facilitate the transition of stiffness and loads at these frame members. However, upstanding members 192, 194 of the present application may be stamped frame members which allow these primary load-carrying members of upper frame assembly 12 to transfer loads more efficiently. Additionally, these stampings may reduce the number of components needed for upper frame assembly 12. More particularly, the stiffness transitions may be gradual in the stampings due to the generally C-shaped curvature at locations 704, 706 (FIG. 24) similar to feet 81 (FIGS. 8A and B), thereby allowing the number of frame components and welds of upper frame assembly 12 to be reduced. For example, these stampings allow for integration of a door interface and seal surface without the need for additional components to accommodate these features.

The configuration of these stampings also provides a natural slip plane for manufacturing which improves the quality, tolerance, and finish of upper frame assembly 12. In one embodiment, and as disclosed further in FIGS. 28-31, these stampings are two-piece stampings which allows for a robust and closed section configuration which improves load transfer and optimizes cross-sectional parameters, material thickness, and material grade to allow for varying strength along the length of upstanding members 192, 194 which is not possible with a conventional tubular design.

Upper frame assembly 12 further includes a plurality of cross-members, such as forward cross-member 198, intermediate cross-member 200, and rearward cross-member 202. Cross-members 198, 200, 202 are integrally or removably coupled to longitudinally-extending members 196 and may be coupled to forward upstanding members 190, intermediate upstanding members 192, and rearward upstanding members 194, respectively.

Diagonal braces or K-braces also may be included on upper frame assembly 12. Illustratively, forward diagonal braces 204 are coupled to intermediate cross-member 200 and longitudinally-extending member 196 at a position generally adjacent forward cross-member 198. Additionally, rearward diagonal braces 206 are coupled to rearward cross-member 202 and longitudinally-extending member 196 at a position generally adjacent intermediate cross-member 200. By including diagonal braces 204, 206, the load-carrying capacity and torsional stiffness of upper frame assembly 12 and, more generally, vehicle 2 may be increased. In this way, by increasing the stiffness and strength of upper frame assembly 12, the total mass of vehicle 2 may be reduced, the ride and handling performance of vehicle 2 may be increased, and noise, vibration, and harshness may be decreased.

Further, as shown in FIG. 1, vehicle 2 may include roof 22 and diagonal braces 204, 206 increase the stiffness and load-carrying capacity of roof 22. More particularly, diagonal braces 204, 206 increase the number of touch points between roof 22 and upper frame assembly 12 and, therefore, increase the stiffness, strength, and noise/vibration/harshness characteristics of roof 22. To achieve such results for roof 22 without the use of diagonal braces 204, 206, a large amount of structure or mass would be required which may negatively impact the weight, center of gravity, cost, and manufacturing of vehicle 2.

Figure 27:
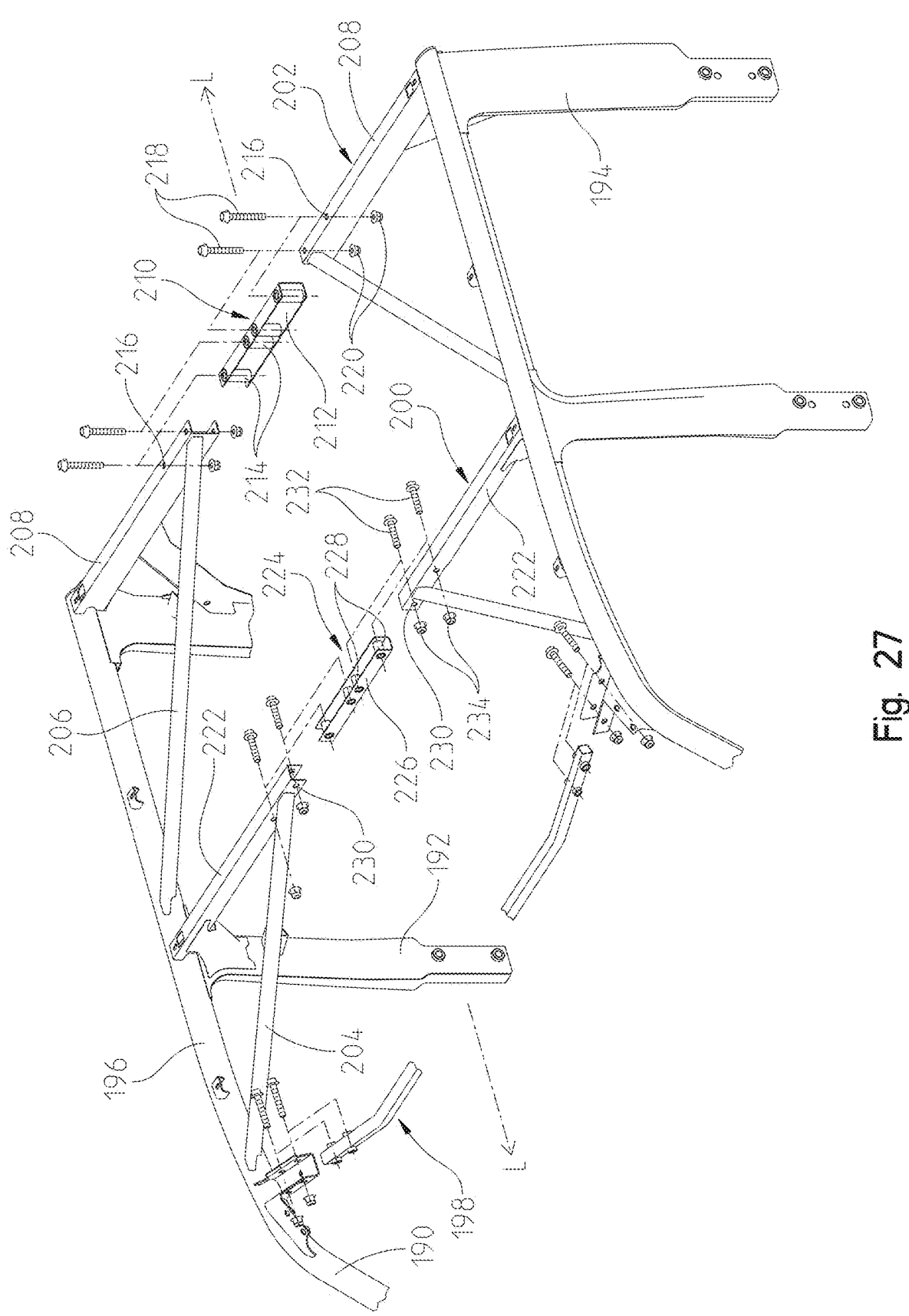
FIG. 27 is an exploded view of the upper frame assembly of FIG. 26.

As shown in FIG. 27, rear cross-member 202 may be configured as two separate frame members (e.g., weldments) 208 which are coupled together. Illustratively, frame members 208 may be split generally along the vertical plane extending through longitudinal axis L and coupled together with a center joint 210. Center joint 210 is illustratively shown as a bracket 212 having a plurality of vertically-extending mounting bosses 214. Bosses 214 align with apertures 216 on frame members 208 to receive fasteners 218 therethrough. Additional fasteners 220 are coupled to fasteners 218 to secure center joint 210 to frame members 208.

Referring still to FIG. 27, intermediate cross-member 200 also may be configured as separate frame members (e.g., weldments) 222 which are coupled together. Illustratively, frame members 222 also may be split generally along longitudinal axis L and coupled together with a center joint 224. Center joint 224 is illustratively shown as a bracket 226 and longitudinally-extending mounting bosses 228. Bosses 228 align with apertures 230 of frame members 222 to receive fasteners 232 therethrough. Additional fasteners 234 are coupled to fasteners 232 to secure center joint 224 to frame member 222.

Center joints 210, 224 may be configured to cooperate with diagonal braces 206, 204, respectively, to transfer loads directly into center joints 210, 224. More particularly, the lateral width and overall configuration of center joints 210 and 224 allows loads to be transferred between both frame members 208 and both frame members 222, respectively.

Figures 28, 29:
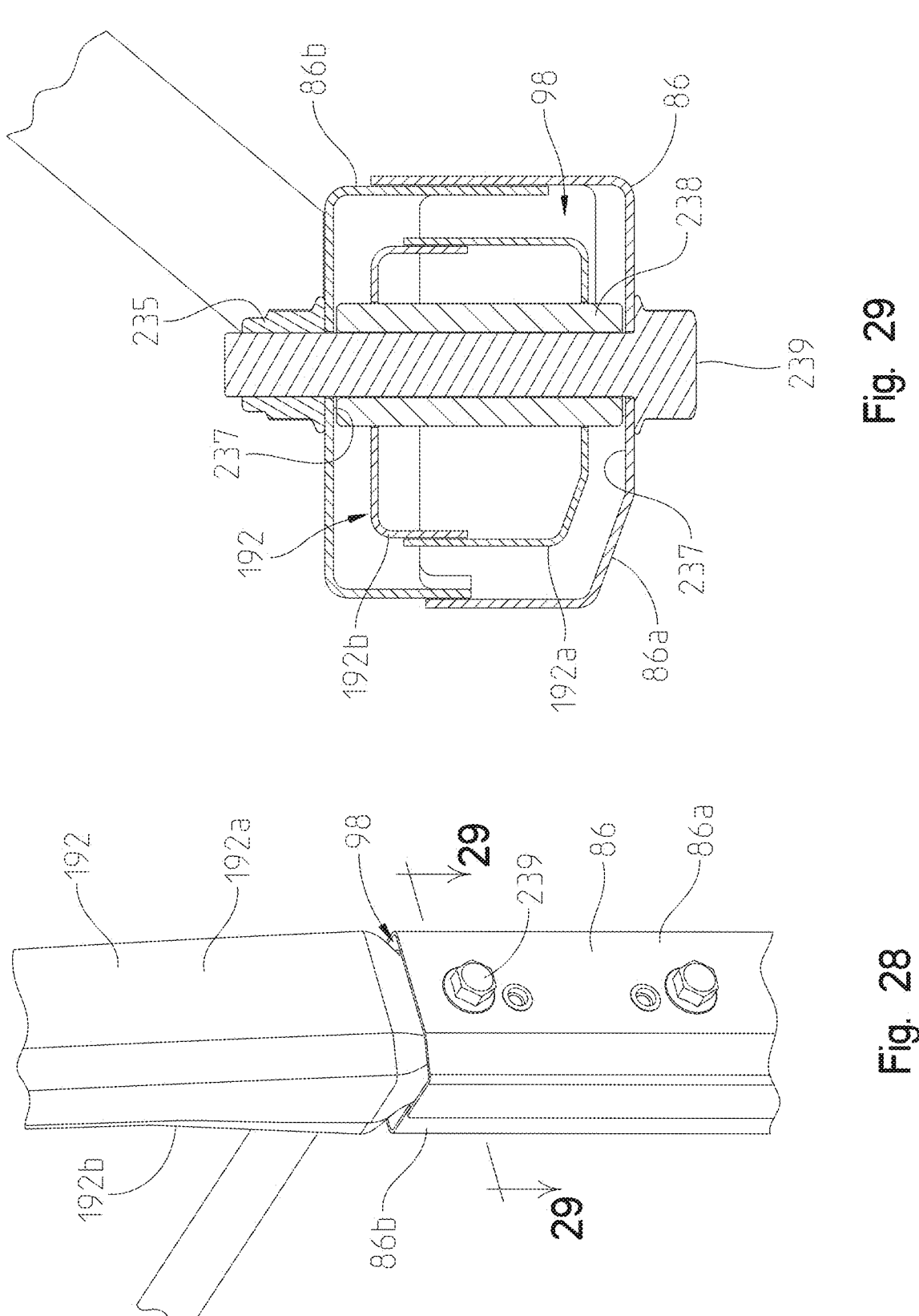
FIG. 28 is a front left perspective view of a connection between the lower and upper frame assemblies of FIG. 24.
FIG. 29 is a cross-sectional view of the connection of FIG. 28, taken along line 29-29 of FIG. 28.
Figure 32:
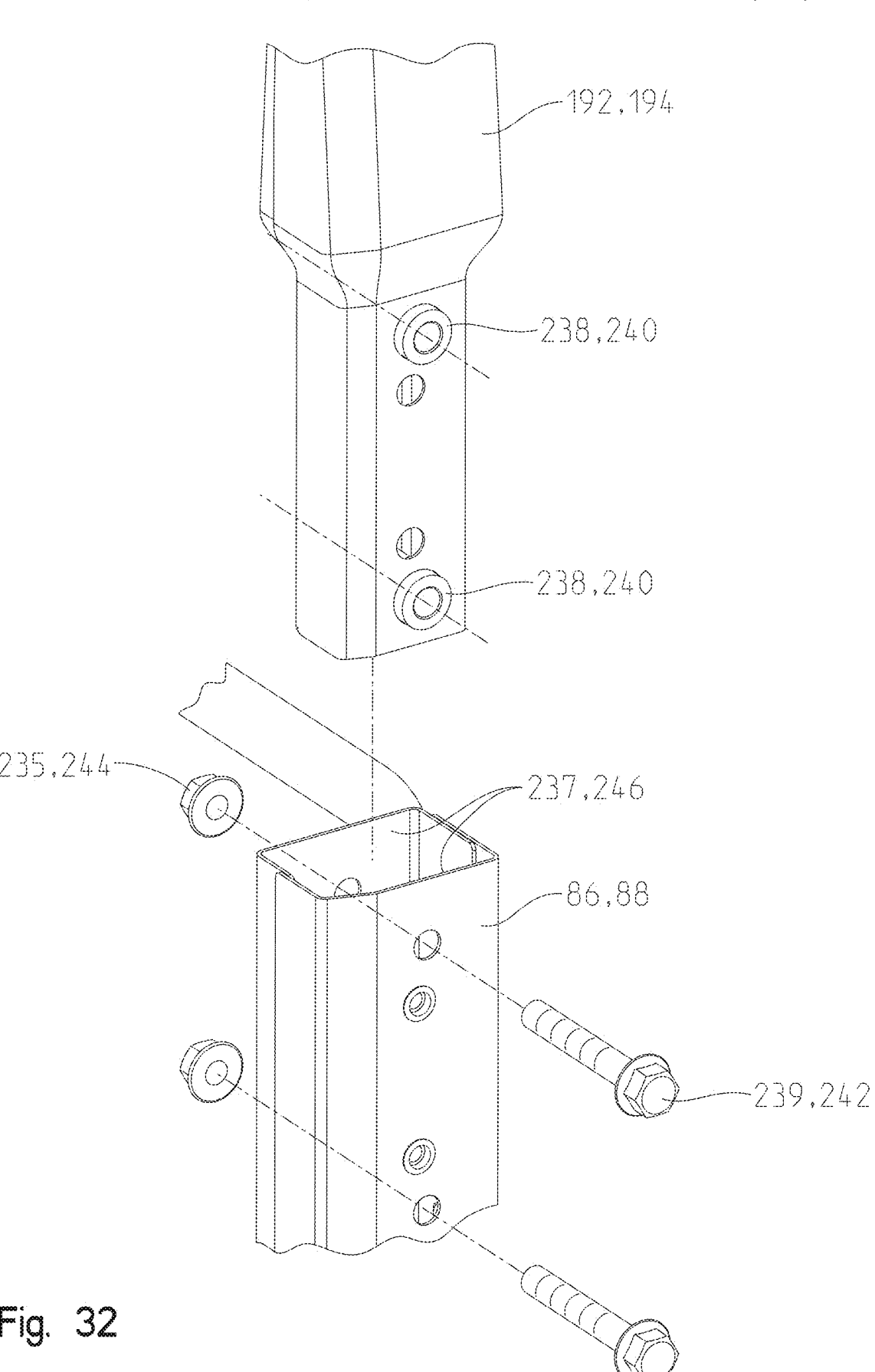
FIG. 32 is an exploded view of the connection of FIG. 28.

Referring to FIGS. 28, 29 and 32, upper frame assembly 12 is coupled to lower frame assembly 10 at a plurality of locations and, illustratively, at least at a joint between a lower end of forward upstanding members 190 and an upper end of frame member 84, a joint between a lower end of intermediate upstanding members 192 and an upper end of frame members 86, and a joint between a lower end of rearward upstanding members 194 and an upper end of frame members 88. The joints between lower and upper frame assemblies 10, 12 may be of any configuration but one example of such a joint is shown in FIGS. 28 and 29 with respect to frame members 86, 192. Illustratively, this is a bolted joint where intermediate upstanding member 192 is inserted or otherwise received within open receiving end 98 of frame member 86. A bushing 238 on intermediate upstanding member 192 is positioned within the joint to prevent the joint from collapsing under clamp load. More particularly, an inner surface 237 of frame member 86 may contact bushing 238 when a bolt 239 is tightened to couple frame members 192, 86 together. An additional fastener 235 also is used to couple with fastener 239.

Additionally, as shown in FIGS. 28 and 29, various frame members may be comprised of generally U- or C-shaped stamped members which are joined together in a clamshell configuration, as disclosed previously herein. For example, intermediate upstanding member 192 may be comprised of a first member 192a and a second member 192b which are permanently or removably coupled together with welds, adhesive, rivets, bolts, or any other fastening or joining mechanism. Similarly, frame member 86 may be comprised of a first member 86a and a second member 86b which also are permanently (e.g., welded) or removably coupled together. As disclosed herein, vehicle 2 includes doors 26 and it may be appreciated that the seam between first and second members 86a, 86b is not the location where doors 26 seal against frame assemblies 10, 12, thereby allowing greater sealing to be realized between doors 26 and frame assemblies 10, 12.

Figure 31:
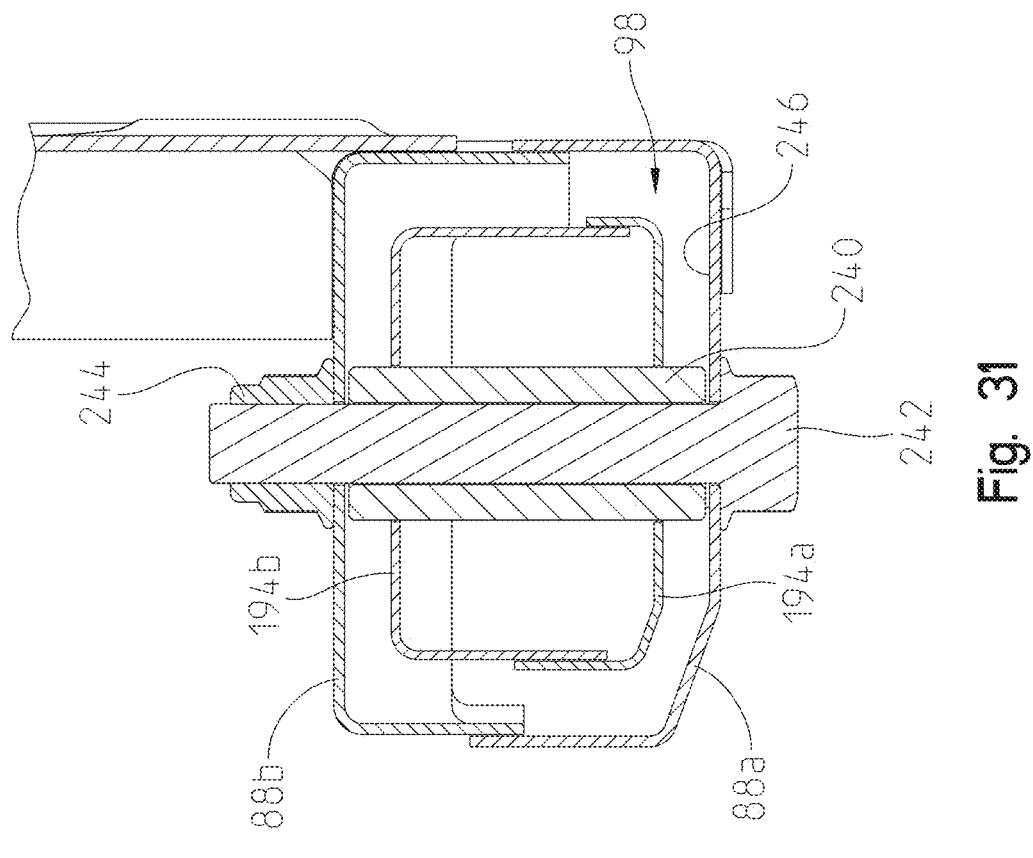
FIG. 31 is a cross-sectional view of the second connection of FIG. 30, taken along line 31-31 of FIG. 30.
Figure 30:
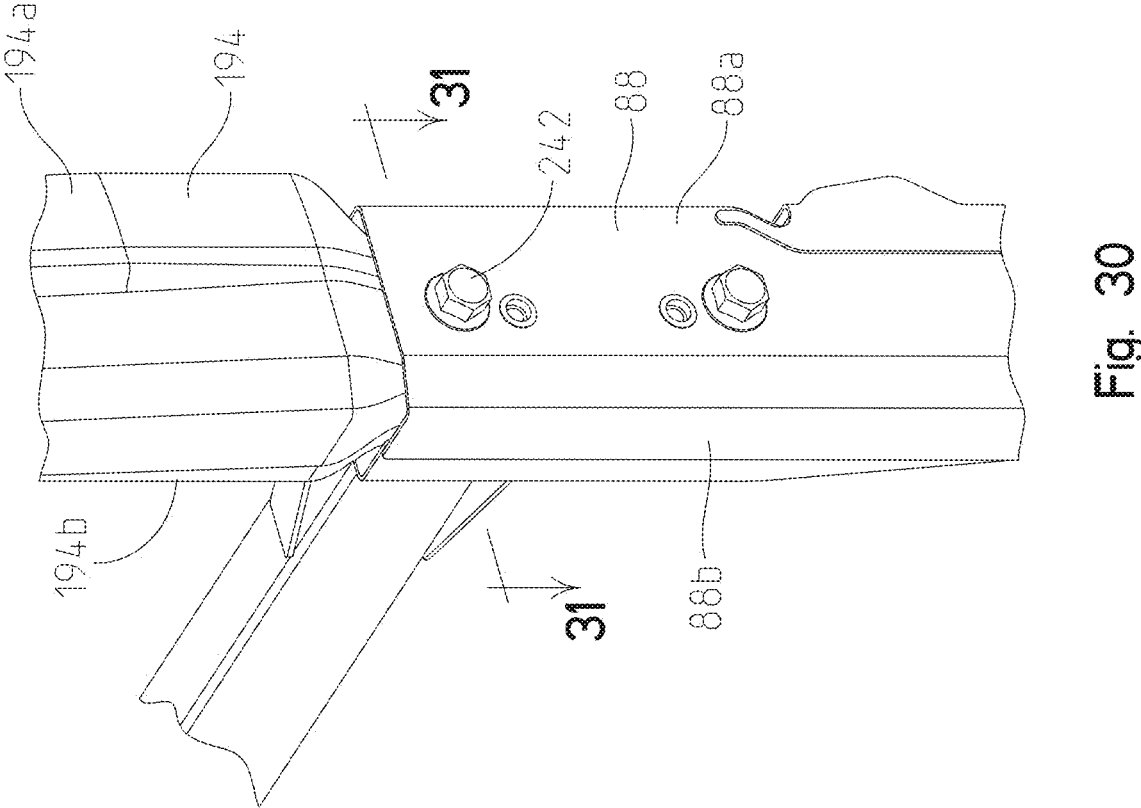
FIG. 30 is a front left perspective view of a second connection between the lower and upper frame assemblies of FIG. 24.

Similarly, and with respect to FIGS. 30-32, a bolted joint also is used at the connection of rearward upstanding member 194 and frame member 88. More particularly, rearward upstanding member 194 is inserted or otherwise received within open receiving end 98 of frame member 88. A bushing 240 on intermediate upstanding member 194 is positioned within the joint to prevent the joint from collapsing under clamp load. More particularly, an inner surface 246 of frame member 88 may contact bushing 240 when a bolt 242 is tightened to couple frame members 194, 88 together. An additional fastener 244 also is used to couple with fastener 242. As shown, rearward upstanding member 194 may be comprised of a first member 194a and a second member 194b which are permanently or removably coupled together with welds, adhesive, rivets, bolts, or any other fastening or joining mechanism. Similarly, frame member 88 may be comprised of a first member 88*a* and a second member 88*b* which also are permanently or removably coupled together.

Figures 33, 34:
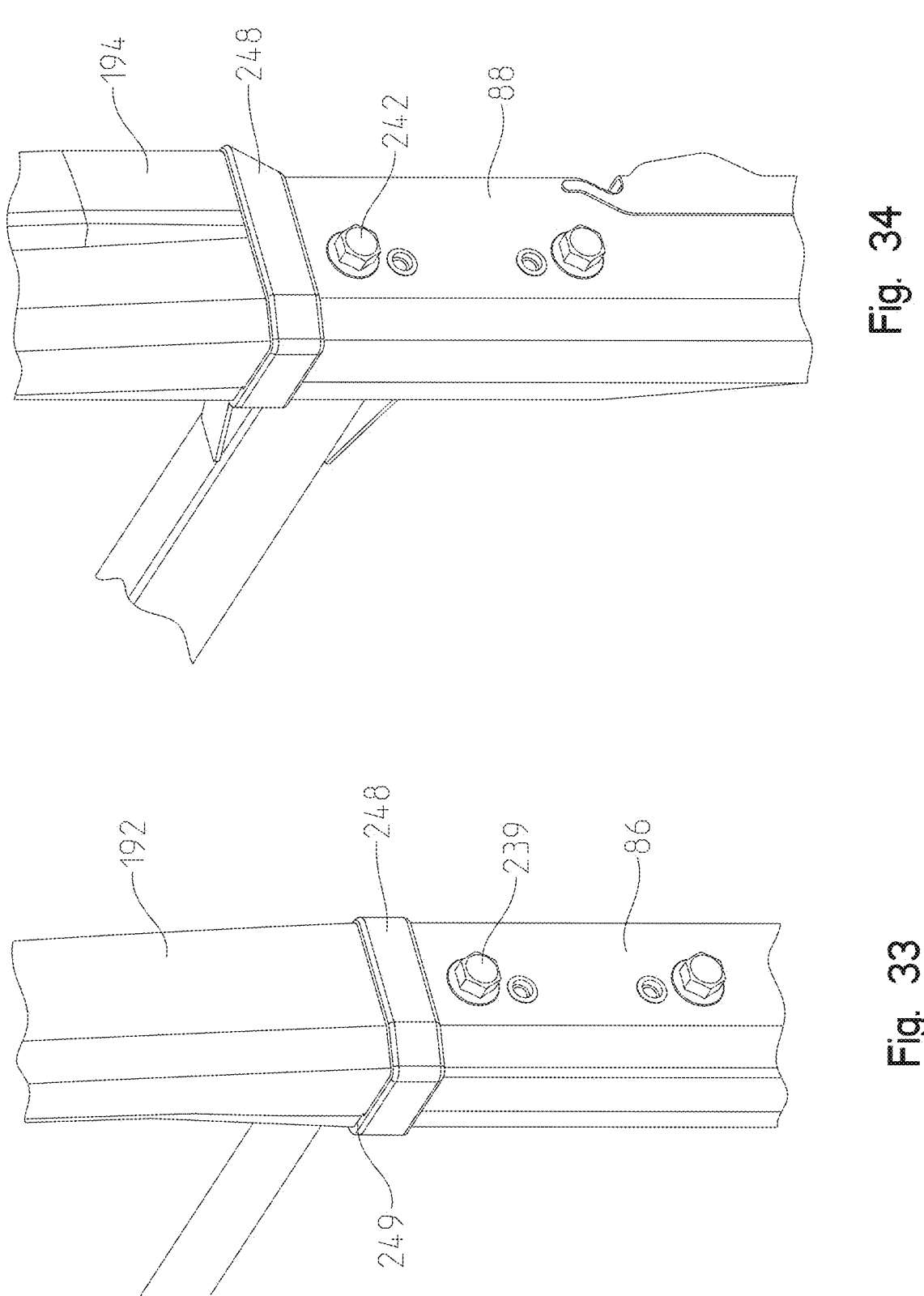
FIG. 33 is a front left perspective view of the connection of FIG. 28 and including a seal at the connection.
FIG. 34 is a front left perspective view of the second connection of FIG. 30 and including a seal at the second connection.
Figure 35:
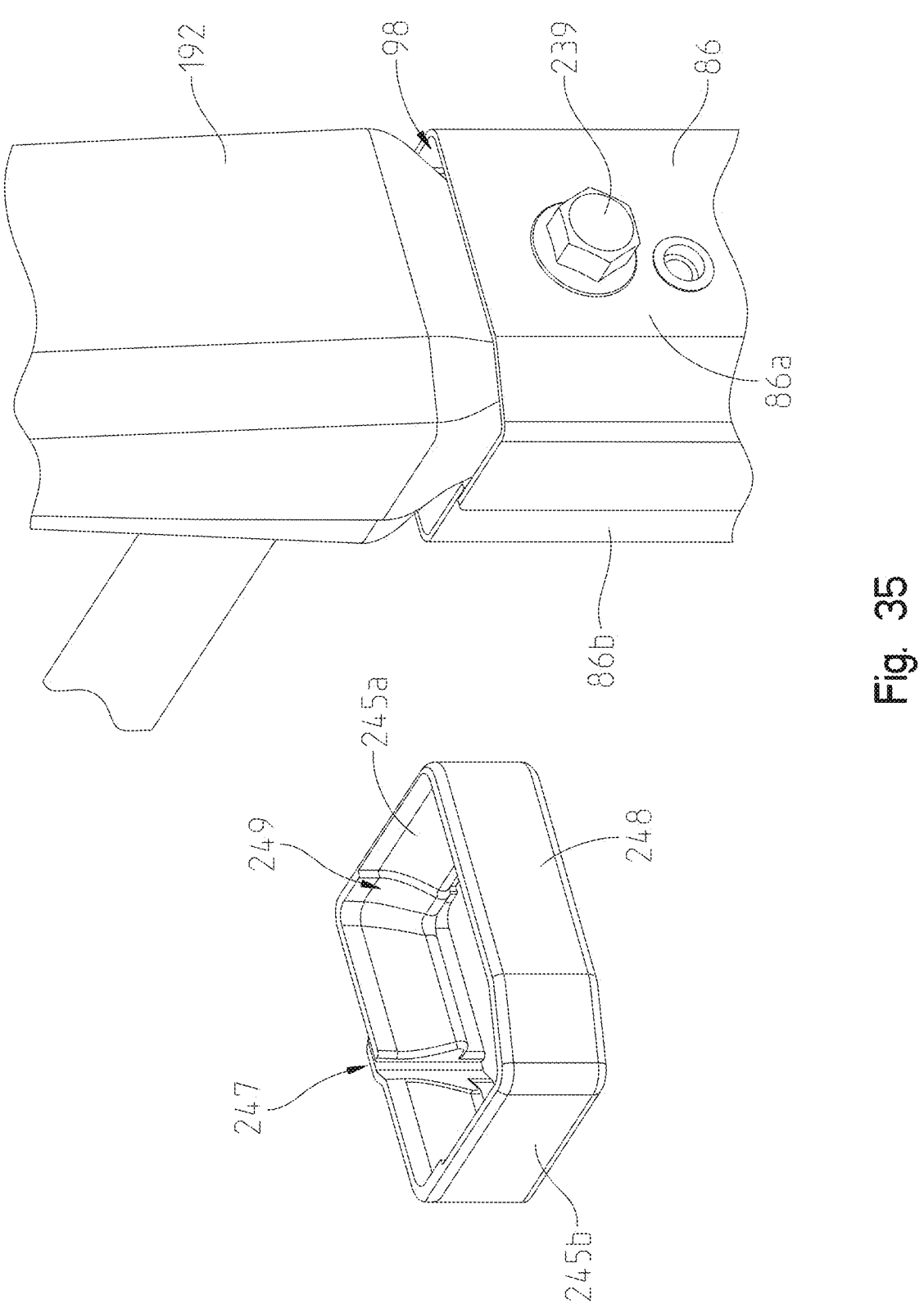
FIG. 35 is an exploded view of the seal and connections of FIGS. 33 and 34.
Figure 36:
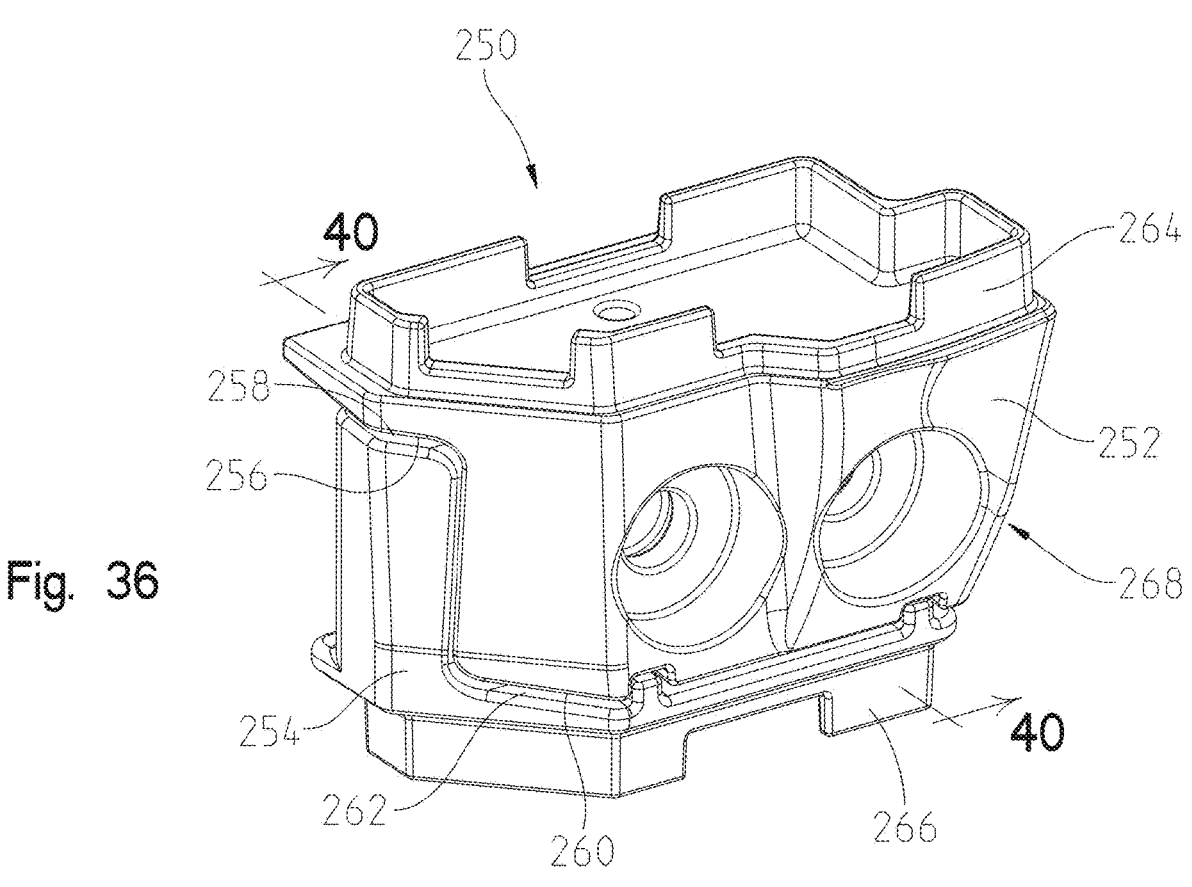
FIG. 36 is a perspective view of a coupling assembly for coupling together the upper and lower frame assemblies of FIG. 24.
Figure 37:
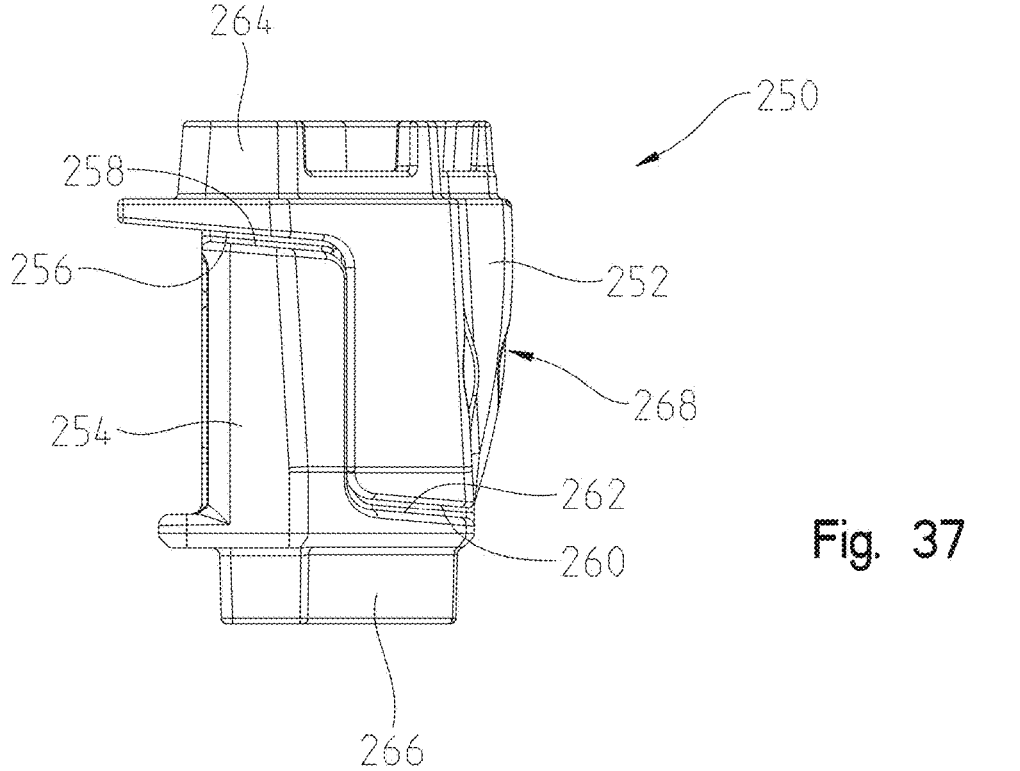
FIG. 37 is a side view of the coupling assembly of FIG. 36.
Figure 39:
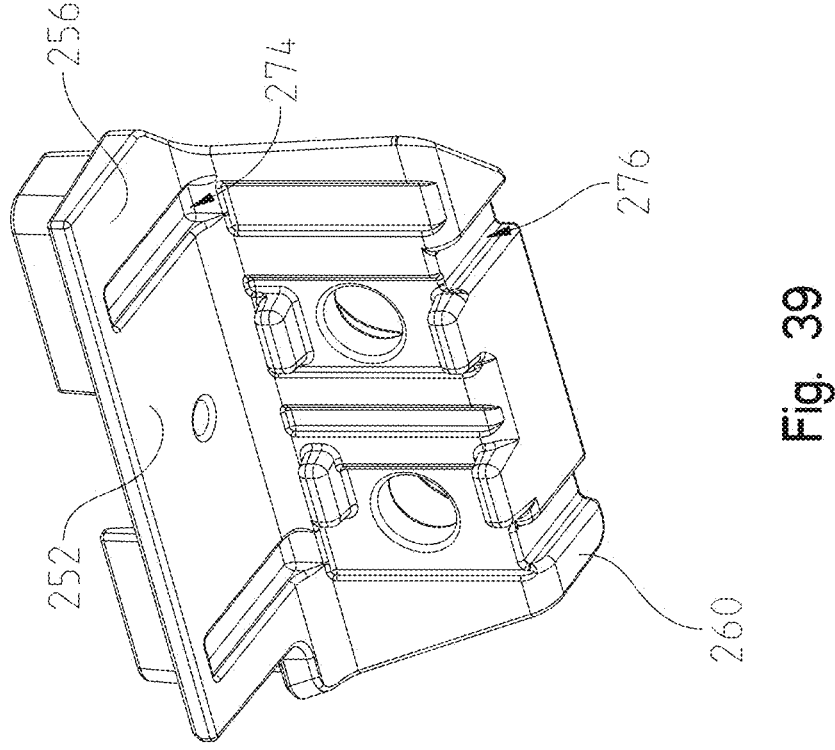
FIG. 39 is a perspective view of a second coupling member of the coupling assembly of FIG. 36.
Figure 38:
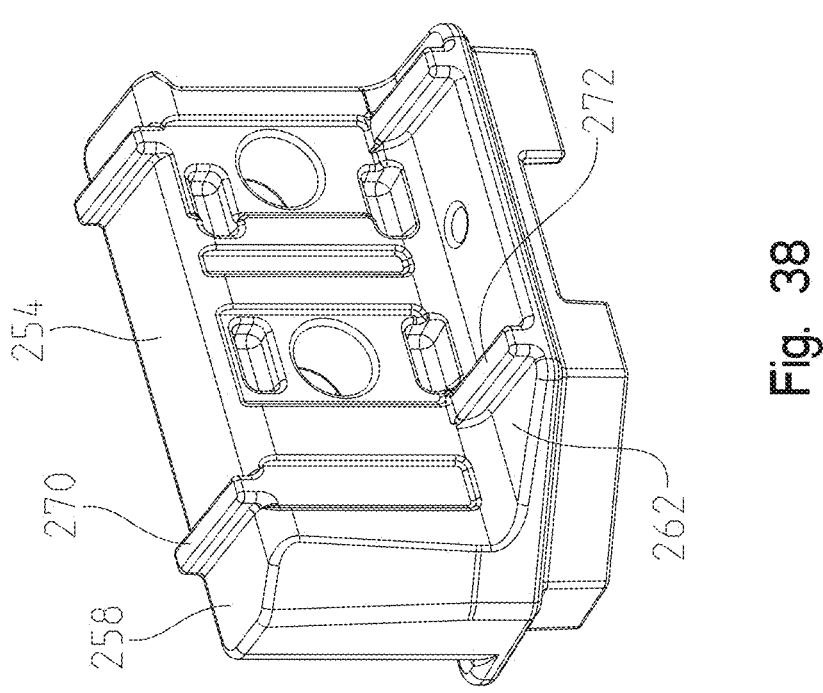
FIG. 38 is a perspective view of a first coupling member of the coupling assembly of FIG. 36.
Figure 40:
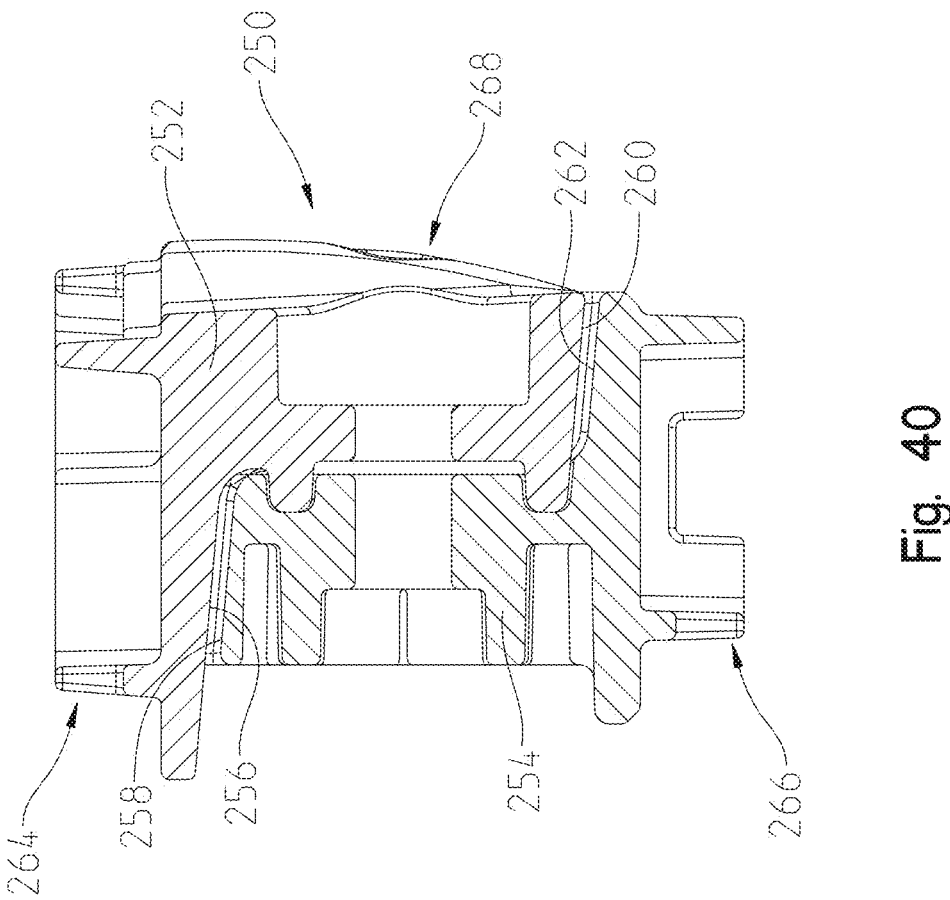
FIG. 40 is a cross-sectional view of the coupling assembly of FIG. 36, taken along line 40-40 of FIG. 36.
Figure 41:
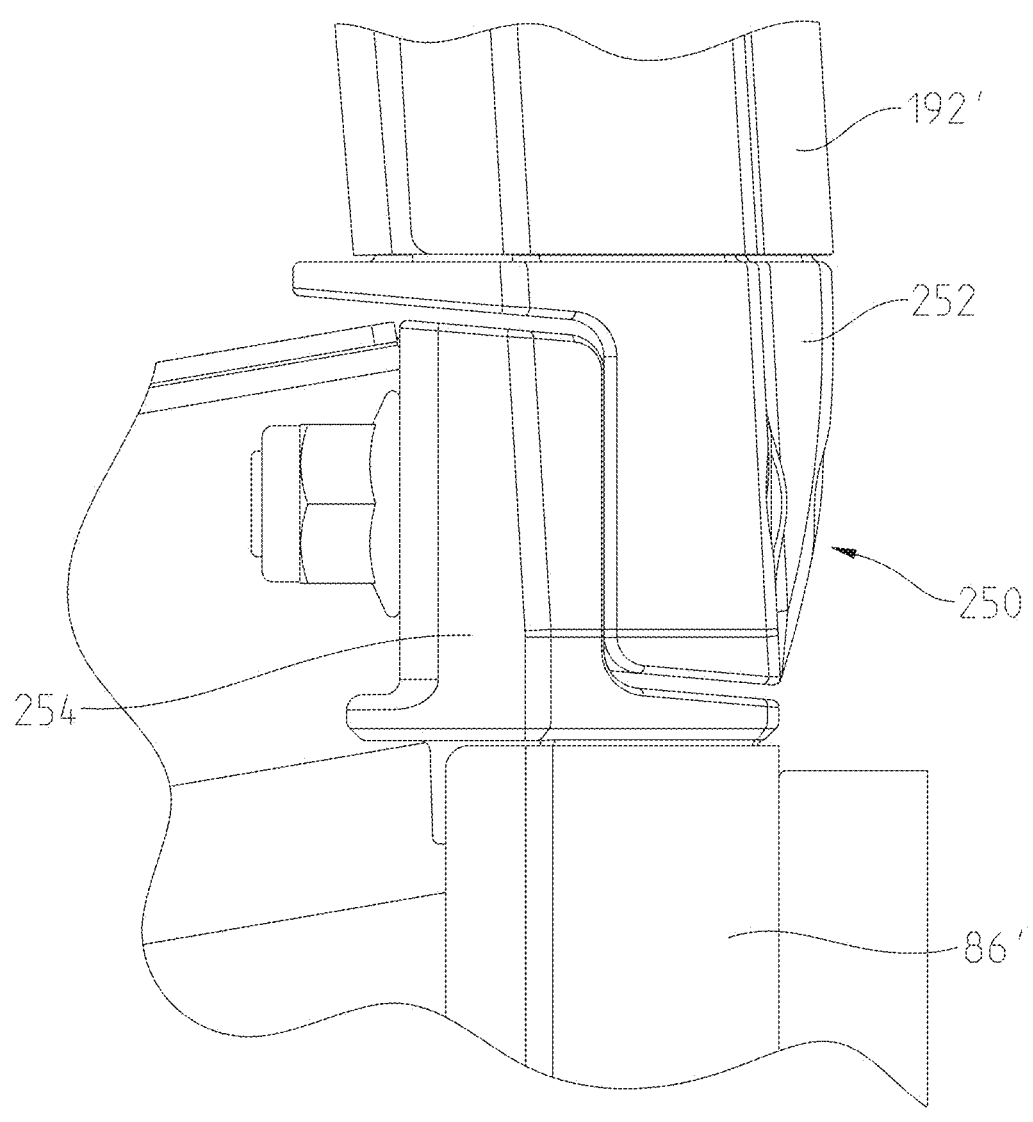
FIG. 41 is a side view of the coupling assembly of FIG. 36.

Referring now to FIGS. 33-35, a seal 248 may be provides at the connections or joints between lower and upper frame assemblies 10, 12. Seal 248 may be positioned at any frame members of frame assemblies 10, 12 but FIGS. 33-35 illustrate frame members 192, 194, 86, 88 as an example. More particularly, seal 248 is positioned generally adjacent a lower end of upstanding member 192, 194 and an upper end of frame member 86, 88. Seal 248 is configured to conceal open receiving end 98 of frame member 86, 88 which prevents dust, water, and debris from accumulating at this joint and entering the cabin of vehicle 2. Additionally, seal 248 allows any doors of vehicle 2 to better seal with frame assemblies 10, 12.

An inner surface of seal 248 includes a tapered inner wall 249 which has a thickness greater than that of the remainder of seal 248 such that tapered inner wall 249 nests against second member 192*b*, 194*b* of upstanding member 192, 194 due to the channel configuration thereof. In this way, seal 248 wraps or extends around the entirety of the joint and the outer surfaces of frame members 192, 194, 86, 88. In order to facilitate the installation of seal 248, seal 248 may be split at 247 such that seal can be partially separated to wrap around frame members 192, 194, 86, 88. However, once installed, seal 248 is closed at 247.

In one embodiment, the bottom of seal 248 wraps around open receiving end 98 of frame member 86, 88 with an inner leg 245*a* of seal 248 being shorter than an outer leg 245*b* to aid in assembly. The upper edge of seal 248 rests on upstanding member 192, 194 and is biased inwardly in its free state to allow for compression when seal 248 is secured to upstanding member 192, 194. This reduces the likelihood that seal 248 will pull away from upstanding members 192, 194 which could result in water or dust entering the joint between lower and upper frame assemblies 10, 12. Additionally, seal 248 extends around the corners of upstanding members 192, 194 where seal 248 has less inward bias and less compression, thereby eliminating high stress in the corners of upstanding members 192, 194 and reducing the risk of tearing in these corners. In this way, seal 248 may be made thinner along the top edge thereof and provide a transition surface for sealing doors against upper frame assembly 12.

Referring now to FIGS. 36-44, the joints between frame assemblies 10, 12 also may be comprised of casting joints. However, casting joints are a common leak path for water and dust to enter the cab of vehicle 2. As shown in FIGS. 36-44, and with respect to alternative embodiments of frame members 192, 86 as an example only, a casting joint 250 is defined at the coupling between an alternative embodiment of intermediate upstanding member 192' and an alternative embodiment of frame member 86'. Casting joint 250 is comprised of a first joint member 252 coupled to a lower end of intermediate upstanding member 192' and a second joint member 254 coupled to an upper end of frame member 86' (e.g., coupled at open receiving end 98 (FIG. 35)). More particularly, an upper end 264 of first joint member 252 is received within the lower end of intermediate upstanding member 192' while a lower end 266 of second joint member 254 is received within open receiving end 98 of frame member 86'.

First joint member 252 includes an upper sloped surface 256 and a lower sloped surface 260. Second joint member 254 includes an upper sloped surface 258 which is complementary to sloped surface 256 of first joint member 252. Second joint member 254 also includes a lower sloped surface 262 which is complementary to sloped surface 260 of first joint member 252. Casting joint 250 is configured to divert water and dust away from the interior of the cab because surfaces 256, 258, 260, 262 are sloped toward the exterior of vehicle 2 and, as such, direct any water that enters joint 250 to flow towards the exterior of vehicle 2. As shown, all sloped surfaces 256, 258, 260, 262 are sloped downwardly towards exterior surface 268 of casting joint 250 where exterior surface 268 defines a laterally outermost surface of casting joint 250.

Additionally, first and second joint members 252, 254 include lapped, stepped, or interlocking joint surfaces 270, 272, 274, 276 to prevent a direct path for water or dust to enter the cab. Illustratively, surfaces 270, 272 of second joint member 254 are shown as protrusions which are not vertically or laterally aligned with each other. First joint member 252 includes surfaces 274, 276 which are configured as recesses to receive respective surfaces 270, 272 of second joint member 254. Because surfaces 270 and 272 are not vertically or laterally aligned with each other and surfaces 274 and 276 are not vertically or laterally aligned with each other, any water that enters casting joint 250 does not have a direct path between first and second joint members 252, 254 and, as such, does not enter the cab of vehicle 2. For example, high pressure water may be used to clean vehicle 2 but providing lapped, stepped, and interlocking surfaces 270, 272, 274, 276 accommodates any tolerance in casting joint 250 and prevents a direct line of access into the cab. Using both lapped surfaces 270, 272, 274, 276 and sloped surfaces 256, 258, 260, 262 prevents water and dust intrusion without the need for additional parts of frame assemblies 10, 12.

Figure 42:
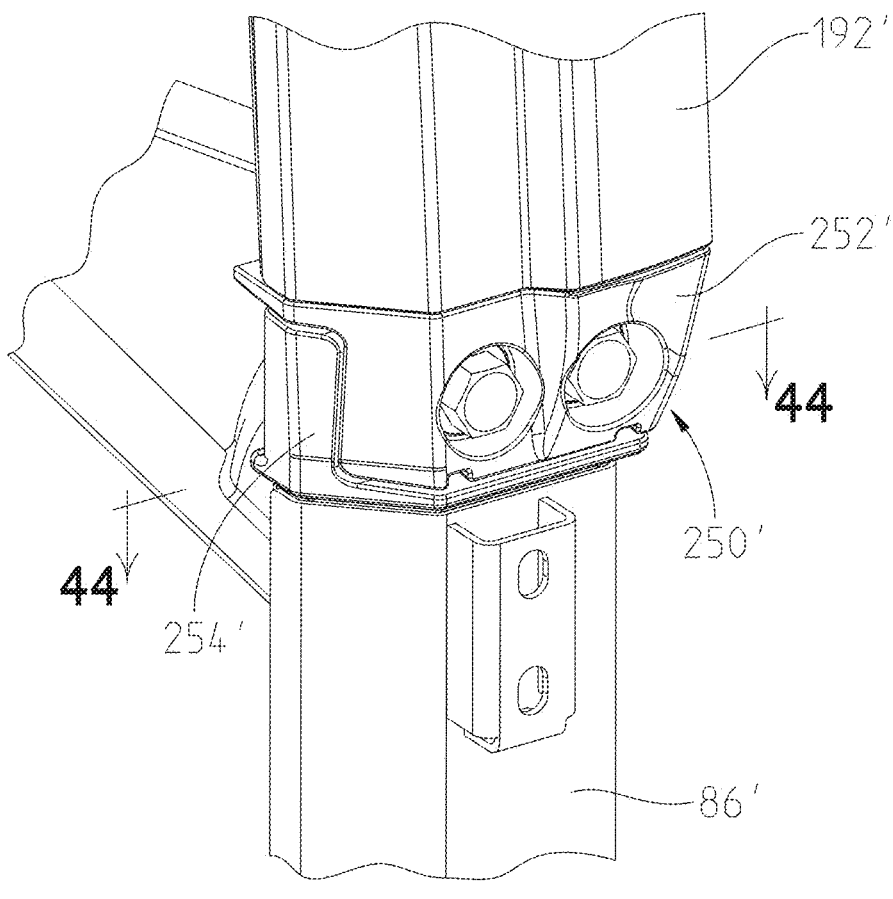
FIG. 42 is a left front perspective view of an alternative embodiment coupling assembly for coupling together the lower and upper frame assemblies of FIG. 24.
Figure 43:
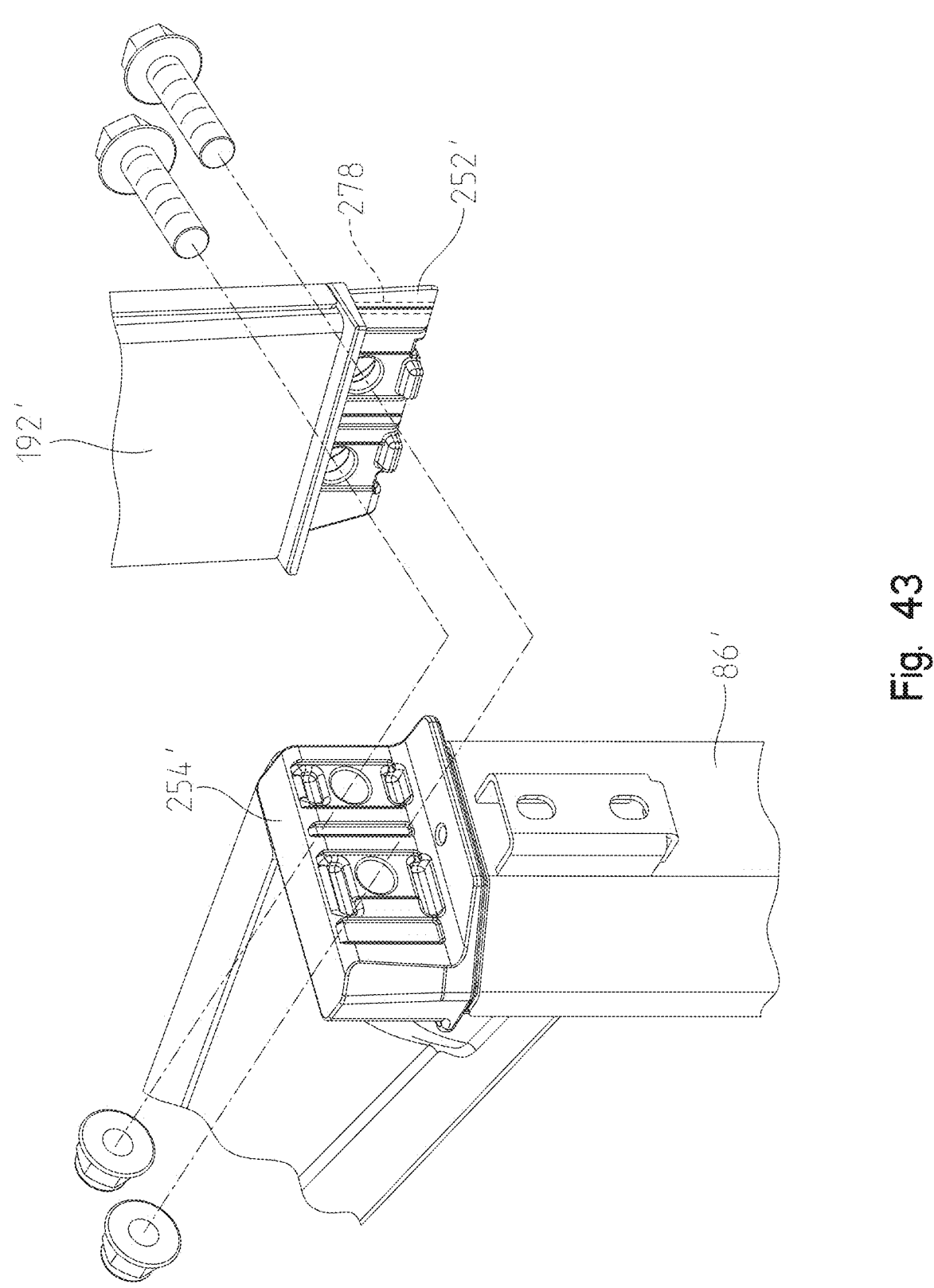
FIG. 43 is an exploded view of the alternative coupling assembly of FIG. 42.
Figure 44:
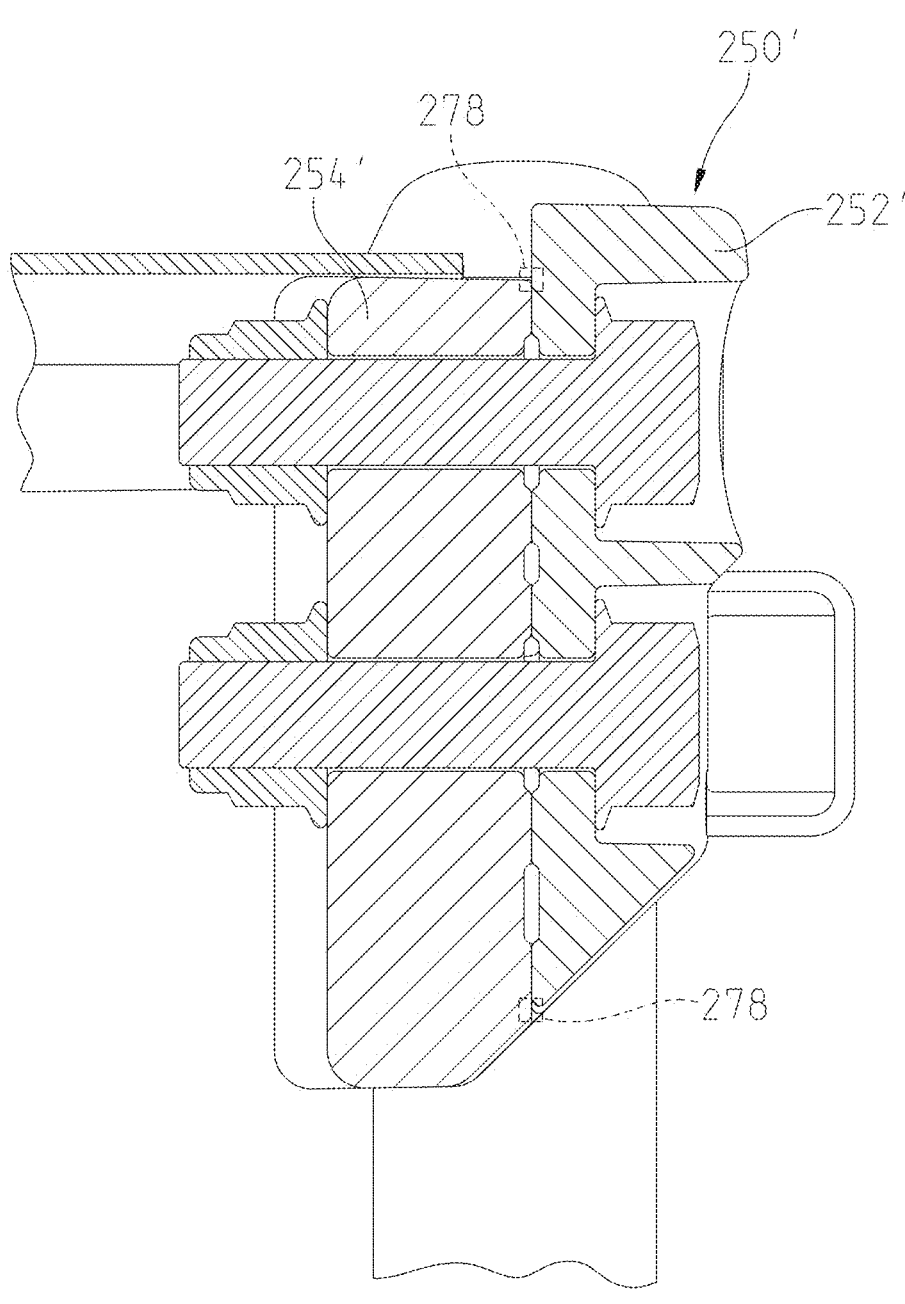
FIG. 44 is a cross-sectional view of the alternative coupling assembly of FIG. 42, taken along line 42-42 of FIG. 42.

Referring specifically to FIGS. 42-44, other embodiments of casting joint 250 may be used, such as casting joint 250'. Casting joint 250' includes first and second joint members 252', 254'. Additionally, a seal 278 may be included with casting joint 250' to prevent water and dust intrusion into the cab of vehicle 2. Seal 278 may be positioned generally around the perimeter of first and/or second joint members 252', 254'. Seal 278 may be comprised of rubber or a synthetic material. Alternatively, caulk or adhesive could also be used at the interface between first and second joint members 252', 254' to prevent water and dust intrusion.

Figure 45:
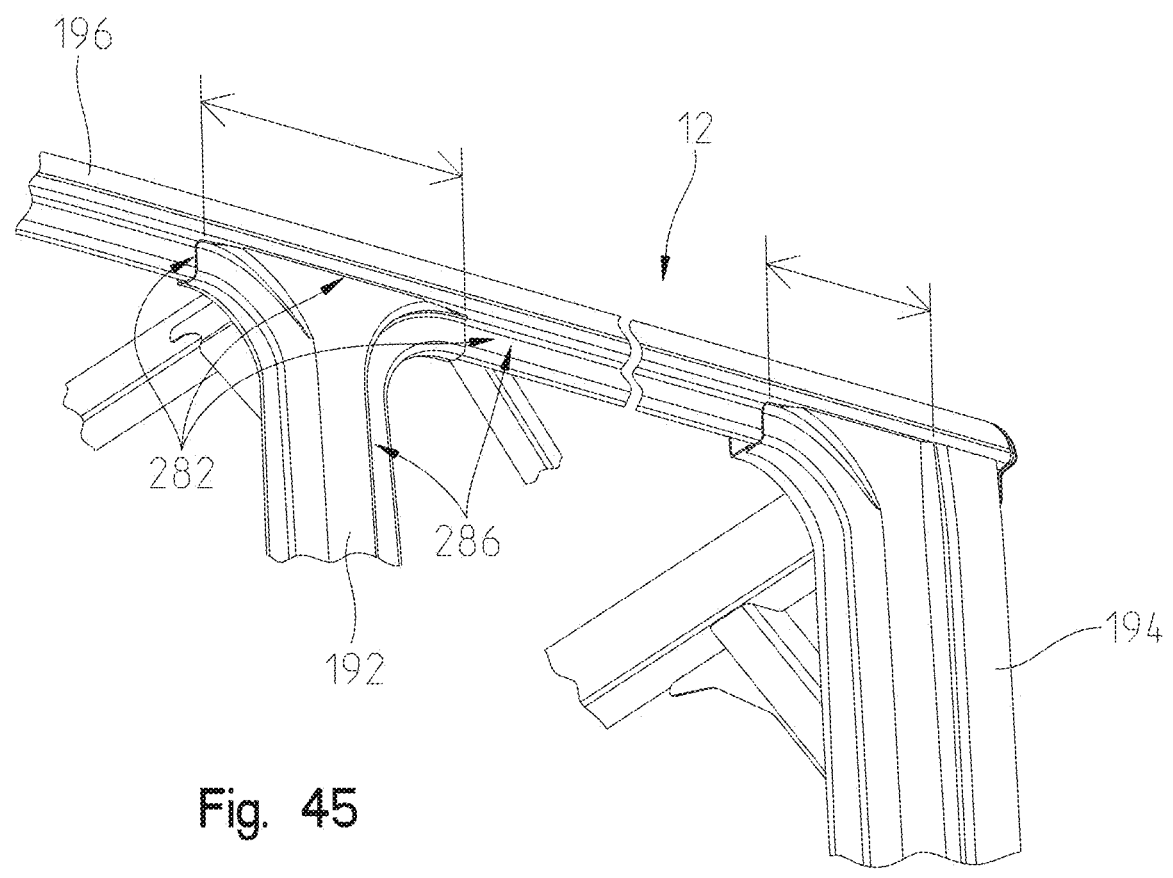
FIG. 45 is a front left perspective view of a portion of the upper frame assembly of FIG. 24.
Figure 46:
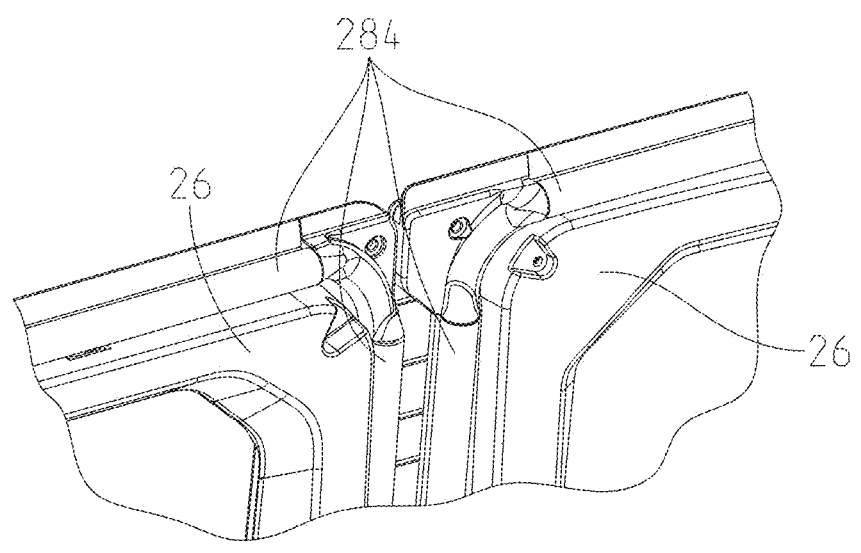
FIG. 46 is a perspective view of doors of the utility vehicle of FIG. 1.

As shown in FIGS. 45 and 46, various surfaces of lower and upper frame assemblies 10, 12 may be comprised of large stampings that serve multiple functions simultaneously. Using upper frame assembly 12 as an example, various components thereof may be formed as a large stamping, such as longitudinally-extending member 196 and upstanding members 190, 192, 194. Alternatively, upstanding members 192, 194 may be stampings welded to longitudinally-extending member 196 along interfaces 282. The stamping includes features and surfaces which may integrate with several other components of vehicle 2 (e.g., doors), thereby reducing the overall number of frame components. For example, upstanding members 192, 194 are configured to integrate with doors 26. By directly interfacing upper frame assembly 12 with a sealing surface 284 of doors 26, there is a reduced leak path into vehicle 2 and upper frame assembly 12 does not require additional components.

On door sealing surface 284, weld content is removed to reduce variation to the seal surface. Recesses 286 along portions of the stamping (e.g., recesses at upstanding members 192, 194 and longitudinally-extending member 196) are integrated into the stamping which act as both sealing surfaces for doors 26 and provide structure to the stamping.

Figure 47:
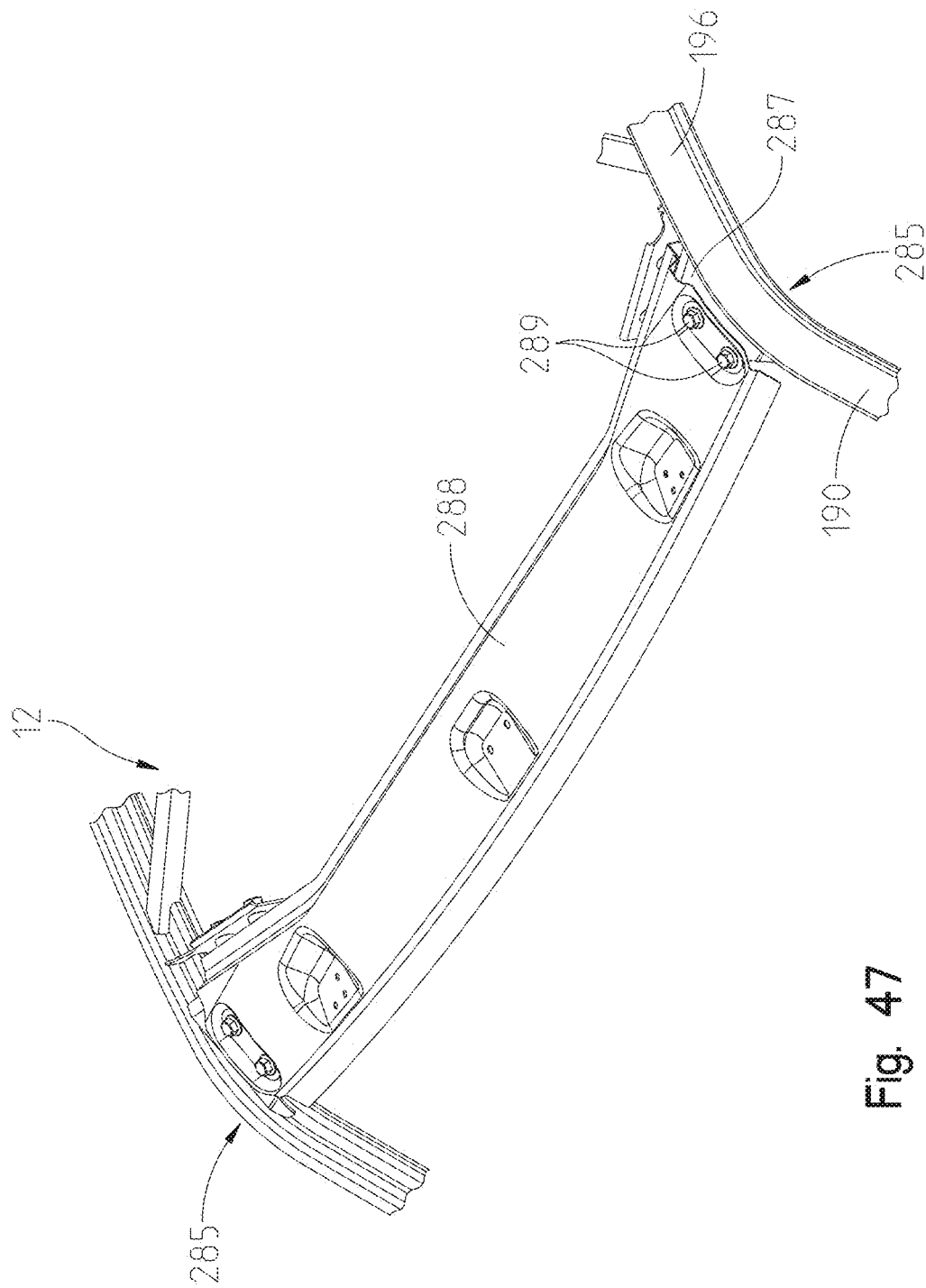
FIG. 47 is a front left perspective view of a visor mount of the upper frame assembly of FIG. 24.
Figure 48:
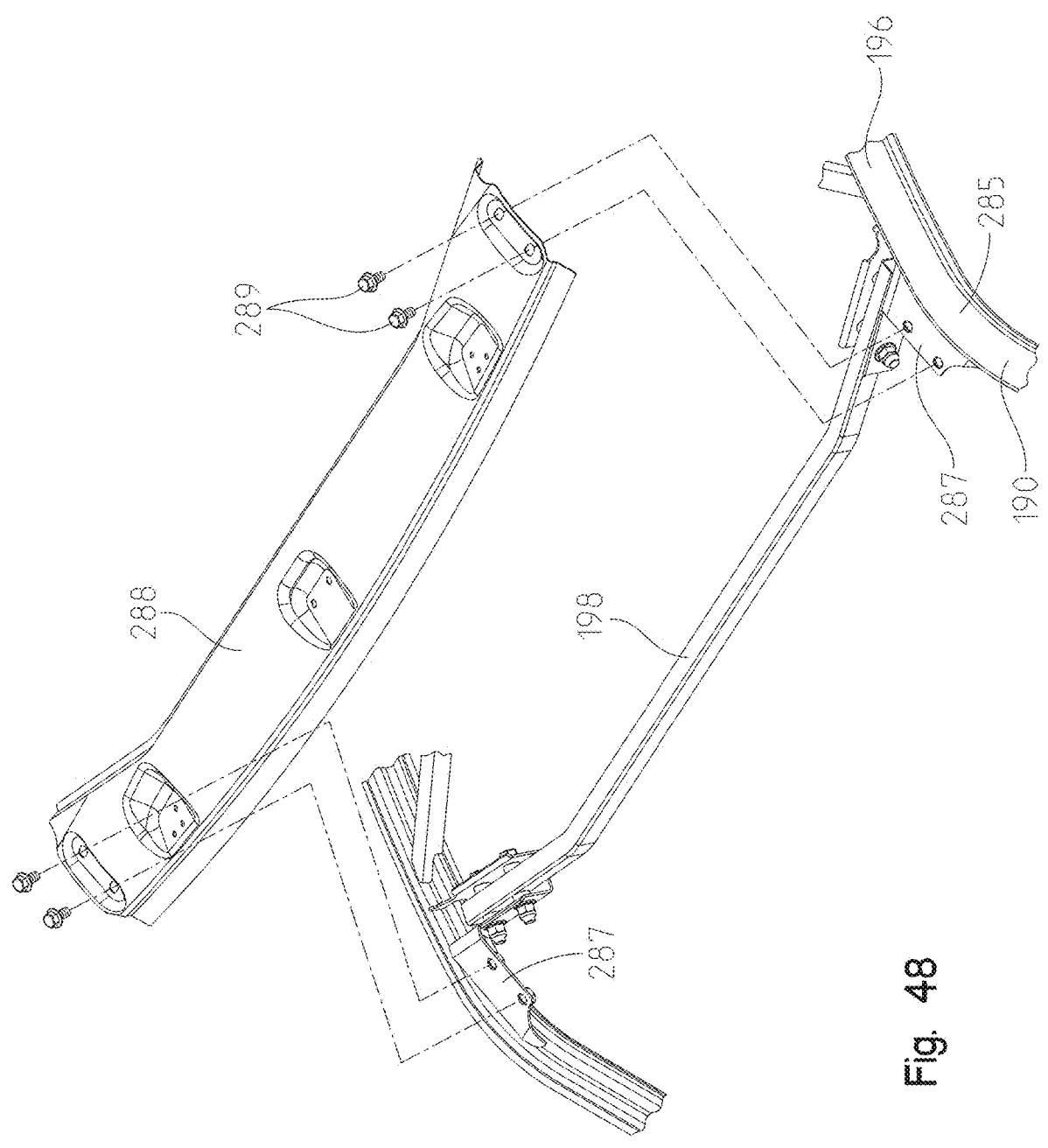
FIG. 48 is an exploded view of the visor mount and the upper frame assembly of FIG. 47.

Upper frame assembly 12 may support a visor and, as such, includes a visor mount 288, as shown in FIGS. 47 and 48. Visor mount 288 is generally coupled to longitudinally-extending frame member 196 at a position adjacent forward upstanding members 190. However, it may be appreciated that visor mount 288 is not at the joint, bend, or intersection 285 between forward upstanding members 190 and longitudinally-extending member 196 which decreases the likelihood of cracking at that location. Visor mount 288 may be positioned vertically above cross-member 198. Visor mount 288 is removably coupled to a bracket 287 of longitudinally-extending frame member 196 with fasteners 289 and spans the lateral width of upper frame assembly 12. It may be appreciated that bracket 287 is coupled to both visor mount 288 and cross-member 198. Visor mount 288 is configured as a double-shear joint to increase joint efficiency and decouples the joint from the highly-stressed tube bend location at the intersection 285 of longitudinally-extending frame member 196 and forward upstanding members 190, thereby resulting in favorable failure modes.

As noted here, vehicle 2 may include a plurality of accessories and/or body panels to enclose operator area 8 and define an enclosed cab of vehicle 2. For example, vehicle 2 may include roof 22, doors 26, windows for doors 34, and front windshield 32. Referring to FIGS. 49A-50B, front windshield 32 may include a wiper 280 supported thereon through a wiper mount 281. To install front windshield 32 on upper frame assembly 12, molded pockets 290 in roof 22 are configured to accept attachment features 292 for front windshield 32. Attachment features 292 may be used to install both a fixed and tip-out version of front windshield 32. In one embodiment, attachment features 292 are hinges which extend between pockets 290 and an outer surface of front windshield 32. The configuration of pockets 290 and attachment feature 292 allows windshield 32 to be installed without the need to remove a plurality of components. Further, attachment feature 292 biases roof 22 downwardly while securing windshield 32 on vehicle 2. In embodiments, where vehicle 2 includes roof 22 but does not include front windshield 32, pockets 290 may be concealed with pucks (not shown) comprised of a material similar to that of roof 22 (e.g., plastic).

Figure 49A:
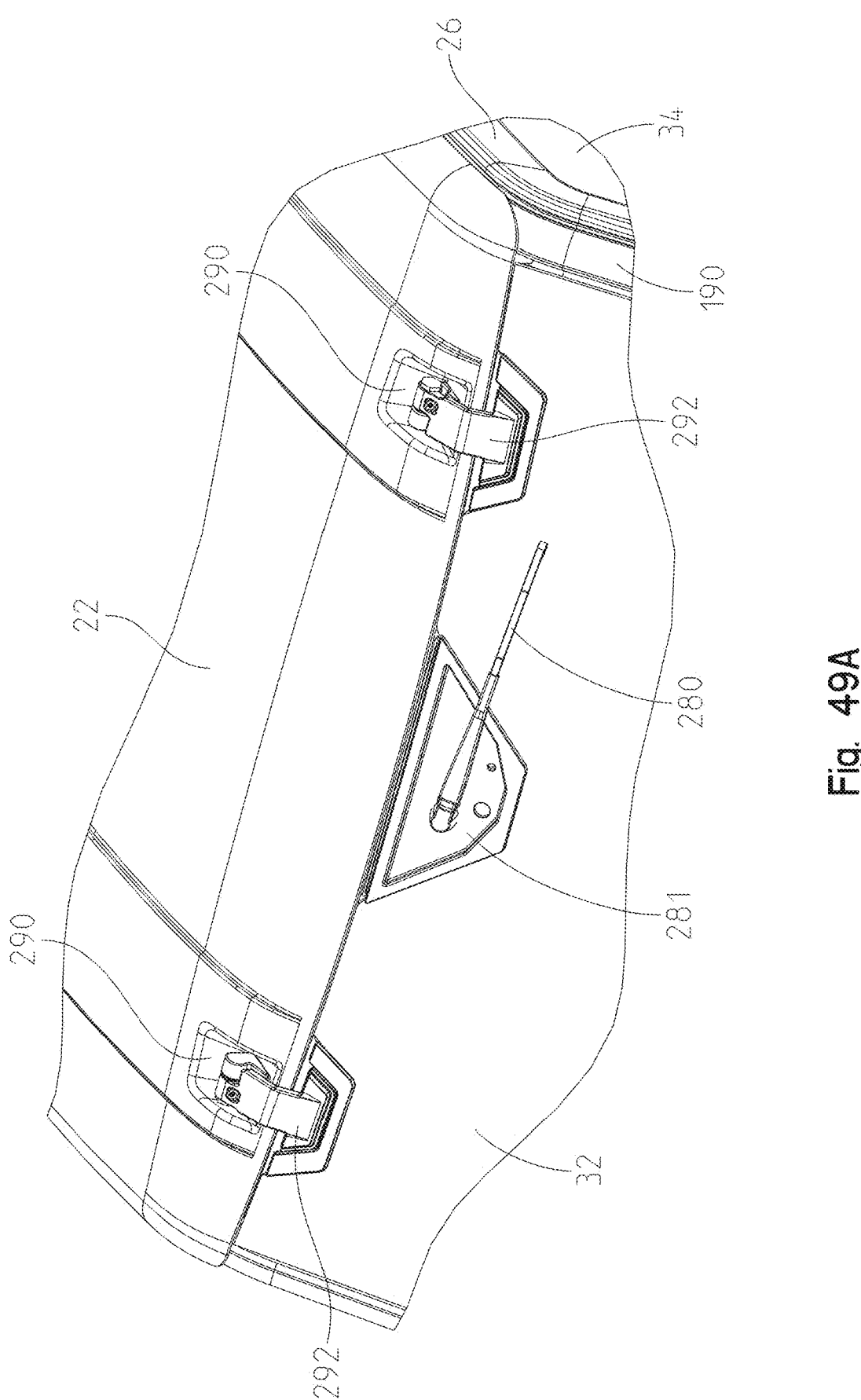
FIG. 49A is a front left perspective view of a roof and a front windshield coupled to the upper frame assembly of the vehicle of FIG. 1.
Figure 49B:
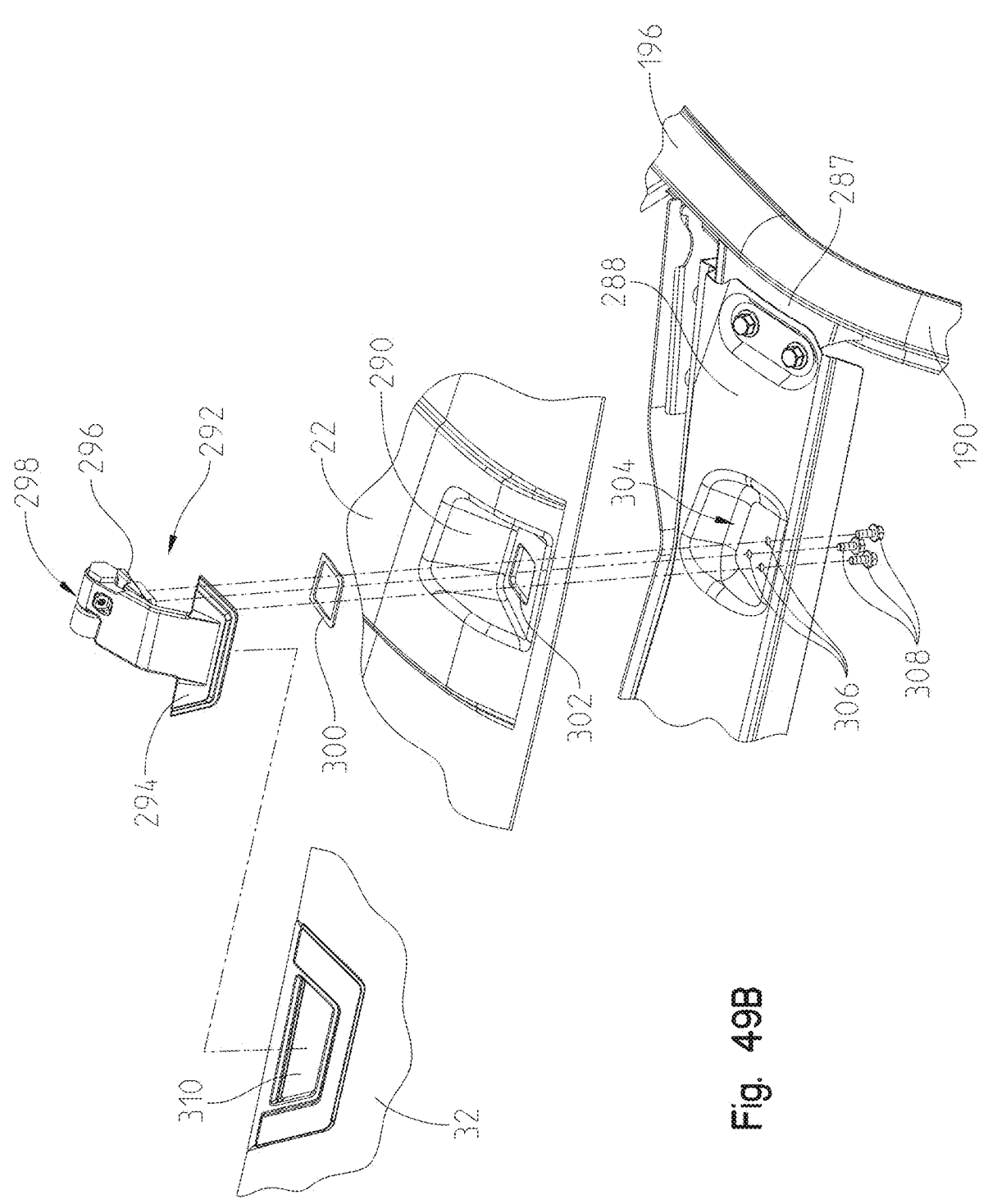
FIG. 49B is an exploded view of a hinge assembly coupled to the roof and the front windshield of FIG. 49A.

As shown best in FIG. 49B, attachment feature 292 is configured as a hinge assembly comprising a first portion 294 configured to be secured to a bracket 310 on front windshield 32. First portion 294 may be secured to bracket 310 through a latching mechanism, magnetic connection, permanent connection, or any other fixed or removable coupling mechanism. First portion 294 is pivotably coupled to a second portion 296 at a pivot joint 298. Second portion 296 is received within pocket 290 of roof 22. A seal or gasket 300 may be positioned vertically intermediate second portion 296 and a lower surface of pocket 290. Second portion 296 is generally aligned with an opening 302 of pocket 290 to receive fasteners 308 extending upwardly from below visor mount 288. More particularly, pocket 290 is configured to be received within a recess 304 of visor mount 288 such that opening 302 of pocket 290 generally aligns with openings 306 of recess 306. In this way, fasteners 308 extend upwardly from the bottom of visor mount 288 to extend through openings 306, through opening 302, and are received within a lower surface of second portion 296 of attachment feature 292.

Figure 50A:
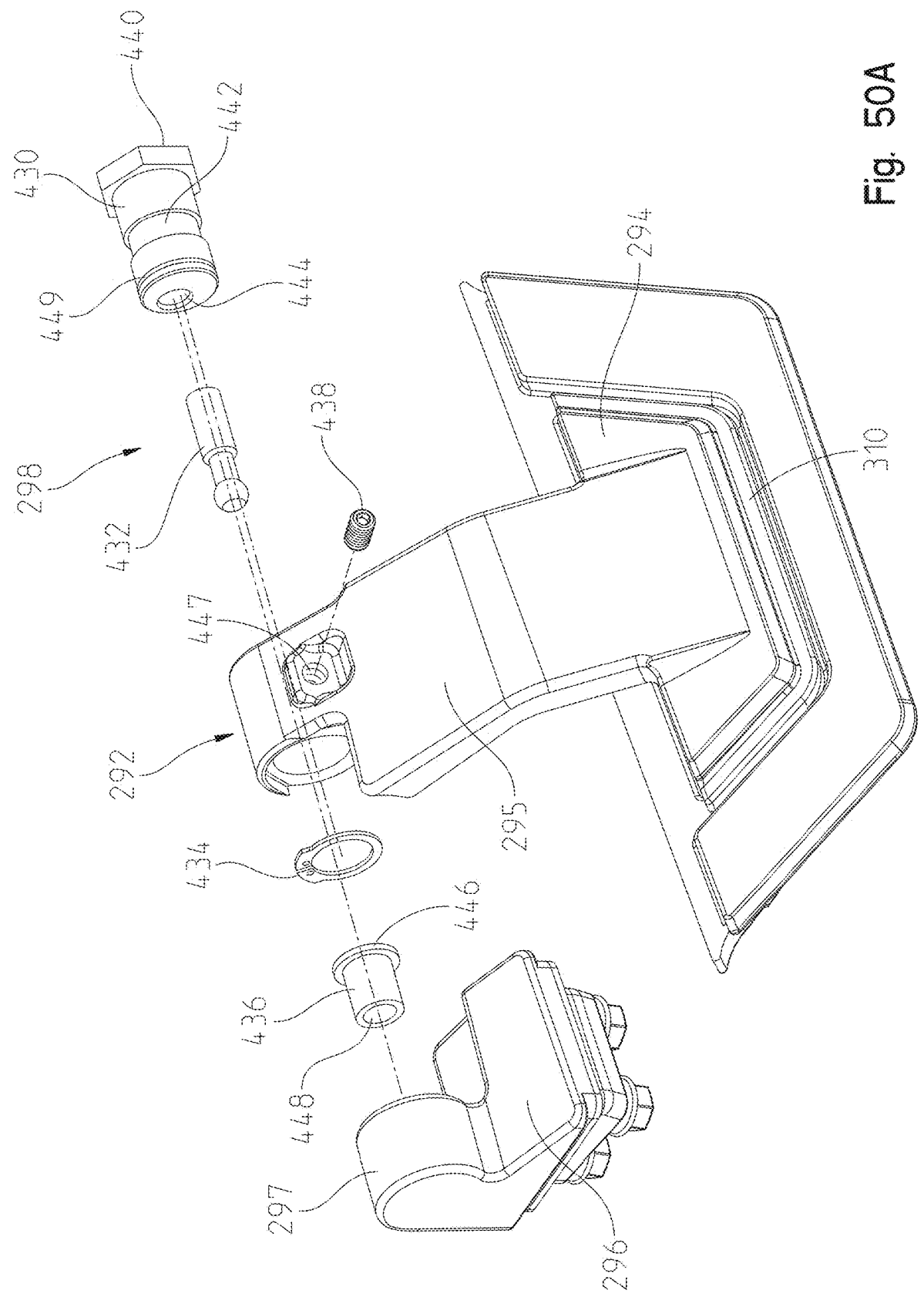
FIG. 50A is an exploded view of a pivot assembly of the hinge assembly of FIG. 49B.
Figure 50B:
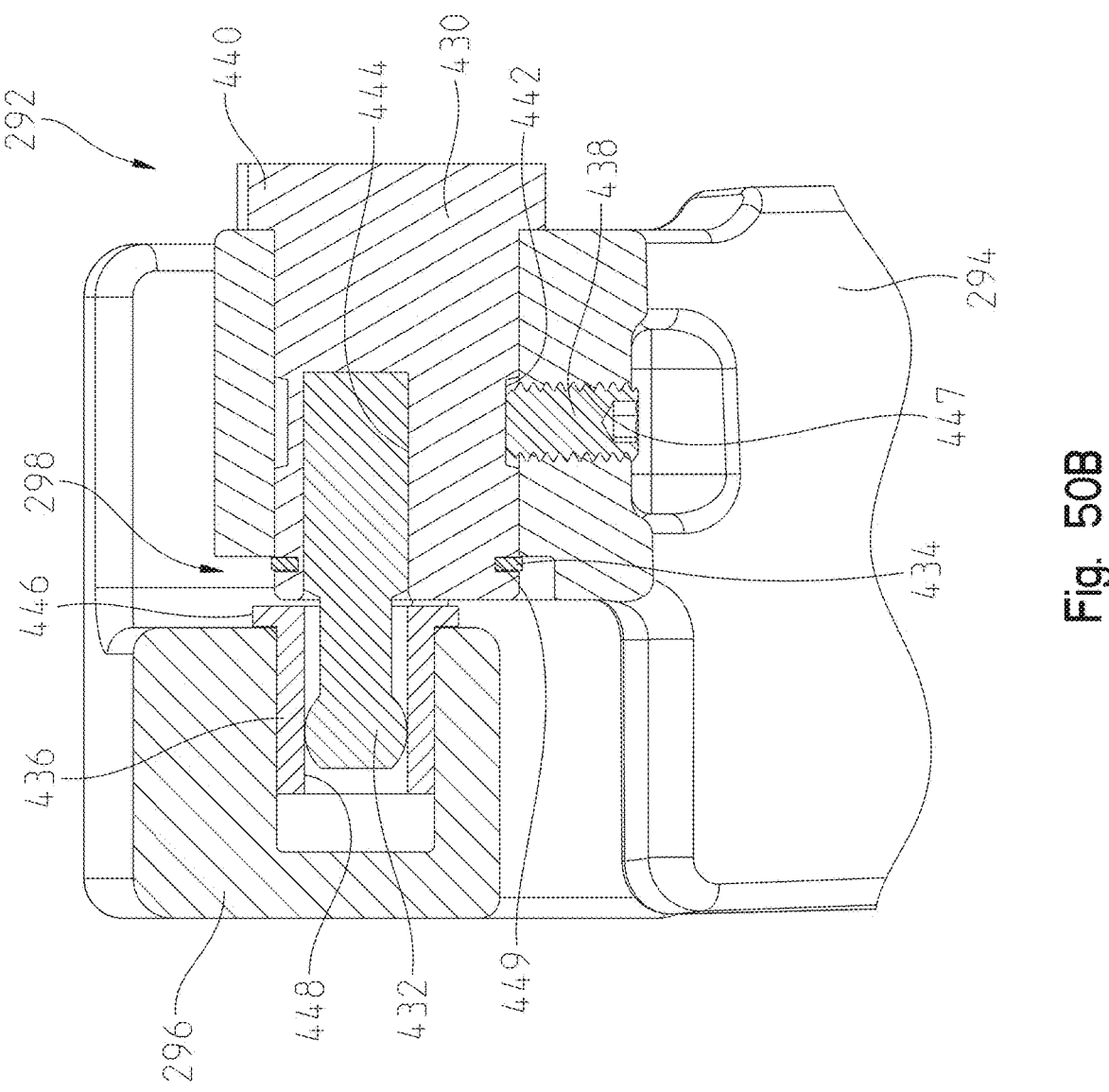
FIG. 50B is a cross-sectional view of the pivot assembly of FIG. 50A.

Referring to FIGS. 50A and 50B, pivot joint 298 is comprised of an eccentric barrel 430, an eccentric pin 432, a retaining ring 434, a bushing 436, and a locking set screw 438. Barrel 430 is configured to be received within a portion of an arm 295, which may be a die cast arm. Barrel 430 includes a head 440 which abuts arms 295 and a recess 442 configured to receive set screw 438 when screw 438 is received through opening 447 in arm 295. Barrel 430 also includes a groove 449 configured to receive retaining ring 434 and a channel 444 configured to receive pin 432. Pin 432 extends from barrel 430 into bushing 436. Illustratively, bushing 436 is received within a cast base 297 of second portion 296 and includes a head 446 which abuts a portion of base 297. Bushing 436 includes a channel 448 configured to receive a portion of pin 432.

In operation, only two standard tools (e.g., an allen wrench and a crescent wrench or adjustable wrench) and are needed to operate pivot joint 298 for securing front windshield 32 to vehicle 2 through attachment feature 292. Using the allen wrench, screw 438 may be loosened with one hand to allow the barrel 430 to rotate and, with the other hand, a hex feature on head 440 of barrel 430 may be rotated to adjust front windshield 32 for the proper seal. Once the seal is correct, screw 438 may be tightened with the allen wrench to maintain the position of front windshield 32. Barrel 430, base 297, and arm 295 are axially aligned but pin 432 is offset from the axis of barrel 430, thereby providing the axial adjustment of joint 298.

Figure 51:
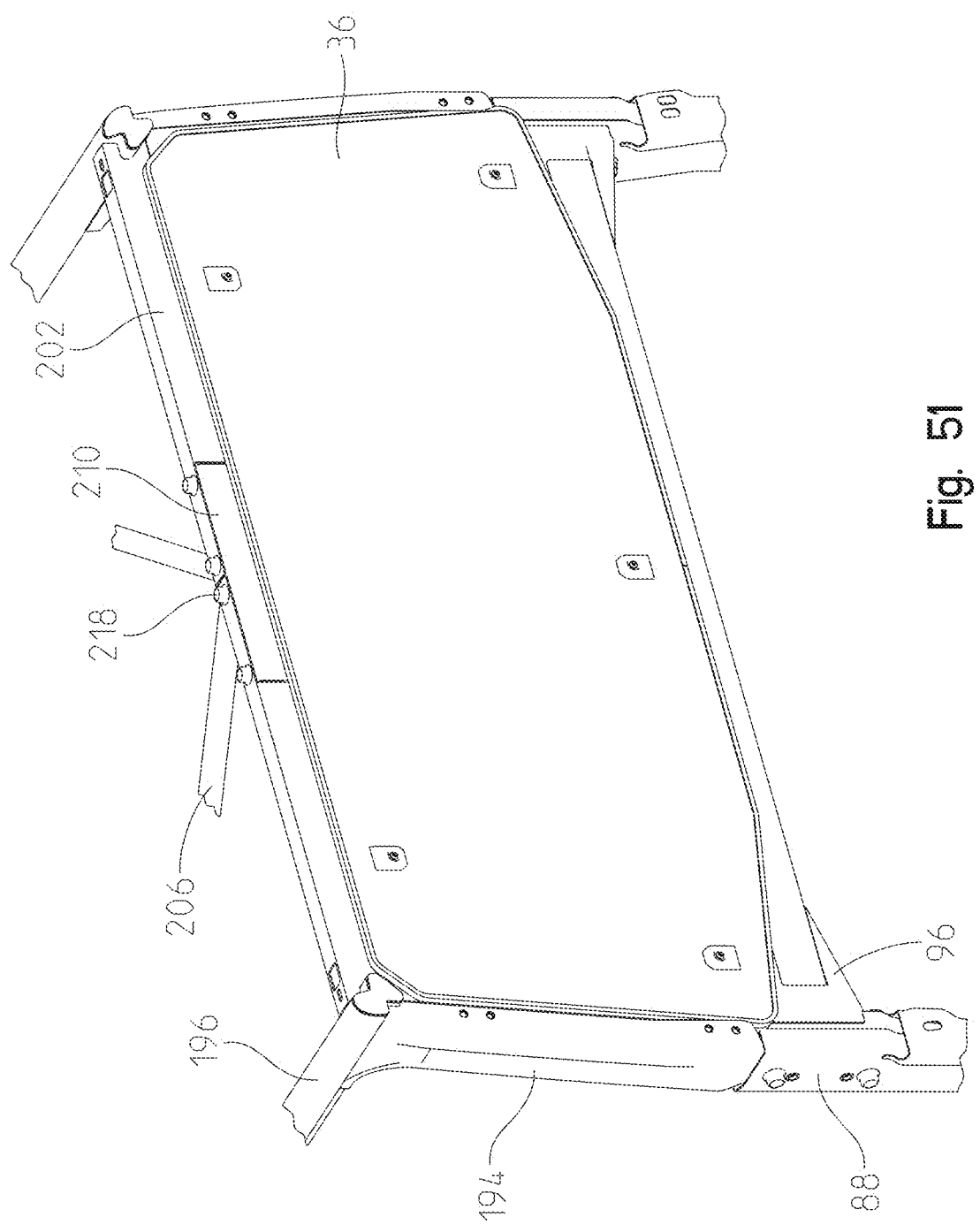
FIG. 51 is a rear left perspective view of a rear windshield coupled to the upper frame assembly of FIG. 24.
Figure 52:
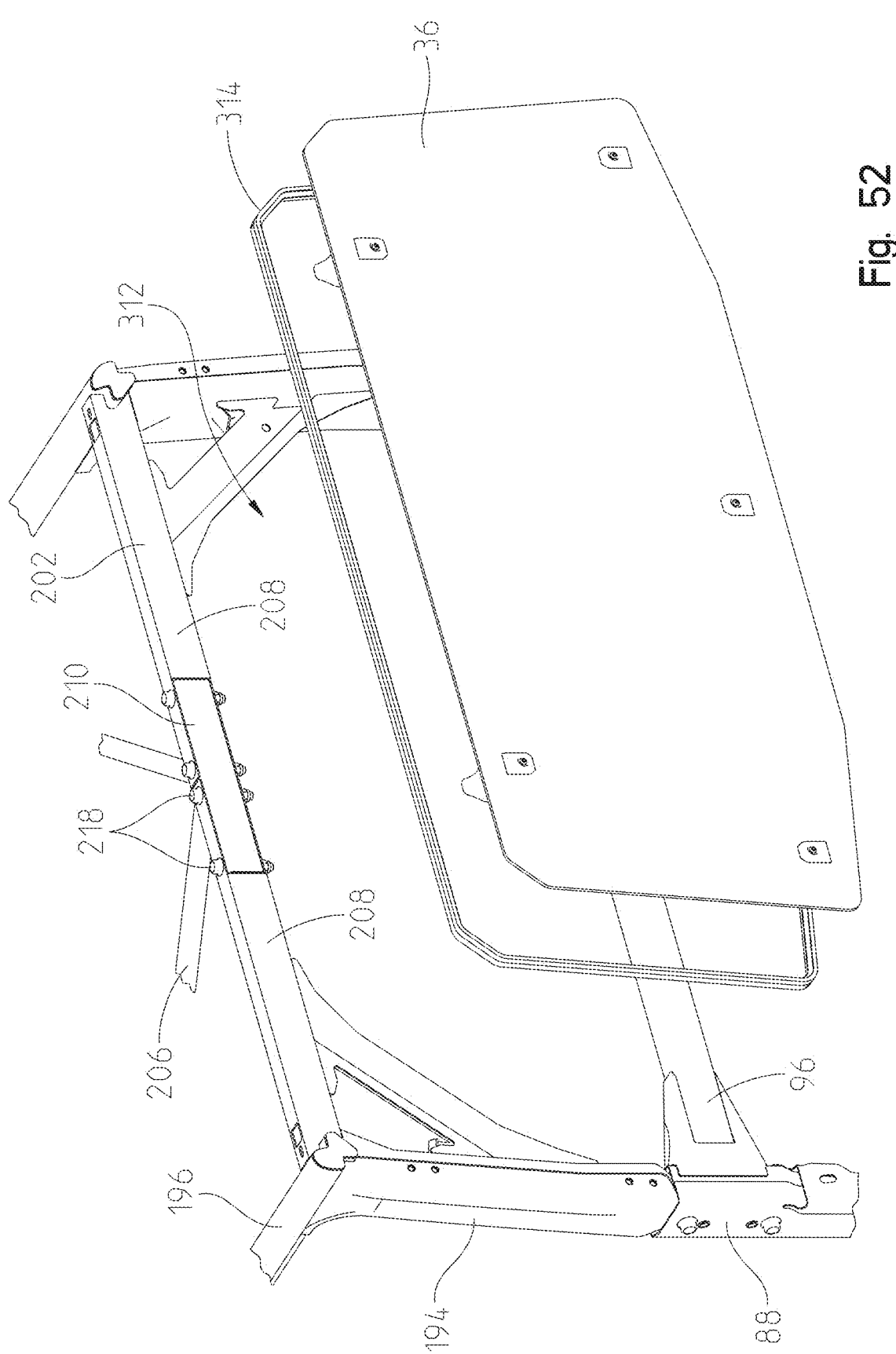
FIG. 52 is an exploded view of the rear windshield and the upper frame assembly of FIG. 51.
Figure 53:
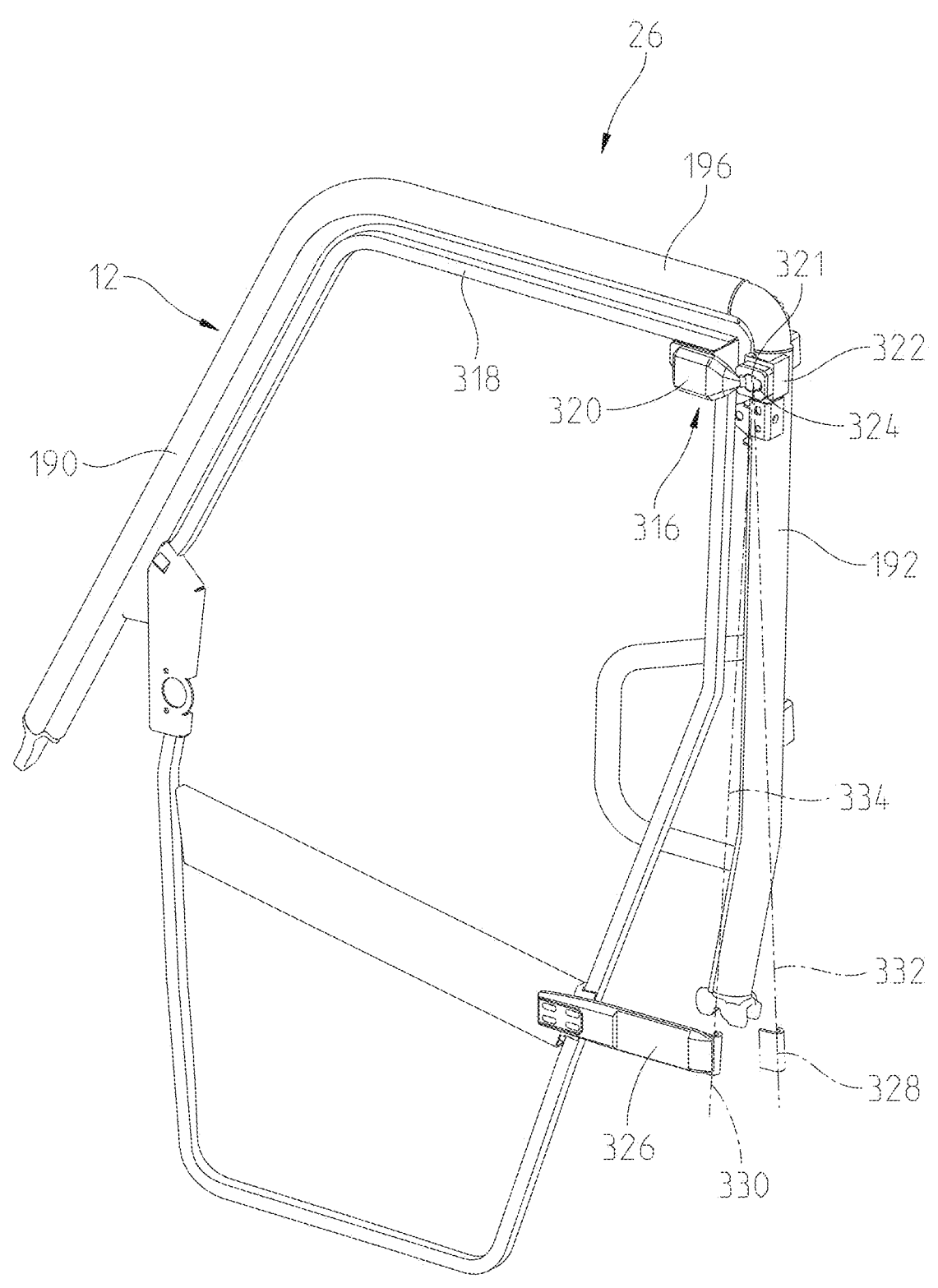
FIG. 53 is a perspective view of a door frame and hinge assembly for the doors of the utility vehicle of FIG. 1.
Figure 54:
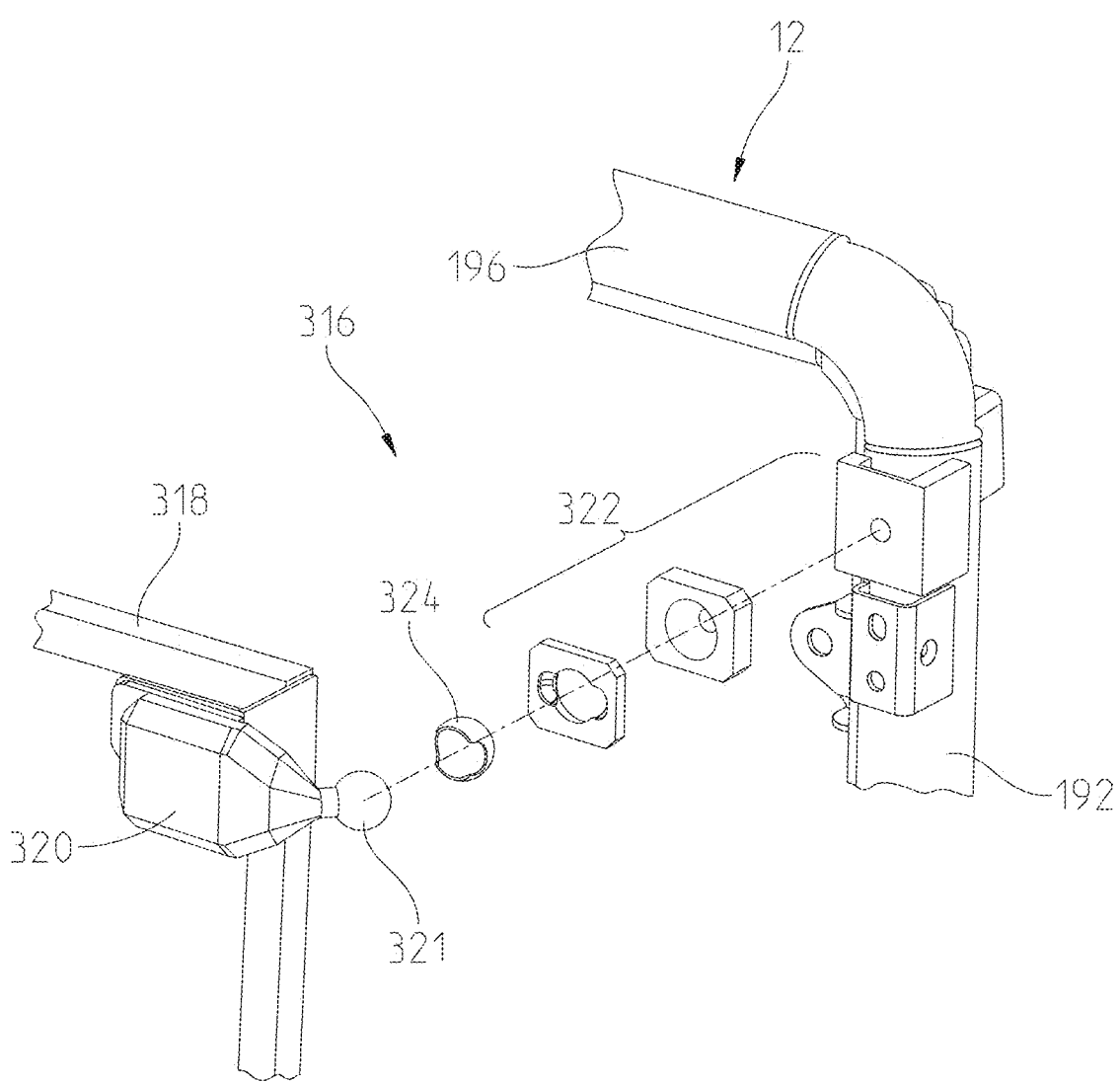
FIG. 54 is an exploded view of a hinge socket joint of the hinge assembly of FIG. 53.
Figure 56:
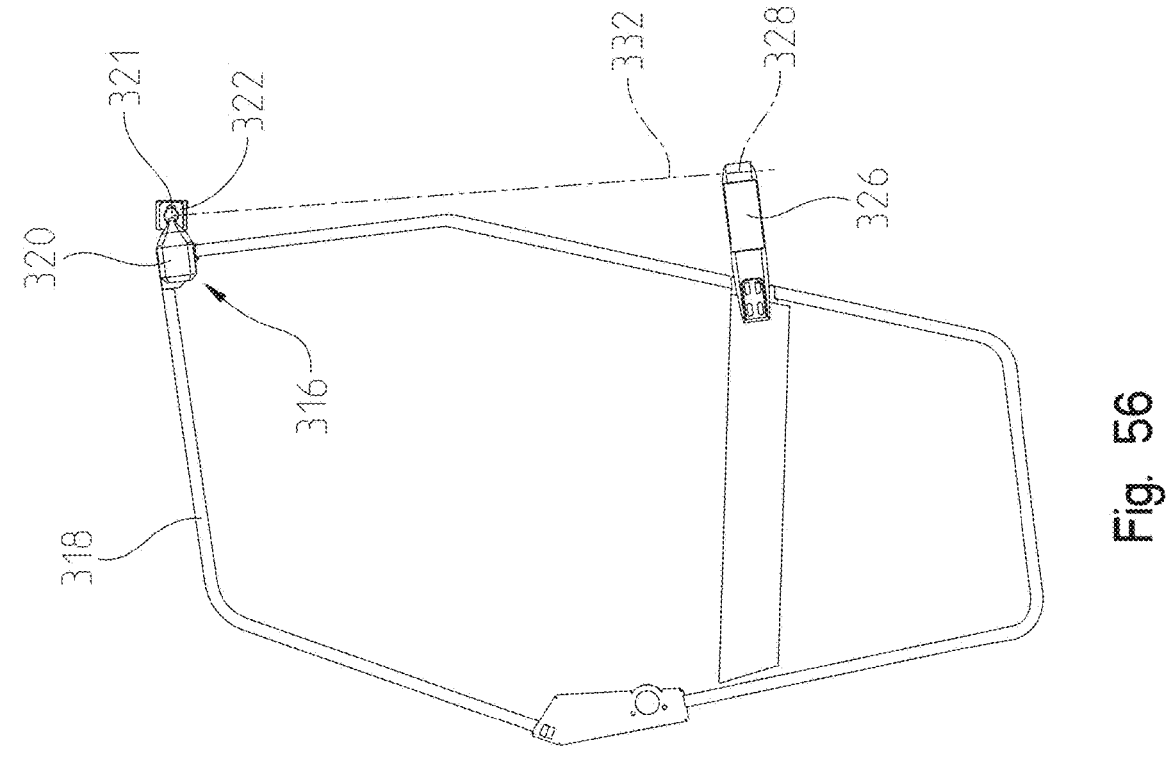
FIG. 56 is a side view of the door frame and hinge assembly of FIG. 53 in a second position.

Referring to FIGS. 51 and 52, vehicle 2 may also include rear windshield 36 to further enclose operator area 8. Rear windshield 36 is positioned within an opening 312 defined by cross-member 202, rearward upstanding members 194, and cross-member 96. A seal 314 is sized and shaped to contact portions of cross-member 202, rearward upstanding members 194, and cross-member 96 along the perimeter of opening 312 such that rear windshield 36 contacts seal 314 and compresses seal 314 against these frame members when installed on vehicle 2.

As disclosed herein, and shown in FIGS. 1-7, vehicle 2 may include doors 26 to further enclose operator area 8. Referring to FIGS. 53-74, doors 26 will be described in further detail. As shown in FIGS. 53-56, doors 26 may include a door frame 318 positioned within an opening defined by various frame members of upper frame assembly 12. Illustratively, door 26 is disclosed with respect to upstanding members 190, 192 and longitudinally-extending member 196 of upper frame assembly 12, however, door 26 also may be included within an opening defined by upstanding members 192, 194 and longitudinally-extending member 196. A hinge assembly 316 may be configured for adjustable positioning and coupling of door 26 to a portion of upper frame assembly 12 (e.g., intermediate upstanding member 192). Hinge assembly 316 may be configured as an infinitely-adjustable hinge comprising a hinge ball 320, a hinge socket base 322, a bushing 324 (e.g., a nylon bushing), and a lower hinge 326. Hinge ball 320 is coupled to door frame 318 and mates and locates to hinge socket 322 which is coupled to a portion of upper frame assembly 12 (e.g., intermediate upstanding member 192). Hinge ball 320 includes bushing 324 or other similar encapsulating feature to ensure a tight fit within hinge socket 322.

Figure 55:
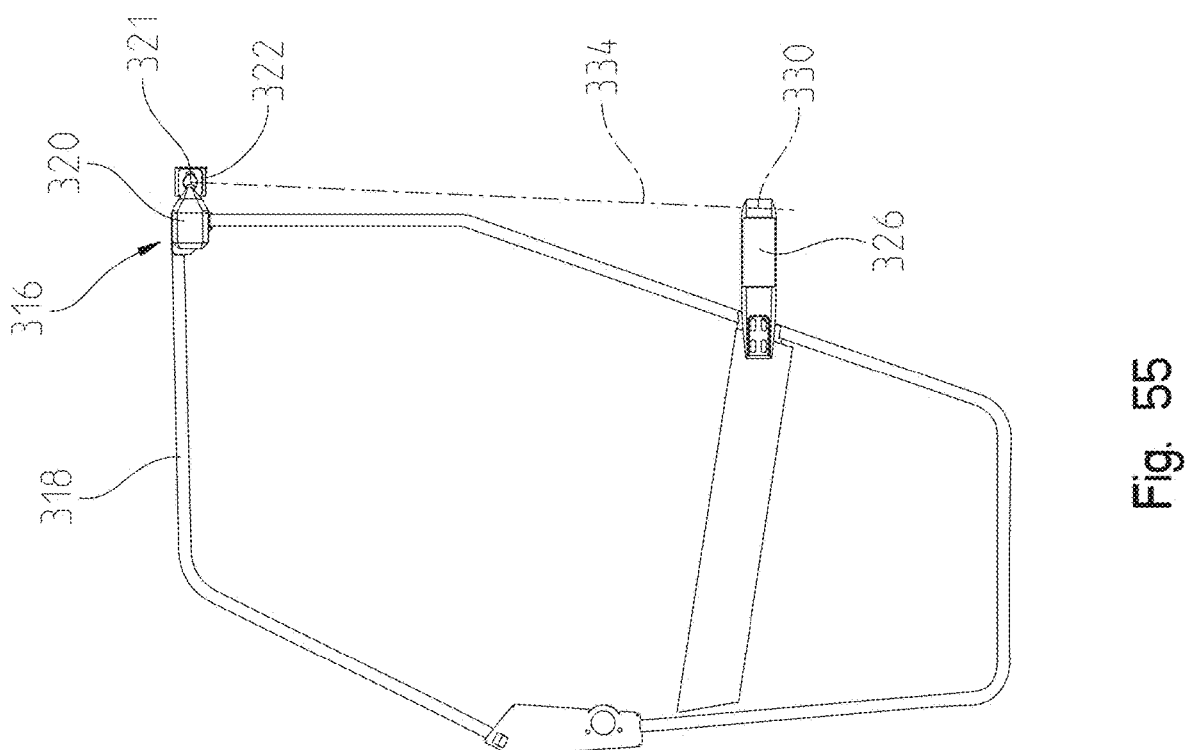
FIG. 55 is a side view of the door frame and hinge assembly of FIG. 53 in a first position.

Lower hinge 326 may be configured to rotate about a first lower hinge axis 328 or a second lower hinge axis 330 while door frame 318 is configured to pivot about a first door frame pivot axis 332 or a second door frame pivot axis 334. Lower hinge 326 may be placed anywhere along door frame 318, depending on the application and parameter of door 26. First lower hinge pivot axis 328 may be positioned infinitely and point to the center sphere of hinge ball 320 through first door frame pivot axis 332. This alignment of first lower hinge pivot axis 328 with first door frame pivot axis 332 and the center of sphere 321 of hinge ball 320 ensures that door 26 pivots properly and may be adjustable. Because the placement of the lower hinge 326 is limitless, lower hinge 326 and door frame 318 also could rotate about axes 330 and 334 which also point to the center of sphere 321. For example, as shown in FIG. 55, hinge ball 320 is at a first position relative to hinge socket 322 and door frame 318 and lower hinge 326 are configured to rotate about respective second axes 334 and 328. However, in FIG. 56, it is shown that hinge ball 320 is at a second (e.g., angled) position relative to hinge socket 322 and, in this second position, door frame 318 and lower hinge 326 are configured to rotate about respective first axes 332 and 328. In this way, because sphere 321 is fixed in space and hinge pivot axes 328, 330 point to its center, the basic principle enabling the infinite placement of lower hinge 326 in relation to hinge ball 320 at the top of door frame 318 is realized. A traditional single axis hinging mechanism cannot achieve the infinite positioning that hinge assembly 316 provides.

Figure 58:
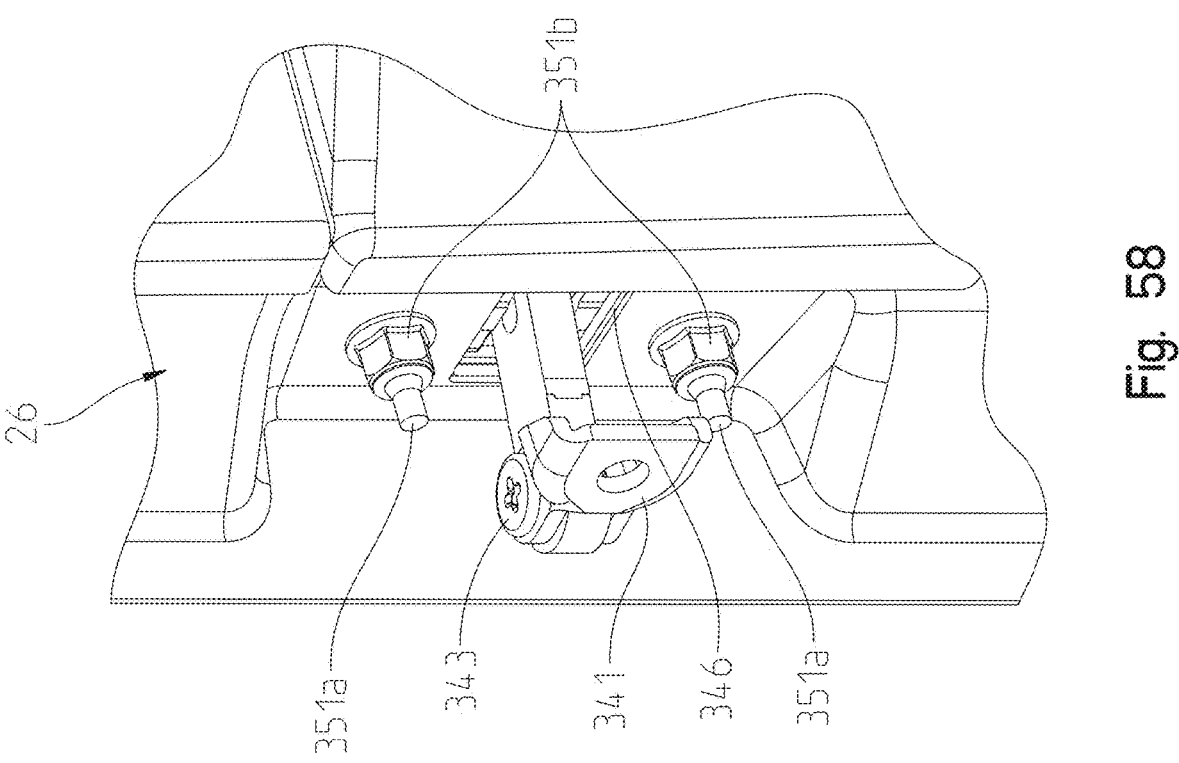
FIG. 58 is a rear right perspective view of the door stop assembly of FIG. 57.
Figure 57:
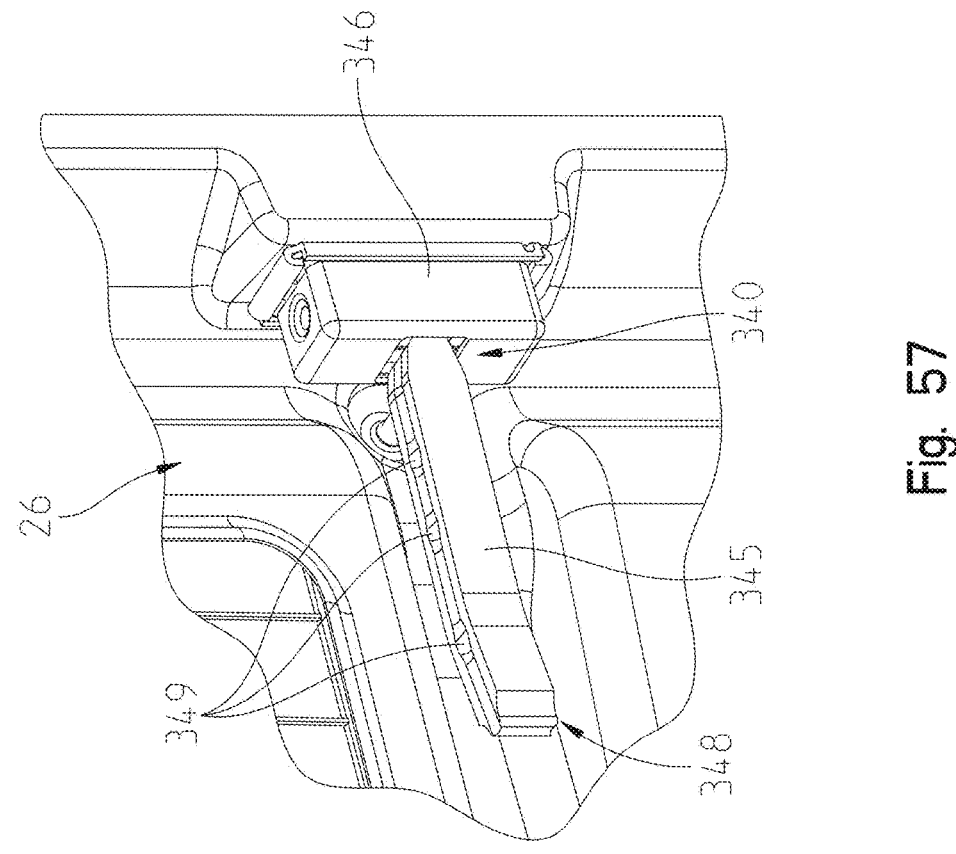
FIG. 57 is a front left perspective view of a door stop assembly for the doors of the utility vehicle of FIG. 1.
Figure 59:
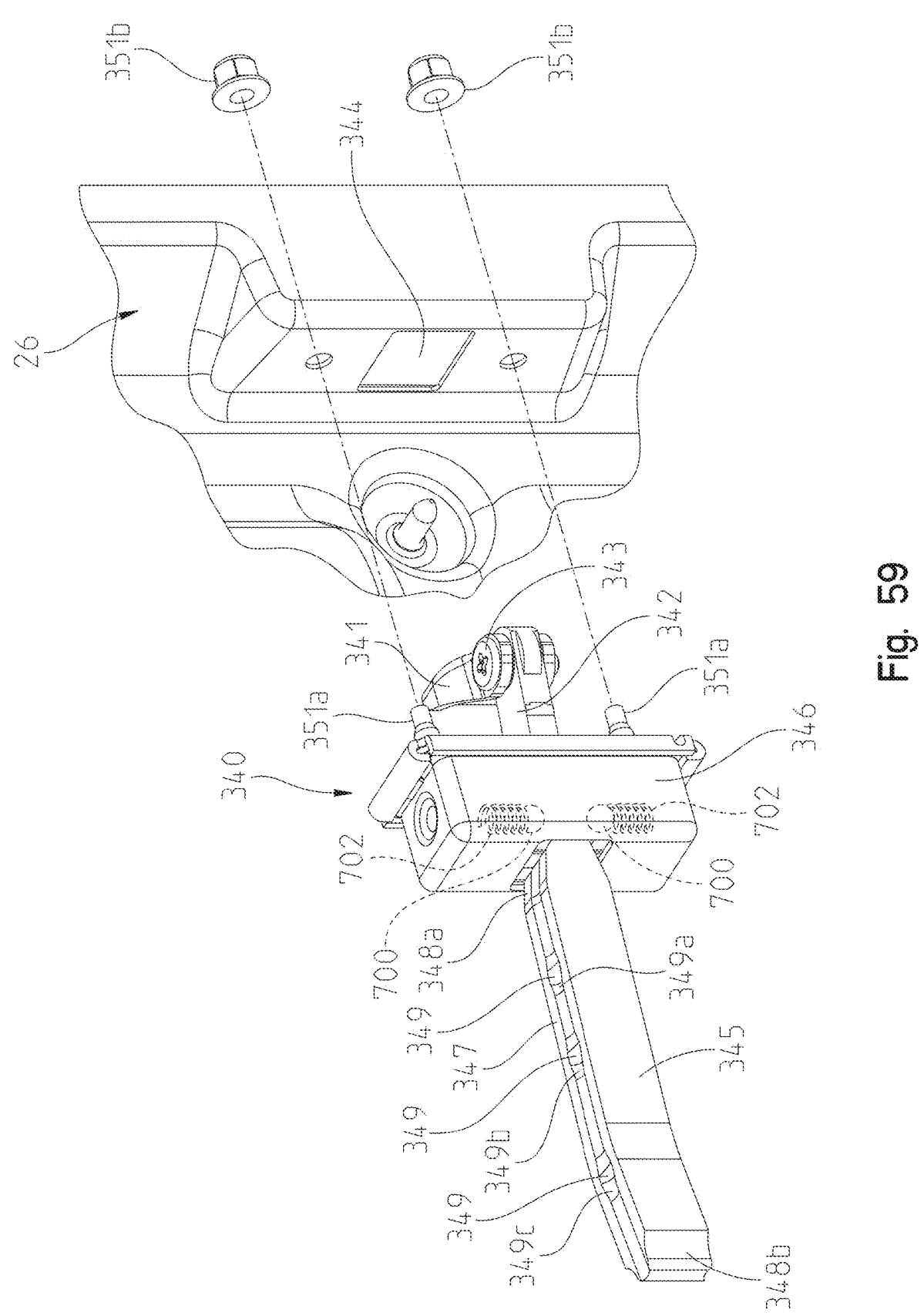
FIG. 59 is an exploded view of the door stop assembly of FIG. 57.

Referring now to FIGS. 57-59, doors 26 may include a door check assembly 340 to allow doors 26 to have stops along the path of opening of doors 26 to ensure doors 26 remain open at desired positions. Door check assembly 340 includes a bracket 341 which is coupled to frame member 86, 88, 192, 194 such that bracket 341 is fixed to frame assembly 10, 12. Bracket 341 is received through an opening 344 in door 26 to couple with frame member 86, 88, 192, 194. Bracket 341 is pivotably coupled to an arm 342 through a pivot joint 343. Arm 342 includes or is coupled to a door check member, illustratively a ramped bar 345, which is received though and extends from a housing 346. Housing 346 includes fasteners 351a which extent through openings in door 26 and couple with fasteners 351b.

Ramped bar 345 includes preset detent grooves 349. In one embodiment, ramped bar 345 includes three detent grooves 349 shown as detent grooves 349a, 349b, 349c and each detent groove 349 corresponds to a discrete open position of door 26. Ramped bar 345 also has an upper surface 347, a ramped portion 348a positioned adjacent a first detent groove 349a, and a tapered end 348b positioned adjacent the last detent groove 349c. Detent grooves 349 are spaced apart from each other along upper surface 347 and configured to receive a detent 700 in housing 346, as disclosed further herein. For example, when detent 700 is positioned in third groove 349c, door 26 may be opened to a greater extent than when detent 700 is positioned in first groove 349a. Detents 700 may be spring-biased towards ramped bar 345 by springs 702. If a force is applied to door 26 that exceeds the spring tension of springs 702, door 26 may be opened 180° such that third groove 349c is exceeded. However, the spring force at third groove 349c may be greater than the spring force at grooves 349a and 349b. More particularly, the end of detent groove 349c, which is adjacent with the end of ramped bar 345 has a larger step or depression in the groove than the remainder of detents (e.g., 349a and 349b). When detent 700 interacts with this edge of detent 349c, it requires greater compression in detent springs 702 to overcome the larger step and, therefore, greater spring force and greater door opening force to overcome this detent.

In operation, FIG. 57 shows door 26 in the closed position where ramped bar 345 fully extends from housing 346. However, as door 26 is opened, ramped bar 345 slides through housing 346 and is able to be checked or held at preset positions when detent 700 within housing 346 are received within detent grooves 349 corresponding to that open position. In this way, while traditional door checks have a stop within a range from about 78° to about 90°, doors 26 of the present disclosure are configured to swing open to a position greater than 90° when detents 700 are in third detent groove 349c or the spring force of detents 700 is exceeded even at third detent groove 349c. Door 26 also is allowed to pass through the last detent position 349c to become disengaged from frame assemblies 10, 12 without causing damage to door 26, lower and upper frame assemblies 10, 12, or door check assembly 340. It also may be appreciated that door 26 can be removed from vehicle 2 without the need to remove bracket 341 and, when it is desired to reattach door 26 to vehicle 2, ramped bar 345 may be coupled to arm 342 and turned sideways to slide through housing 346 due to tapered end 348.

Figure 60:
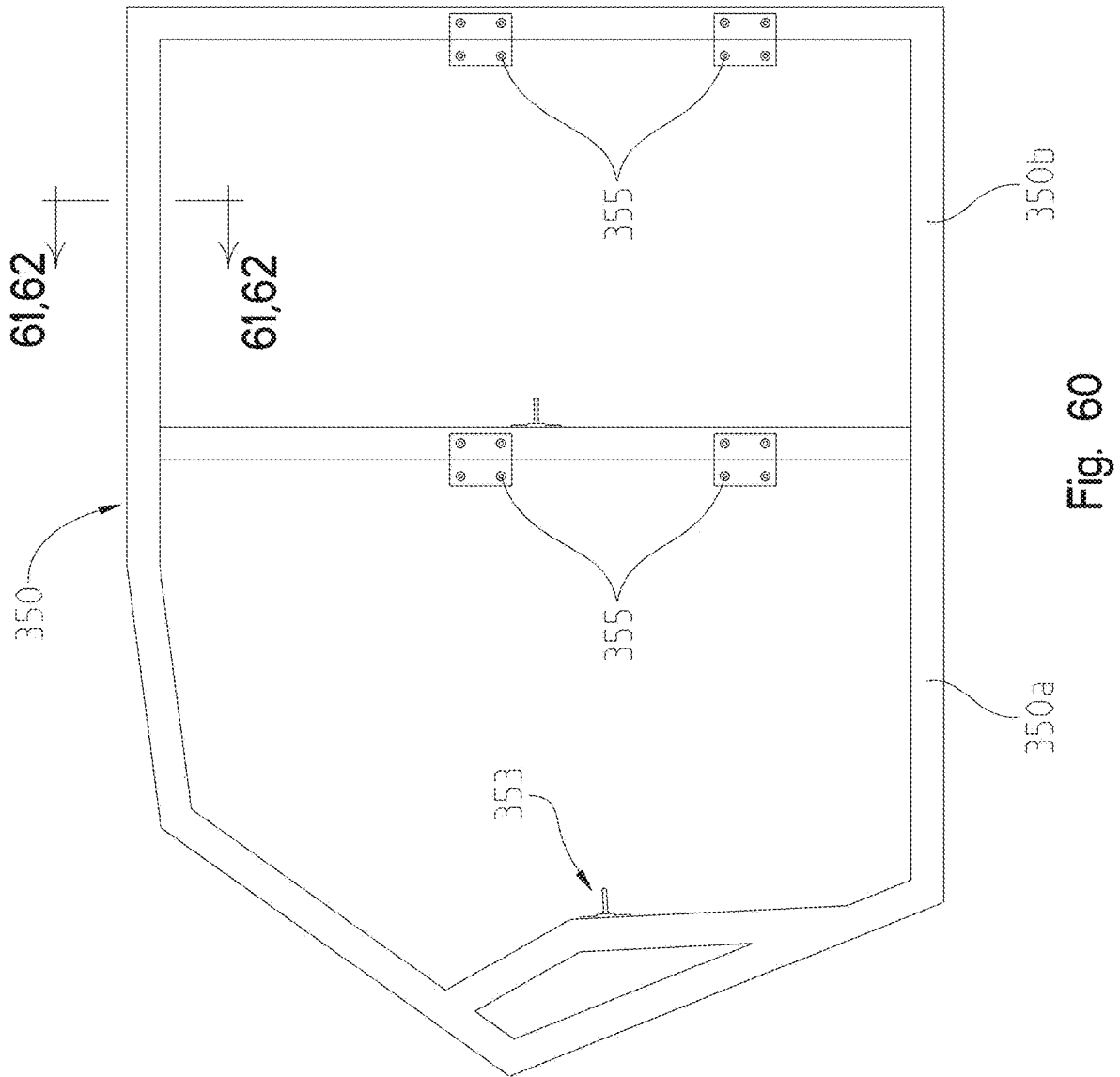
FIG. 60 is a side view of a door ring for the doors of the utility vehicle of FIG. 1.
Figure 61:
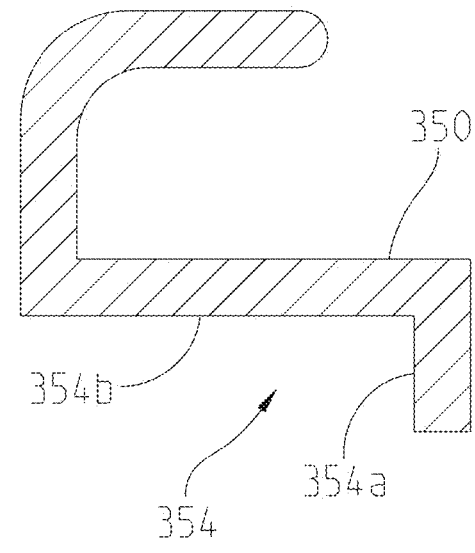
FIG. 61 is a cross-sectional view of the door ring of FIG. 60, taken along line 61-61 of FIG. 60.
Figure 62:
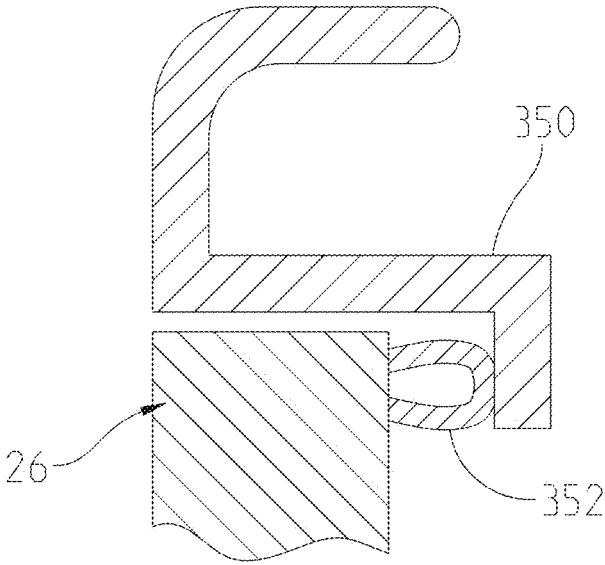
FIG. 62 is a second cross-sectional view of the door ring of FIG. 60, taken along line 62-62 of FIG. 60.
Figure 63:
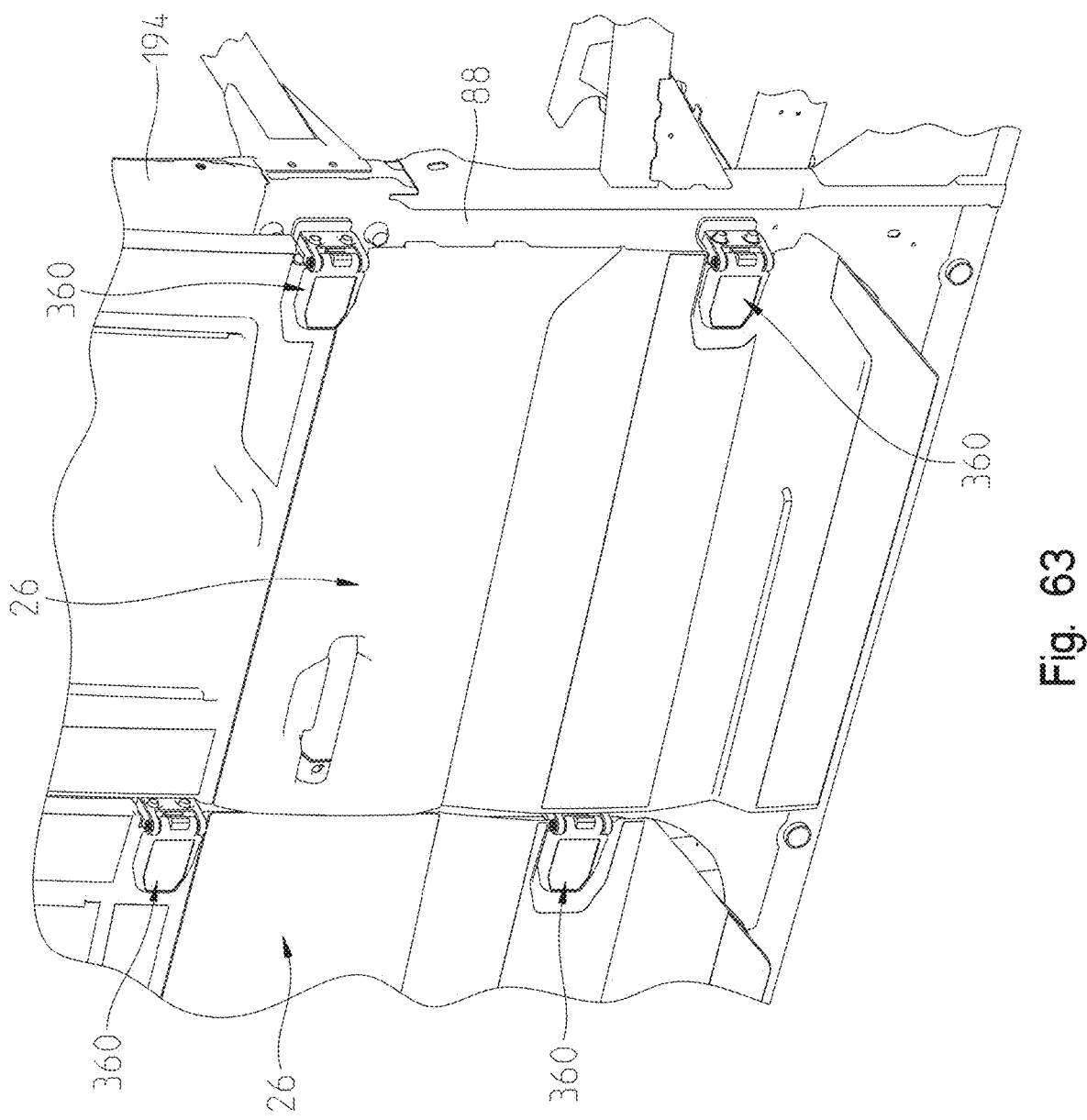
FIG. 63 is a rear left perspective view of an outer hinge assembly for the doors of the utility vehicle of FIG. 1.
Figure 64:
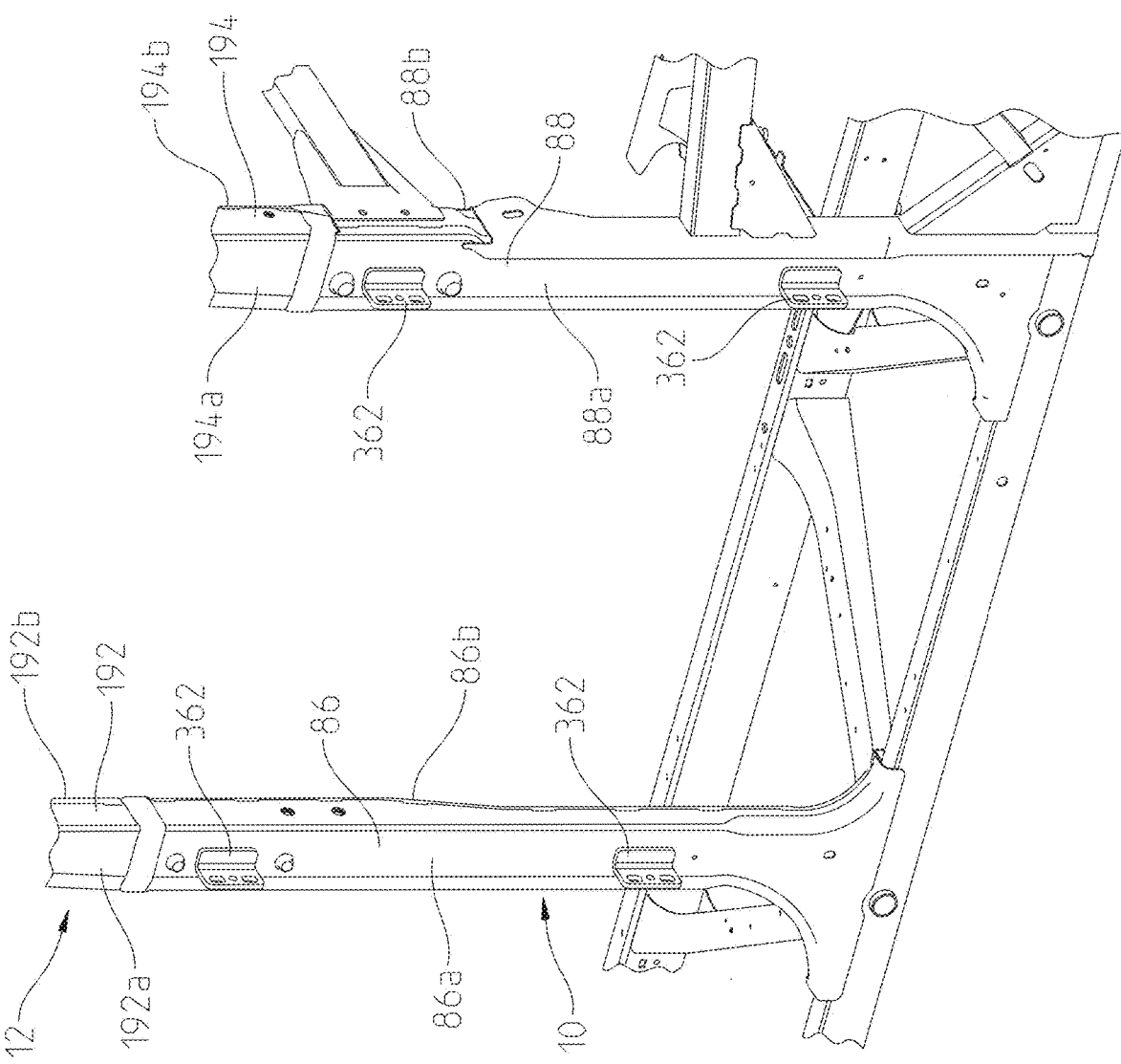
FIG. 64 is a rear left perspective view of brackets for the outer hinge assembly of FIG. 63.
Figure 65:
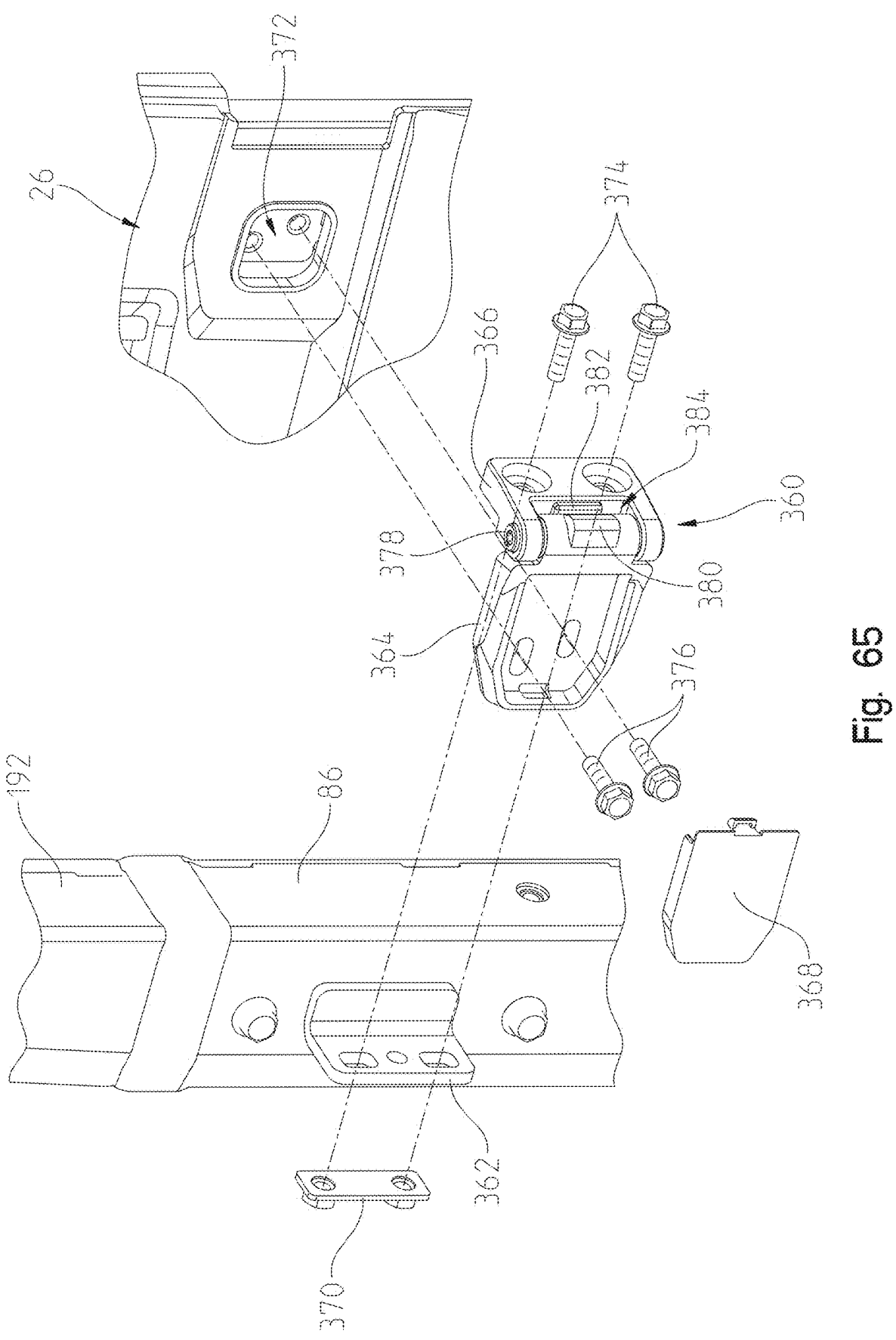
FIG. 65 is an exploded view of the outer hinge assembly of FIG. 63.

As shown in FIGS. 60-62, to facilitate assembly of doors 26 at a dealer or location other than the manufacturer, doors 26 also may include door rings 350 which are separable from vehicle 2 and improves the fit and function of doors 26 when installed on lower and upper frame assemblies 10, 12. As disclosed herein, it may be necessary to remove or never attach various components of vehicle 2 when transporting vehicle 2 from the manufacturer. In such instances, a dealer may be required to install or assemble the unattached components in a manner that preserves the fit and finish for optimal operation and look of vehicle 2

Door ring 350 is an example of a component that may be used to facilitate installation of doors 26 after transport. Door ring 350 may be formed from channel-shaped or L-shaped sheet metal sections which are spot welded together to form a rigid, one-piece configuration. Illustratively, door ring 350 includes a first portion 350a configured to support front doors of vehicle 2 and a second portion 350b configured to support rear doors of vehicle 2. First and second portions 350a, 350b may be integral with each other (e.g., formed from one continuous metal part via spot welding or the like). In this way, door ring 350 may be configured as a single component for supporting installation of a front door and a rear door simultaneously.

Door ring 350 includes hinge locations 355 and latch points 353 for door 26. Hinge locations 355 may define actual hinges or may define brackets for coupling with hinges of door 26. As such, door 26 may be preassembled to door ring 350 and, specifically, frame 318 (FIG. 54) for doors 26 may be coupled to door ring 350 such that the entire assembly of doors 26 can be installed on vehicle 2 (e.g., installed on frame members 86, 88, 190, 192, 194, 196) at the dealer or distribution center with improved dimensional control than current methods. The use of door rings 350 results in improved door sealing, improved door operation, and fewer vibrations. Further, because door ring 350 is separable from vehicle 2, high shipping density can be maintained.

Door ring 350 may have a cross-sectional profile, as shown in FIGS. 61 and 62. Door ring 350 includes a recessed portion 354 which is configured to receive a seal 352 and a portion of door 26. Seal 352 is positioned intermediate door 26 and door ring 350 and may be compressed therebetween. Illustratively, seal 352 is positioned adjacent a first surface 354a of door ring 350 and door 26 (e.g., door frame 318) is positioned adjacent a second surface 354b of door ring 350. Based on the location of seal 352, both seal 352 and door 26 may be adjacent second surface 354b.

As shown in FIGS. 63-67, doors 26 include exterior hinges 360 which may cooperate with hinge assembly 316 for door frame 318 (FIGS. 53-56) and/or door check assembly 340 (FIGS. 57-59). Hinges 360 are configured to couple with brackets 362 on frame members 86, 88 of lower frame assembly 10. It may be appreciated that brackets 362 are on the same surface of frame members 86, 88. More particularly, because frame members 86, 88 may be comprised of two channel members coupled together (e.g., 86a, 86b and 88a, 88b), brackets 362 are positioned on the same surface, such as member 86a and/or 88a and are not positioned at the seam between the two channel members.

Hinges 360 allow doors 26 to open 180° while also having a stop at approximately 90° to keep doors 26 open at a position generally desired by the operator and/or passengers. It may be appreciated that the open positions of door 26 (e.g., 90° or 180°) are with respect to a closed position of door 26 where door 26 is latched. Hinge 360 includes a first hinge member 364 and a second hinge member 366 pivotably coupled together at pivot joint 378. First hinge member 364 is removably coupled to door 26 with fasteners 376. First hinge member 364 is received within a pocket 372 of door and fasteners 376 extend through first hinge member 364 and door 26. An outer cover 368 is coupled to first hinge member 364 and conceals fasteners 376. As shown, outer cover 368 snaps into first hinge member 364 and no fastener is needed for this coupling. First hinge member 364 also includes a protrusion 380 positioned generally adjacent joint 378. Protrusion 380 is configured to move with first hinge member 364 and rotate within a recess 384 defined by a portion of second hinge member 366.

Second hinge member 366 is removably coupled to bracket 362 with fasteners 374. A plate 370 also may receive fasteners 374 such that bracket 362 is positioned longitudinally intermediate second hinge member 366 and plate 370. Second hinge member 366 includes a stopper or stop member 382, which may be comprised of a compressible material, such as rubber, positioned within recess 384. In various embodiments, stopper 382 may be molded from various materials having a plurality of durometers to change the force necessary to overcome the 90° position.

Figure 67:
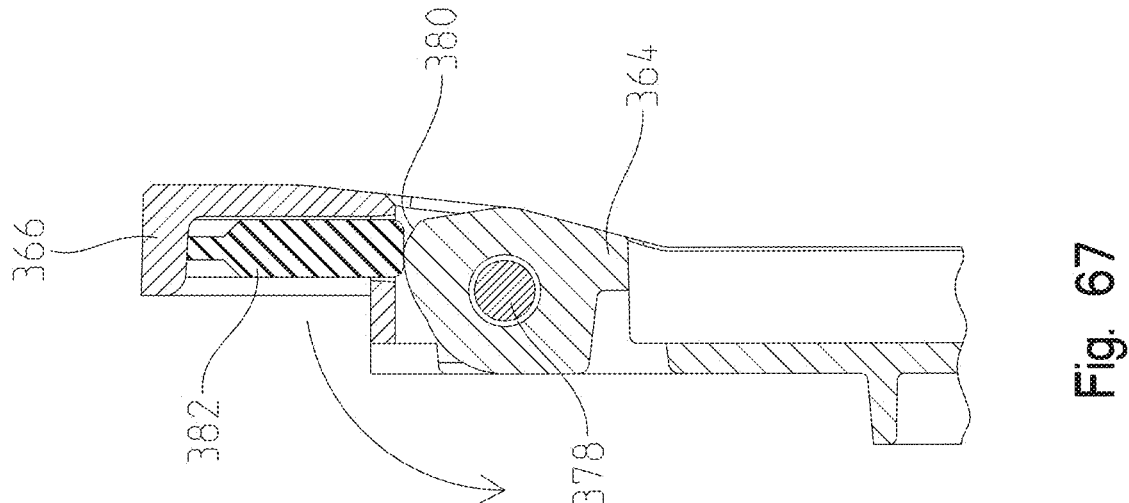
FIG. 67 is a cross-sectional view of the outer hinge assembly of FIG. 63 with the door in the open position.
Figure 66:
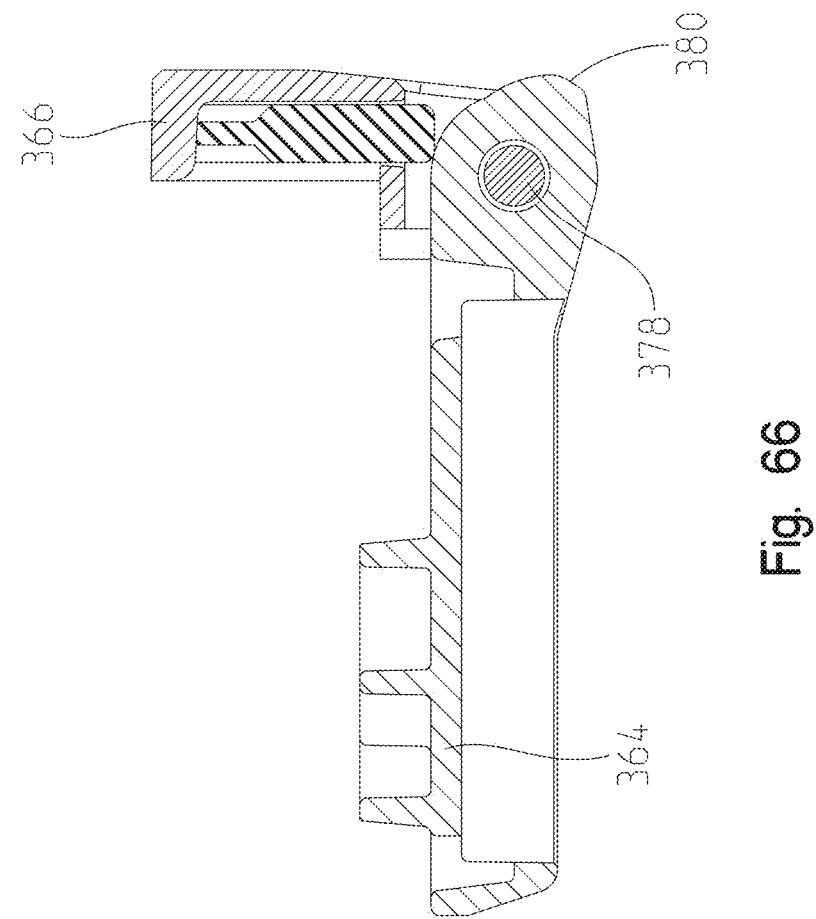
FIG. 66 is a cross-sectional view of the outer hinge assembly of FIG. 63 with the door in a closed position.

In operation, when door 26 is rotated to an open position, first hinge member 364 rotates with door 26 and relative to second hinge member 366 which is fixed to lower frame assembly 10. As door 26 rotates to an open position of at least 90°, protrusion 380 contacts stopper 382 and compresses stopper 382, as shown in FIGS. 66 and 67. In this way, door 26 may be maintained at a 90° position when protrusion 380 contacts stopper 382. However, door 26 can overcome this 90° position without damage to door 26 and can be opened to a greater extent (e.g., 180°). More particularly, because stopper 382 is comprised of a compressible material, stopper 382 may be compressed and have a first or compressed profile when engaged with protrusion 380 to maintain door 26 in a first open position. However, if protrusion 380 is pushed, protrusion 380 can compress stopper 382 and rotate against the entirety of stopper 382 in or to move past stopper 382 such that door 26 is opened to a further open position. If protrusion 380 is not engaged with stopper 382, then stopper 382 is no longer compressed and, therefore, has a second or uncompressed profile.

Hinge 360 allows for directional adjustment in the X, Y, and Z directions such that tilt, rotational, and sliding adjustments are possible. The directional adjustment is possible because oversized slots in bracket 362 allow for vertical (Z direction) and some lateral (Y direction) adjustment. Fore-aft slots in hinge 364 allow for the fore-aft (X direction) adjustment of doors 26. Such adjustments are maintained even when doors 26 are removed from vehicle 2. In particular, doors 26 may be removed from brackets 362 by removing fasteners (e.g., bolts) therefrom but the specific configuration of hinge 360 is not affected when doors 26 are removed.

Figure 113:
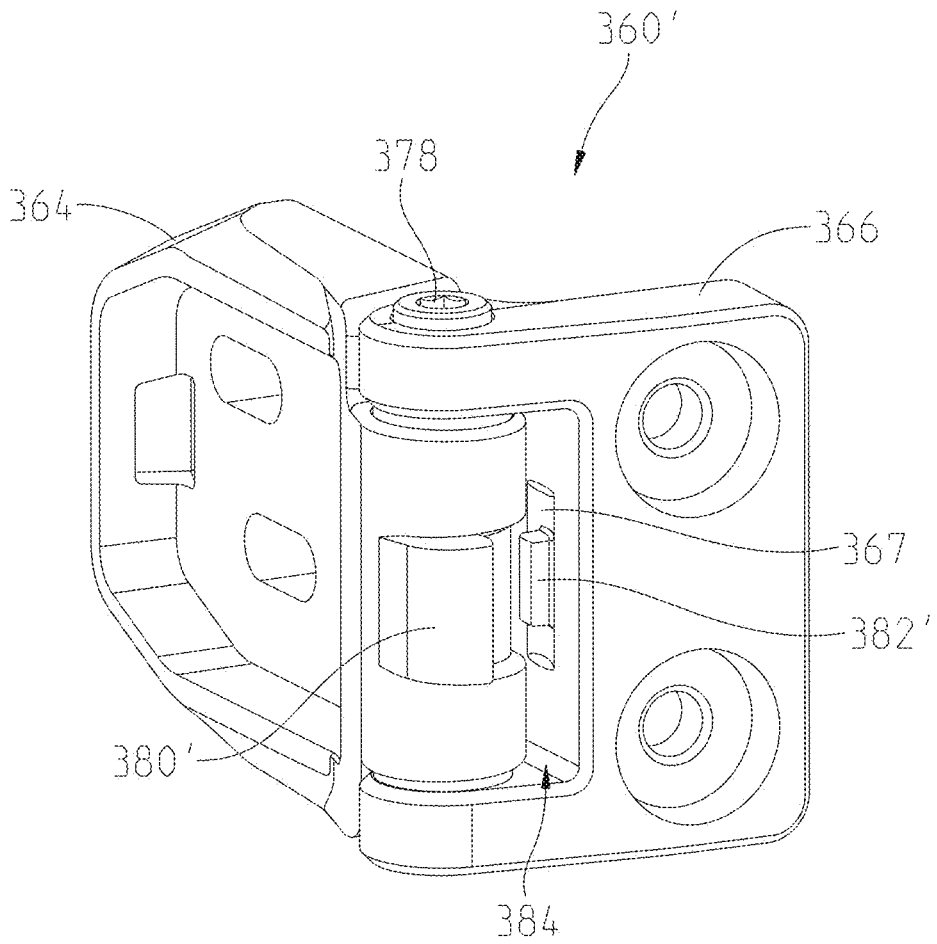
Figure 115:
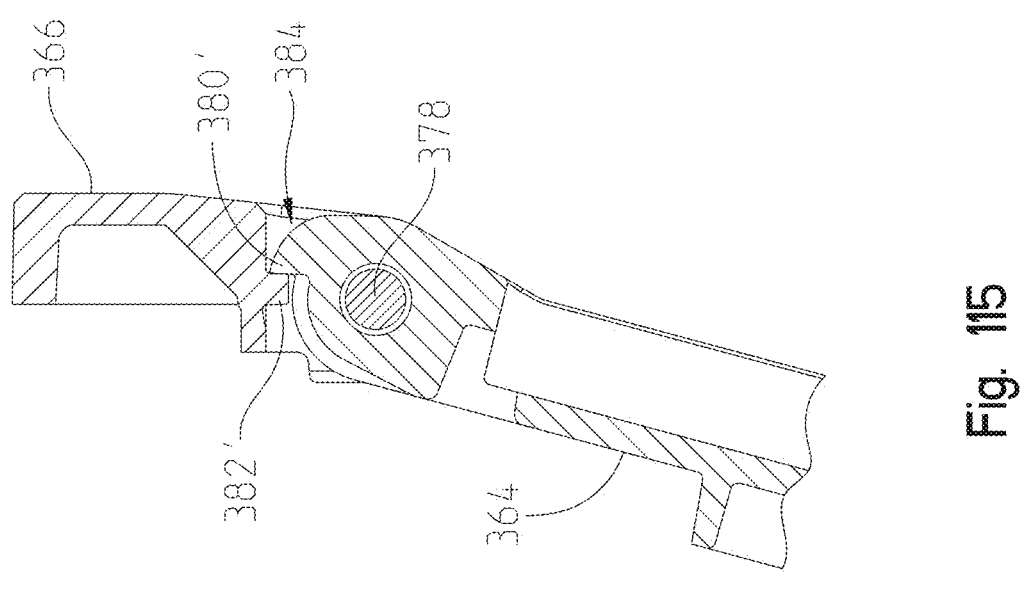
Figure 114:
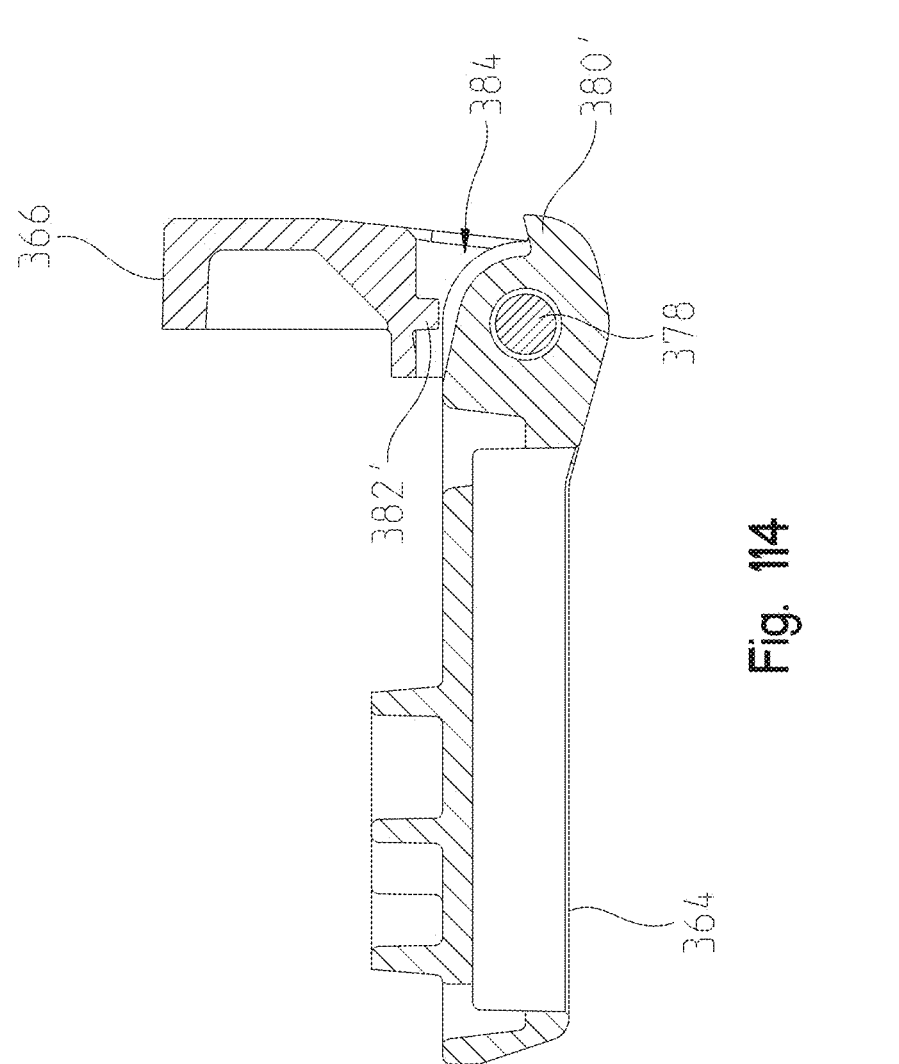

Now referring to FIGS. 113-115, an alternative hinge 360' is substantially similar to hinge 360. Alternative hinge 360' includes first hinge member 364 and second hinge member 366, and an outer cover (not shown, similar to outer cover 368) may cover first hinge member 364. First hinge member 364 is coupled to a door (e.g., door 26) and second hinge member 366 is coupled to the vehicle frame (e.g., intermediate upstanding members 86). A pivot joint 378 is coupled between first hinge member 364 and second hinge member 366. A protrusion 380' may be substantially similar to protrusion 380 of hinge 360. Protrusion 380' may be integrally formed with first hinge member 364 and rotate about pivot joint 378. A recess 384 is positioned between pivot joint 378 and second hinge member 366. Second hinge member 366 may define an aperture 367 generally facing pivot joint 378. A hinge stop 382' extends through aperture 367 to a position adjacent pivot joint 378 to contact protrusion 380' as it rotates about pivot joint 378. Hinge stop 382' is a replaceable frame member coupled to second hinge member 366 and configured with a specific cross-section to be able to withstand a specific shear force applied from protrusion 380'. In embodiments, hinge stop 382' is integral with second hinge member 366. That is, hinge stop 382' may be welded to second hinge member 366, or may otherwise be formed with the second hinge member 366 during the manufacturing process (e.g., stamping, extrusion, machining, printed, or other process). Hinge stop 382' may be made of a metal, or metal composite (e.g., aluminum), which may be configured to withstand a specific force applied from door 26 through protrusion 380'. That is, hinge stop 382' may be configured to stop door 26 from rotating completely through pivot joint 378, but may also be configured to break at a predetermined force to prevent damage to door 26 or the vehicle frame. Hinge stop 382' may break after a predetermined force and second hinge member 366 may be replaceable by a user, dealer, manufacturer, or other party.

Figure 68:
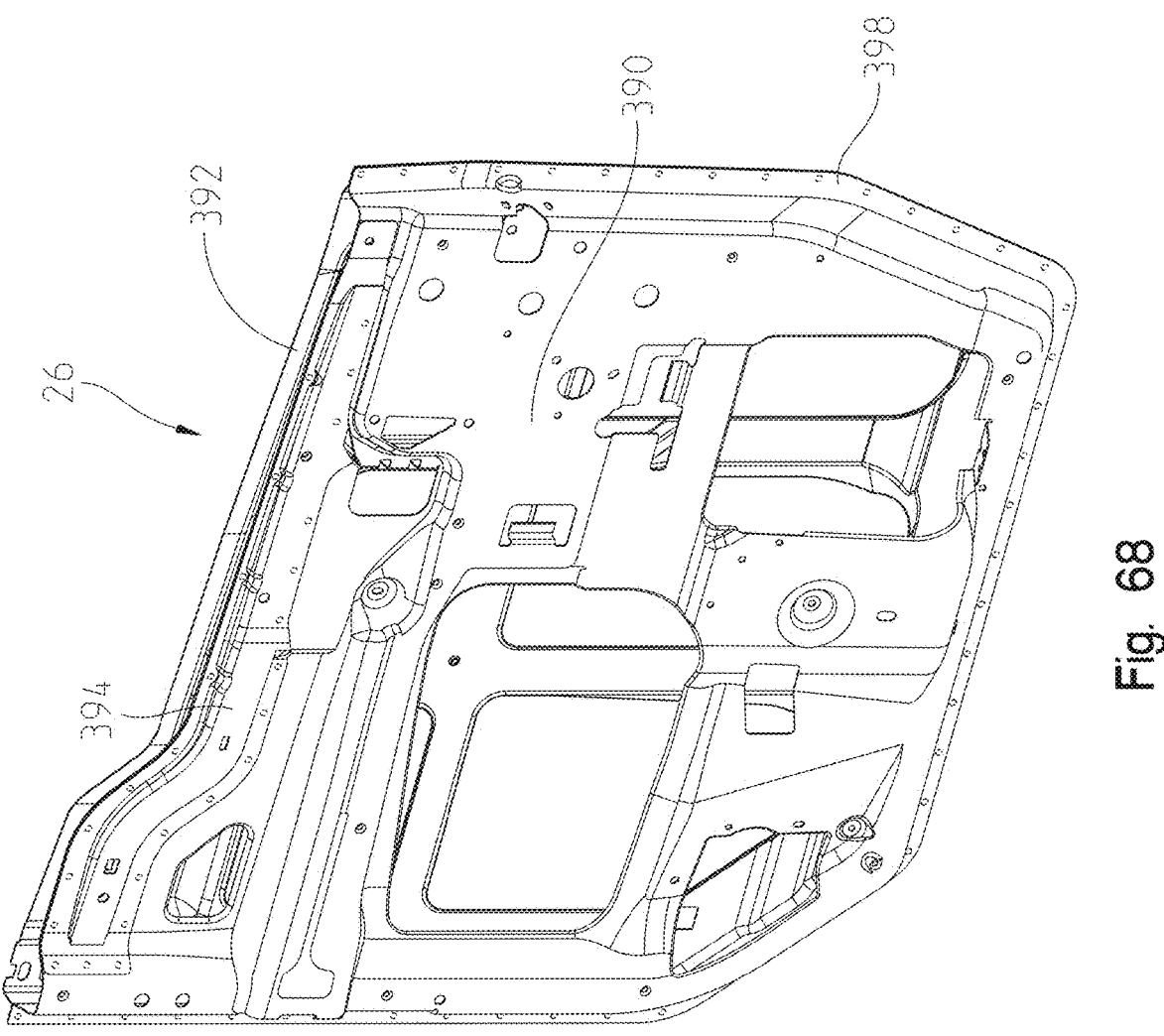
FIG. 68 is a perspective view of a stamping assembly of the doors of the utility vehicle of FIG. 1.
Figure 69:
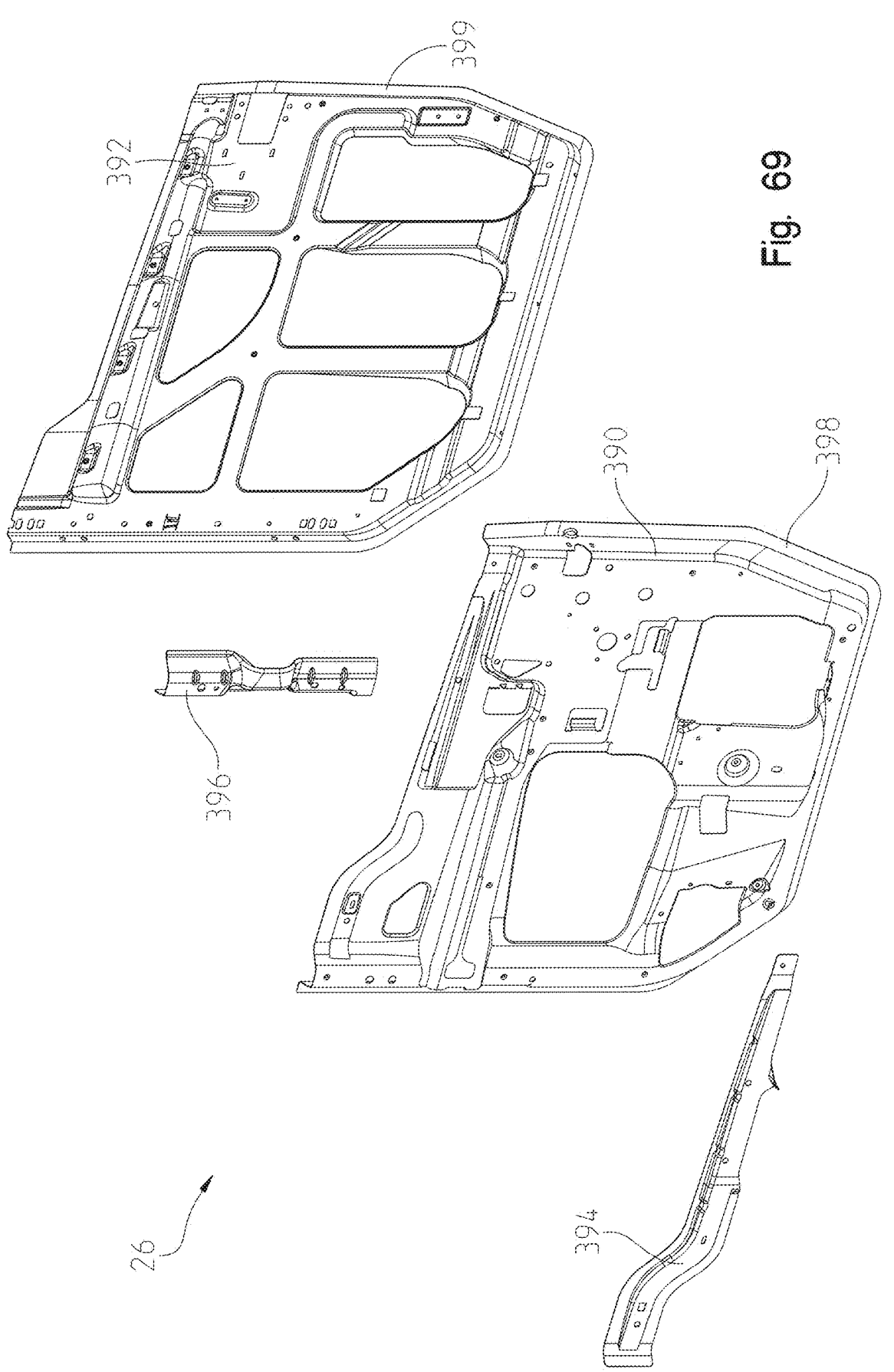
FIG. 69 is an exploded view of the stamping assembly of FIG. 68.
Figure 70:
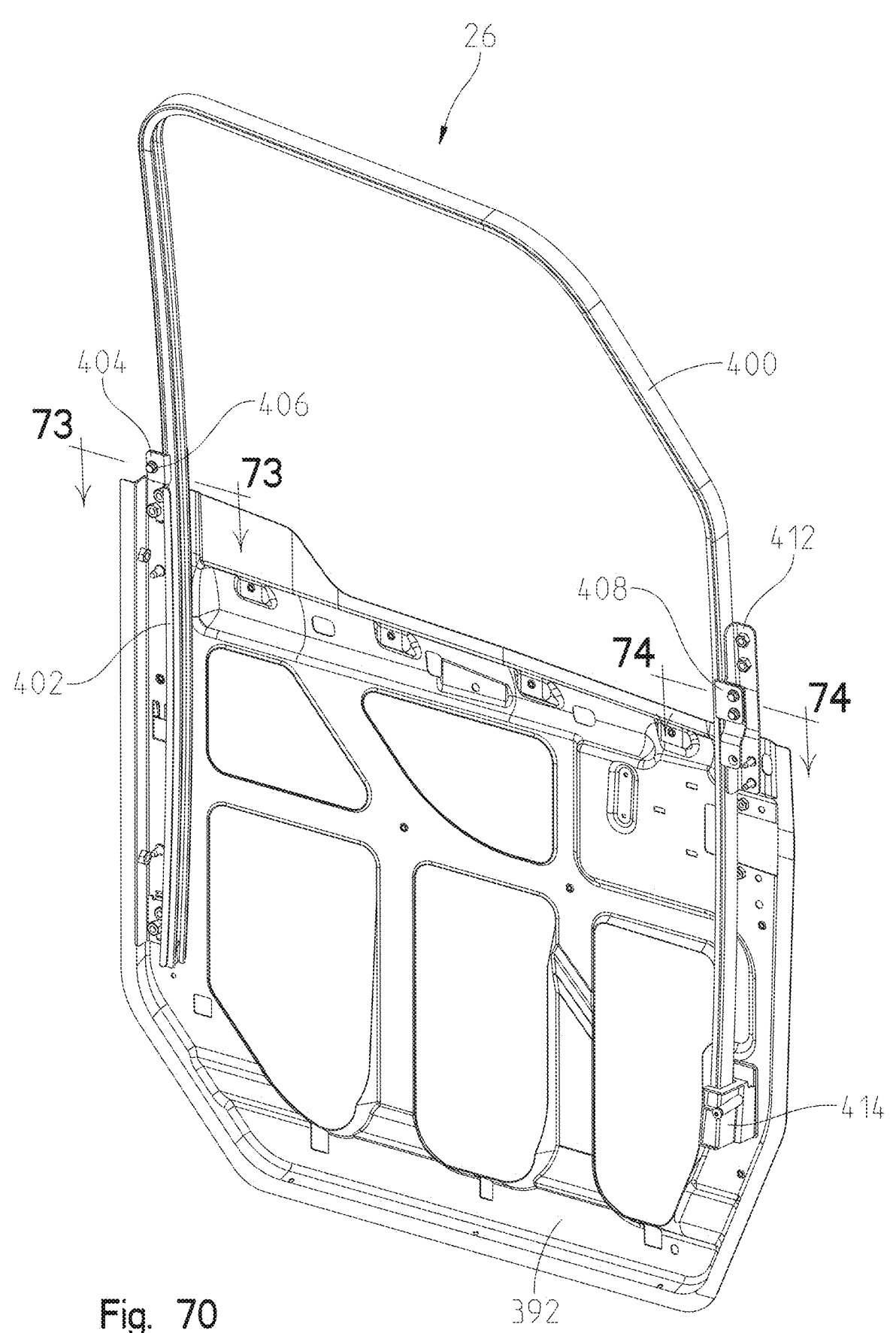
FIG. 70 is a perspective view of an upper frame assembly of the doors for the utility vehicle of FIG. 1.
Figures 71, 72:
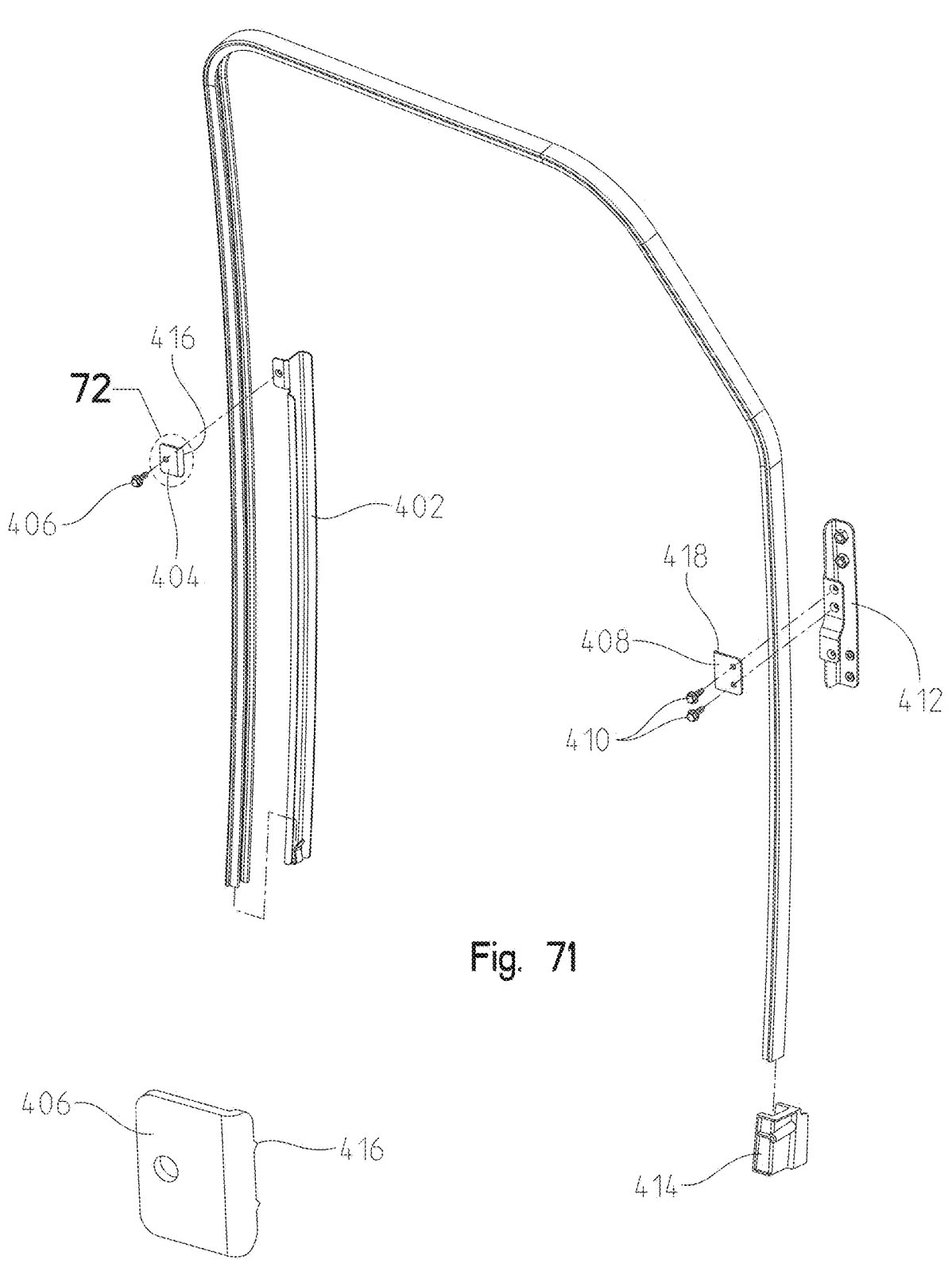
FIG. 71 is an exploded view of the upper frame assembly of FIG. 70.
FIG. 72 is a perspective view of a bracket of the upper frame assembly of FIG. 70.
Figure 74:
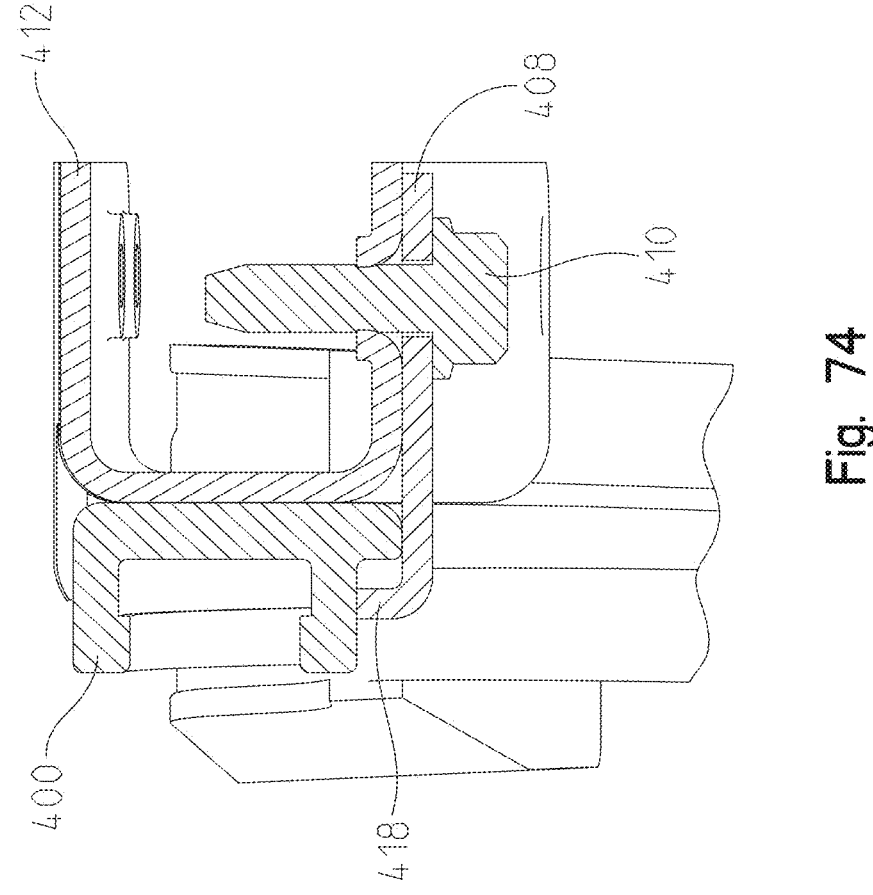
FIG. 74 is a cross-sectional view of the upper frame assembly of FIG. 70, taken along line 74-74 of FIG. 70.
Figure 73:
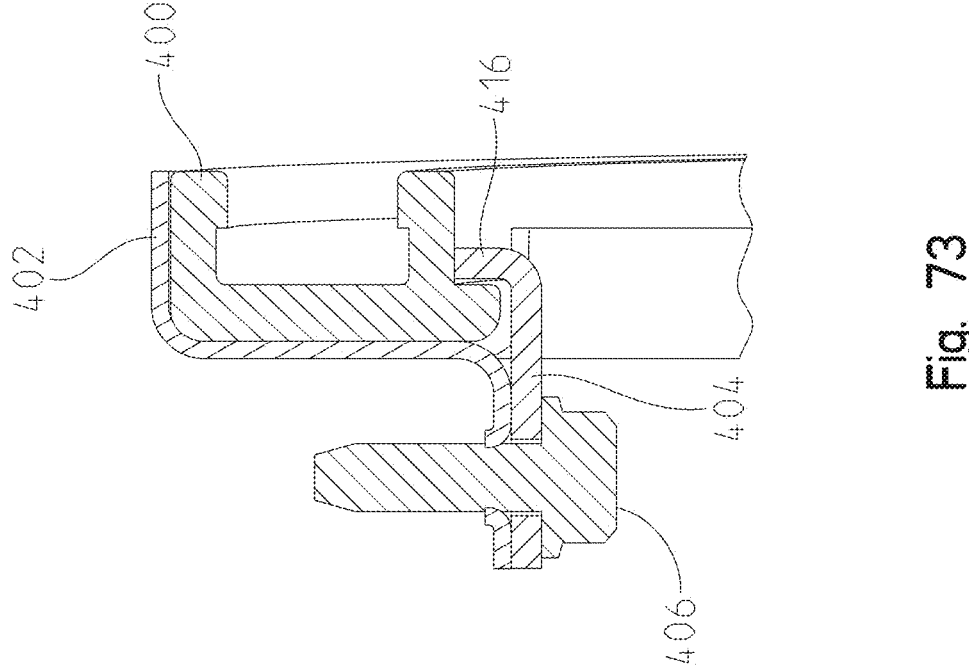
FIG. 73 is a cross-sectional view of the upper frame assembly of FIG. 70, taken along line 73-73 of FIG. 70.

As shown in FIGS. 68 and 69, doors 26 may be comprised of at least one stamping. Illustratively, doors 26 are comprised of a first stamping 390 and a second stamping 392 which are welded together (e.g., via resistance welding). Additional support members 394, 396 may be welded onto stampings 390, 392 to increase the structure of door 26. More particularly, resistance welding along outer flanges 398, 399 of respective first and second stampings 390, 392 decreases manufacturing cost and removes the use of additional filler material to create the joint between first and second stampings 390, 392. Additional filler material creates weld beads which become difficult for sealing and, therefore, decrease operator comfort within the cab of vehicle 2.

Referring now to FIGS. 70-74, doors 26 (e.g., door frame 318) also may include an upper extrusion 400 coupled to stamping 392. Extrusion 400 may be comprised of a metallic material, such as aluminum. However, when joining aluminum to steel members, bolts are needed for this coupling. In conventional configurations, this may require brackets which are welded to the aluminum, however, welding negatively impacts the material properties of the aluminum. Therefore, as shown in FIGS. 70-74, extrusion 400 is configured to slide into a rail or track 402 and is clamped in place with track 402 without the need for welds on extrusion 400. In this way, door 26 may utilize a separate upper frame (defined by extrusion 400) for assembly with any configuration of a lower half door.

Illustratively, a first upper plate 404 is used to couple track 402 to lower frame assembly 10 with a fastener 406. A second upper plate 408 also couples track 402 to lower frame assembly 10 through a bracket 412 and fasteners 410. A lower block 414 may be coupled to lower frame assembly 10 and is configured to control and lock track 402. First and second upper plates 404 and 408 each includes respective tabs 416 and 418 which are configured to receive a portion of extrusion 400 as it slides along track 402. In this way, extrusion 400 is removably but securely positioned on stamping 392 without the use of welds on extrusion 400.

Figure 76:
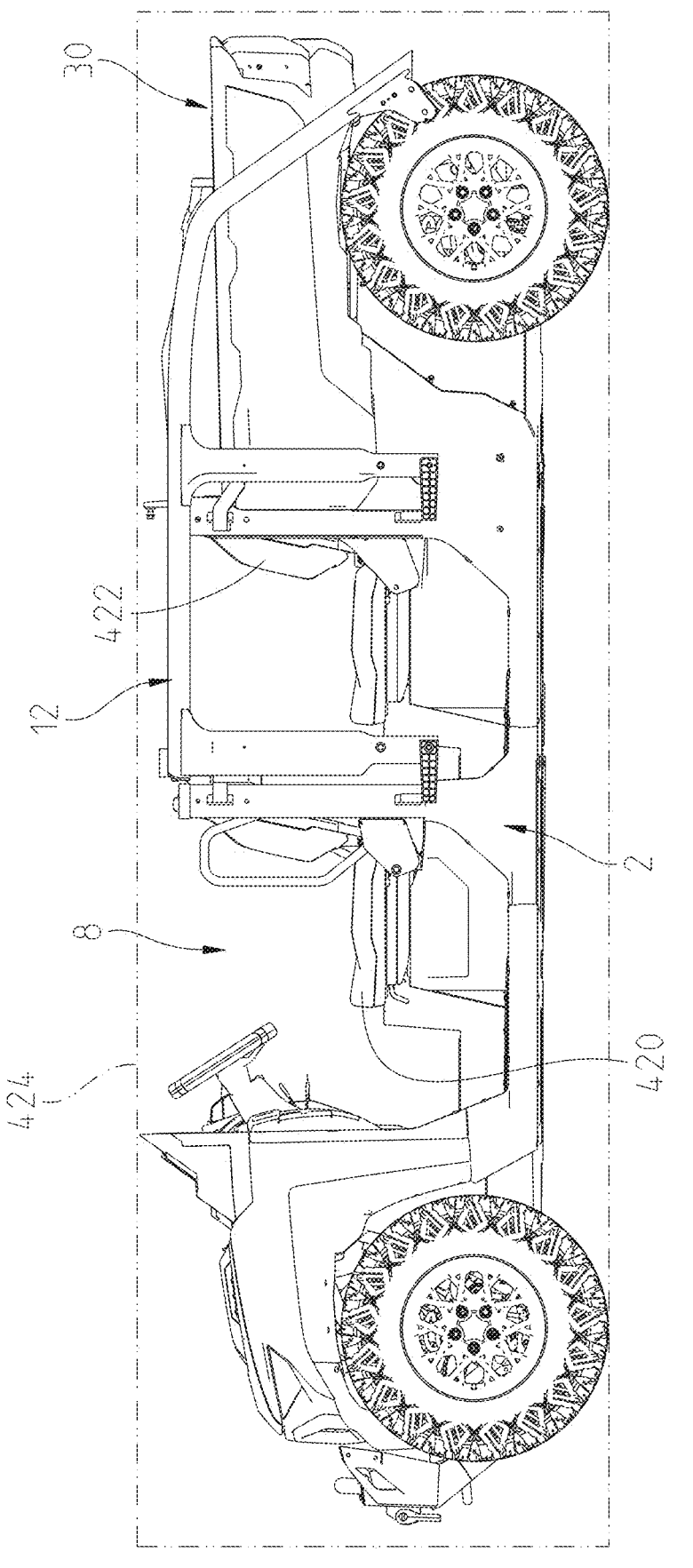
FIG. 76 is a further schematic view of the cargo container of FIG. 75.
Figure 77:
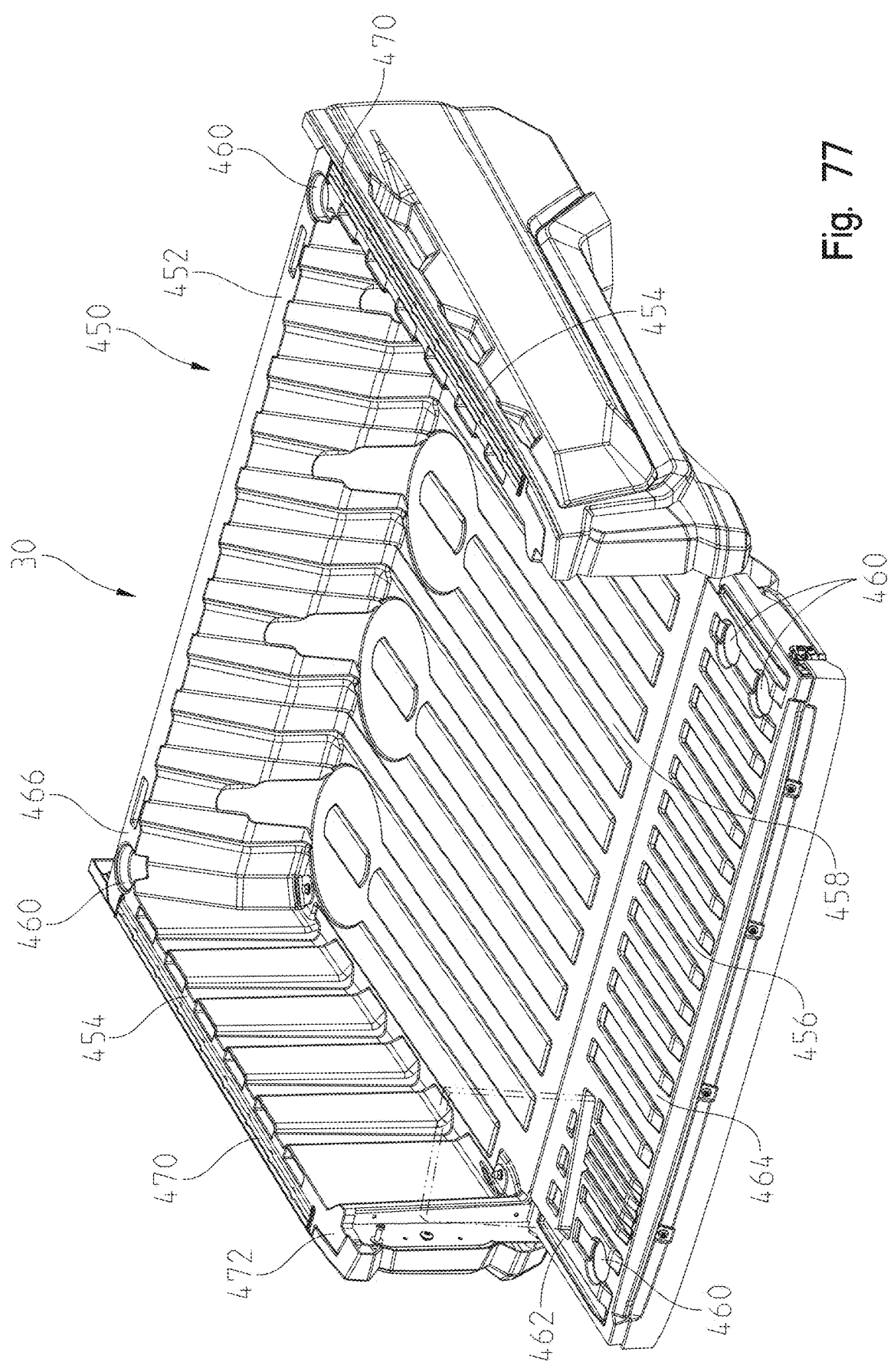
FIG. 77 is a rear right perspective view of a cargo box of the utility vehicle of FIG. 1.

Referring to FIGS. 75 and 76, vehicle 2 may be shipped to dealers or locations and, as such, must be configured in a manner to fit within a cargo container 424. To fit vehicle 2 within container 424, upper frame assembly 12 is nested with lower frame assembly 10 and may be included in container 424 in a plurality of components or subassemblies. Nesting upper frame assembly 12 allows the operator more space within operator area 8 to operate vehicle 2 before vehicle 2 is fully assembled or de-packaged. More particularly, upper frame assembly 12 is nested at a position rearward of operator seat 420 and, illustratively, is positioned over a portion of rear passenger seats 422 and cargo area 30. In this way, operator seat 420 remains open and available for an operator to drive vehicle 2, if needed, during the process of assembling upper frame assembly 12 to lower frame assembly 10.

Referring now to FIGS. 77-88, cargo area 30 is described in more detail. Cargo area 30 is comprised of a cargo box 450 having a forward wall 452, opposing side walls 454 coupled to forward wall 452, a tailgate 456, and a floor 458. Cargo box 450 includes a plurality of retention features to support items the operator may be using. For example, cargo box 450 may include a plurality of cupholders 460 at various locations such as along an upper surface 466 of forward wall 452 and on an inner surface 464 of tailgate 456 such that when tailgate 456 is rotated to the lowered positioned and is generally coplanar with floor 458, cupholders 460 face upwardly. Additionally, inner surface 464 of tailgate 456 may include a recess 462 configured to receive a tablet, laptop computer, phone, or the like in a generally upright position such that the screen of such device is visible to the operator, speakers are oriented in a selected direction, input portions of the devices are accessible, etc.

Figure 78:
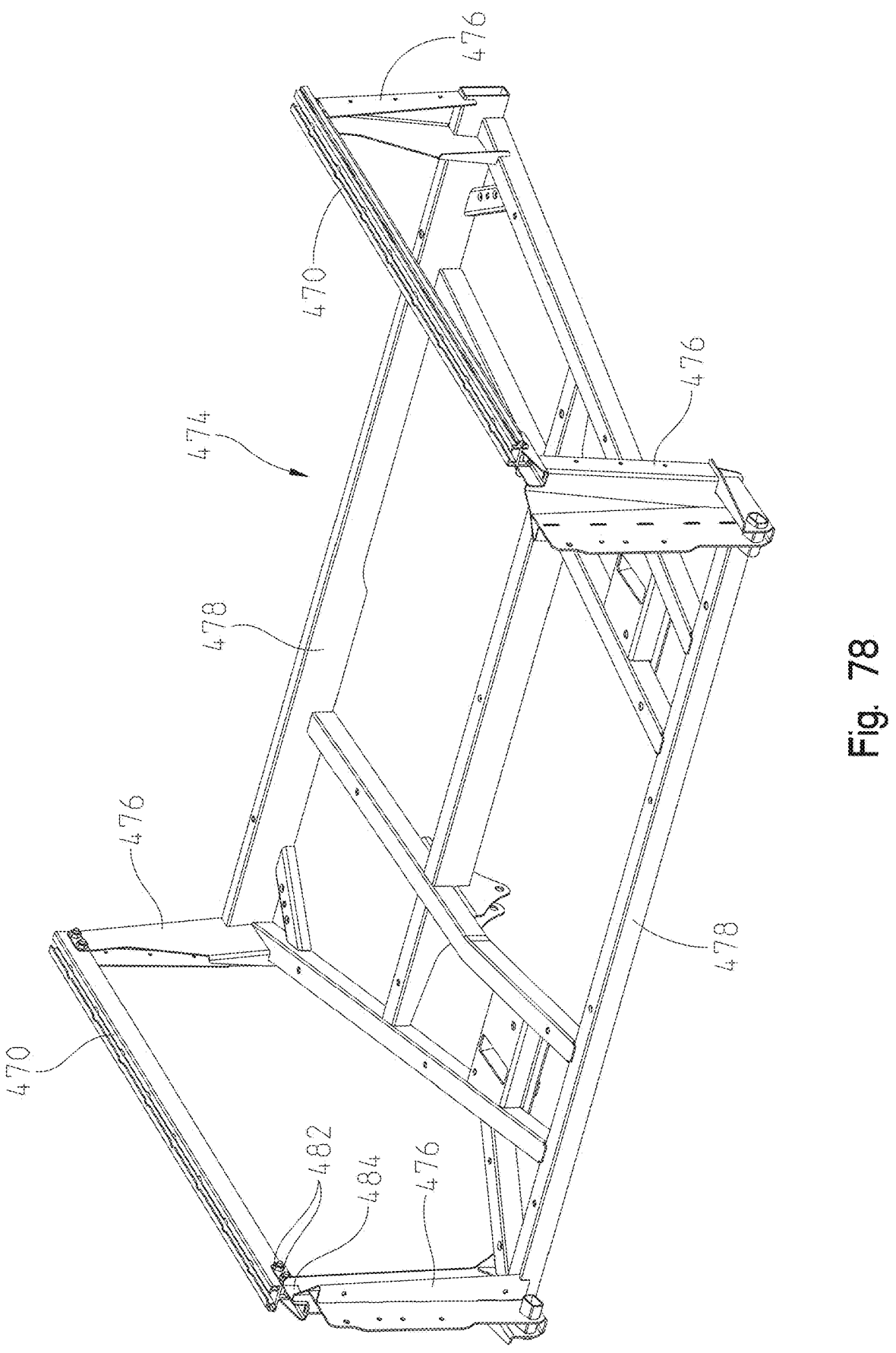
FIG. 78 is a rear right perspective view of a frame assembly of the cargo box of FIG. 77.
Figure 79:
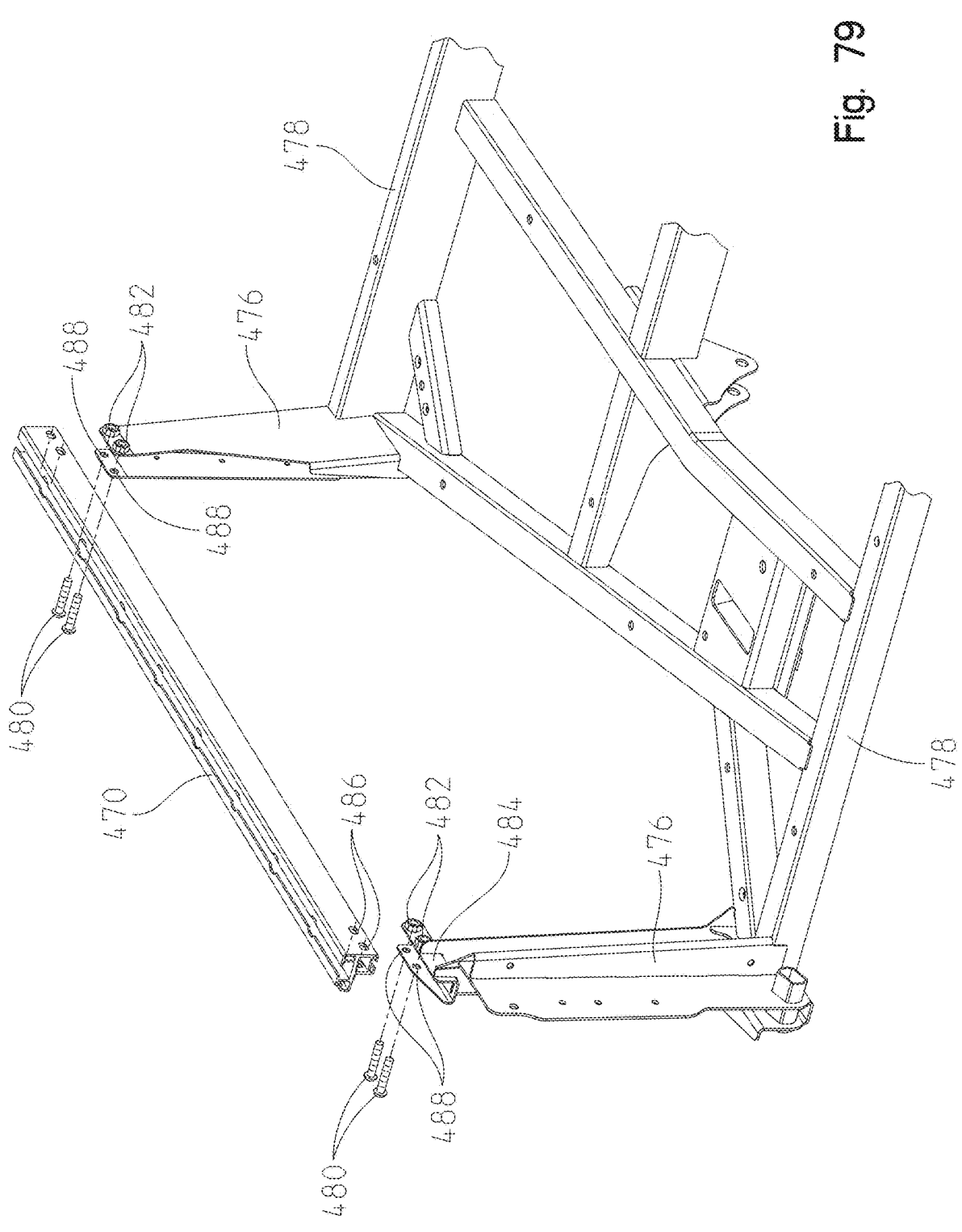
FIG. 79 is an exploded view of a portion of the frame assembly of FIG. 78.
Figure 80:
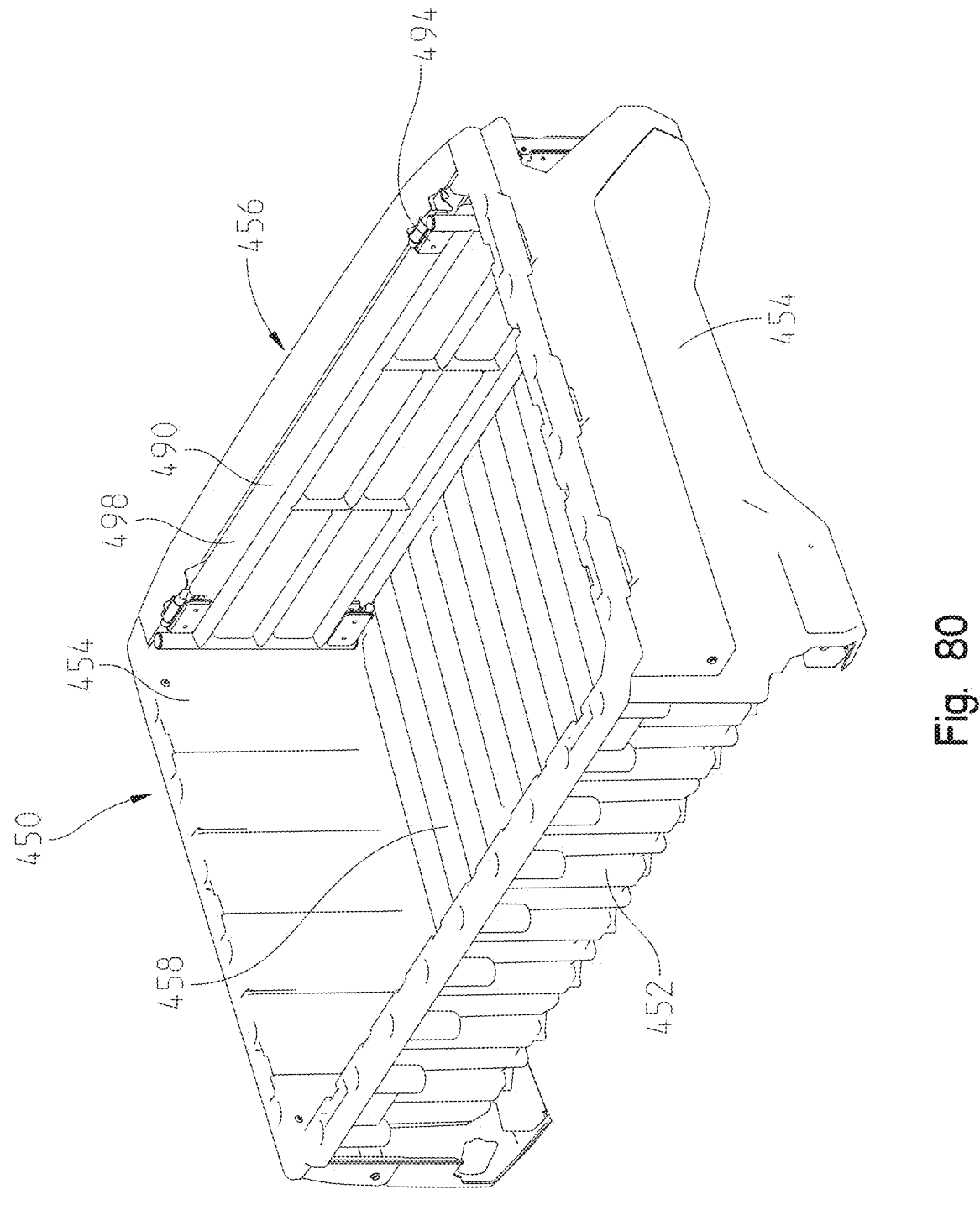
FIG. 80 is a front left perspective view of the cargo box of FIG. 77 with a tailgate in a first position.

Rails 470 may be included with cargo box 450 and, illustratively, rails 470 are positioned at and/or define an uppermost surface 472 of side walls 454. Rails 470 are used to mount accessories to cargo box 450 and are coupled to side walls 454 with fasteners which are not visible. More particularly, and as shown in FIGS. 78 and 79, rails 470 are removably coupled to a frame 474 of cargo box 450. Frame 474 includes upstanding posts 476 positioned at approximately the four corners of cargo box 450. Frame 474 further includes a plurality of cross-members 478 which couple opposing posts 476 together. Rails 470 are coupled to the upper surfaces of posts 476 with fasteners 480. In various embodiments, rails 470 may be directly coupled to the upper surface of posts 476 and/or may be coupled to a bracket 484 at the upper extent of posts 476. Fasteners 480 are configured to be received through laterally-aligned apertures 486 of rails 470 and laterally-aligned apertures 488 at the upper extent of posts 476. Weld nuts 482 may be included at the upper extent of posts 476 and/or on bracket 484 to couple with fasteners 480. Due to the lateral alignment of apertures 486 and 488, fasteners 480 are received through side walls of rail 470 and, therefore, are concealed by the body panels of side walls 454 of cargo box 450. In this way, fasteners 480 are not visible to the operator of vehicle 2 and do not interfere with the functionality of rails 470.

In one embodiment, tailgate 456 may have an expandable configuration, as shown in FIGS. 80-85. Illustratively, tailgate 456 includes a first panel 490 pivotably coupled to a second panel 492 through a hinge 494. Second panel 492 may be a blow molded component and hinge 494 may be a friction hinge. In this way, first and second panels 490, 492 are configured to rotate together or rotate relative to each other (via hinge 494) to extend the longitudinal length of tailgate 456. A retention member, illustratively a strap or cable 496, is coupled to post 476 (FIG. 78) and a portion of second panel 492 to limit the lower position of tailgate 456 and ensure that an inner surface of second panel 492 does not extend past a generally horizontal position. When tailgate 456 is rotated to the lowered position, portions of tailgate 456 are generally coplanar with floor 458 of cargo box 450.

Figure 81:
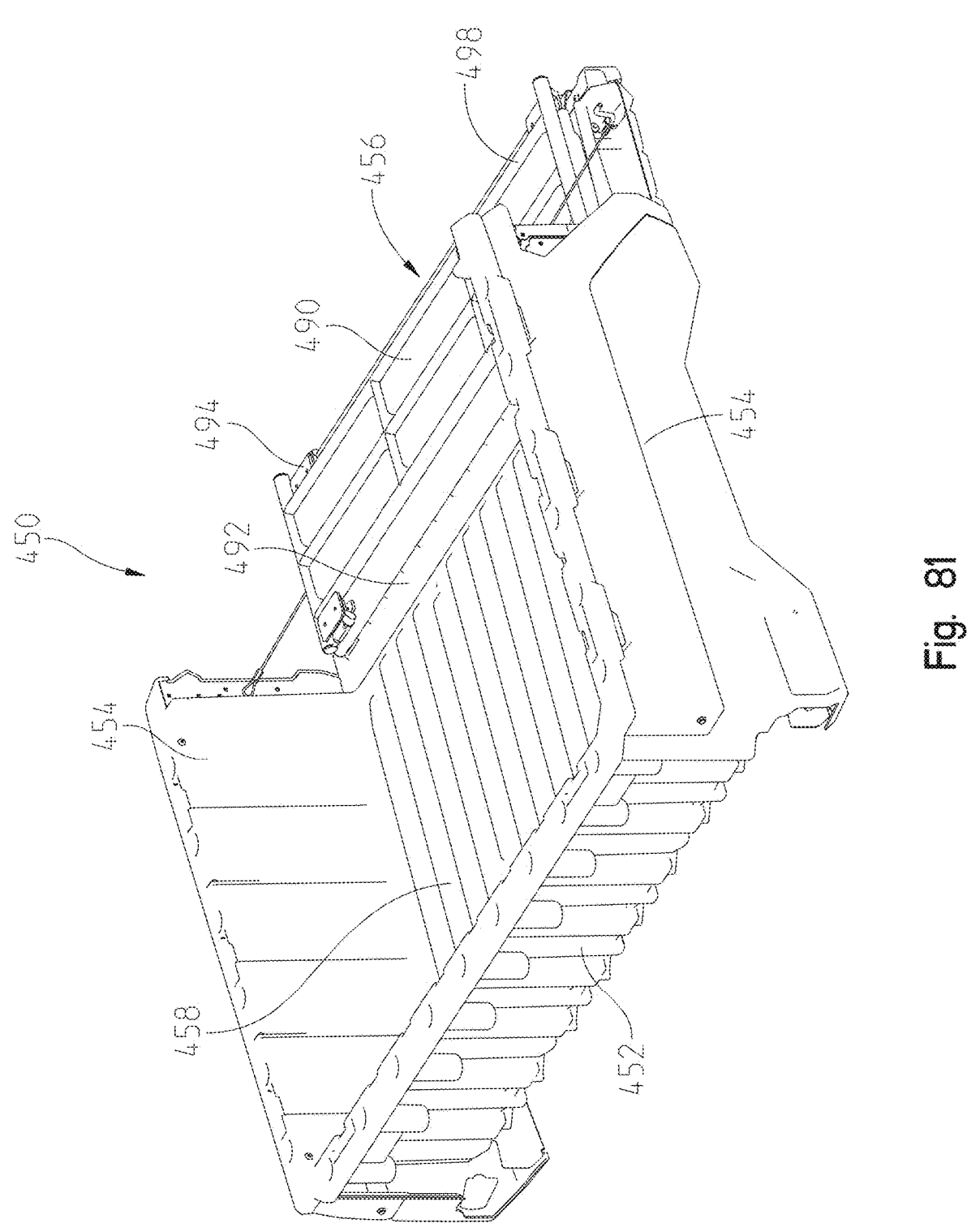
FIG. 81 is a front left perspective view of the cargo box of FIG. 77 with a tailgate in a second position.
Figure 82:
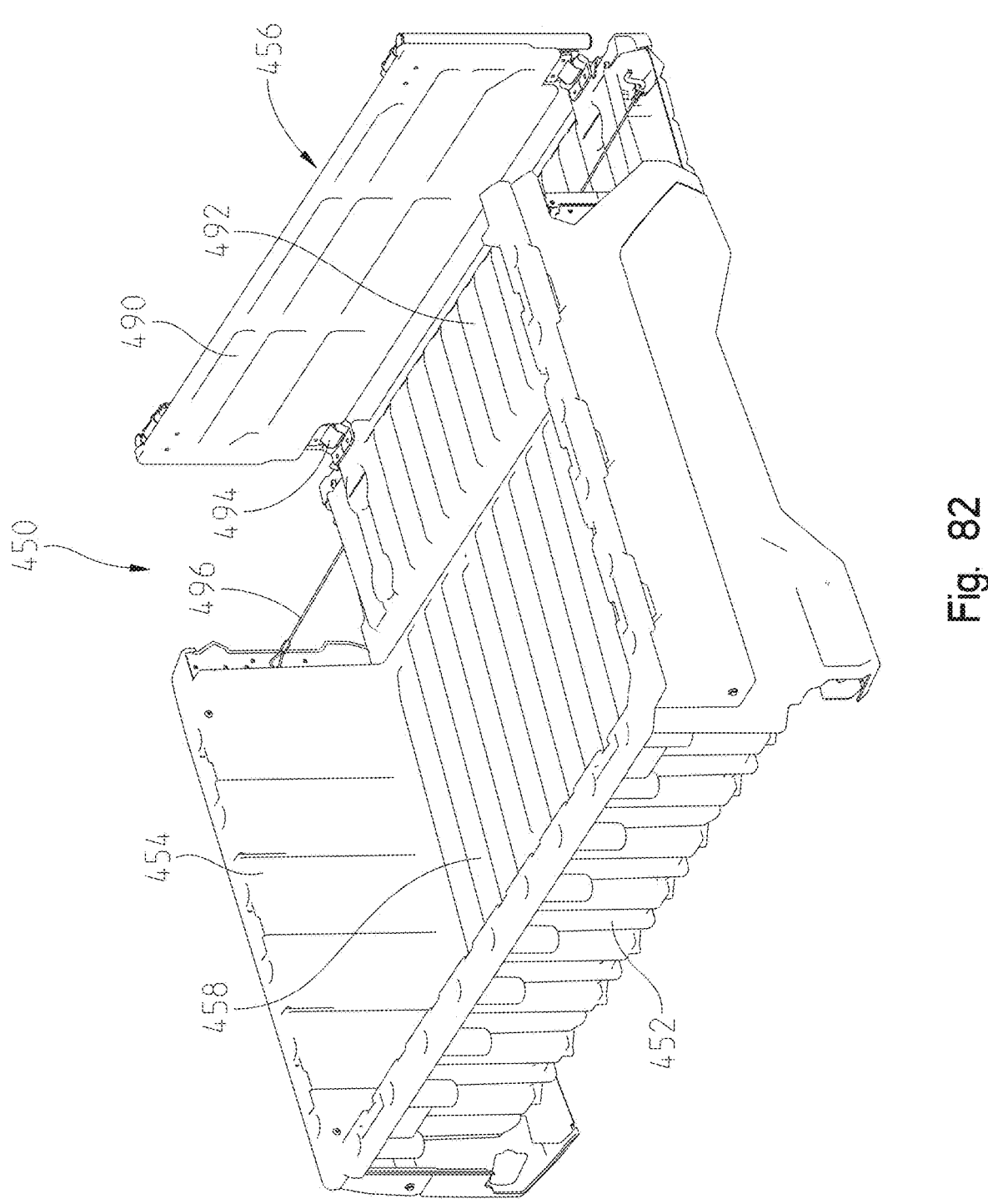
FIG. 82 is a front left perspective view of the cargo box of FIG. 77 with a tailgate in a third position.
Figure 83:
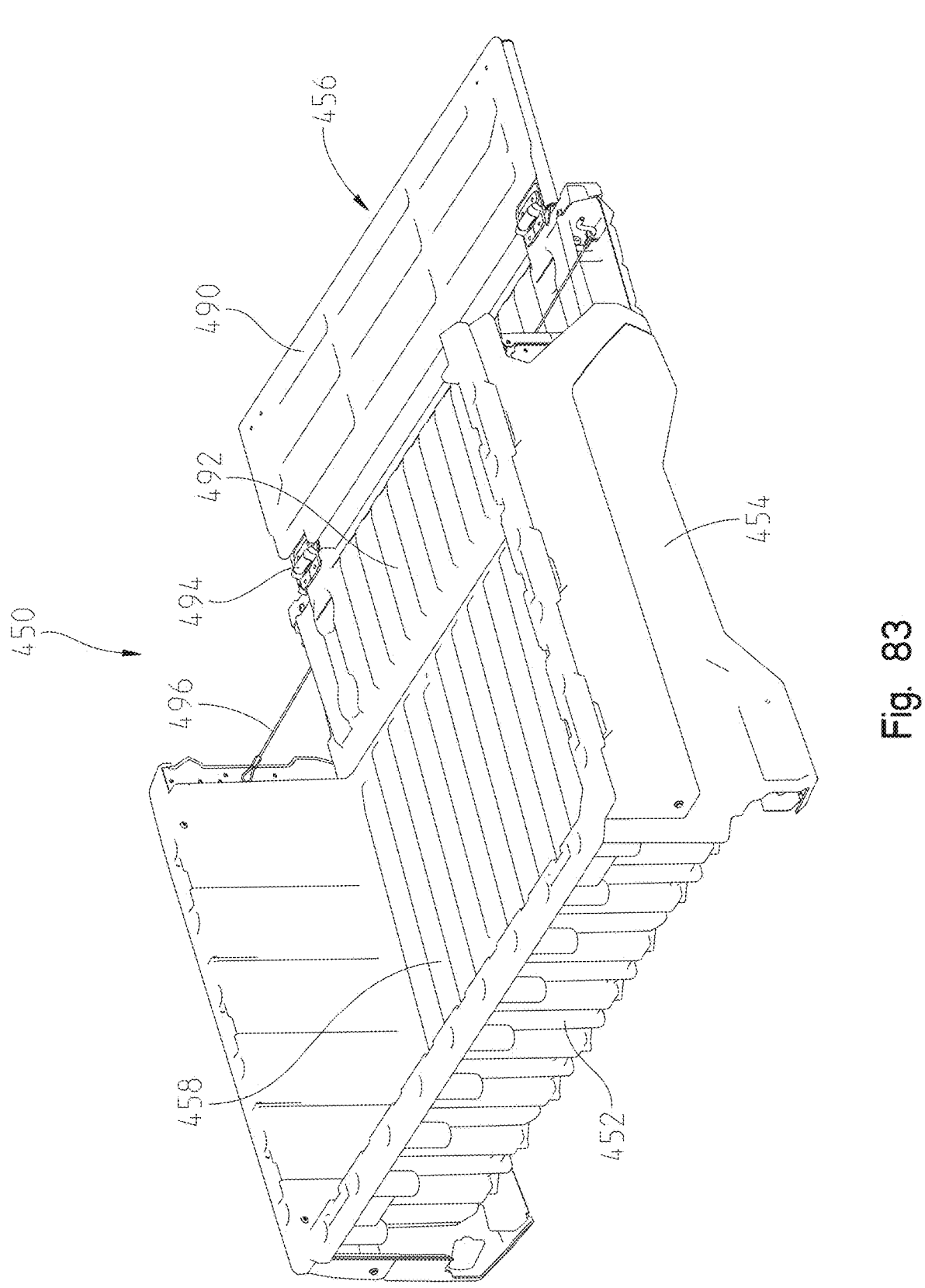
FIG. 83 is a front left perspective view of the cargo box of FIG. 77 with a tailgate in a fourth position.
Figure 84:
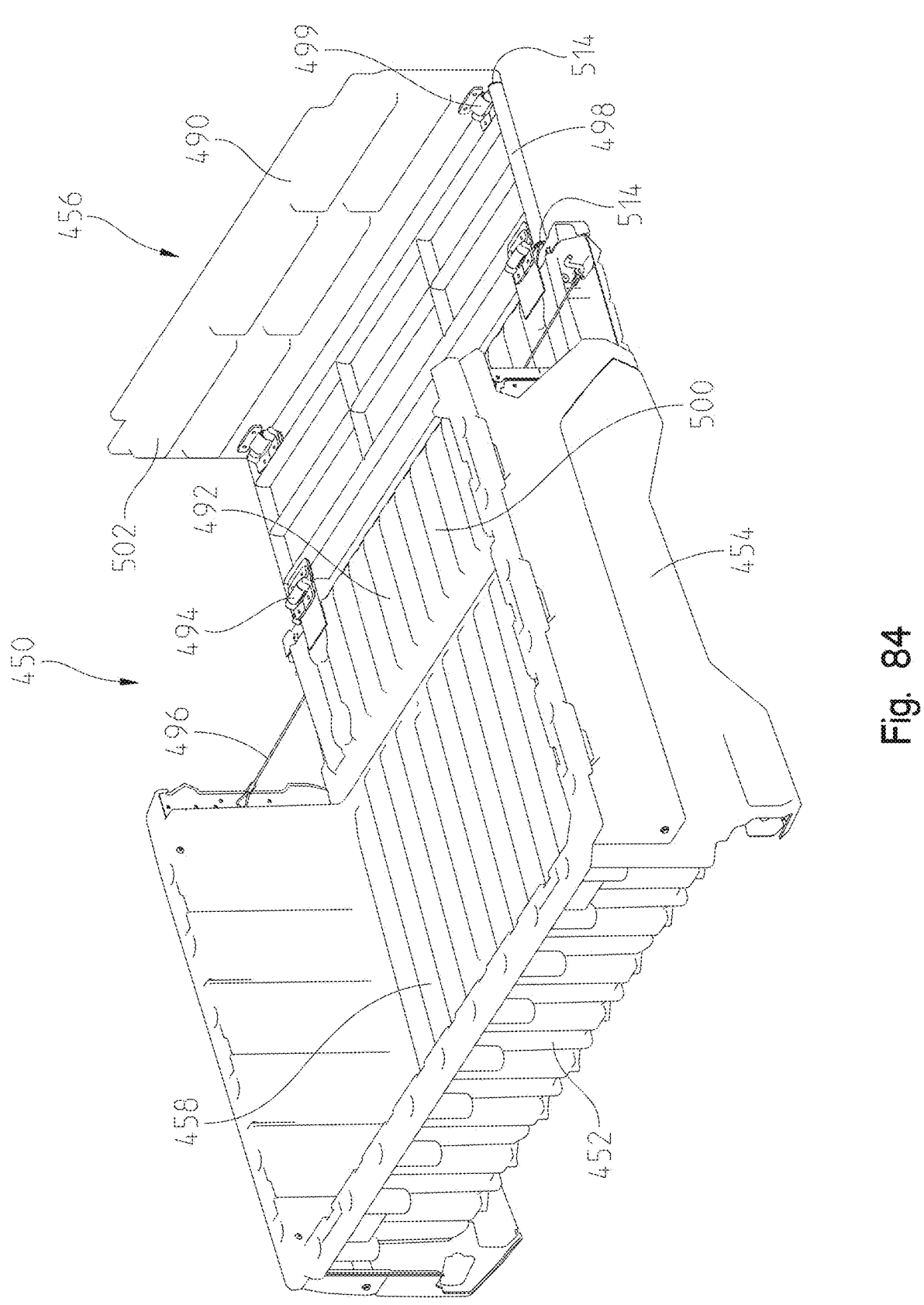
FIG. 84 is a front left perspective view of the cargo box of FIG. 77 with a tailgate in a fifth position.

As shown in FIG. 81, when tailgate 456 is moved from the latched position (FIG. 80) to the lowered position (FIG. 81), first and second panels 490, 492 may rotate with each other to the lowered position. Additionally, as shown in FIG. 82, first panel 490 may rotate relative to second panel 492 such that first panel 490 is moved to a generally vertical position while second panel 492 remains in the lowered, generally horizontal position. Further, as shown in FIG. 83, first panel 490 may be rotated even further to extend longitudinally from second panel 492 such that both first and second panels 490, 492 are generally horizontal and coplanar with floor 458. As shown in FIG. 84, first panel 490 may include an extension panel 498, illustratively shown as a gate, coupled to second panel through hinge 494. Additional hinges 499 may be used to allow first panel 490 to rotate relative to panel 498. Hinges 499 may be friction hinges. Hinges 494, hinges 499, or both may be friction hinges. Friction hinges may be configured to reduce movement of one or more portions of tailgate 456 (e.g., first panel 490, second panel 492, or extension panel 498) when the vehicle is in motion. As shown in FIG. 84, extension panel 498 may be rotated to a position longitudinally rearward of and coplanar with second panel 492 while first panel 490 extends approximately vertically relative to extension panel 498 and second panel 492.

Figure 85:
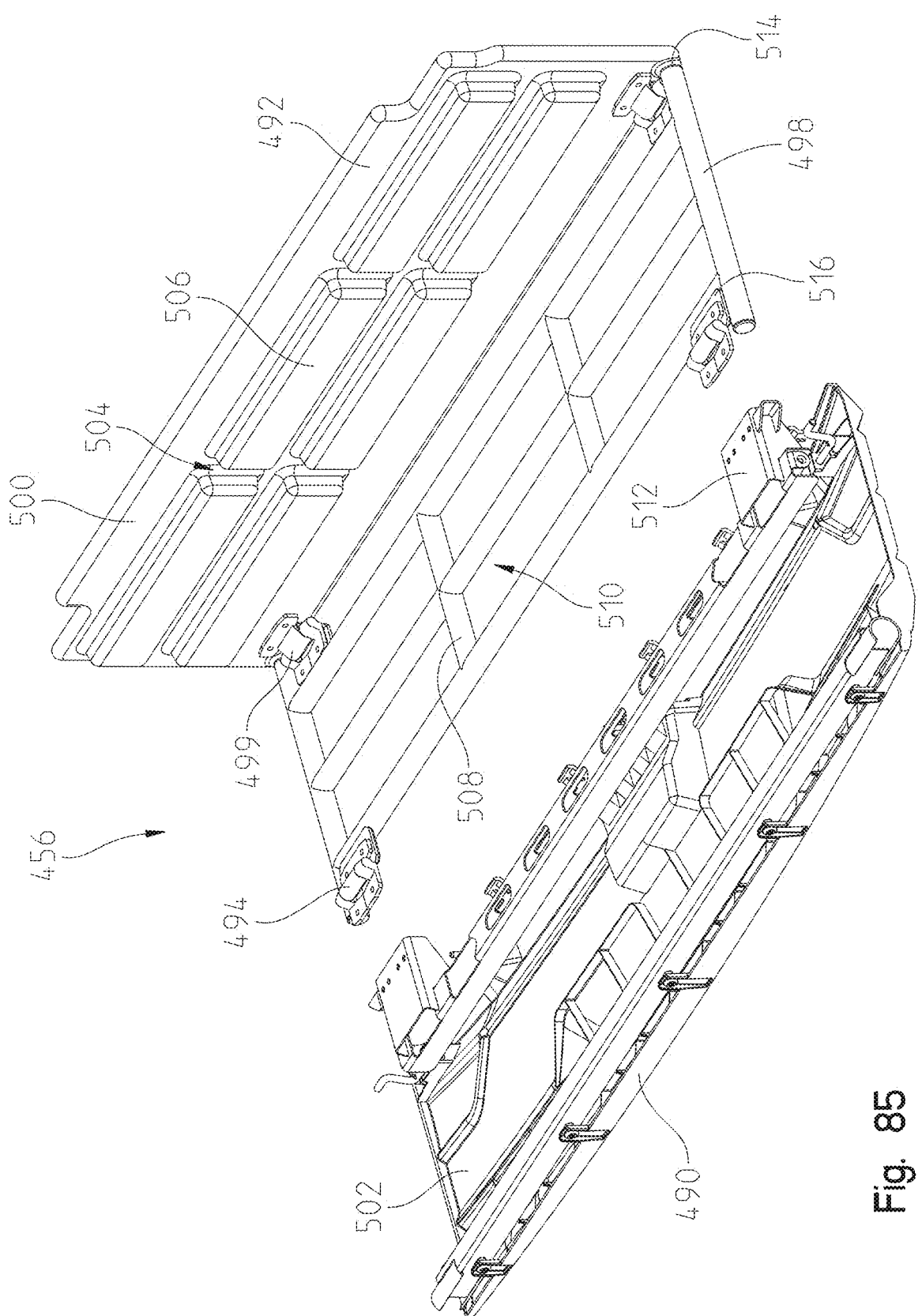
FIG. 85 is an exploded view of the tailgate of FIG. 77.

As shown in FIG. 85, it may be appreciated that an inner surface 500 of second panel 492 and/or an inner surface 502 of first panel 490 may be configured to receive extension panel 498 such that extension panel 498 nests within and between first and second panels 490, 492 to minimize the longitudinal depth of tailgate 456. More particularly, inner surface 500 of second panel 492 may include a plurality of protrusions 506 spaced apart by a plurality of grooves 504, where grooves 504 are configured to receive a frame 508 of extension panel 498 and protrusions 506 are received within openings 510 defined by frame 508. In this way, extension panel 498 nests against inner surface 500 of second panel 492, thereby decreasing the longitudinal depth or dimension of tailgate 456 to maintain maximum cargo capacity in cargo box 450. Additionally, frame 508 may be comprised of aluminum, an aluminum alloy, a polymeric material, or combination thereof, thereby reducing the weight of the extended tailgate 456.

Hinges 494 are used to rotatably couple extension panel 498 to first panel 490 through bracket covers 512 on first panel 490. Hinges 494 may be welded to brackets 516 on frame 508. Additionally, various frame members of frame 508 of extension panel 498 may be coupled to first panel 490 and/or second panel 492 at a bump stop 514. Bump stops 514 prevent extension panel 498 from pivoting beyond its range.

In some examples, cargo box 450 and/or tailgate 456 may include one or more supports that are configured to reduce or prevent vertical movement tailgate 456 when in the extended configuration. For example, the one or more supports may include a hinged connected to cargo box 450. When in a folded configuration, the one or more supports may be substantially flush with a sidewall of cargo box 450. When in an extended configuration, the one or more supports may extend from the hinged connection on the cargo box over at least a portion of tailgate 456 (e.g., at least a portion of second panel 492). In some examples, the one or more supports may engage a portion of the tailgate 456 to removable lock in place the one or more supports. In this way, when in the extended configuration, the one or more supports may reduce or prevent vertical movement tailgate 456 during operation of the vehicle.

The ability to increase the longitudinal length of cargo box 450 with panels 490, 492, 498 of tailgate 456 allows for increased cargo space along floor 458. For example, in an extended configuration, tailgate 456 may add between about 25 inches and about 30 inches to a total length of cargo box 450. In this way, the total length of cargo box 450 may be within a range from about 60 inches to about 70 inches. In one embodiment, the total longitudinal length of cargo box 450 may be approximately 64 inches. Additionally, it is not necessary to use tools when folding and unfolding extension panel 498 such that this operation is toolless.

Figure 86:
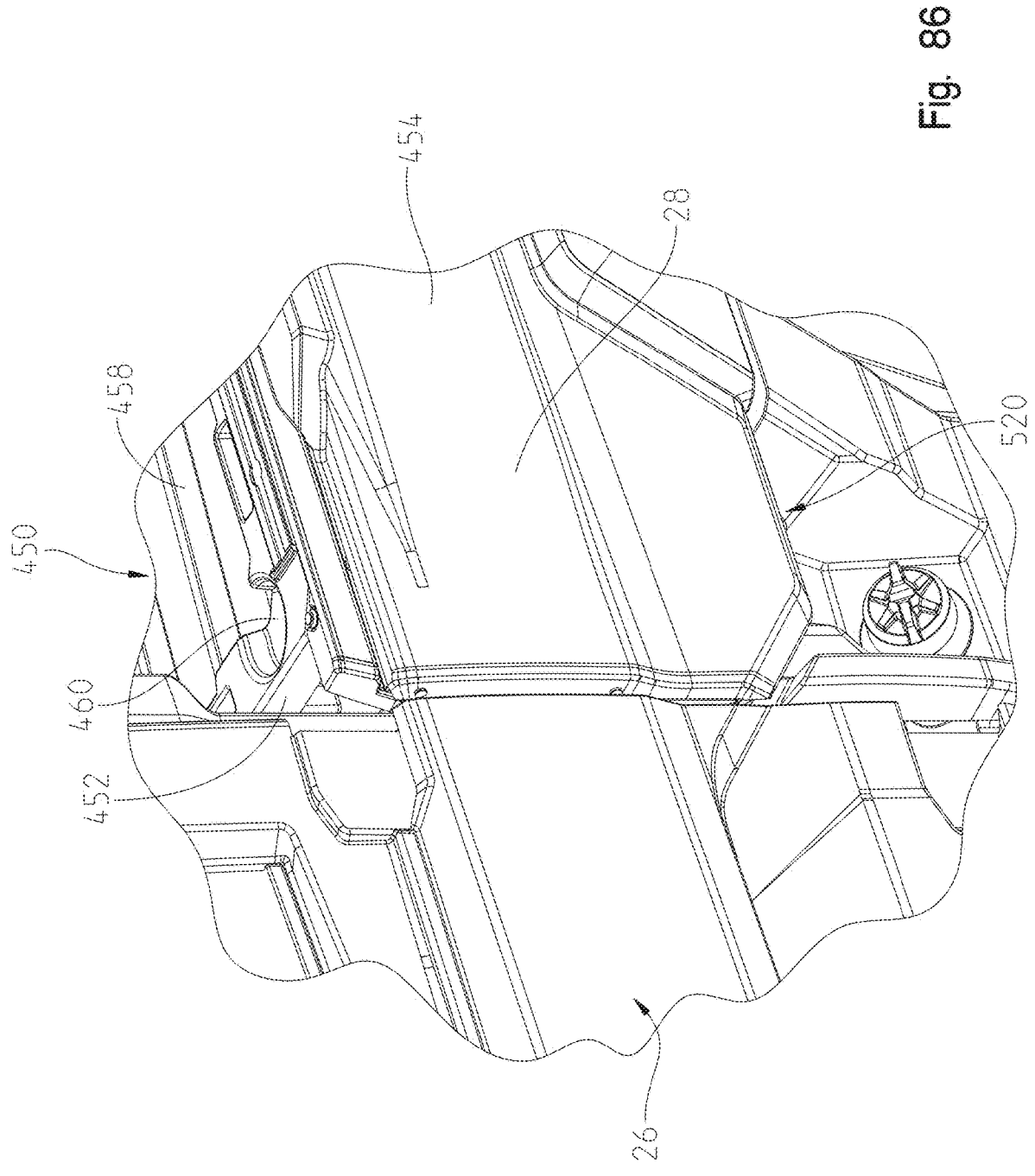
FIG. 86 is a front perspective view of the cargo box of FIG. 77 and showing a location for a tip handle of the cargo box.
Figure 87:
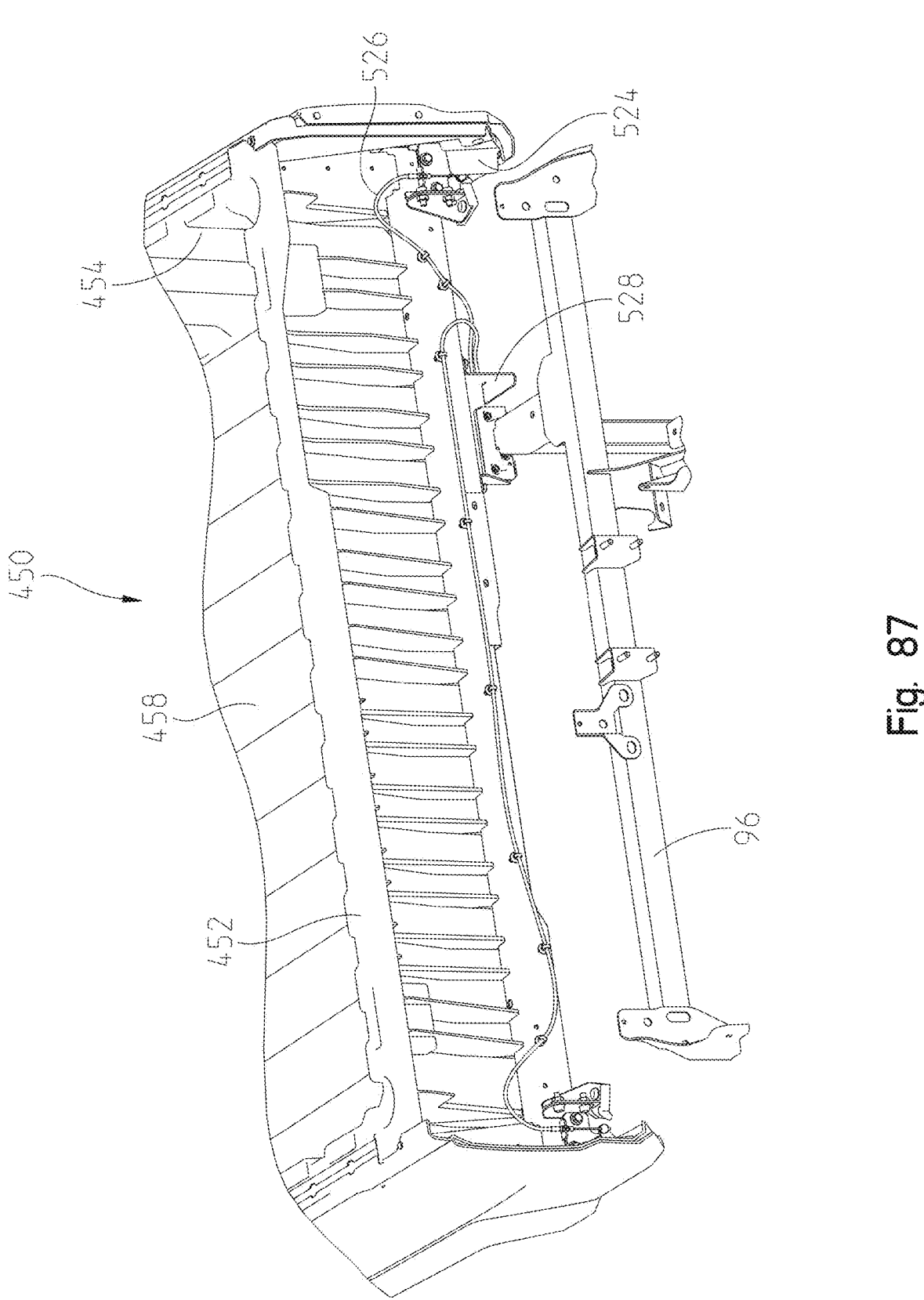
FIG. 87 is an exploded view of the cargo box of FIG. 77 and a portion of the lower frame assembly of FIG. 8A, showing a release mechanism for the cargo box.
Figure 88:
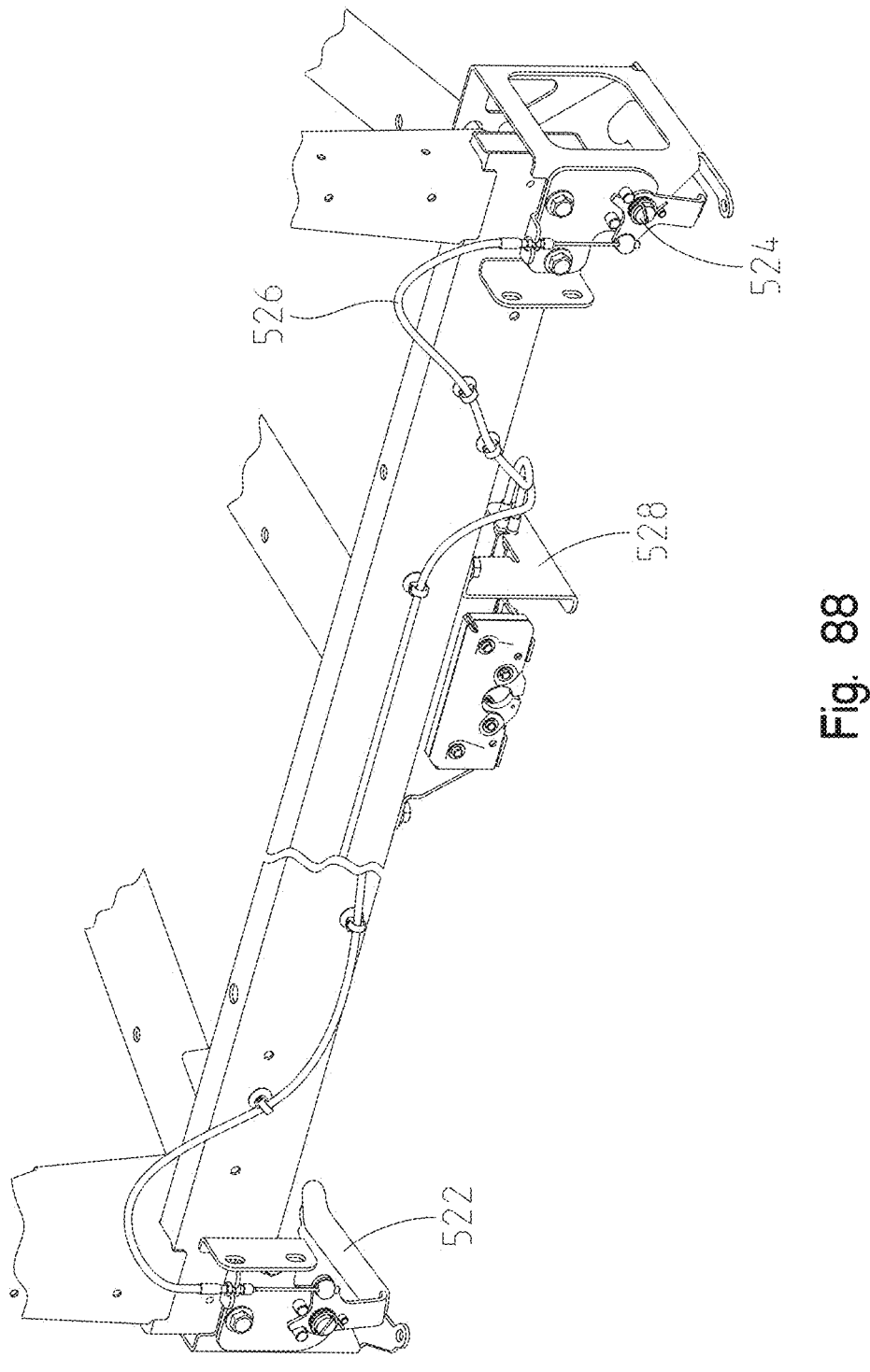
FIG. 88 is a perspective view of the release mechanism of FIG. 87.

As shown in FIGS. 86-88, cargo box 450 is configured to tilt rearwardly and downwardly to allow contents therein to be dumped from cargo box 450. In this way, cargo box 450 has a first position in which floor 458 is generally horizontal and a second position in which floor 458 is angled relative to horizontal. To tilt cargo box 450, a mechanical or electronic actuator may be used. For example, a mechanical tip handle 522 may be used, such as a manual lift actuator or release handle. Tip handle 522 is not shown in FIG. 86 because it is hidden by a body panel (at least in a side view of vehicle 2), such as panels at side walls 454 and/or rear fender 28, however, tip handle 522 is generally positioned at location 520. Rear fender 28 and/or any other body panel used to conceal tip handle 522 also may cover an oil filter and dipstick for the engine of vehicle 2. Tip handle 522 may be actuated by reaching under the body panel at location 520.

To conceal tip handle 522 at location 520, forward wall 452 of carbo box 450 may support and conceal the tilt mechanism and tip handle 522. Specifically, forward wall 452 may support and conceal at least one release mechanism 524, such as a rotary latch, and a cable 526 extending between release mechanism 524 and tip handle 522. Cable 526 is operably coupled to tip handle 522 and may apply hydraulic or electric actuation to release mechanism 524 in response to actuation of tip handle 522. When carbo box 450 is in the first or untilted position, release mechanism 524 may have a first position in which release mechanism 524 is in contact with a portion of cargo box 450. However, when cargo box 450 is in the second or tilted position, release mechanism 524 may have a second position in which release mechanism 524 is spaced apart from the portion of cargo box 450. Release mechanism 524 may be concealed by at least forward wall 452 in both the first and second positions. A tilt platform 528 may be supported on at least cross-member 96 of lower frame assembly 10 and may be at least partially concealed by forward wall 452. In embodiments, release mechanism 524 is coupled to the cargo box 450, and in the second or tilted position, release mechanism 524 may remain coupled to the cargo box 450 and is spaced apart from cross-member 96.

Figure 119:
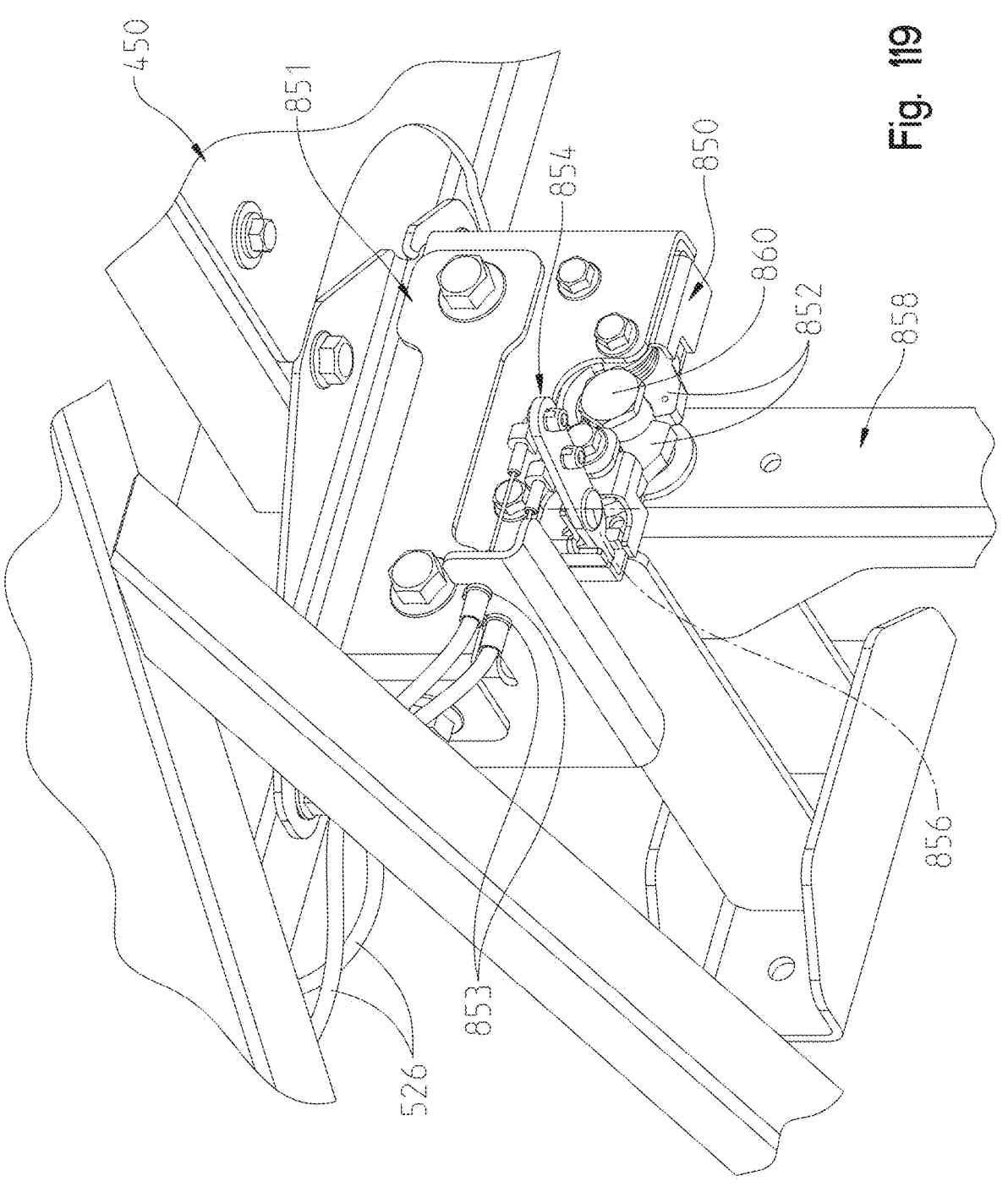
Figure 120:
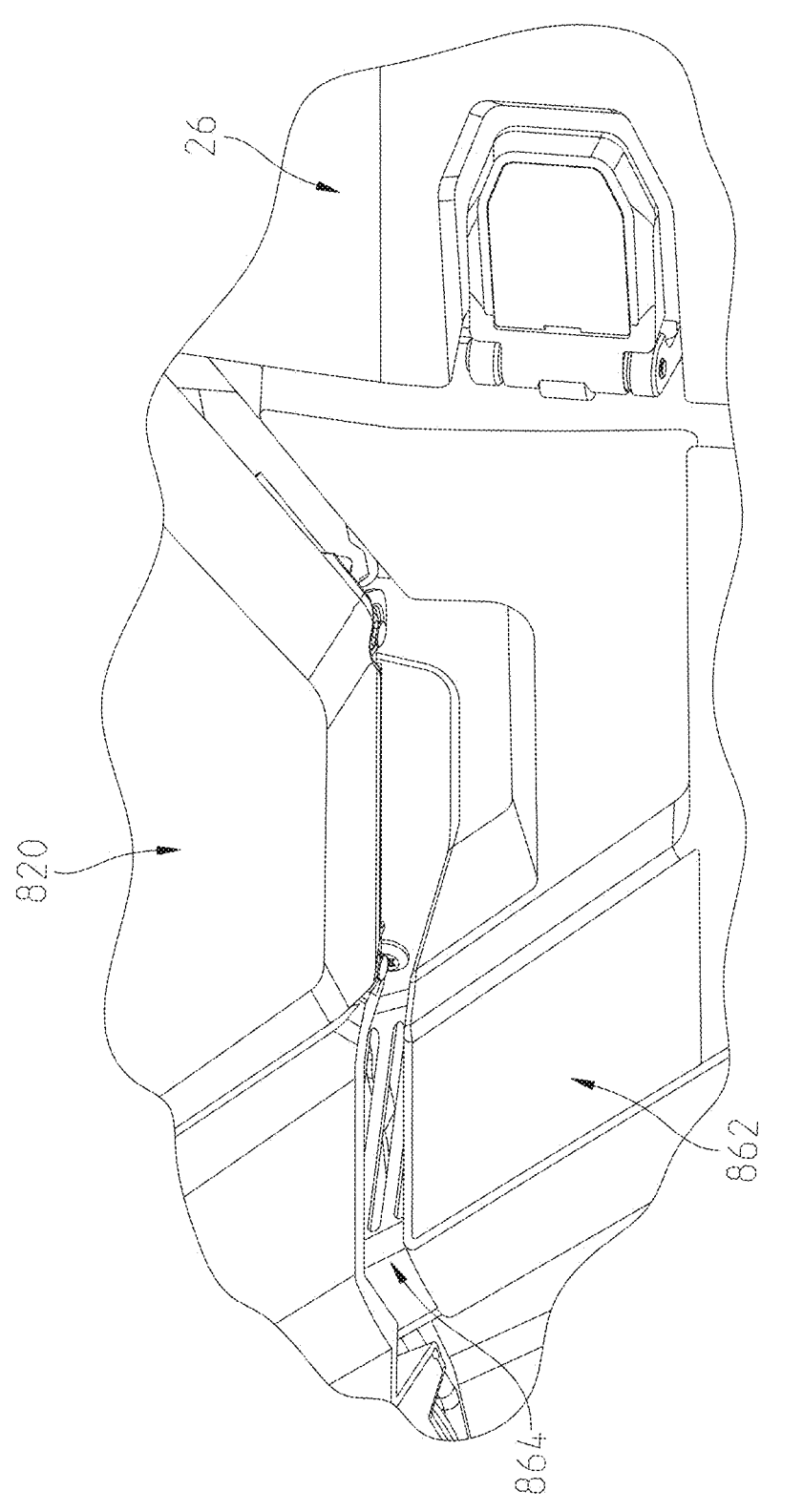

Referring to FIG. 119, lower frame assembly 10 includes a frame member 858 which supports a striker, or bumper 860. Cargo box 450 supports a frame support 851 which defines a pair of notches 853 configured to support each of cables 526. A latching mechanism 850 is coupled to frame support 851. Latching mechanism 850 comprises a pair of latch arms 852 configured to move between an engaged position surrounding striker 860 (FIG. 119). A lever arm 854 is rotatably coupled to latching mechanism 850 about a rotational axis 856. Each of cables 526 are coupled to lever arm 854 and configured to move the lever arm about rotational axis 856. In embodiments, a rotation of lever arm 854 about rotational axis 856 is configured to disengage latch arms 852 and allow cargo box 450 to move relative to striker 860. In embodiments, latching mechanism 850 is a single-stage rotary latch, and an actuation of release mechanism 524 actuates latching mechanism 850 from the engaged position to the disengaged position to allow cargo box 450 to move. In embodiments, when cargo box 450 is moved downwardly, latching mechanism 850 contacts striker 860 and automatically re-engages latching mechanism 850 and lock cargo box 450 in place.

Figure 89:
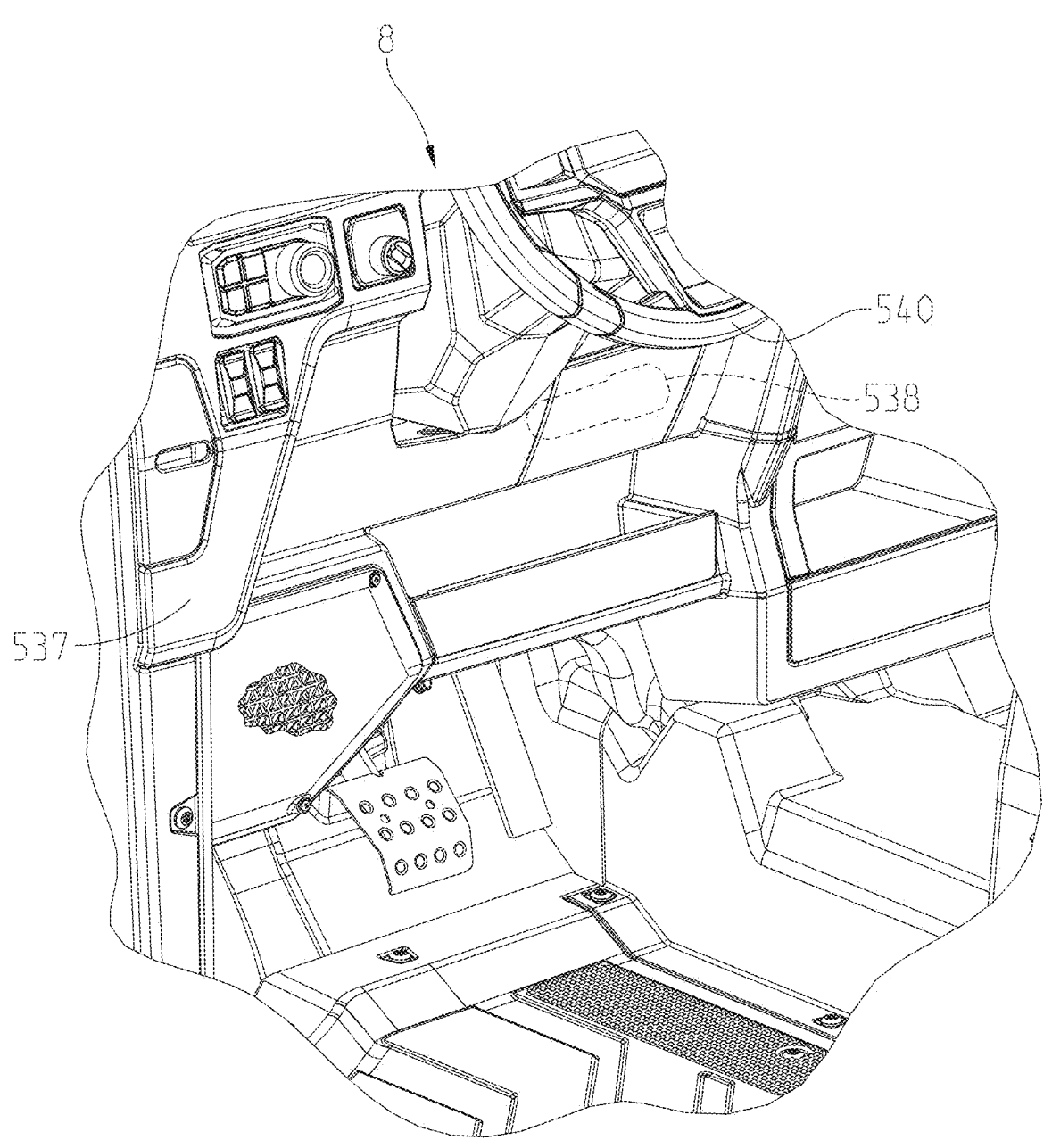
FIG. 89 is a rear left perspective view of the operator area of the utility vehicle of FIG. 1 and showing an actuator for a transmission disconnect.
Figure 90:
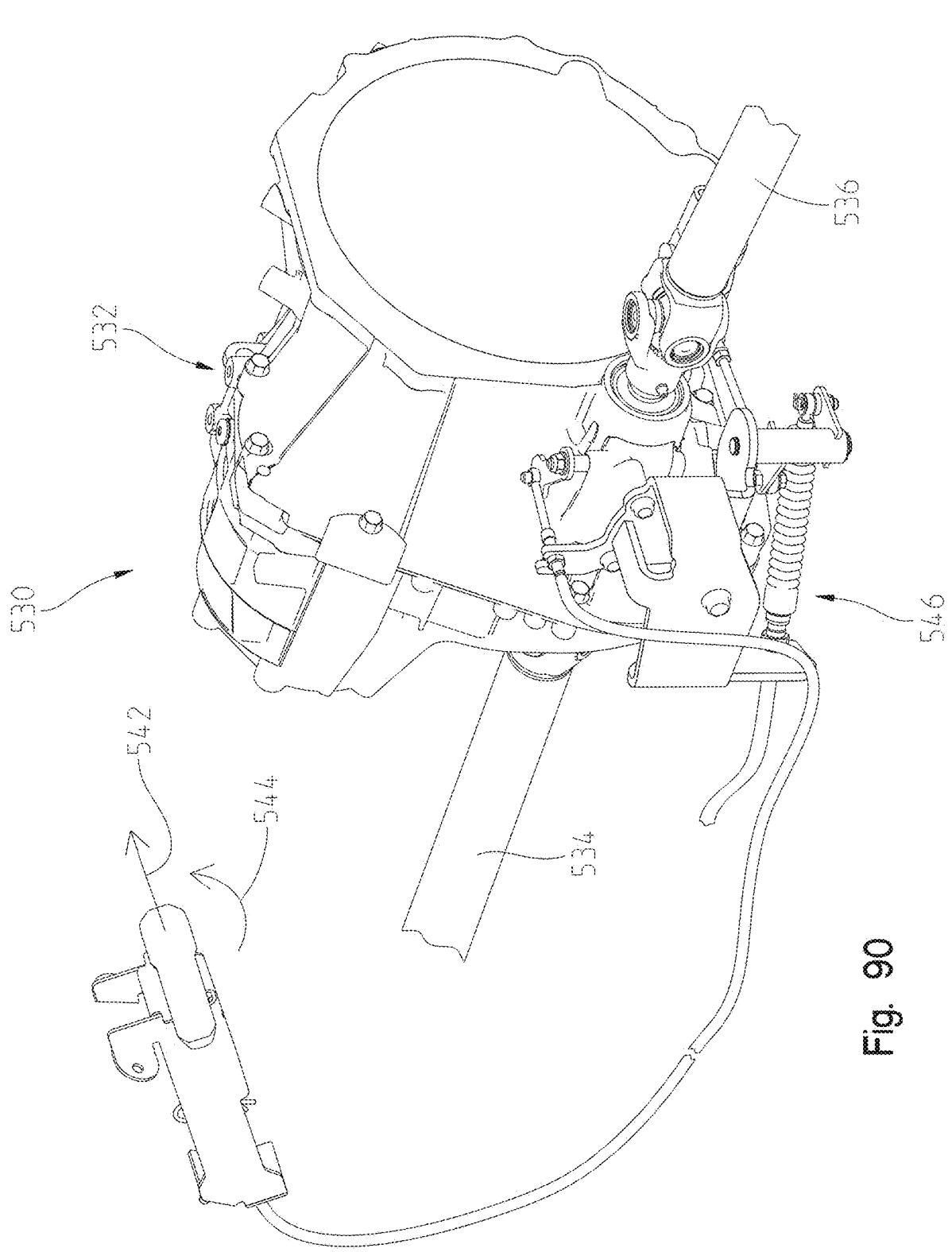
FIG. 90 is a rear left perspective view of the transmission disconnect of FIG. 89.
Figure 109:
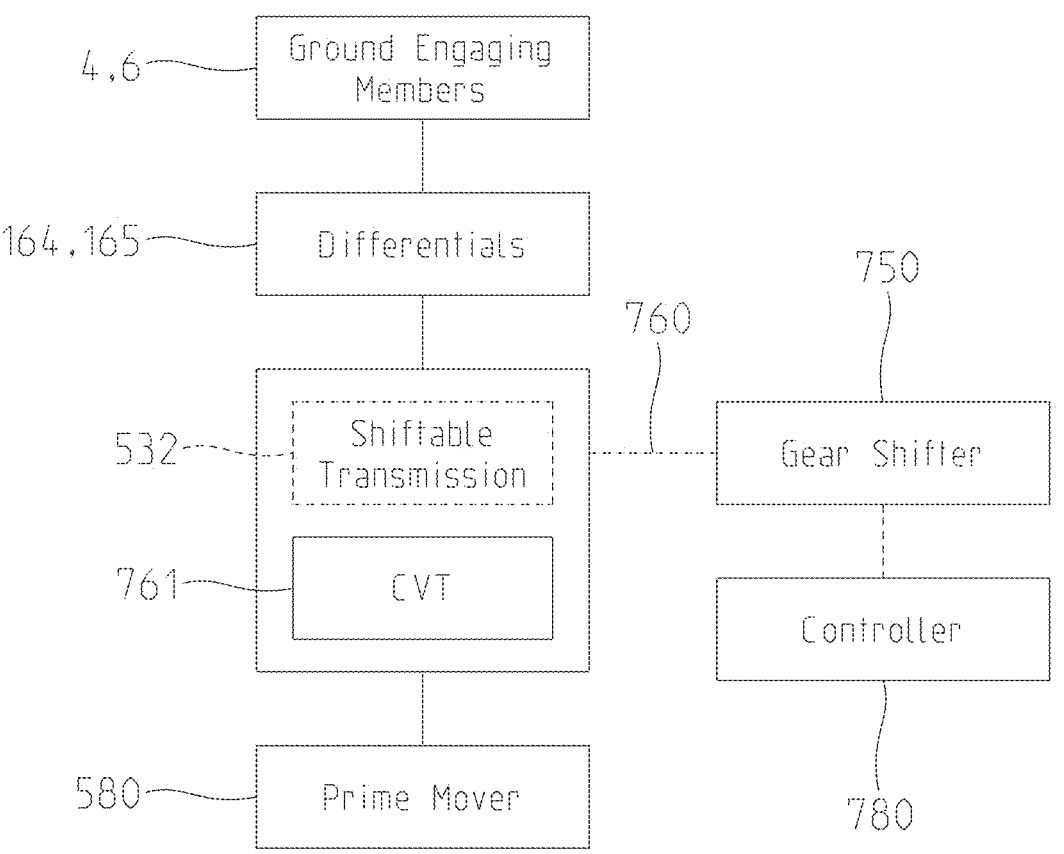
FIG. 109 is a schematic diagram of a powertrain of the present disclosure.

Referring to FIGS. 89-90, portions of the powertrain assembly of vehicle 2 may be shown generally at 530. A transmission 532 of powertrain assembly 530 is operably coupled to a front drive shaft 534, which may be operably coupled to a front differential, and a rear drive shaft 536, which may be operably coupled to rear differential 164 (FIG. 18). The front differential is operably coupled to front ground-engaging members 4 and rear differential 164 is operably coupled to rear ground-engaging members 6. Transmission 532 also is operably coupled to engine 580 (FIG. 96) of vehicle 2 and may be operably coupled to a continuously variable transmission ("CVT") 761 (FIG. 109). In one embodiment, the CVT 761 may be a steel belt CVT, the details of which are disclosed in U.S. Patent Application Ser. No. 17/147,937, filed Jan. 13, 2021, and entitled "POWERTRAIN FOR A UTILITY VEHICLE", the complete disclosure of which is expressly incorporated by reference herein. In other embodiments, the CVT 761 may an electronically-controlled CVT, the details of which are disclosed in U.S. patent application Ser. No. 17/587,486, filed Jan. 28, 2022, and entitled "ELECTRONICALLY-CONTROLLED CONTINUOUSLY VARIABLE TRANSMISSION FOR A UTILITY VEHICLE", the complete disclosure of which is expressly incorporated by reference herein. In embodiments, the CVT 761 includes a drive clutch (not shown) and a driven clutch (not shown) coupled between the prime mover and one or more of the ground engaging members 4, 6. In embodiments, the drive clutch is coupled to the engine, the driven clutch is coupled to transmission 532, and the drive clutch is operably coupled to the driven clutch by an endless member, such as a blet. In embodiments, the drive clutch has a drive clutch fixed sheave and a drive clutch movable sheave and the driven clutch has a driven clutch fixed sheave and a driven clutch movable sheave.

Transmission 532 allows vehicle 2 to operate in various drive modes, such as forward/drive, rear, high, and low. Transmission 532 also includes park. In the present embodiment, neutral is removed from the shift pattern and is separate from drive, reverse, park, and any other gears or drive modes of transmission 532. By separating neutral, transmission 532 can be decoupled from the remainder of the driveline. A disconnect feature 546 may be included which is configured as a transmission disconnect/driveline neutral feature to allow for a mechanical disconnect between transmission 532 and the remainder of powertrain assembly 530. More particularly, the sheaves of the CVT may be damaged if vehicle 2 is towed when the engine is off and, as such, disconnect feature 546 allows transmission 532 to disconnect from drive shafts 534, 536 under certain conditions (e.g., towing). A handle 538 is located on a dashboard assembly 537 within operator area 8. Given that handle 538, which actuates the transmission disconnect, is within operator area 8 and positioned generally adjacent a steering wheel 540, the operator can easily actuate the disconnect feature from operator seat 420. The operator may be required to actuate the disconnect feature in a multi-step process, such as pulling handle 538 out and rotating it to engage the disconnect feature, as shown by respective arrows 542 and 544. In embodiments, transmission 532 includes an electronic shifting mechanism configured to electronically shift between the various drive modes (e.g., park, rear, high, low, $1^{st}$, $2^{nd}$, $3^{rd}$, etc.). A controller may be configured to control the electronic shifting mechanism to automatically shift between the various drive modes. Additional details regarding electronic shifting may be found in U.S. patent application Ser. No. 14/947,737, filed Nov. 20, 2015, titled ELECTRONIC CONTROL OF A TRANSMISSION, the entire disclosure of which is expressly incorporated by reference herein.

As shown in FIG. 148, an embodiment of the powertrain assembly of vehicle 2 is shown as powertrain 1420 and may be included on vehicle 2 when vehicle 2 includes four ground-engaging members 4 and 6 (FIG. 1), six ground-engaging members 4, 6, 7 (FIG. 141), or more than six ground-engaging members. Powertrain 1420 is configured to propel one or more of a plurality of ground engaging members 4, 6, 7. In embodiments, powertrain 1420 includes a prime mover 1422 operably coupled to a transmission 1424. In embodiments, prime mover 1422 is an engine with a crankshaft (not shown) configured to extend along an engine centerline 1426. In embodiments, prime mover 1422 is an electric motor or another type of propulsion unit.

Transmission 1424 may be a shiftable transmission or a continuously variable transmission (CVT) (e.g., a rubber belt CVT, a steel belt CVT, an electronic CVT, or another CVT).

Transmission 1424 includes a first output 1428 and a second output 1430. First output 1428 is coupled to a first drive shaft 1432 and a second drive shaft 1436. First drive shaft 1432 is coupled to second drive shaft 1436 by a CV joint, or universal joint 1434. Second drive shaft 1436 is operably coupled to a front drive 1440 at a CV joint 1438. Front drive 1440 is operably coupled to each of ground engaging members 1322, 1324 by a pair of halfshafts 1456. Second output 1430 is coupled to a third drive shaft 1442. Third drive shaft 1442 is operably coupled to a second drive 1446 at a CV joint 1444. Second drive 1446 is operably coupled intermediate ground engaging members 1326, 1328 by a pair of halfshafts 1458. Second drive 1446 includes a CV joint 1448, and a fourth shaft 1450 extends from CV joint 1448 to a CV joint 1452, which is operably coupled to third drive 1454. Third drive 1454 is operably coupled between ground engaging members 1330, 1332 by a pair of halfshafts 1460.

Figure 91:
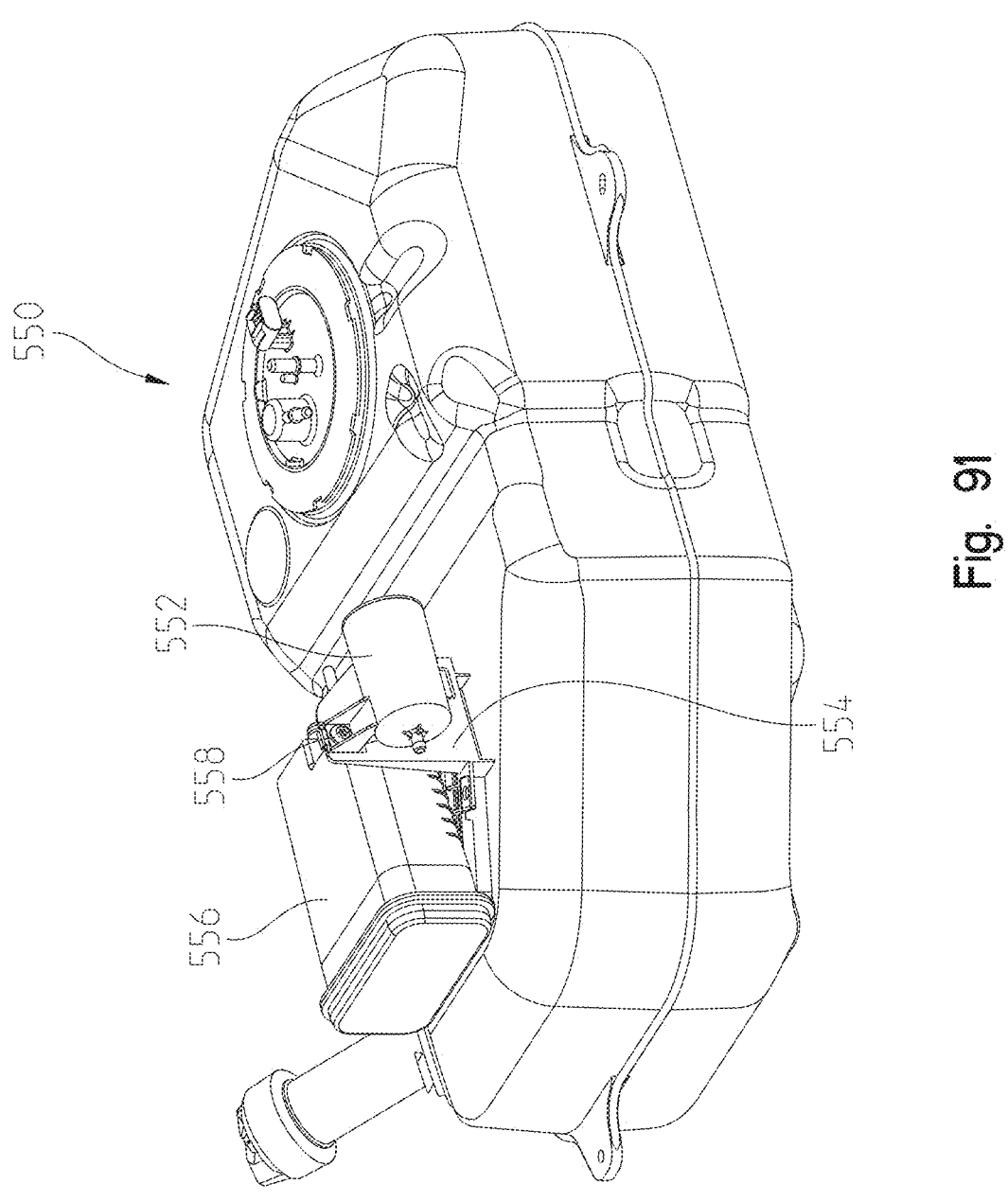
FIG. 91 is a perspective view of a fuel tank of the utility vehicle of FIG. 1.
Figure 92:
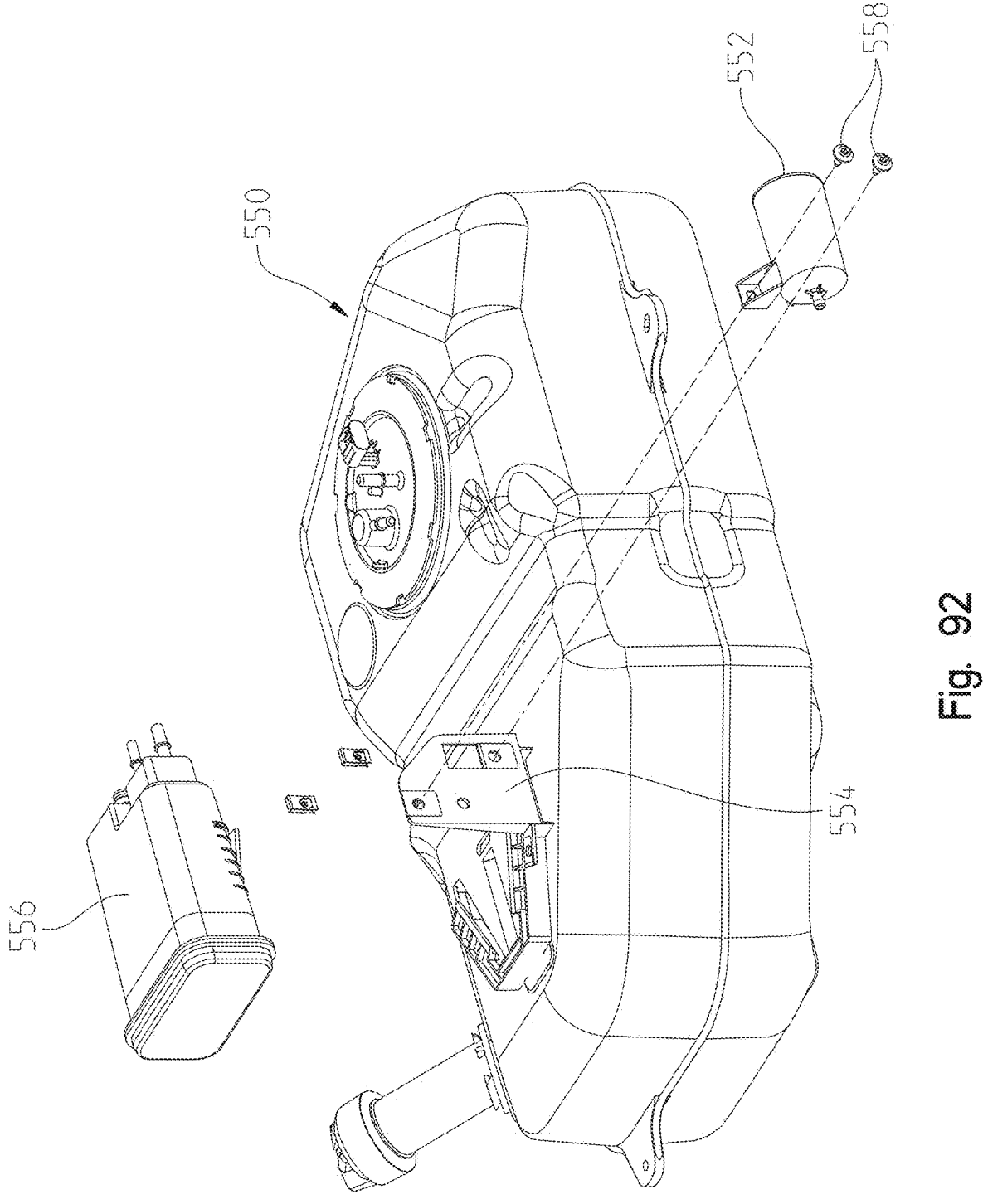
FIG. 92 is an exploded view of a canister and the fuel tank of FIG. 91.

Referring to FIGS. 91 and 92, a fuel tank 550 is provided on vehicle 2 and is fluidly coupled to the engine. Fuel tank 550 includes an evaporation canister 552 (e.g., evaporative fuel vapor canister) which is coupled to a bracket 554 supported on fuel tank 550. More particularly, bracket 554 is hot plate welded onto fuel tank 550 and canister 552 is secured to bracket 554 with fasteners 558. The location of bracket 554 allows canister 552 to be in a position above fuel tank 550 and may allow other components to be packaged or otherwise supported on vehicle 2 adjacent fuel tank 550 without interference from canister 552. By positioning canister 552 above fuel tank 550, the draining of condensation is improved. The overall configuration of canister 552 on fuel tank 550 allows the remainder of fuel tank 550 to also accommodate a fresh air filter vent 556 and, in some examples, other evaporative emissions components, such as, for example, one or more evaporation vent lines and/or solenoids, one or more purge flow sensors, one or more evaporation purge solenoids, or the like.

Figure 93:
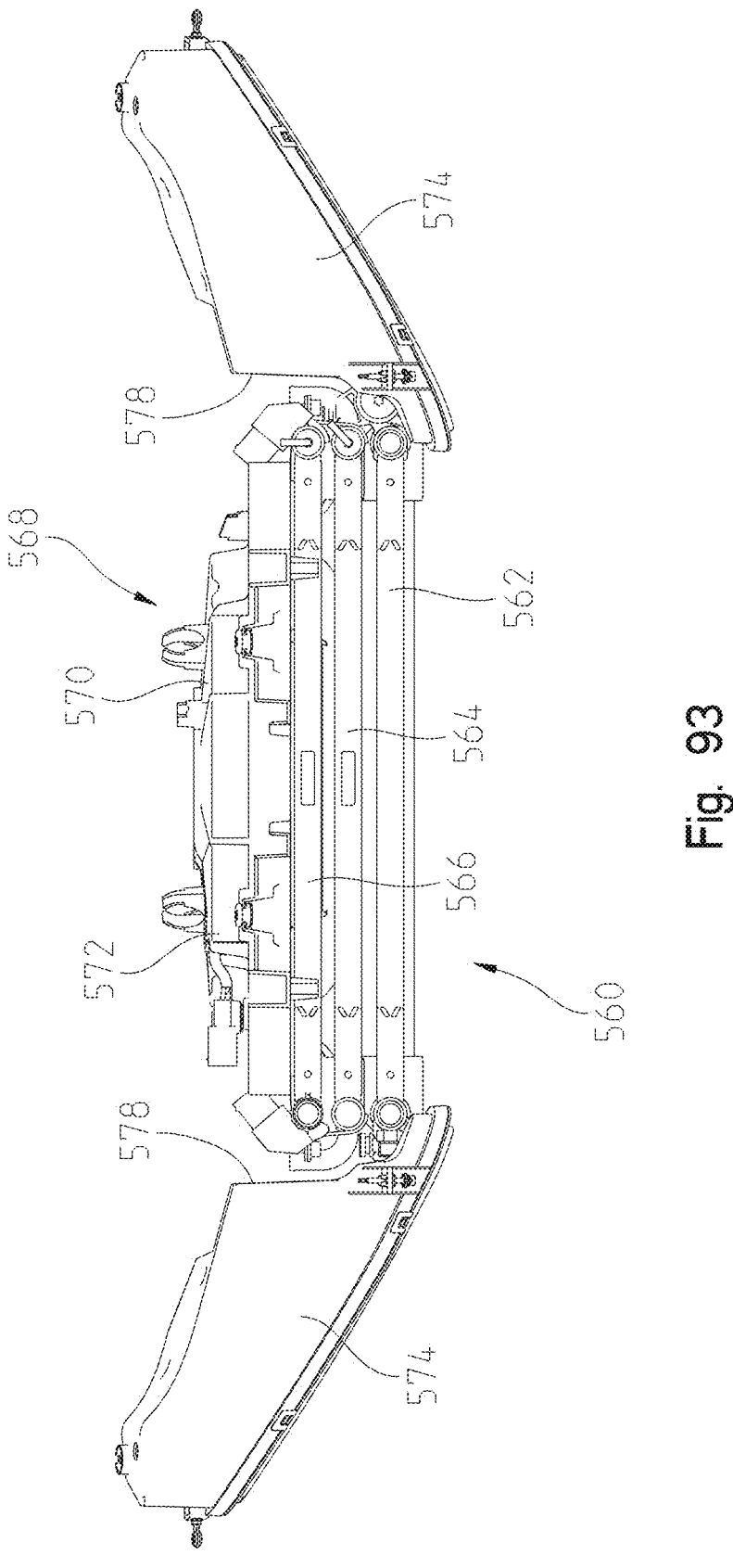
FIG. 93 is a top view of a cooling assembly for the utility vehicle of FIG. 1.
Figure 94:
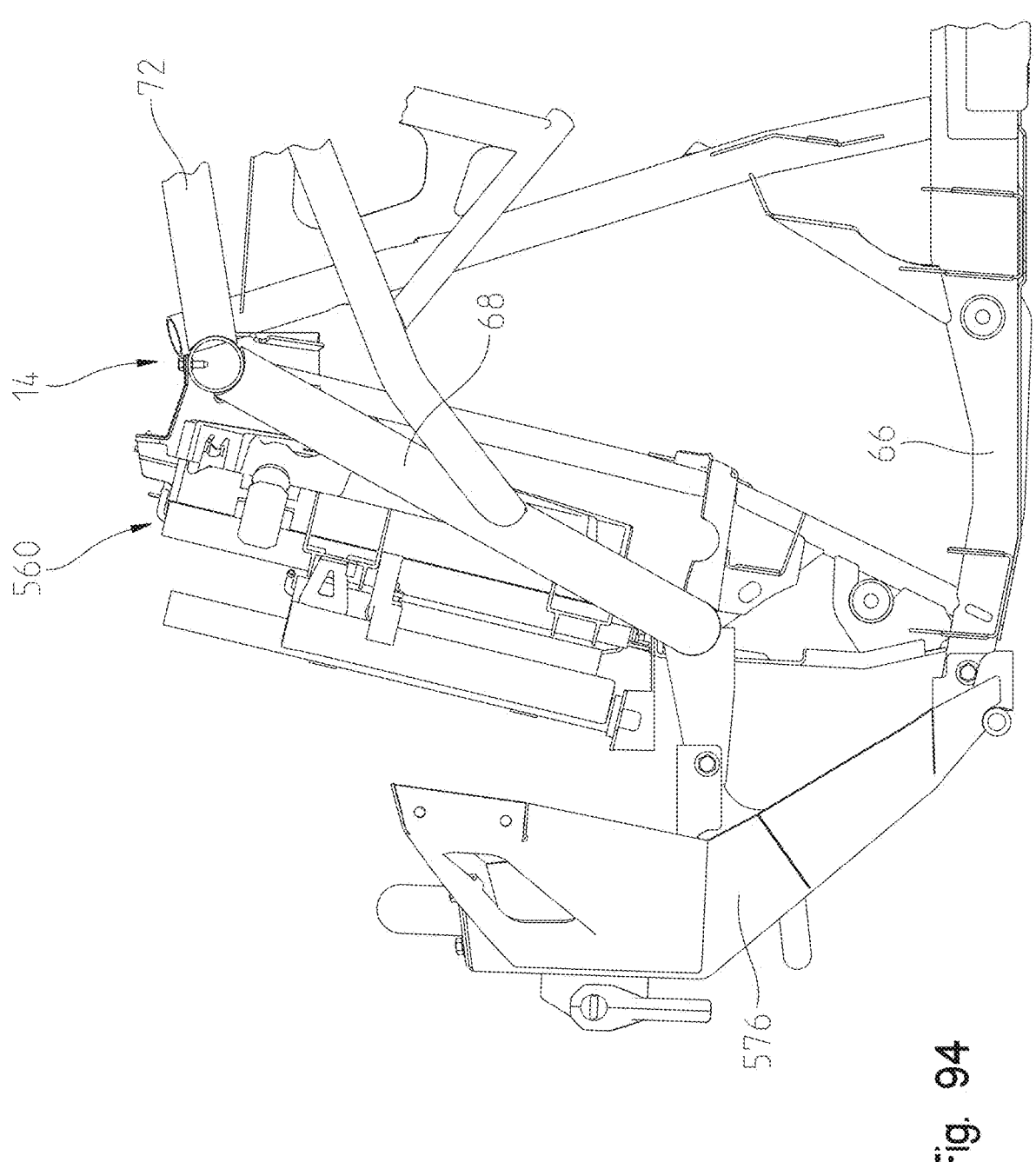
FIG. 94 is a left side view of the cooling assembly of FIG. 93.
Figure 95:
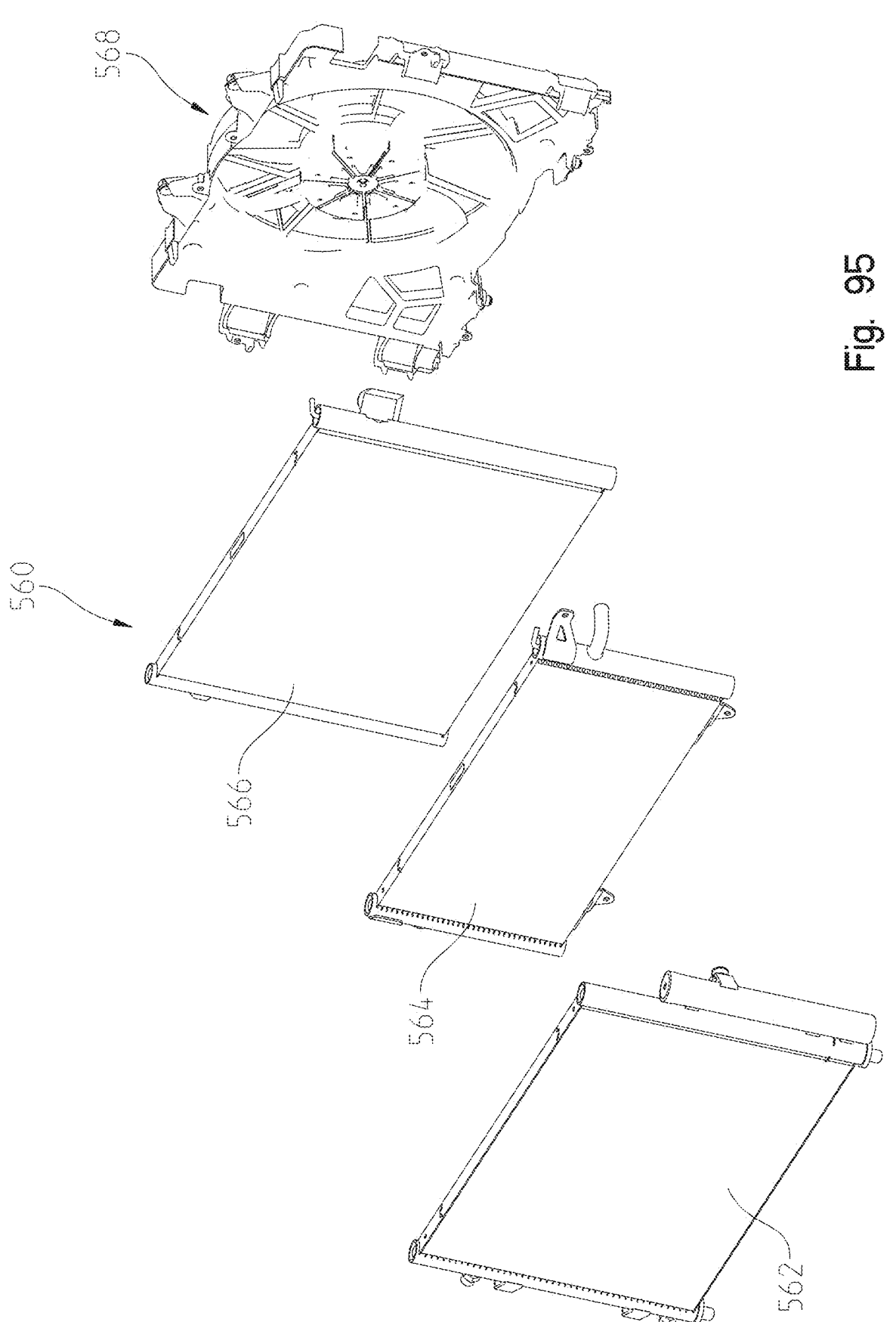
FIG. 95 is an exploded view of the cooling assembly of FIG. 93.
Figure 96:
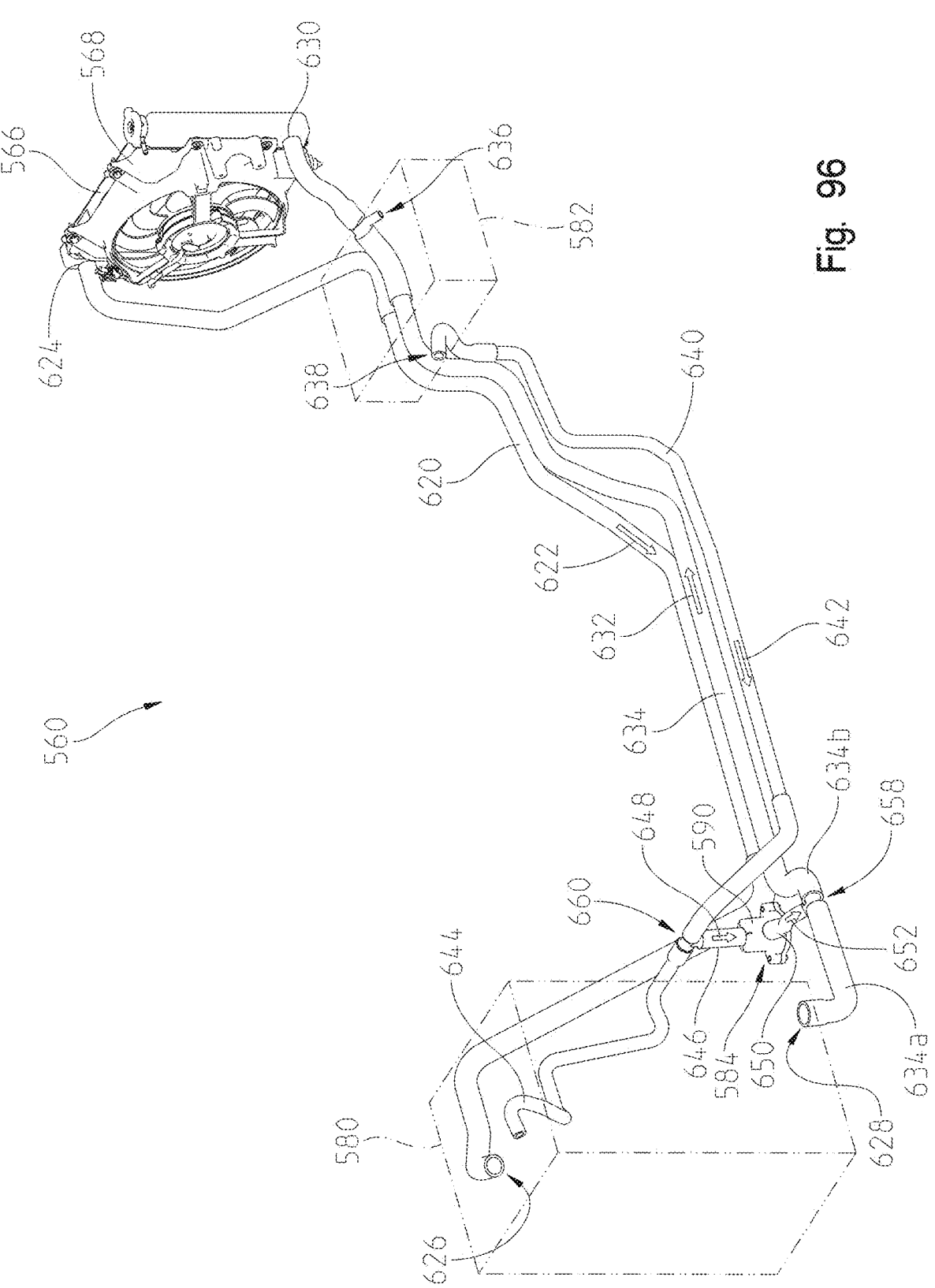
FIG. 96 is a rear right perspective view of a heater core assembly for the utility vehicle of FIG. 1.
Figure 97:
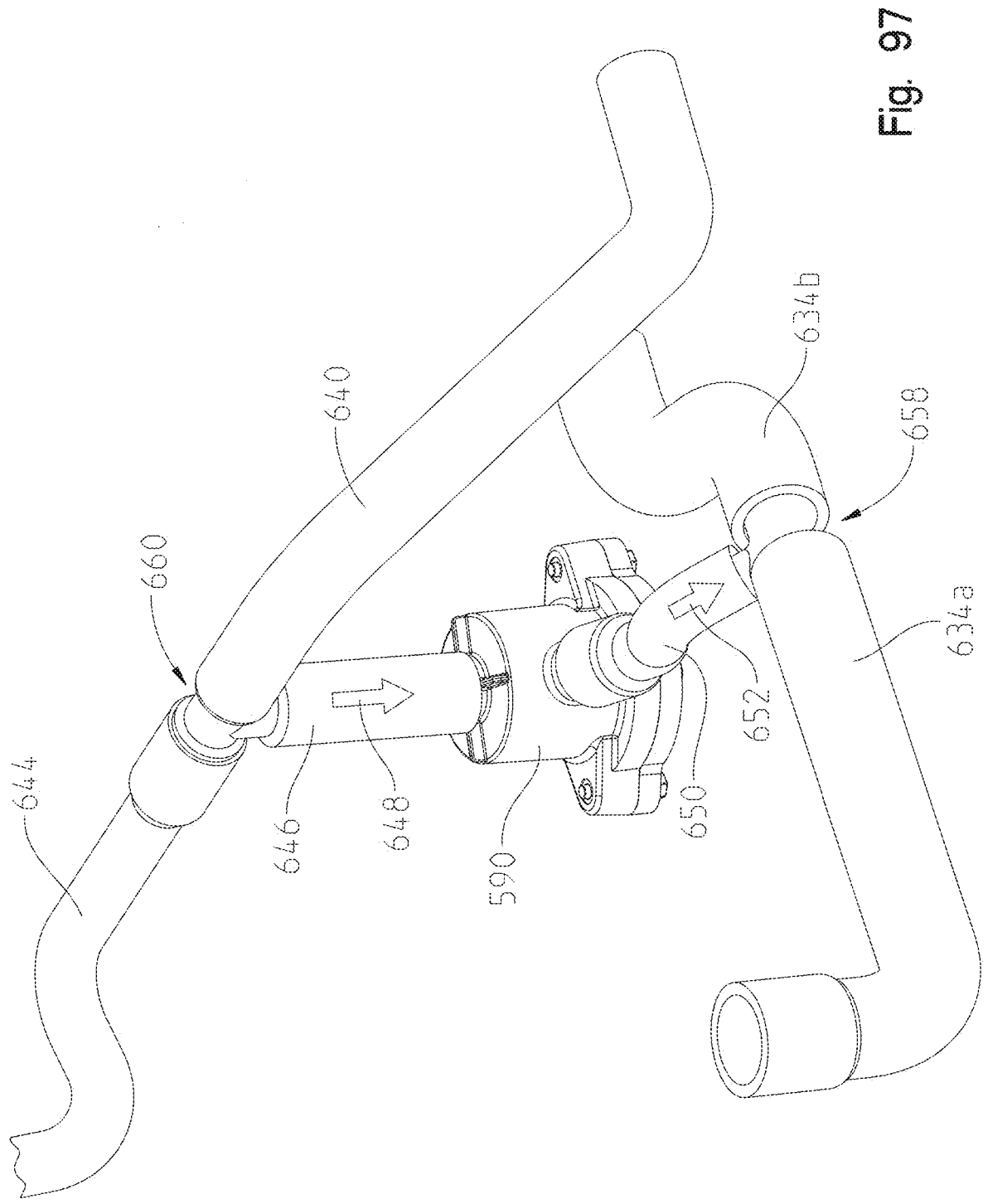
FIG. 97 is a perspective view of a bypass valve of the heater core assembly of FIG. 96.
Figure 98:
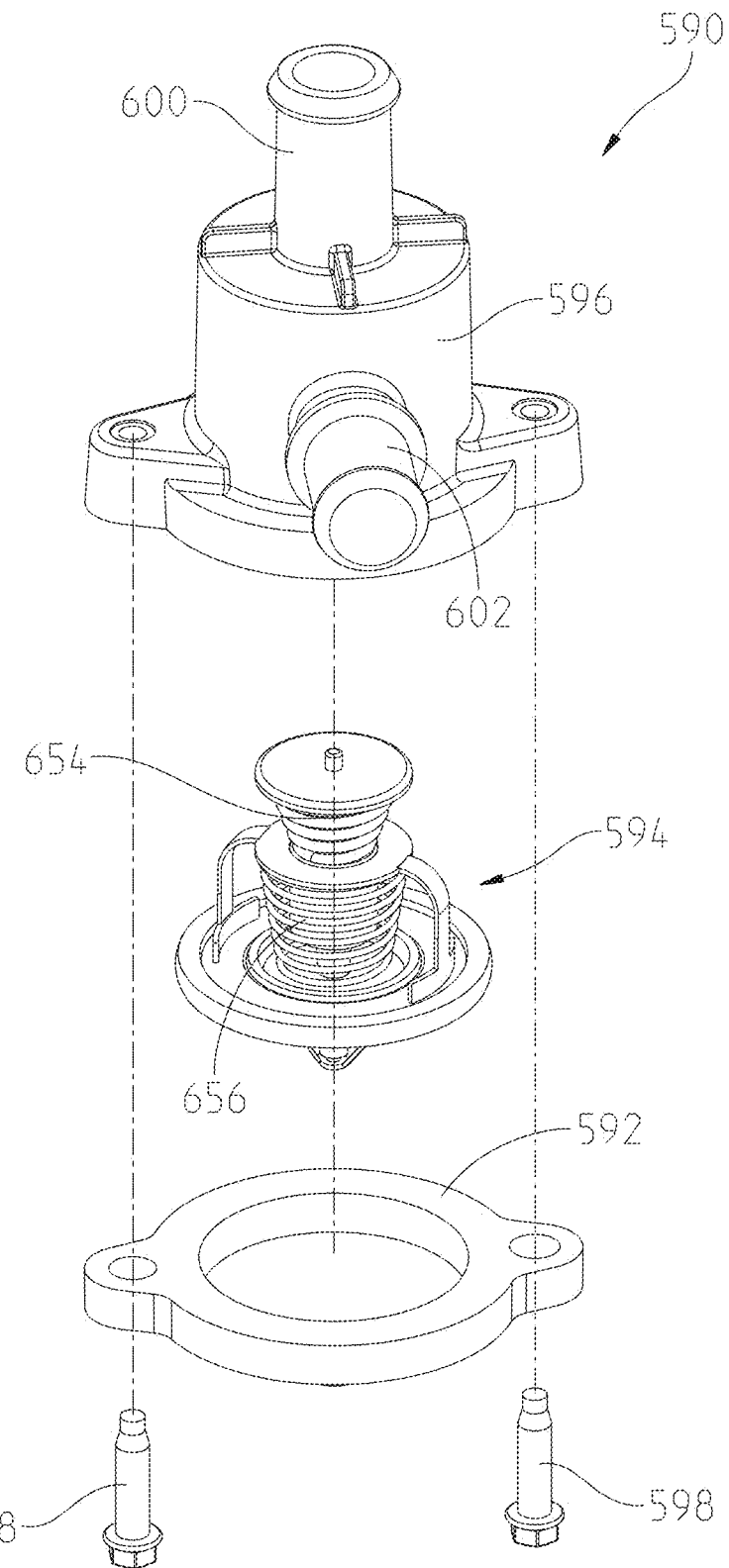
FIG. 98 is an exploded view of the bypass valve of FIG. 97.
Figure 99:
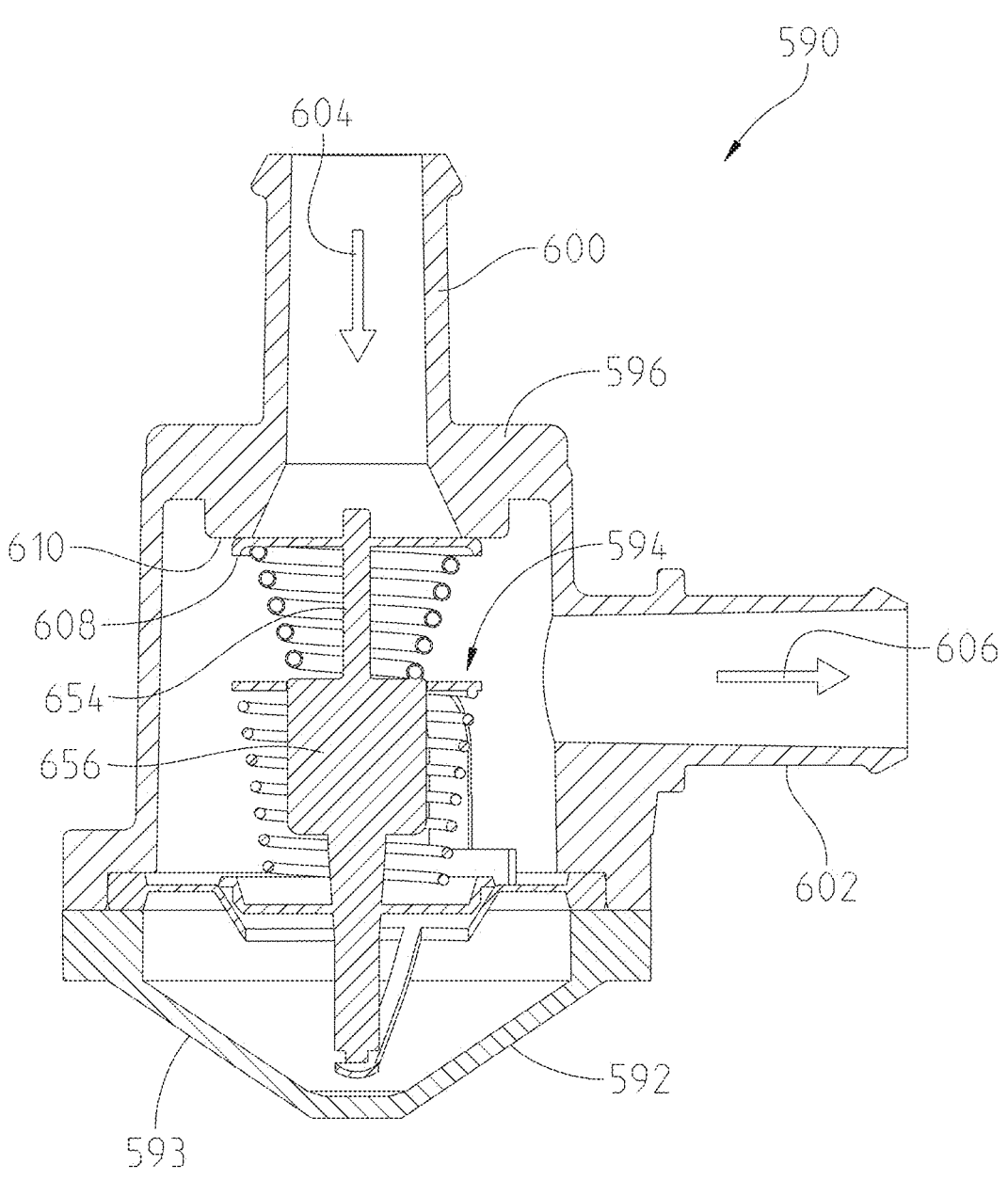
FIG. 99 is a cross-sectional view of the bypass valve of FIG. 97.

As shown in FIGS. 93-95, a cooling assembly 560 also is fluidly coupled to the engine of vehicle 2. Cooling assembly 560 is comprised of at least one heat exchanger configured to cool engine 580 (FIG. 96). Illustratively, three heat exchangers 562, 564, 566 are in a stacked or longitudinally-aligned arrangement at the front end of vehicle 2. First heat exchanger 562 may be a condenser for a HVAC system of vehicle 2, second heat exchanger 564 may be a transmission oil cooler, and third heat exchanger 566 may be an engine radiator. A fan assembly 568 is positioned longitudinally rearwardly of heat exchangers 562, 564, 566 and is comprised of a first fan 570 and a second fan 572. All three heat exchangers 562, 564, 566 utilize the same fan assembly 568 to draw air therethrough. In embodiments, first heat exchanger 562 (i.e., HVAC condenser) is the forwardmost heat exchanger to provide the greatest cooling capacity to the HVAC system to allow for the greatest amount of cooling. In embodiments, each of first heat exchanger 562, second heat exchanger 564, and third heat exchanger 566 are longitudinally spaced to allow a fluid (e.g., air, water) to flow between each of heat exchangers 562, 564, 566.

Figure 118:
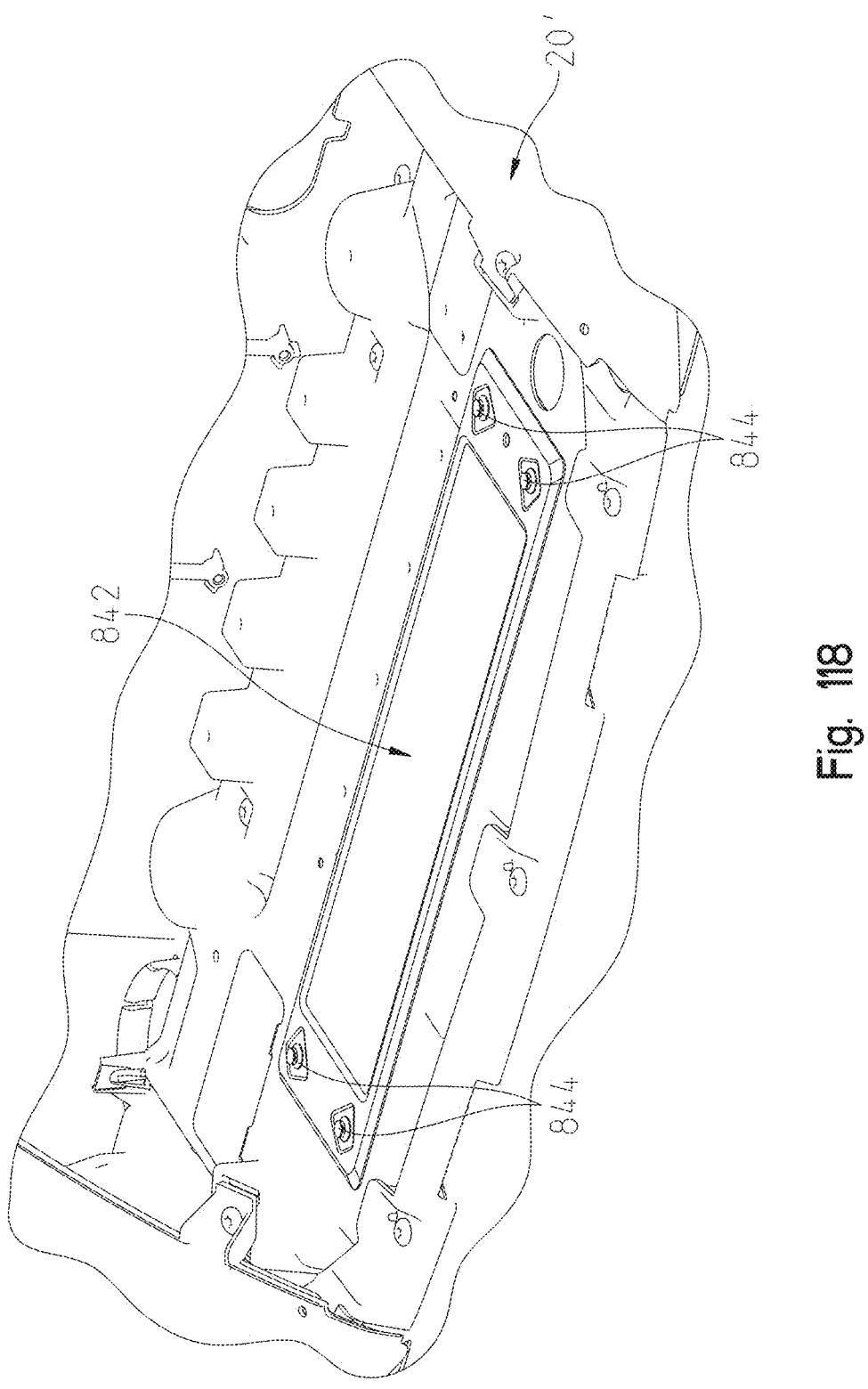

Referring to FIG. 118, a vehicle 2' includes a hood 20' (similar to, or the same as hood 20) positioned adjacent a front of vehicle 2'. Hood 20' includes a center panel 840 which may be removed from hood 20'. Center panel 840 is configured to cover various components (e.g., electrical components such as an accessory panel) and a heat exchanger cover 842. Heat exchanger cover 842 may be removed by a plurality of fasteners 844 to reveal each of first heat exchanger 562, second heat exchanger 564, and third heat exchanger 566. Heat exchanger cover 842 may be removed to allow a cleaning tool (not shown) to be positioned adjacent heat exchangers 562, 564, 566 to facilitate cleaning out of heat exchangers 562, 564, 566. That is, a user may shoot a fluid (e.g., air, water) downwardly between heat exchangers 562, 564, 566 to clean debris (e.g., mud, straw, dirt, etc.).

As shown, heat exchangers 562, 564, 566 are supported on the front subframe and are positioned laterally between frame members 68. Heat exchangers 562, 564, 566 also are positioned longitudinally rearwardly of a front bumper 576 but extend forwardly from the front subframe to be positioned longitudinally intermediate a portion of the front subframe and bumper 576. Because heat exchangers 562, 564, 566 are supported on, and partially extend forwardly from, the front subframe, heat exchangers 562, 564, 566 are forward of main or intermediate frame section 60. Heat exchangers 562, 564, 566 also are laterally between head lights 574 of vehicle 2 (also seen in FIG. 1). An inner surface 578 of head lights 574 is recessed to allow heat exchangers 562, 564, 566 to fit therebetween. Being able to fit three heat exchangers 562, 564, 566 at the front of vehicle 2 and between head lights 574 eliminates the need to find a location to package additional heat exchangers and fans for vehicle 2.

Referring to FIGS. 96-99, further details of cooling assembly 560 are disclosed. Specifically, when vehicle 2 includes an HVAC system, a heater core 582 is included to provide adjustable temperature to the cab of vehicle 2. An engine coolant bypass circuit or system 584 also is shown. Adding heater core 582 into engine coolant bypass circuit 584 adds flow restriction. Bypass system or circuit 584 includes bypass valve assembly 590 described in further detail below. This flow restriction can reduce bypass coolant flow to an undesirable level at high engine speeds. However, bypassing heater core 582 to prevent this flow reduction may reduce flow for heater core 582 and performance at low engine speeds. As such, the configuration of FIGS. 96-99 utilizes bypass circuit 584 with a two-way engine thermostat to function as a bypass loop flow regulator to provide both desired high engine speed flow for engine 580 and the desired low engine speed flow for heater core 582. The benefits of using bypass system 584 are that all bypass flow at idle engine speed is forced through heater core 582, bypass system 584 regulates the pressure drop across heater core 582 to ensure that the flow for heater core 582 is not as affected by changes in engine speed, bypass system 584 regulates the pressure drop across heater core 582 so that the flow for heater core 582 is not as affected by a thermostat position, and bypass system 584 allows for higher engine bypass flow at high engine speed with a closed thermostat to provide the needed engine water/coolant flow. In this way, bypass system 584 may improve heating in the cab of vehicle 2 and improve engine cooling, especially during engine start-up. Additionally, by installing heater core 582 within bypass system 584, additional coolant lines are not needed.

As shown in FIGS. 96-99, bypass system 584 is fluidly coupled to engine 580 for maintaining the performance and maximum head temperature of engine 580. An engine inlet line 620 is fluidly coupled to an outlet 624 of heat exchanger 566 and an inlet 626 of engine 580 to provide coolant or cooling water to engine 580 in the direction of arrow 622. An engine outlet or return line 634 is fluidly coupled to an outlet 628 of engine 580 and an inlet 630 of heat exchanger 566 to provide hot coolant back to heat exchanger 566 in the direction of arrow 632. Heater core 582 includes an inlet 636 configured to receive hot coolant from engine return line 634 to provide the necessary to temperature to heater core 582 for heating and cooling the cab of vehicle 2. Heater core 582 also includes an outlet 638 fluidly coupled to a heater core line 640 which provides cool coolant to engine 580 in the direction of arrow 642 which may facilitate the cooling of engine 580. Heater core line 640 is fluidly coupled to a bypass line 644 coupled to bypass valve assembly 590.

Bypass system 584 includes a plurality of bypass lines, including a relief inlet line 646 fluidly coupled to bypass valve assembly 590 and configured to provide coolant into bypass valve 590 in the direction of arrow 648. Additionally, the bypass lines include a relief outlet line 650 fluidly coupled to bypass valve assembly 590 and configured to provide hot coolant to engine return line 634 in the direction of arrow 652.

Bypass valve assembly 590 is positioned within bypass system 584. Bypass valve assembly 590 includes a cover 592, a thermal actuator valve 594, a housing 596, a first thermostat 654, and a second thermostat 656. Fasteners 598 are used to couple cover 592 to housing 596. Housing 596 includes an inlet 600 and an outlet 602. Housing also includes a valve seat 610 configured to receive a diaphragm 608 of first thermostat 654. Coolant can be received within housing through inlet 600 (arrow 604) and is regulated by thermal actuator valve 594 before flowing through outlet 602 (arrow 606). Cover 592 may include a plurality of ribs 593 configured to increase the structural integrity of cover 592.

In operation, if the HVAC system is not being used for vehicle 2, then heater core 582 does not need to be engaged. Coolant is provided to engine 580 through line 620 to cool the temperature of engine 580 and hot coolant from engine 580 is provided back to heat exchanger 566 through return line 634 to cool the coolant with air flow through heat exchanger 566.

However, when the operator desires to use the HVAC system of vehicle 2, heater core 582 may be engaged. Coolant from heat exchanger 566 continues to flow to engine 580 through line 620 to ensure proper cooling of engine 580. If heater core 582 also includes cool coolant, such coolant will flow from heater core outlet 638 to provide the cool coolant to engine 580. More particularly, the coolant flows through outlet 638, through heater core line 640, through a joint 660, into bypass line 644, and into engine 580. In this way, the cool coolant bypasses valve assembly 590. Because the coolant is cold, the coolant at joint 660 flows into relief inlet 646 but does not actuate thermostats 654, 656 because the temperature is below a predetermined actuation temperature for thermostats 654, 656. When thermostats 654,656 are not actuated, diaphragm 608 remains seated against seat 610 and the coolant does not flow into valve assembly 590.

But, as the temperature of the coolant from heater core 582 begins to increase, the coolant flows through heater core line 640 and reaches relief inlet line 646 through joint 660, and the increased temperature of the coolant is senses by at least first thermostat 654 and diaphragm 608 begins to move away from seat 610, thereby allowing some hot coolant to flow into valve assembly 590. As the temperature of the coolant continues to increase in heater core line 640 and relief inlet line 646, the increased temperature is sensed by second thermostat 656 and diaphragm 608 moves to a fully open position away from seat 610. The coolant in valve assembly 590 then flows through relief outlet line 650 and flows to a joint 658 in engine return line 634. In this way, hot coolant from heater core 582 bypasses engine 580 and does not flow to engine 580 and, instead, flows through valve assembly 590, through relief outlet line 650, and is joined with hot coolant from engine 580 in return line 634 to flow back into heat exchanger 566 to be cooled. Illustratively, hot coolant from engine 580 flows directly out of engine 580 into a first portion 634a of return line 634 while hot coolant from heater core 582 (via valve assembly 590) joins with the hot coolant from engine 580 in a second portion 634b of return line 634 to flow back to heat exchanger 566.

Figure 100:
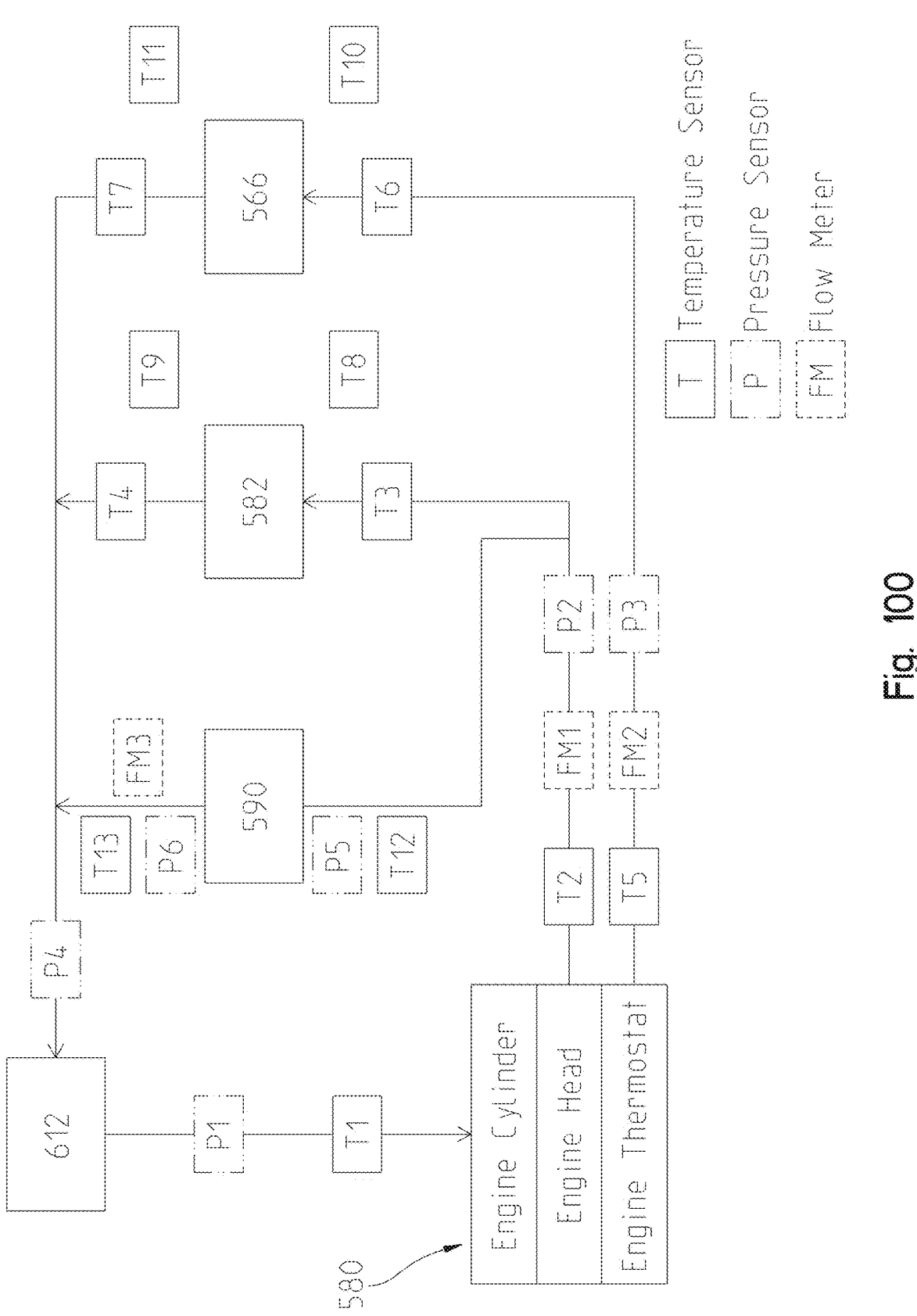
FIG. 100 is a schematic view of the heater core assembly of FIG. 96.

Additionally, and with respect to FIG. 100, a pump 612 may be provided and the test setup conditions for bypass system 584 is disclosed. When engine 580 is starting and/or otherwise at idle or low-engine speed conditions, diaphragm 608 of thermal actuator valve 594 may remain closed (i.e., is closed against seat 610 of housing 596) and flow is restricted such that more coolant passes through heater core 582. In this way, the performance of heater core 582 may increase at idle or low-engine speeds (e.g., during engine start-up). When the flow pressure increases at inlet 600, diaphragm 608 begins to move away from seat 610. When the pressure reaches a predetermined threshold, then thermal actuator valve 594 moves to an open state where diaphragm

608 is spaced apart from seat 610 and the coolant flows through housing 596 and into outlet 602. In this way, the flow returns to pump 612 directly instead of going through heater core 582 and heat exchanger 566 and the temperature of engine 580 can be reduced for high speed conditions as the flow through engine 580 increases.

Referring still to FIG. 100, the outlet from the engine thermostat is connected to heat exchanger 566 and a return line from heat exchanger 566 is connected to engine water pump 612. A plurality of temperature sensors are provided and shown as T1, T2, T3, T4, T5, T6, T7, T8, T9, T10, T11, T12, T13. Additionally, a plurality of pressure sensors are provided and shown P1, P2, P3, P4, P5, P6. Flow meters FM1, FM2, and FM3 also are provided. T5 temperature sensor is connected downstream of the engine thermostat outlet. T6 and T7 temperature sensor are connected upstream and downstream of heat exchanger 566, respectively. Flow meter FM2 and pressure sensor P3 are connected downstream of the engine thermostat, as well. A bypass line is connected from the engine head to water pump 612. Downstream of the engine head, temperature sensor T2, flow meter FM1, and pressure sensor P2 are connected. Upstream and downstream of heater core 582 are two temperature sensor T3 and T4. There are two pressure sensor P5, P6 and two temperature sensor T12, T13 connected upstream and downstream of bypass valve 590 to measure data at these locations. Upstream of water pump 612 is pressure sensor P4. Pressure sensor P1 and temperature sensor T1 are connected to engine 580 to measure pressure and temperature downstream of engine water pump 612.

Additional details of the HVAC assembly may be disclosed in U.S. Pat. No. 9,738,134, issued on Aug. 22, 2017, and entitled "UTILITY VEHICLE", the complete disclosure of which is expressly incorporated by reference herein.

Figure 101:
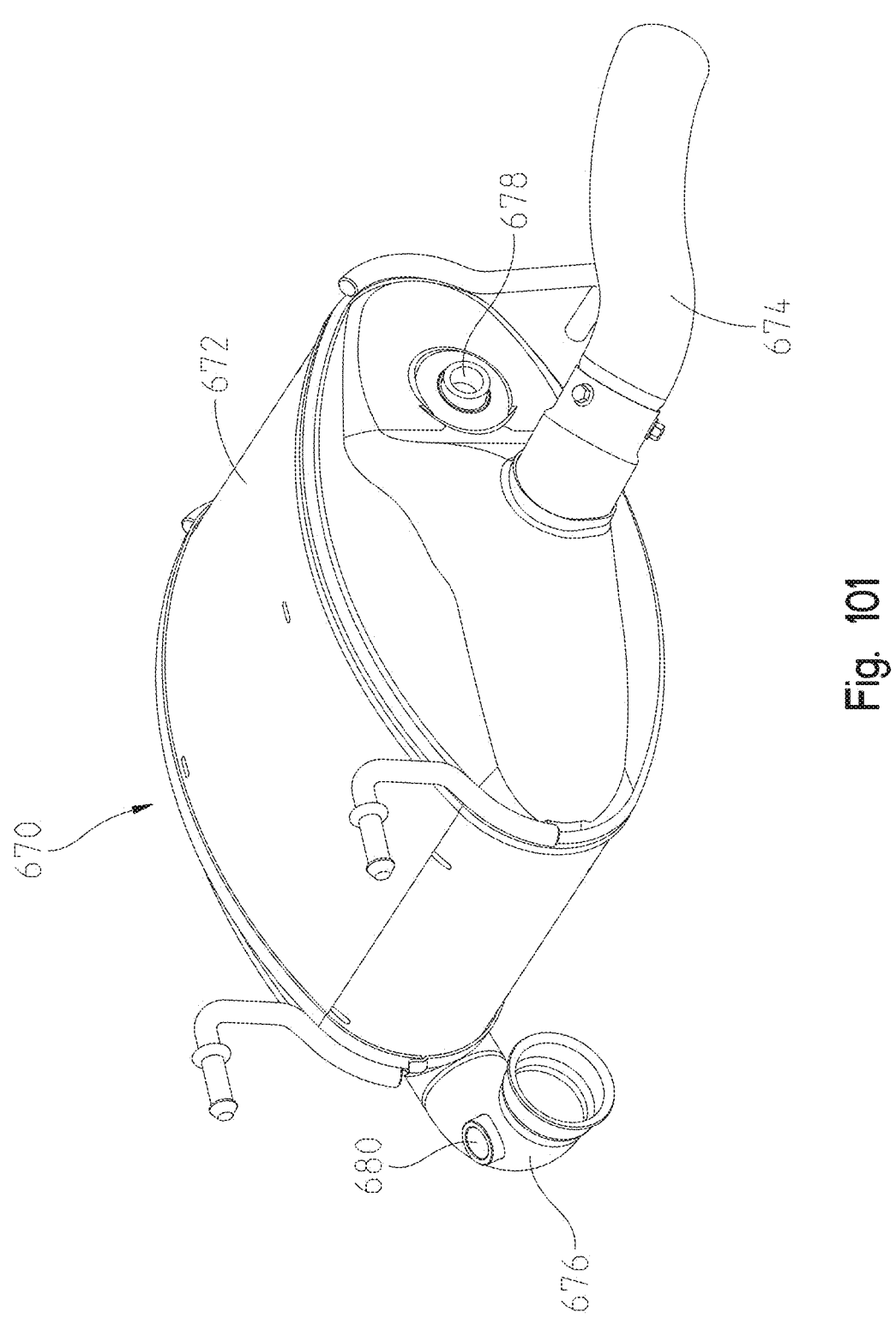
FIG. 101 is a perspective view of a muffler of an exhaust assembly of the utility vehicle of FIG. 1.
Figure 102:
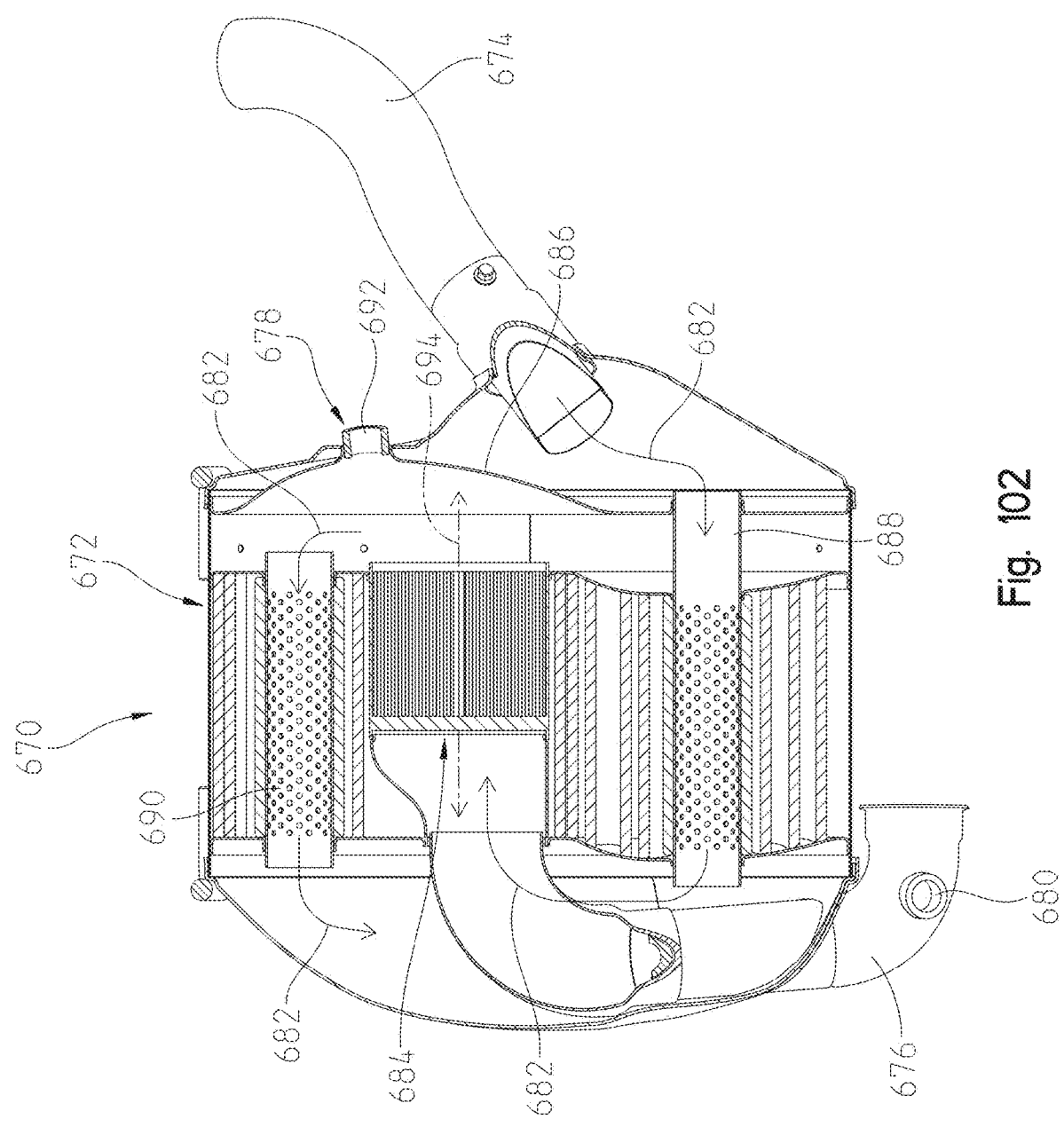
FIG. 102 is a cross-sectional view of the muffler of FIG. 101.
Figure 103:
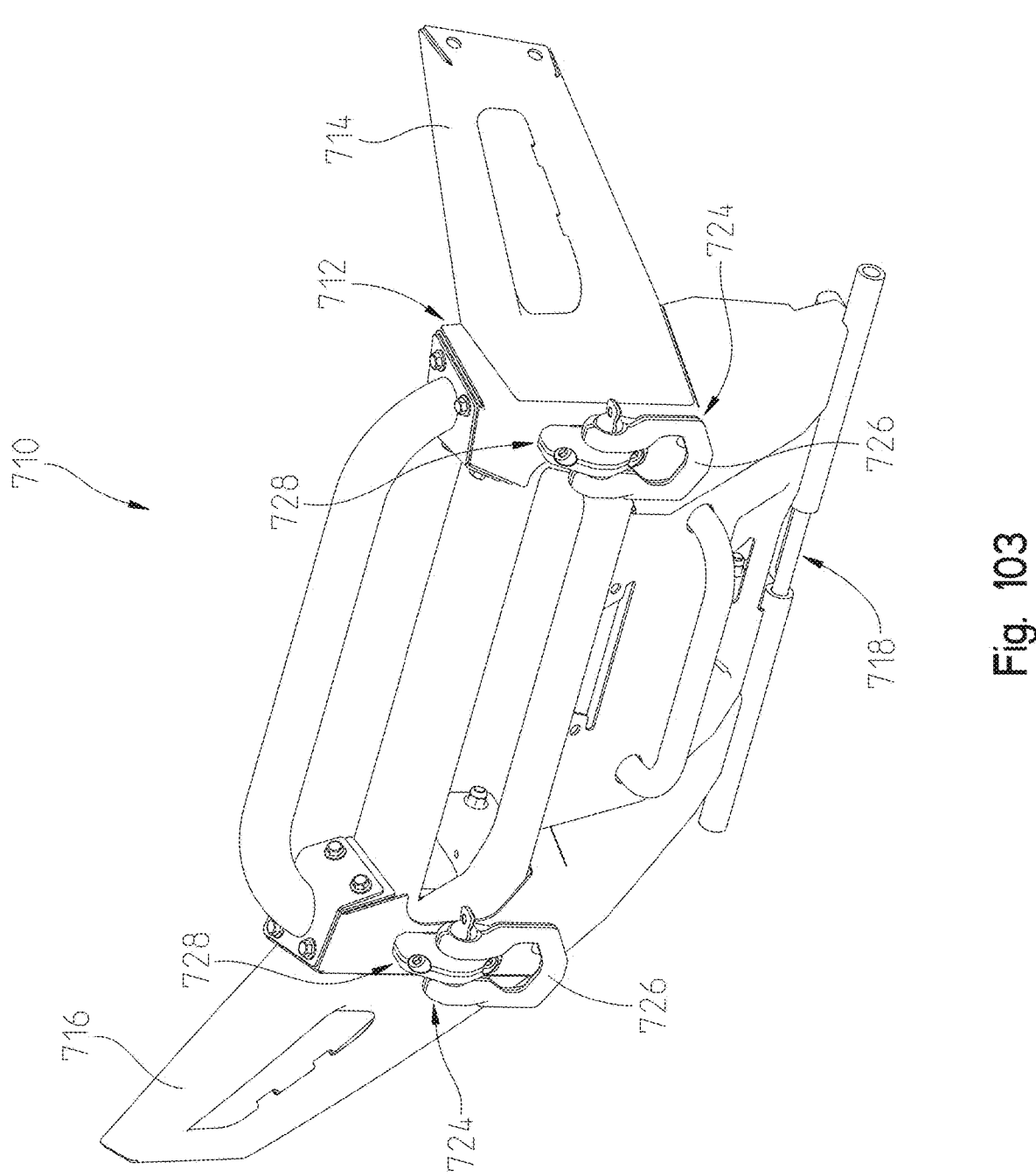
FIG. 103 is a perspective view of a bumper assembly of a utility vehicle of the present disclosure.
Figure 104:
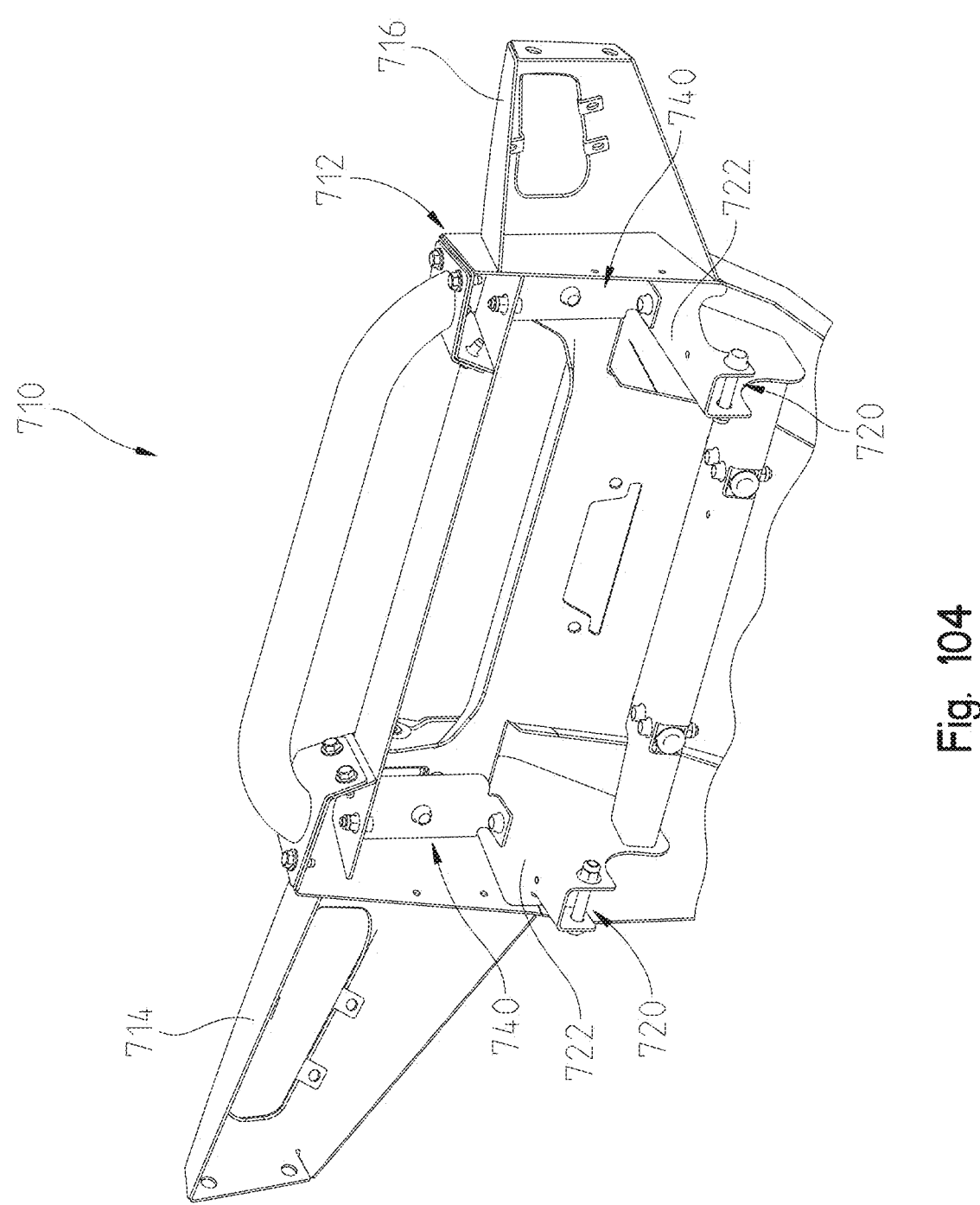
FIG. 104 is a rear perspective view of the bumper assembly of FIG. 103.

Referring to FIGS. 101 and 102, exhaust assembly 670 is shown. Exhaust assembly 670 may be positioned generally along a vertical plane extending through longitudinal axis L which contributes to the ability to tilt cargo box 450, as disclosed herein. Exhaust assembly 670 includes muffler or silencer 672, an inlet conduit 674 providing exhaust gases from engine 580 (FIG. 96) to muffler 672, and an outlet conduit 676 providing exhaust gases from muffler 672 to a tailpipe of vehicle 2 to be exhausted from vehicle 2. A first oxygen sensor may be supported on muffler 672 at location 678 and a second oxygen sensor may be supported on outlet conduit 676 at location 680. As exhaust flows through inlet conduit 674 and into muffler 672 in the direction of arrows 682, the exhaust gas passes through a first inner chamber 688 and then flows through a catalyst 684. The exhaust gas exiting catalyst 684 contacts an inner pass-through baffle 686 and the composition of the exhaust gas may be measured at the first oxygen sensor at location 678. The exhaust gas then flows through a second inner chamber 690 in the direction of arrow 682 and flows into outlet conduit 676 where the composition of the exhaust gas is again measured by the second oxygen sensor at location 680 before flowing into the tailpipe.

First oxygen sensor at location 678 utilizes baffle 686 which is formed such that the first oxygen sensor can pull from inner chamber 688 within muffler 672. Baffle 686 is formed so that it protrudes through the inner volume of muffler 672. A bung weld 692 at location 678 supports the boss for the first oxygen sensor which measures the exhaust gas downstream of catalyst 684. Bung 692 is welded approximately parallel to a catalyst axis 694 and may be within 15 degrees of parallel to axis 694. The configuration of exhaust assembly 670 allows the exhaust gas to be monitored by the sensor at location 678 from within muffler 672, rather than outside of muffler 672. Illustratively, catalyst 684 is positioned generally within the middle of muffler 672 rather than directly adjacent the external shell of muffler 672 or baffle 686, which allows for increased sound attenuation. Additional details of exhaust assembly 670 are disclosed in U.S. Provisional Patent Application Ser. No. 63/184,496, filed on May 5, 2021, and entitled "EXHAUST ASSEMBLY FOR A UTILITY VEHICLE", the complete disclosure of which is expressly incorporated by reference herein.

Referring now to FIGS. 103-105B, a front bumper 710 (which may be similar or the same as bumper 576) is coupled to front frame section 14. Front bumper 710 includes a first bumper portion 712, a second bumper portion 714 extending outwardly from first bumper portion 712 and a third bumper portion 716 extending outwardly from first bumper portion 712 generally opposite second bumper portion 714. An upper surface 713 extends laterally along an upper portion of first bumper portion 712 between second bumper portion 714 and third bumper portion 716. A first mounting portion 718 is generally a rod and configured for mounting front bumper 710 to front frame section 14. Front bumper 710 also includes a pair of second mounting portions 720 positioned vertically higher than first mounting portion 718, and each of second mounting portions 720 are configured for mounting front bumper 710 to front frame section 14. In embodiments, each of second mounting portions 720 extend generally rearwardly from first bumper portion 712 and have a top surface 722. Front bumper 710 is configured with at least three separate mounting portions 718, 720. In embodiments, front bumper 710 has more than three mounting portions.

Still referring to FIGS. 103-105B, front bumper 710 includes a pair of D-ring assemblies 728 configured to receive a hook, a latch, a clasp, or another type of latching member. D-ring assemblies 728 include a mounting assembly 724 and a ring 726 coupled to the mounting assembly 724. Mounting assembly 728 includes a T-shaped body 734 with a middle extension 735. Middle extension 735 defines an aperture 736, and body 734 defines a pair of apertures 730, 732 positioned vertically above and below aperture 736. First bumper portion 712 defines a pair of apertures 711, and apertures 712a positioned below and above apertures 711. T-shaped body 734 is configured to be received within an aperture 711, and a pair of fasteners 731 are configured to extend through apertures 730, 712a and 732, 712a, respectively, to couple T-shaped body 734 to first bumper portion 712.

A support member 740 is positioned longitudinally rearwardly of first bumper portion 712 and extends vertically between top surface 722 and upper surface 713. Support member 740 comprises a first flange 742 positioned along its lower extent and a second flange 744 positioned along its upper extent. First flange 742 defines an apertures 743 and second flange 744 defines an aperture 745. Top surface 722 of second mounting portions 720 define apertures 723 and upper surface 713 defines a pair of apertures 715. A pair of fasteners 746 are configured to extend through apertures 745, 715 to couple second flange 744 to upper surface 713 and apertures 743, 723 to couple first flange 742 to top surface 722. Further, support member 740 defines a longitudinally directed aperture 741, and a fastener 737 is configured to extend through longitudinally directed aperture 741 and aperture 736 to couple t-shaped body 734 to support member 740.

Figure 105A:
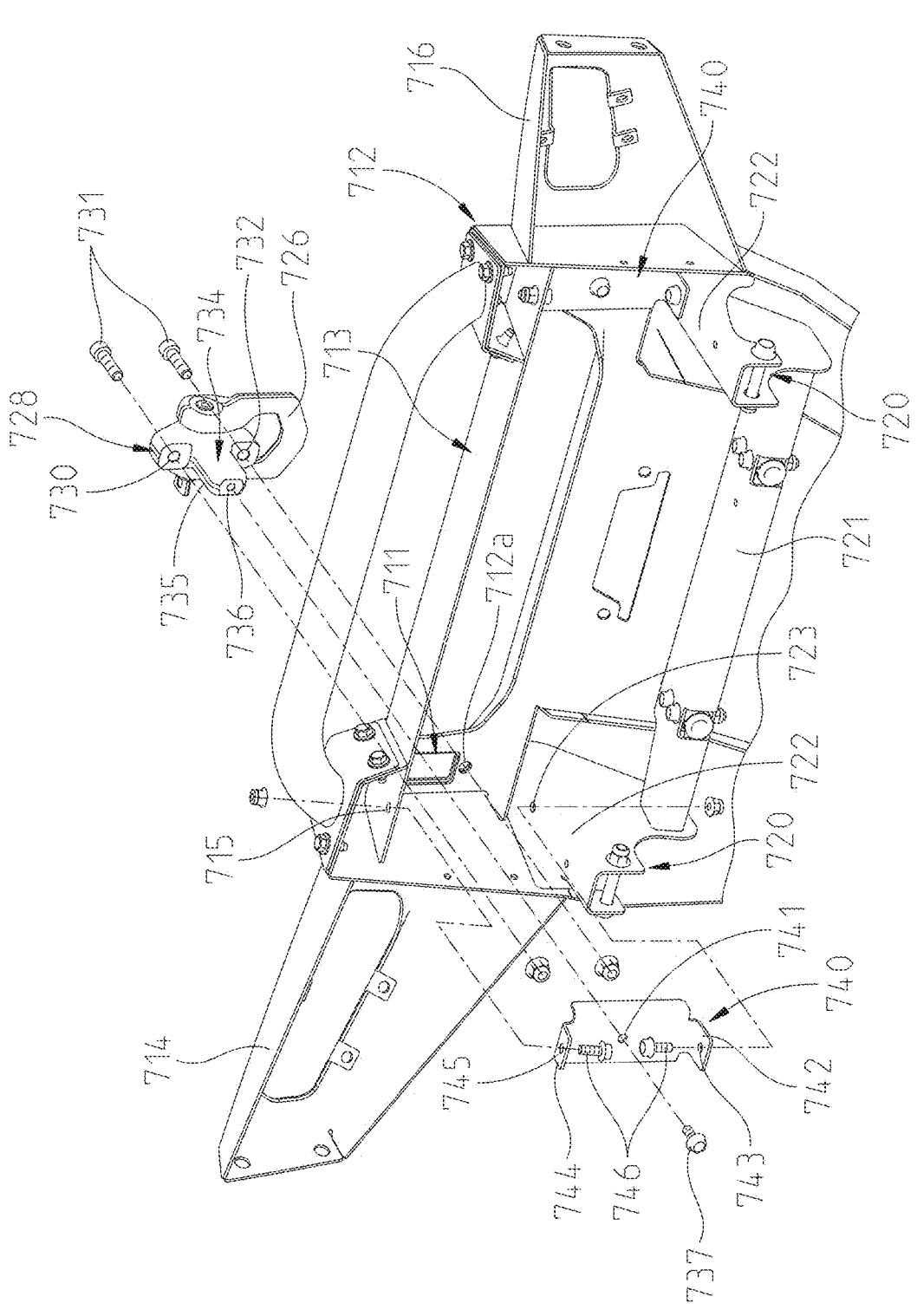
FIG. 105A is an exploded view of the bumper assembly of FIG. 103.
Figure 105B:
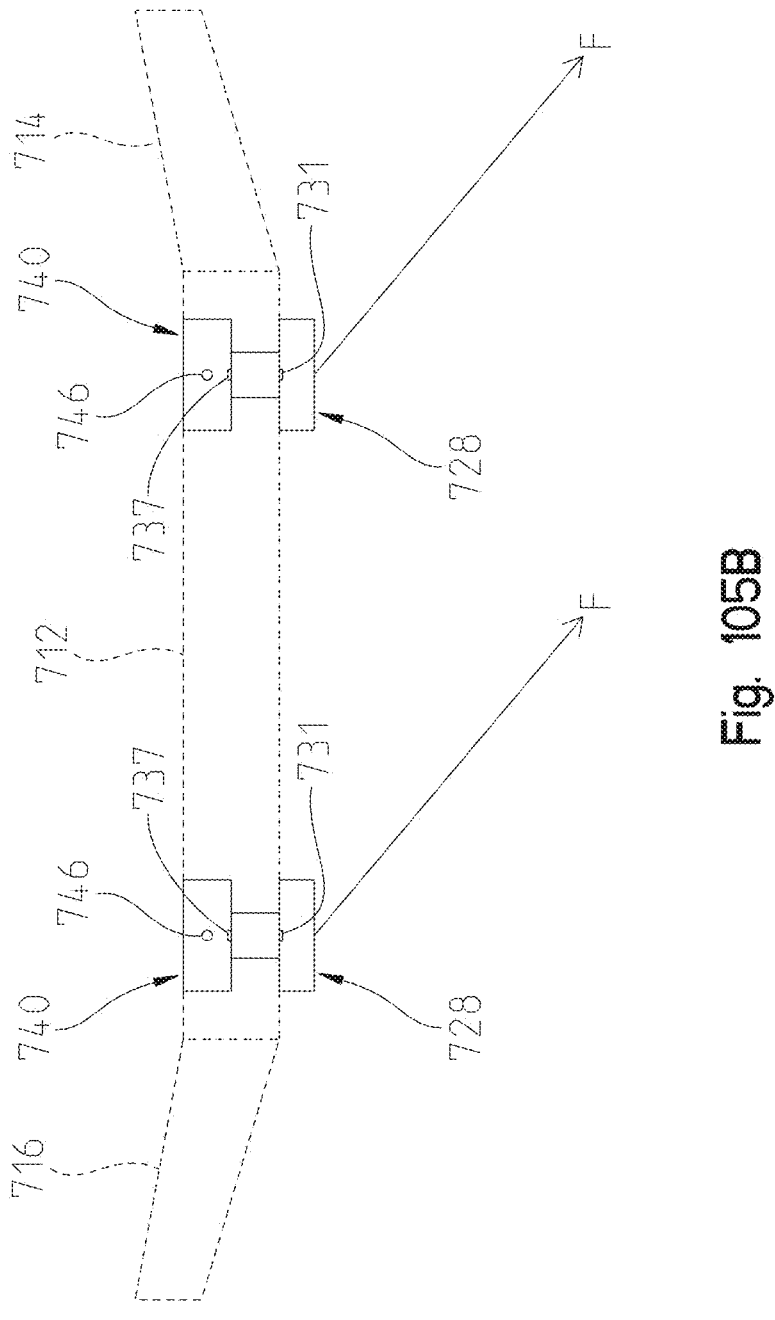
FIG. 105B is a schematic top view of the bumper assembly of FIG. 103.
Figure 106:
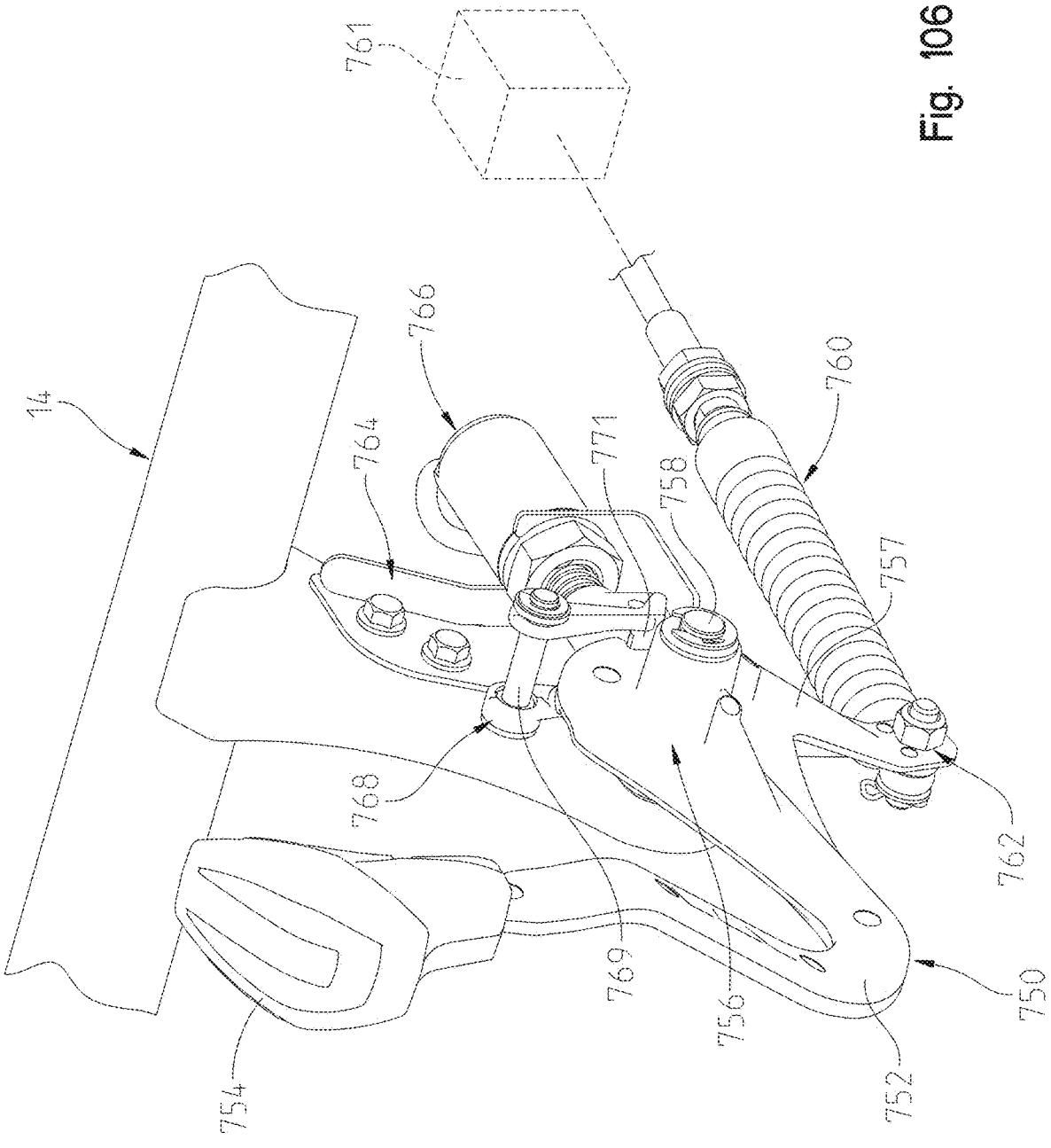
FIG. 106 is a perspective view of a gear shift linkage assembly of the present disclosure.

D-ring assemblies 728 are coupled to bumper 710 at a plurality of locations by a plurality of fasteners to increase the strength of D-ring assemblies 728. As shown in FIG. 105B, D-ring assemblies 728 are coupled in at least three separate longitudinal locations along bumper 710 (e.g., fasteners 731, fastener 737, fasteners 746). Spacing these coupling locations longitudinally increases the amount of force (F) that D-ring assemblies can withstand in a non-normal direction. That is, by spacing fasteners 731, 737, 746 longitudinally, D-ring assemblies 728 may withstand a greater moment. D-ring assemblies 728 may be used as recovery hooks to pull vehicle 2 from a stuck state (e.g., in mud, sand or otherwise), and often during recovery, vehicle 2 experiences both normal and lateral forces.

Referring now to FIGS. 106-110, a gear shifter assembly 750 includes a shifter arm 752 and a shifter knob 754 coupled to the shifter arm 752. Shifter arm 752 generally defines a bell crank 756, and shifter arm 752 is operably coupled to front frame section 14 about a pivot link 758. Shifter arm 752 includes an extension 757 positioned generally opposite shifter knob 754, and extension 757 defines an aperture 762. A gear shift cable 760 is coupled to extension 757 at aperture 762. Gear shift cable 760 is operably coupled to a transmission (e.g., transmission 532 or CVT 761 (FIG. 109)). An operator of vehicle 2 may operate gear shifter assembly 750 by placing a rotational force on gear shifter arm 752 which rotates gear shifter arm 752 about pivot link 758 and shifting gear shift cable 760. Bell crank 756 comprises a notch 776 at its outer extent, and notch 776 rotates about pivot link 758 as bell crank rotates.

Figures 107, 108:
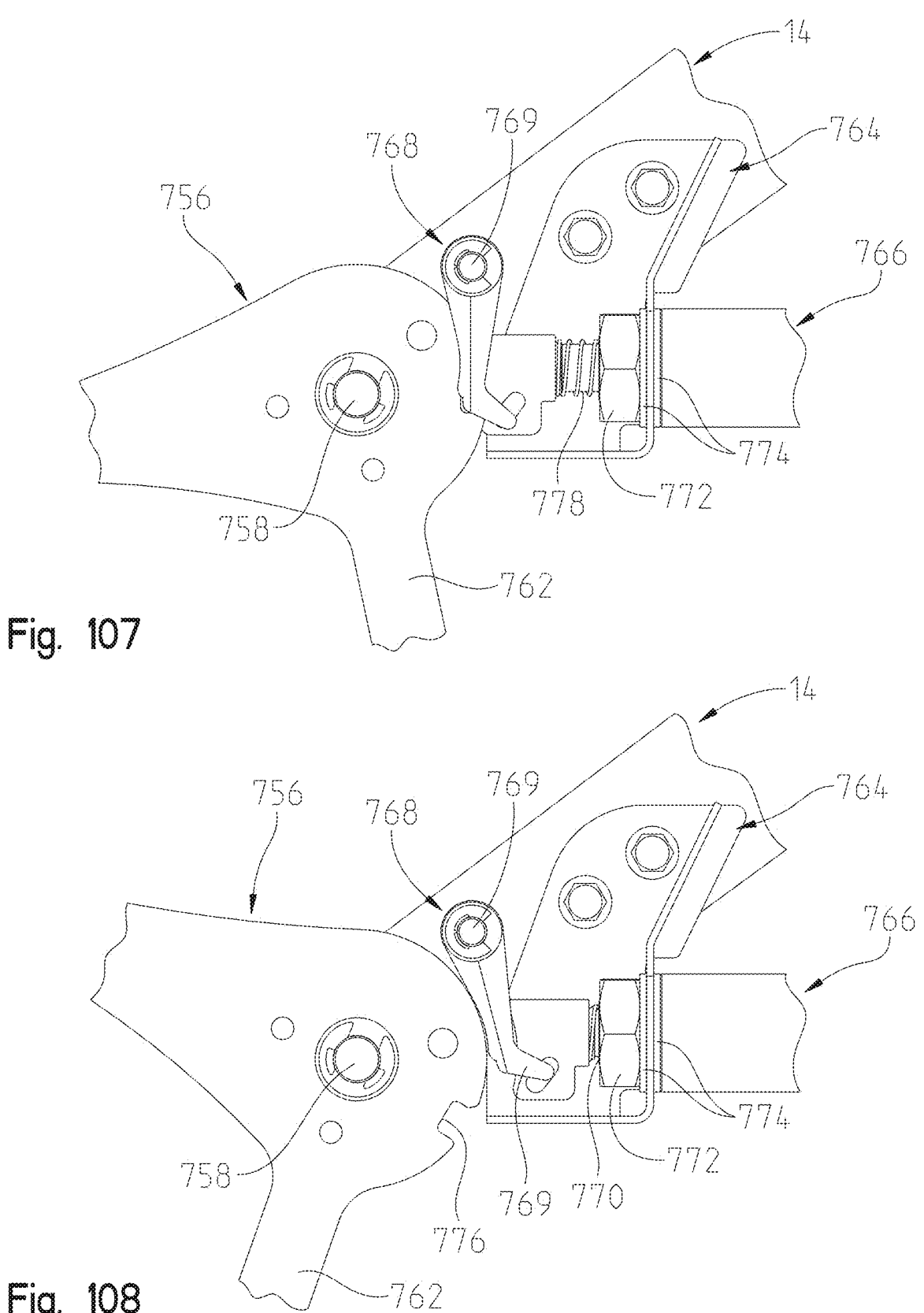
FIG. 107 is a side view of the gear shift linkage assembly of FIG. 106 with an actuator in an engaged position.
FIG. 108 is a side view of the gear shift linkage assembly of FIG. 106 with an actuator in a disengaged position.

A frame member 764 is coupled to front frame section 14, and an actuator, or solenoid 766 is coupled to frame member 764. An arm 768 is operably, and rotatably coupled, to front frame section 14, about pivot link 769. Arm 768 is positioned generally intermediate shifter arm 752 and solenoid 766. Arm 768 is generally U-shaped and comprises a cross-link 771 positioned vertically lower than pivot link 769. Cross-link 771 is positioned and shaped to fit within notch 776. Solenoid 766 includes a shaft 778 extending outwardly from solenoid 766. Solenoid 766 is operably coupled to an electronic controller 780 which is configured to cause a current to be provided to solenoid 766. Shaft 778 is operably coupled to arm 768 at the cross-link 771, and as shaft 778 moves inwardly and outwardly from solenoid 766, cross-link 771 rotates around pivot link 769. In embodiments, solenoid 766 is movable between an extended, or engaged state (FIG. 107) and an unextended, or disengaged state (FIG. 108). In the engaged state (FIG. 107), cross-link 771 is configured to engage notch 776 and prohibit shifter arm 752 from rotating about pivot link 758. In the disengaged state (FIG. 108), cross-link 771 is configured to be positioned away from (i.e., disengaged) from notch 776 and allow shifter arm 752 to rotate about pivot link 758. In embodiments, when cross-link 771 is engaged with notch 776 (i.e., positioned in notch 776), gear shift cable 760 is in a first state and the transmission (e.g., transmission 532 or CVT 761) is in a 'Park' condition (i.e., 'Park' gear). In embodiments, when cross-link 771 is disengaged from notch 776 (i.e., positioned out of notch 776), gear shift cable 760 is in a second state and the transmission (e.g., transmission 532 or CVT 761) may move between any of the available gears.

Figure 110:
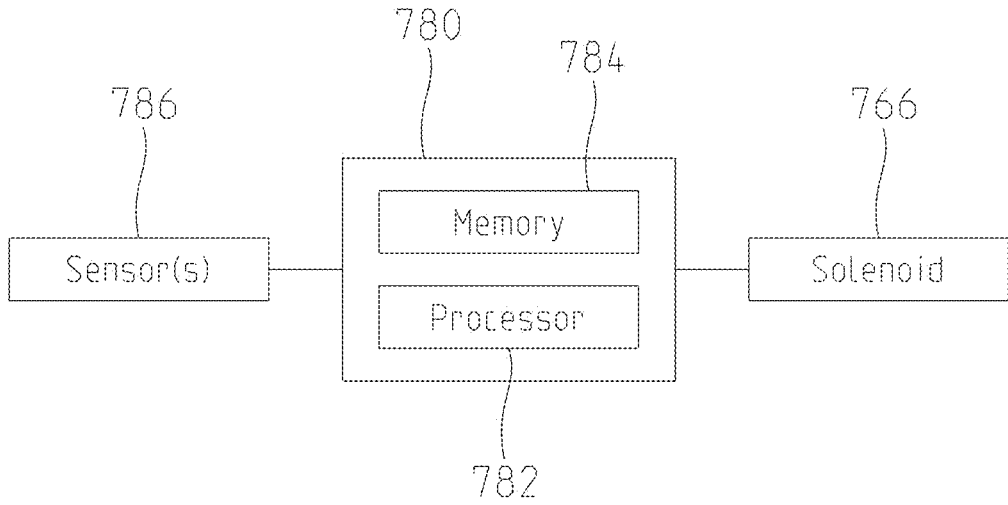
FIG. 110 is a schematic control diagram of the actuator of FIG. 107.

Referring to FIG. 110, electronic controller 780 includes at least one processor 784 and at least one non-transitory computer readable medium, memory 784. In embodiments, electronic controller 780 controls the operation of various systems of vehicle 2, 2'. In embodiments, electronic controller 780 is a distributed system comprised of multiple controllers each of which control one or more systems of vehicle 2, 2' and may communicate with each other over one or more wired and/or wireless networks. In embodiments, the multiple controllers communicate over a CAN network.

Further, electronic controller 780 is operatively coupled to a plurality of sensors 786 which monitor various parameters of vehicle 2, 2' or the environment surrounding vehicle 2, 2'. In embodiments, one or more of a plurality of sensors 786 may be incorporated as part of electronic controller 780, have a direct connection to electronic controller 780, and/or provide information regarding sensed characteristics over one or more wired and/or wireless networks. In embodiments, the multiple sensors and controllers communicate over a CAN network.

The plurality of sensors 786 may include a brake information sensor (e.g., brake input sensor, brake pressure sensor), a throttle information sensor (e.g., throttle input sensor), a gear position sensor 1062 (FIG. 140), a steering information sensor, an IMU 1004 (FIG. 137), an accelerometer 1006 (FIG. 137), a gyroscope 1008 (FIG. 137), a suspension sensor, or another sensor. Controller 780 is configured to receive information from one or more of the plurality of sensors 786 and cause one of the first current and the second current to be provided to solenoid 766.

Controller 780 performs certain operations (e.g., provides commands) to control one or more subsystems of other vehicle components. In embodiments, controller 780 forms a portion of a processing subsystem including one or more computing devices having memory, processing, and communication hardware. Controller 780 may be a single device or may be distributed among multiple devices, and the functions of the controller 780 may be performed by hardware and/or as the execution of computer instructions stored on a non-transitory computer readable storage medium, such as memory 784, by one or more processors.

Referring to FIGS. 107-108, solenoid 766 is coupled to frame member 764, or front frame portion 14, in an isolated manner. That is, a threaded nut 772 is positioned on shaft 770 and may tighten frame member 764 between nut 772 and solenoid 766 to couple solenoid 766 to frame member 764. In embodiments, one or more isolation spacers 774 may be placed between nut 772 and frame member 764 and between frame member 764 and solenoid 766. In further embodiments, solenoid 766 is filled with an isolation material to reduce noise and vibrations emitted by solenoid 766.

Figure 111:
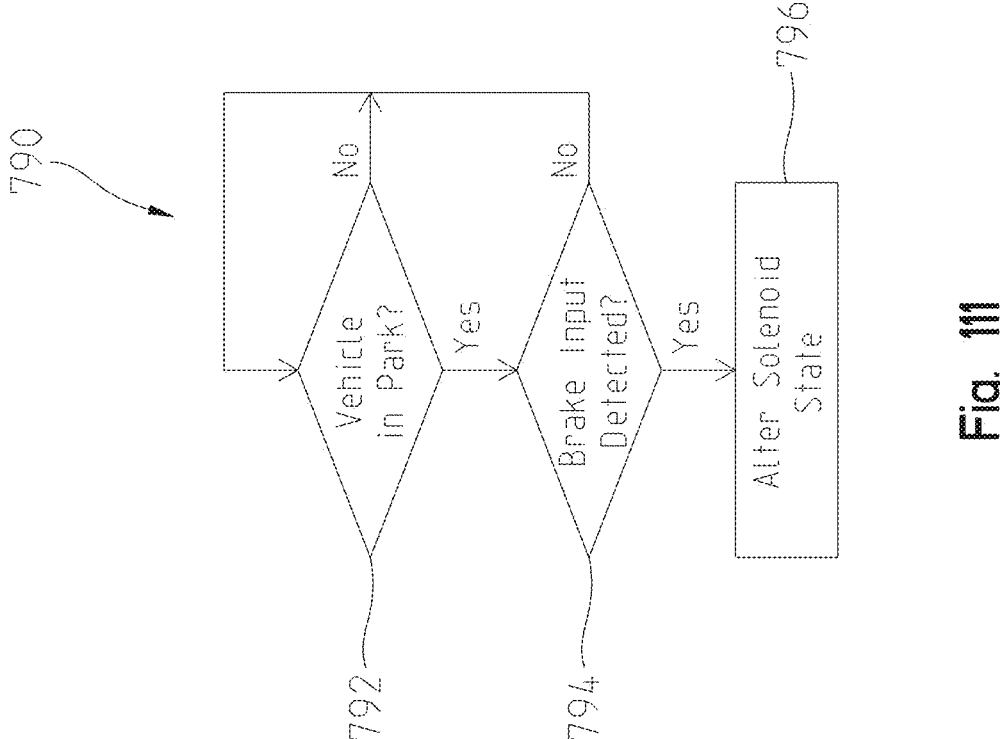

Referring now to FIG. 111, a process 790 is configured to determine whether the position of solenoid 766 should be altered. Process 790 includes step 792, which determines if vehicle 2 is in the 'Park' gear. If vehicle 2 is not in the 'Park' gear, process 790 restarts and will not move on until it is determined that vehicle 2 is in the 'Park' gear. When it is determined in step 792 that vehicle 2 is in the 'Park' gear, process 790 proceeds to step 794 to determine if a brake input is detected. Brake input may be detected in step 794 by one or more of sensors 786, such as a brake switch or a brake pressure sensor. If no brake input is detected, process 790 returns to step 792. If it is determined in step 794 that a brake input is detected, process 790 moves on to step 796. In step 796, process 790 alters the state of solenoid 766 (e.g., between engaged state (FIG. 107) and unengaged state (FIG. 108)). Process 790 is configured to ensure that the transmission (e.g., transmission 532 or CVT 761) does not move out of the 'Park' gear unless a brake input is detected in step 794.

Figure 112:
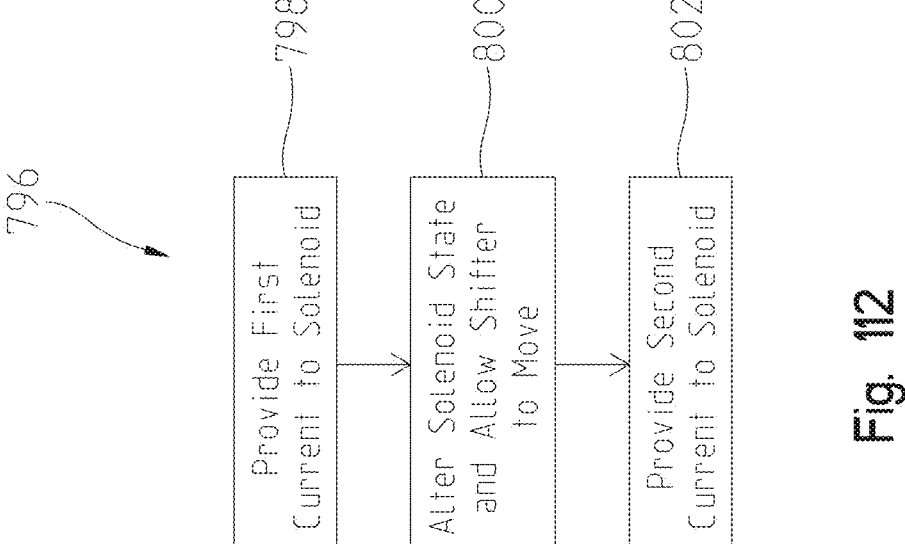

Referring now to FIG. 112, process 796 is a process comprised of a plurality of steps configured to alter a current (Amps) provided to solenoid 766. Process 796 starts with step 798 and, in response to controller 780 makes the determination to alter the solenoid position (e.g., as a result of performing aspects of process 790 discussed above), controller 780 causes a first current to be provided to solenoid 766. Process 796 proceeds to step 800, and the first current is configured to provide power for solenoid 766 to move shaft 778 and disengage cross-link 771 from notch 776 and allow shifter arm 752 to rotate and allow vehicle 2 to shift out of the 'Park' gear. Process 796 proceeds to step 802 and, after solenoid 766 has moved shaft 778 and disengaged cross-link 771 from notch 776, controller 780 causes a second current to be provided to solenoid 766. The second current may be considered a 'holding' current, and the second current may be less than the first current. The second current is configured to 'hold' the shaft 778 in the disengaged position. Solenoid 766 requires less current to hold the shaft 778 in place than to move shaft 778 from the engaged position to the disengaged position. Providing the second current to the solenoid 766 (in step 802) after the first current (in step 798) thus reduces energy draw from the solenoid 766 and reduces heat produced by solenoid 766. In embodiments, shaft 778 is biased outwardly by a biasing member (by a spring, shock, or other linear force element), such that, when cross-link 771 is moved outwardly to engage notch 776, a current is not provided to solenoid 766 and shaft 778 moves outwardly under the force of the biasing member (e.g., spring, shock, other linear force element).

Figure 116:
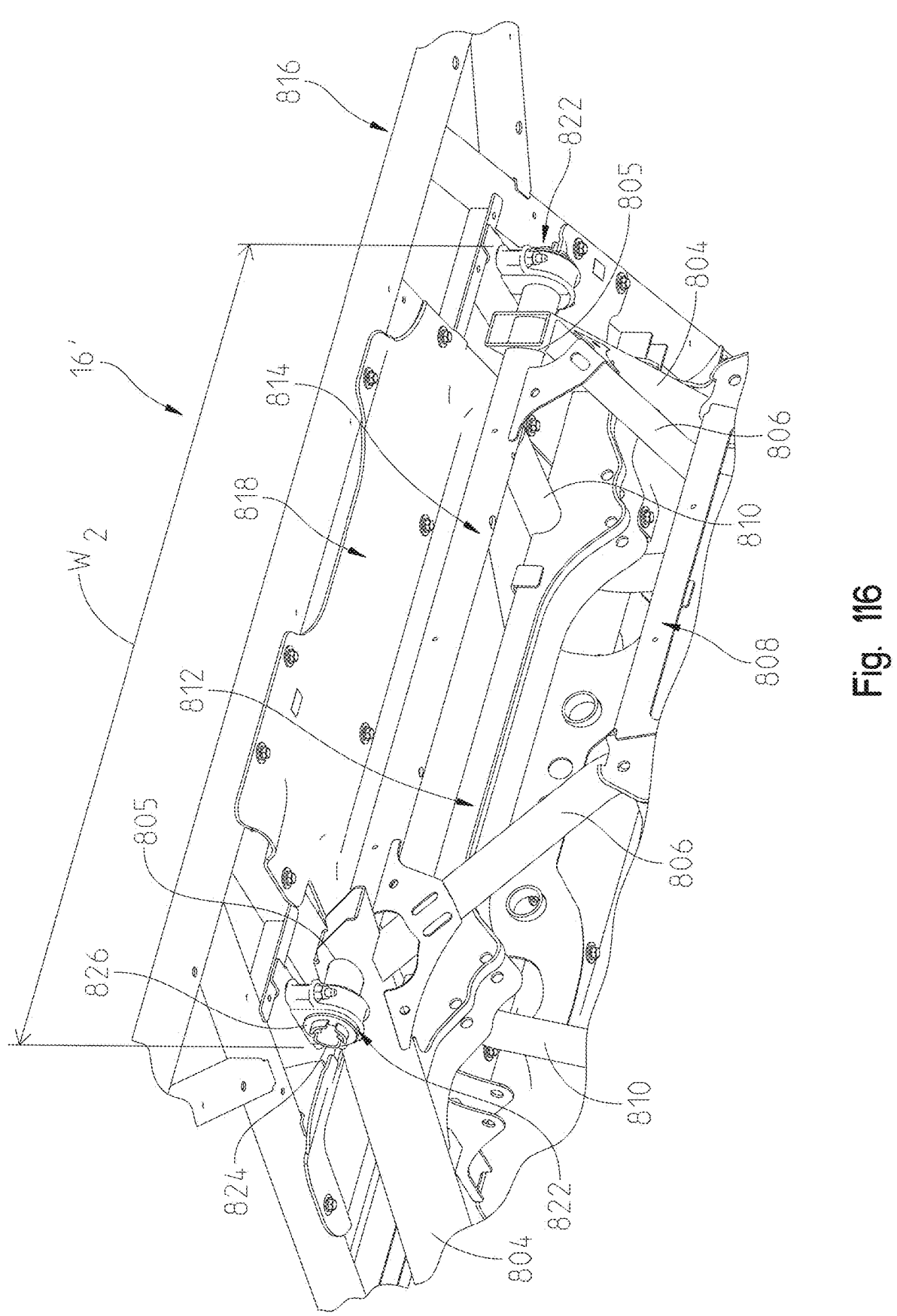
Figure 117:
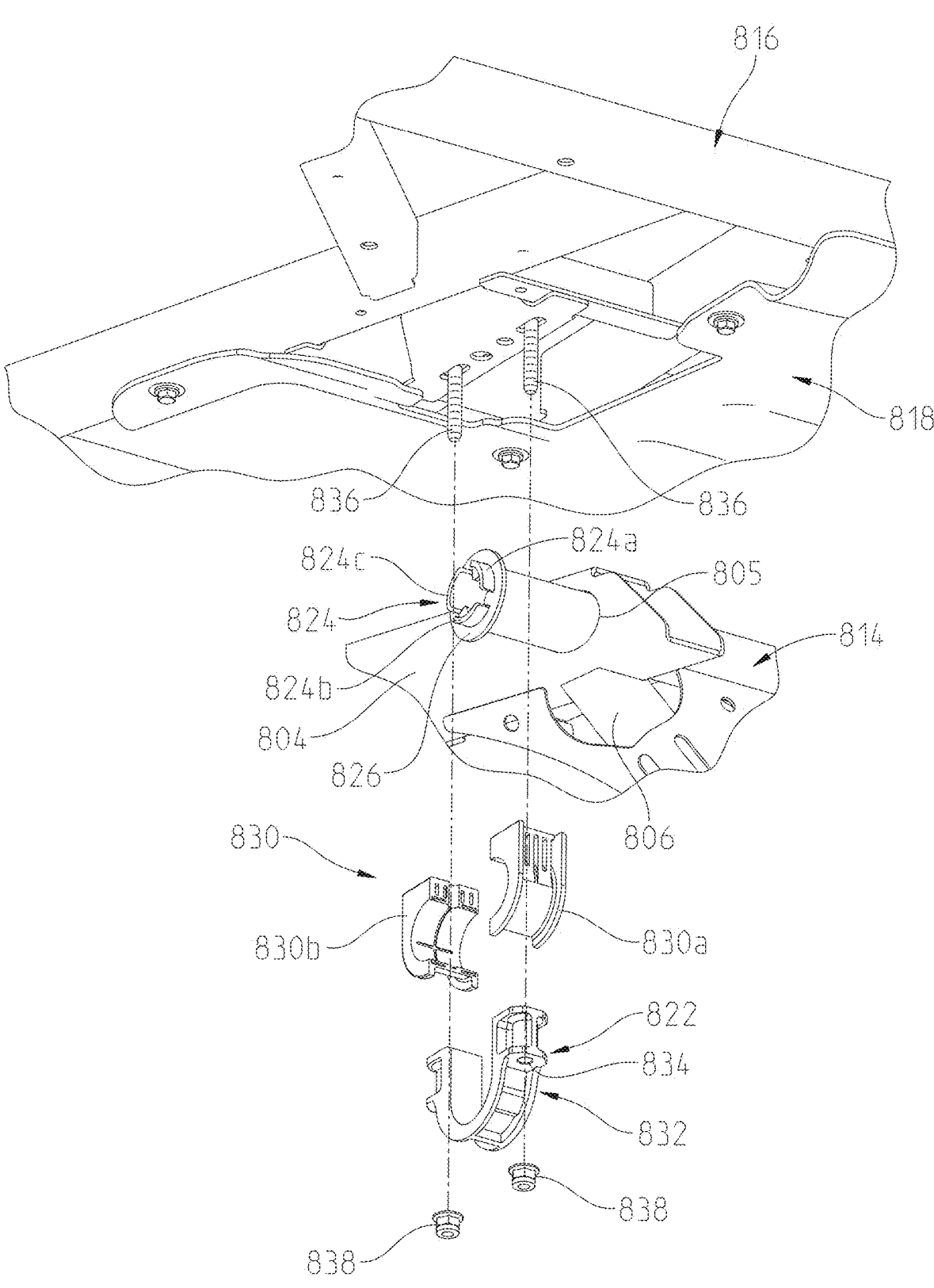

Now referring to FIGS. 116-117, vehicle 2' comprises rear frame portion 16' (similar, or the same as, rear frame portion 16) which may be a part of lower frame assembly 10 and may be compatible with front frame section 14 and main frame section 60. Rear frame portion 16' comprises a pair of upper outer frame members 804 (similar, or the same as, upper outer frame members 112), a pair of frame members 806 (similar, or the same as, frame members 122) extending downwardly from a rear extent of upper outer frame members 804, and a frame cross-member 814 (similar, or the same as, cross-member 114) extending between upper outer frame members 804. Further, a pair of frame members 810 (similar to, or the same as, frame members 116) are coupled to, and extend forwardly from cross-member 814. A brace 812 (similar to, or the same as brace 118) extends between frame members 810. Each of frame members 804 define an aperture 805 positioned at a generally rearwardly portion thereof, and cross-member 814 extends through each aperture 805 and extends a width W2. Each cross-member 814 comprises an end portion 824 positioned laterally outwardly from frame members 804.

Vehicle 2' (FIG. 124) may be similar to, or the same as, vehicle 2. Components, assemblies, subassemblies, or other systems of vehicle 2, or vehicle 2', may be used with either vehicle 2, or vehicle 2'. Referring to FIG. 124, vehicle 2' includes a cargo box 820 (similar to, or the same as, cargo box 450) supported by rear frame portion 16', and cargo box 820 has a width W1. In embodiments, width W2 of cross-member 814 is greater than half of width W1 of cargo box 820. Cargo box 820 defines a cargo box area 30' (similar to, or the same as, cargo box area 30). Cargo box 820 includes a cargo box frame 816, which supports cargo box area 30', and a shield member 818 is coupled to a bottom of cargo box frame 816. Shield member 818 is configured to separate cargo box 820, and cargo box area 30', from a portion of the powertrain (e.g., engine 580).

Referring still to FIGS. 116-117, cargo box 820 is rotatably coupled to rear frame portion 16'. A pair of coupling assemblies 822 are coupled between cargo box 820 and end portions 824. End portion 824 comprises a plurality of extensions 824a, 824b, 824c spaced around a circumference of frame member 814. A ring member 826 is configured to fit over end portions 824 and extend between extensions 824a, 824b, 824c. In embodiments, ring member 826 is coupled to end portion 824 by a permanent coupling method such as welding. In other embodiments, ring member 826 is coupled to end portion 824 by an adhesive or another coupling method.

Coupling assemblies 822 include a bushing 830, including a first bushing portion 830a and a second bushing portion 830b. Illustratively, first bushing portion 830a and second bushing portion 830b are configured to couple together to surround frame member 814. Frame member 814 is configured to rotate within bushing 830. A retainer 832 defines a pair of apertures 834, and retainer 832 is configured to surround bushing 830 and couple each of bushing 830 and frame member 814 to cargo box frame 816 of cargo box 820. A pair of fasteners 836 (e.g., bolts) extend downwardly from cargo box frame 816 and extend through apertures 834 and a pair of nuts 838 fit onto fasteners 836 to couple coupling assemblies 822 to cargo box 820. That is, cargo box 820 is rotatable about frame member 814 by coupling assemblies 822. Each coupling assembly 822 is positioned laterally outwardly of frame members 804 and laterally inwardly of ring members 826. Coupling assemblies 822 define the pivot points of cargo box 820, and frame member 814 extends laterally and ensures each pivot point is laterally aligned. Further, coupling assemblies 822 are multi-piece assemblies and may be assembled on frame member 814 after rear frame portion 16' is assembled.

Referring now to FIGS. 120-123, a vent 864 is positioned adjacent cargo box 820. Illustratively, vent 864 is positioned behind a rear fender panel 862 and at least a portion of cargo box 820. In embodiments, vent 864 is positioned rearwardly of doors 26. Vent 864 includes a plurality of vent apertures 866, and vent 864 is coupled to upper outer frame member 804 by a plurality of fasteners 868. A panel 870 (FIGS. 122 and 123) is coupled to rear fender panel 862 to enclose a volume 871 adjacent vent 864. That is, vent apertures 866 provide fluid access to volume 871. Panel 870 includes an outlet 872 configured to provide a path for fluid to pass through. Panel 862 also includes a plurality of tabs 874 defining apertures 876, and a plurality of fasteners 878 are configured to extend through apertures 876 to couple panel 870 to rear fender panel 862. Vent 864 is positioned vertically above and forward of a rear wheel 6 to maximize fresh air (e.g., free of debris) enters vent apertures 866.

Referring still to FIG. 120-123, a panel 894 is coupled to engine 580. In embodiments, panel 894 is coupled to a rearward side of engine 580 and configured to cover one or more belts, alternators, starters, pumps, a fan or the like. Panel 894 includes an inlet 896 and a collar 898 positioned inside a volume 900. Inlet 896 is fluidly coupled to volume 900, and collar 898 may have one or more notches, or channels 899 to direct air within volume 900. In embodiments, collar 898 has a notch 899 configured to direct air downwardly.

A conduit 890 is coupled between outlet 872 and panel 894, and air is configured to flow through vents 866, into volume 871, through conduit 890, and into panel 894. In embodiments, a coupler 892 is coupled between conduit 890 and inlet 896 of panel 894. In embodiments, air flows into inlet 896 of panel 894, and is directed toward a fan 902 coupled to the alternator. In embodiments, the rotational movement of the fan 902 is configured to propel the air throughout panel 894 and over various belts, alternators, starters, pumps, or the like. In embodiments, cool air pulled through conduit 890 and into panel 894 is configured to cool exhaust components as well as cargo box 820. In embodiments, air is dispersed around engine 580 and generally underneath cargo box 820 to cool various other components (e.g., exhaust, engine, transmission, or other auxiliary components).

Referring now to FIGS. 124-129, vehicle 2' comprises a body assembly 18' which may be the same or similar as body assembly 18. Body assembly comprises hood 20', panel 840, front fender 24' (similar to, or the same as front fender 24'), rear fender 28', doors 26, cargo box 820, and may also include a roof 904 (which may be similar to roof 22). Roof 904 includes a first roof portion 906 and a second roof portion 908. In embodiments, first roof portion 906 is the front roof portion and the second roof portion 908 is the rear roof portion. A plurality of fasteners 912 are configured to couple first roof portion 906 and second roof portion 908 along a coupling boundary 910.

Referring to FIG. 126, second roof portion 908 includes a bottom portion 914 with a plurality of bosses 916. A support brace 913 is coupled to bottom portion 914. Support brace 913 is configured to extend laterally across at least a portion of second roof portion 908. Support brace 913 is configured to increase the rigidity of second roof portion 908 to prevent roof portion 908 from sagging, or buckling, due to wear, debris, or the like. Support brace 913 includes a pair of extensions 915 and a plurality of apertures 917. A plurality of fasteners 919 are configured to extend through apertures 917 and bosses 916 to couple support brace 913 to second roof portion 908.

Referring now to FIGS. 127-129, coupling boundary 910 is defined at the junction of a first end, or forward end 918 of second roof portion 908 and a first end, or rearward end 932 of first roof portion 906. In the embodiment, rearward end 932 of first roof portion 906 is configured to overlap and cover forward end 918 of second roof portion 908. Forward end 918 includes a first channel 920, a second channel 924, and a third channel 928. First channel 920 extends approximately the same width as second roof portion 908 and has lateral ends 922 that angle downwardly. In embodiments, first channel 920 is angled downwardly from a lateral middle point to the lateral ends 922. First channel 920 defines a plurality of bosses 921, and first roof portion 906 defines a plurality of apertures 911 and fasteners 912 extend through apertures 911 and bosses 921 to couple first roof portion 906 to second roof portion 908. First roof portion 906 has a bottom portion 907, which defines a plurality of first extensions 934 and a plurality of second extensions 936. First extensions 934 are configured to extend downwardly into first channel 920. Second channel 924 is positioned forwardly of first channel 920, and a seal 926 is configured to sit within channel 920. Extensions 936 are at least partially aligned with second channel 918, and extensions 936 provide pressure on seal 926 within channel 918 when first roof portion 906 is coupled to second roof portion 908. Seal 926 is configured to prohibit flued from flowing past seal 926 through channel 924.

Coupling boundary 910 is configured to provide a path, as illustrated by arrows 938, for fluid (e.g., water) to drain outwardly toward a side of vehicle 2'. That is, fluid may fall or flow onto either of roof portions 906, 908, and toward coupling boundary 910. Water will then flow laterally outwardly through first channel 920 along path 938, toward lateral ends 922. If fluid pass through first channel 920, fluid will be prohibited from moving past seal 926 within second channel 924. Further, third channel 928 defines a plurality of apertures 930 configured to align with a plurality of bosses 940 on bottom portion 907. Fasteners 912 are configured to extend through apertures 930 and bosses 940 to couple first roof portion 906 to second roof portion 908.

Referring to FIGS. 130-135, a windshield assembly 942 is coupled between a pair of upstanding members 992, 994 (similar to upstanding members 192, 194), cross-member 996 (similar to cross-member 202), and cross-member 990 (similar to cross-member 96). Roof 904 is configured to overlap a portion of windshield assembly 942. Windshield assembly 942 includes a windshield 944 and a seal 946 surrounding a perimeter of the windshield 944. Windshield assembly 942 includes three hooks 948 positioned adjacent a bottom of windshield 944. Windshield assembly 942 includes a pair of latch assemblies 956 positioned adjacent a top of windshield 944. Windshield 944 includes a plurality of apertures 952 positioned adjacent a bottom of windshield 944 and a plurality of apertures 972 positioned adjacent a top of windshield 944.

Referring to FIG. 132, hook 948 includes a hook portion 950 and a pair of apertures 949. A plurality of fasteners 954 are configured to extend through apertures 954 and apertures 949 to couple hook 948 to windshield 944.

Referring to FIGS. 132-133, latching assemblies 956 include a latch body 958. Latch body 958 includes a latch body 962 and a latch handle 960. A protrusion 964 extends outwardly from latch body 962. Protrusion 964 is generally circular and comprises a plurality of features, including a projection 966, a recessed portion 968, and an aperture 970. Recessed portion 968 is generally arcuately shaped and aperture 970 is in a center of recessed portion 968. Projection 966 is positioned generally above recessed portion 968. Latching assemblies 956 also include a spacer 974 comprising an aperture 976. Latching assemblies 956 also includes a plate 978. Plate 978 includes a projection 980 including a projection 984, a plurality of recessed portions 982, and an aperture 983. In embodiments, the plurality of recessed portions 982 includes a first recessed portion 982a, a second recessed portion 982b, and a third recess portion 982c, and each of recessed portions 982a, 982b, 982c are spaced apart by approximately ninety-degrees. In embodiments, protrusion 964 extends through apertures 972 and aperture 976 and engages projection 980. That is, projection 984 is configured to sit within recessed portion 968 and projection 966 is configured to sit within one of each of recessed portions 982. Latching assemblies 956 also include a wave washer 998 and a washer 1000. Further, a fastener 986 is configured to extend through each of washer 1000, wave washer 998, aperture 983, aperture 976, apertures 972, and aperture 970 to couple latch body 958 to each of windshield 944, spacer 974, plate 978, wave washer 998, and washer 1000.

In embodiments, latch body 962 is configured to rotate relative to windshield 944 and each of spacer 974, plate 978, wave washer 998, and washer 1000. Further, latch body 962 is configured to rotate between three separate discrete positions associated with each of recessed portions 982. Further, when protrusion 964 of latch body 962 interfaces projection 980 of plate 978, projection 984 sits within recessed portion 968. Further, latch body 962 is rotationally restrained by the movement of projection 984 moving within recessed portion 968. As shown in FIG. 133, latch body 962 is an upright position and projection 966 is aligned with, and sits within, second recessed portion 982b. In embodiments, latch body 962 is rotatable 90 degrees in either direction so that projection 966 is aligned with, and sits within, first recessed portion 982a or third recess portion 982c.

Referring to FIGS. 134-135, windshield assembly 942 is configured to be installed on vehicle 2 (or vehicle 2') by first placing hooks 948 of windshield assembly 942 onto cross-member 990 and rotating windshield assembly 942 upwardly, into an installed position, so an upper portion of windshield assembly 942 contacts cross-member 996 and seal 946 contacts each of upstanding members 992, upstanding members 994, cross-member 990, and cross-member 996. As shown in FIG. 134, roof 904 includes a recess 988 configured to receive latch handle 960 of latch body 958. As windshield assembly 942 is rotated upwardly into the installed position, latch body 958 must be rotated so that projection 966 is engaging either of first recessed portion 982a, 982c and latch body 958 is rotated generally sideways. When windshield assembly 942 is positioned in the upward and installed configuration, latch body 958 is rotated upwardly so that latch handle 960 is positioned within recess 988. In embodiments, as latch body 958 is rotated upwardly, cross-member 996 is sandwiched between latch handle 960 and windshield 944 to lock windshield assembly 942 into place.

Referring now to FIGS. 136-138, controller 780 is operably coupled to an IMU 1004, an accelerometer 1006, a gyroscope 1008, an engine speed sensor 1010, a transmission speed sensor 1012 and may be coupled to other sensors, such as another inclination sensor 1014 configured to determine a pitch angle α of a ground surface 1001 that vehicle 2 is positioned on. When vehicle 2 is stationary on ground surface 1001, a downward force Fy along the hill incline (e.g., Fy=(vehicle mass)*(gravity)*sin(α)) is acting upon vehicle 2. To overcome the downward force Fy, powertrain 530 must produce enough power to overcome the downward force Fy and propel the vehicle upwardly along ground surface 1001.

Still referring to FIGS. 136-138, controller 780 is configured to determine, or receive, a tire diameter 1016 (e.g., a diameter of ground engaging members 4, 6), an engine displacement 1018, engine losses 1020, transmission losses 1022, and a transmission ratio 1024.

Referring now to FIG. 138, a controller (e.g., controller 780 in FIG. 110) may complete a process 1026 to control movement of vehicle 2 or 2' on inclined ground surface 1001. In embodiments, process 1026 may be used to provide terrain-based powertrain control, such as a hill descent control, hill hold functionality, or hill ascent control. That is, process 1026 includes controlling the powertrain according to one or more inputs to maintain a substantially constant speed (positive, negative, or zero) going uphill or downhill. In embodiments, process 1026 starts at step 1028, with receipt of a user input to start the terrain-based powertrain control. Process 1026 proceeds to step 1034 for determining a power output corresponding to the user-requested terrain based powertrain control. The user input may also include a requested, or target ground speed.

Process 1026 includes step 1030 and in step 1030 the controller determines the downward force Fy that is acting on the vehicle based upon at least one or more of pitch angle α, vehicle weight 1038, and additional weight 1040 (e.g., cargo, passengers, fuel). Process 1026 also includes step 1032 and determines the total losses of powertrain 530 based upon at least one or more of engine losses 1020 and transmission losses 1022. Engine losses 1020 and/or transmission losses 1022 may be predetermined values inputted by the manufacturer and/or may be experimentally determined. Alternatively, or additionally, the controller may measure engine efficiency and/or transmission efficiency. For example, the controller may compare one or more engine intake temperatures and one or more engine exhaust temperatures to determine an engine efficiency and engine losses. In another example, the controller may compare a transmission input torque and a transmission output torque to determine transmission efficiency and transmission losses. Engine losses may also include frictional losses. Transmission losses may also include frictional losses.

Still referring to FIG. 138, process 1026 may determine the power output corresponding to the user-requested terrain-based powertrain control, in step 1034, to meet the target ground speed of step 1028 after overcoming the combined forces of each of the determined downward forces in step 1030 and the determined powertrain losses in step 1032. In embodiments, step 1034 also includes factoring in the tire diameter 1016. That is, the greater the tire diameter 1016 is, the greater torque needed at each ground engaging member 4, 6 to produce the requested power. Process 1026 proceeds to step 1036, where the controller provides one or more instructions to powertrain 530 (e.g., including prime mover 580) to meet the requested power in step 1028.

In embodiments, the controller may provide instructions to powertrain 530 that include one or more of increasing or decreasing an engine speed, increasing or decreasing an engine torque, increasing or decreasing a gear ratio of a transmission to change an associated mechanical advantage, increasing or decreasing an electric motor speed, increasing or decreasing an electric motor torque, or another type of variation to powertrain 530.

In embodiments, aspects of process 1026 are iterative and may, for example, repeatedly (e.g., continually or periodically) determine the power output corresponding to the user-requested terrain-based powertrain control in step 1034 based upon changing vehicle or environmental conditions (e.g., angle α, engine losses 1020, transmission losses 1022, or any of a variety of alternative or additional conditions). In embodiments, process 1026 includes a closed-loop feedback circuit to match a target value, such as a target ground speed or a target engine speed.

Now referring to FIGS. 139-140, vehicle 2, 2' may include one or more operator presence sensors 1042. Operator presence sensors 1042 may include a seat sensor, such as a pneumatic seat sensor or a resistive seat sensor. Operator presence sensors 1042 may be placed in each of driver's seat 420 and in one or more of passenger seats 422. In embodiments, a controller (e.g., controller 780) is configured to receive information from each operator presence sensor 1042 and determine that an operator is present in driver's seat 420 when the operator presence sensor 1042 determines a weight (e.g., exceeding a predetermined threshold) is present in the seat 420. In embodiments, any of a variety of alternative or additional sensors may be used to identify the presence of an operator. For example, the operator presence sensor 1042 includes a sensor that detects the presence of a key fob, and the controller is configured to determine an operator is present when the key fob is detected within vehicle 2, 2'. In embodiments, the operator presence sensor 1042 includes a door switch. In embodiments, vehicle 2, 2' also includes a seat restraint system, which may include a seat belt (not shown) and a seat belt receiver (not shown). A seat belt sensor 1044 (FIG. 140) may determine when a seat belt is engaged with a seat belt receiver. Seat belt sensor 1044 is operably coupled with the controller, and controller is configured to determine the presence of an individual (e.g., an operator or a passenger) when the seat belt is engaged with the seat belt receiver based on an indication from the seat belt sensor 1044.

In embodiments, process 1046 includes an additional step 1060 that may be completed before, or after, step 1048. In step 1060, the controller is configured to determine if vehicle 2, 2' is in a driving gear (e.g., High, Low, Reverse, or, 1$^{st}$ gear, 2$^{nd}$ gear, 3$^{rd}$ gear, etc.). In embodiments, process 1046 will not proceed if it is determined that vehicle 2, 2' is in a Park gear. That is, in such an example, process 1046 is executed when it is determined that vehicle 2, 2' is in a gear that may cause it to move forward, or backward, by a 'creep' movement (i.e., incremental movement without a throttle input).

Referring now to FIG. 140, a process 1046 may start with step 1048 to determine an operator is not in seat 420. In embodiments, an operator is determined to not be present in the seat 420 based upon a determination from presence sensor 1042 that a weight is not detected in seat 420 and a determination from seat belt sensor 1044 that the seat belt is not engaged with the seat belt receiver. In embodiments, step 1048 determines an operator is not in the seat 420 based upon a determination from only the presence sensor 1042. In embodiments, step 1048 determines an operator is not in the seat 420 based upon a determination from only the seat belt sensor 1044. In embodiments, step 1042 determines an operator is not in the seat 420 based upon any of a variety of alternative or additional sensors, including one or more of, a key fob and/or a door switch, among other sensors.

Still referring to FIG. 140, after determining that an operator is not in seat 420, process 1046 proceeds to step 1050. In step 1050, the controller determines if the time the operator is not detected in the seat 420 is greater than a time threshold. That is, the controller determines how long the operator has been out of the seat 420 and compares the time out of the seat to a time threshold. In embodiments, the time threshold is 0.5 seconds, 0.75 seconds, 1 second, 1.25 seconds, 1.5 seconds, 1.75 seconds, 2 seconds, 2.25 seconds, 2.5 seconds, 2.75 seconds, 3 seconds, or more. If it is determined that the operator has not been out of the seat for a time greater than the time threshold, process 1046 returns to step 1048 until it is determined that the operator has been out of the seat for a time greater than the time threshold. The time threshold is configured to provide a buffer time period before process 1046 proceeds. That is, process 1046 is configured to not proceed if the operator is bouncing in the seat, leans forward, or otherwise temporarily takes weight off of the seat.

Process 1046 proceeds to step 1052 and alters a vehicle state from the current state, or original state, to a new vehicle state. In embodiments, in step 1052, the vehicle state that is to be altered is a powertrain state, a braking state, and/or another state of the vehicle. In embodiments, in step 1052, the controller is configured to alter a CVT 761 (FIG. 109) to decouple the CVT 761 from one or more of the ground engaging members. In embodiments, the controller is configured to move one or more of the drive clutch movable sheave and the driven clutch movable sheave to decouple the CVT 761 from one or more of the ground engaging members. By decoupling the CVT 761 from one or more of the ground engaging members, the 'creep', or incremental movement, of the vehicle will be reduced, stopped, or interrupted. In embodiments, in step 1052, the controller is configured to alter the braking system to engage a parking brake or engage an Anti-Lock brake system. By engaging the parking brake, or otherwise engaging the braking system, the 'creep', or incremental movement, of the vehicle will be reduced, stopped, or interrupted. In embodiments, in step 1052, the controller is configured to alter a gear position of the transmission 532. In embodiments, the controller is configured to electronically shift transmission 532 to the Park gear. By shifting to the Park gear, the 'creep', or incremental movement, of the vehicle will be reduced, stopped, or interrupted.

Referring still to FIG. 140, process 1046 includes steps 1054 and step 1056 and the controller will maintain the new vehicle state until a user input is received in step 1056. When a user input is received in step 1056, process 1046 proceeds to step 1058. The user input of step 1056 may include, but is not limited to, throttle input, brake input, or a gear shift. It will be appreciated that the received user input need not be limited to explicit user input. For example, the user input of step 1056 may include a determination that the operator is present in the seat 420. That is, if the controller determines that the presence sensor indicates an operator is in the seat 420 and/or the seat belt sensor indicates the seat belt is within the seat belt receiver, process 1046 proceeds to step 1058 and alters the vehicle state. Altering the vehicle state in step 1058 may include returning the vehicle to the original state before step 1052. In embodiments, altering the vehicle state in step 1058 may include altering the CVT 761 (FIG. 109) to operably couple the CVT 761 to one or more of the ground engaging members. In embodiments, the controller is configured to move one or more of the drive clutch movable sheave and the driven clutch movable sheave to couple the CVT 761 to one or more of the ground engaging members. By coupling the CVT 761 to one or more of the ground engaging members, the 'creep', or incremental movement, of the vehicle will be induced, or allowed. In embodiments, in step 1058, the controller is configured to alter the braking system to disengage a parking brake or disengage an Anti-Lock brake system. By disengaging the parking brake, or otherwise disengaging the braking system, the 'creep', or incremental movement, of the vehicle will be induced, or allowed. In embodiments, in step 1058, the controller is configured to alter a gear position of the transmission 532. In embodiments, the controller is configured to electronically shift transmission 532 to a driving gear (e.g., high, low, reverse, or 1$^{st}$, 2$^{nd}$, 3$^{rd}$, etc.) gear or the original gear vehicle 2, 2' was in during the original state. By shifting to the driving gear, the 'creep', or incremental movement, of the vehicle will be induced, or allowed.

The following clauses illustrate example subject matter described herein.

Clause 1. A frame assembly for a utility vehicle, comprising a front frame section; a main frame section coupled to the front frame section; and a rear frame section coupled to the main frame section and comprising at least a forward member; a rearward member spaced apart from the forward member; an upper member coupled to the forward and rearward members; and a lower member coupled to the forward and rearward members, where the forward member, the rearward member, the upper member, and the lower member form a closed portion of the rear frame section, and the closed portion couples to the main frame section.

Clause 2. The frame assembly of clause 1, wherein the upper and lower members are in contact with the forward member.

Clause 3. The frame assembly of clause 1, wherein the upper and lower members are in contact with the forward member.

Clause 4. The frame assembly of clause 2, wherein the upper and lower members are spaced apart from the main frame section by the forward member of the rear frame section.

Clause 5. The frame assembly of clause 1, wherein the rear frame section further comprises a laterally-extending brace, and the upper member is coupled to the rearward member through the brace.

Clause 6. The frame assembly of clause 1, wherein the forward member of the rear frame section is configured to receive a portion of the main frame section.

Clause 7. The frame assembly of clause 1, wherein, through the forward member of the rear frame section, a position of the rear frame section is adjustable relative to a position of the main frame section.

Clause 8. The frame assembly of clause 7, wherein the position of the rear frame section is adjustable in a fore/aft direction and in a vertical direction relative to the position of the main frame section.

Clause 9. The frame assembly of clause 1, wherein the closed portion generally defines a square shape.

Clause 10. A method of assembly a frame for a utility vehicle, the method comprising providing a front frame section; providing a main frame section; coupling the front frame section to the main frame section; providing a rear frame section including a forward member, a rearward member, an upper member, and a lower member; coupling the upper member to the forward and rearward members; coupling the lower member to the forward and rearward members to define a closed portion of the rear frame section; and coupling the closed portion of the rear frame section to the main frame section.

Clause 11. The method of clause 10, wherein coupling the closed portion of the rear frame section to the main frame section occurs after coupling the upper frame to the forward and rearward members and coupling the lower frame to the forward and rearward members.

Clause 12. The method of clause 10, wherein coupling the closed portion of the rear frame section to the main frame section includes contacting the main frame section with only the forward member defining the closed portion of the rear frame section.

Clause 13. The method of clause 10, further comprising providing lower longitudinally-extending frame members on the rear frame section, the lower longitudinally-extending frame members being generally coplanar with the lower member of the closed portion within a laterally-extending plane; and coupling the lower longitudinally-extending frame members to the main frame portion.

Clause 14. The method of clause 13, wherein the lower longitudinally-extending frame members extend forwardly relative to the closed portion of the rear frame portion.

Clause 15. The door of clause 11, wherein the door frame is coupled to the door ring when the door is separated from the utility vehicle The method of clause 10, wherein coupling the closed portion of the rear frame section to the main frame section occurs along a generally vertical plane.

Clause 16. The method of clause 10, further comprising adjusting a position of the rear frame section relative to the main frame section.

Clause 17. The method of clause 16, wherein adjusting the position of the rear frame section includes moving the rear frame section longitudinally relative to the main frame section.

Clause 18. The method of clause 16, wherein adjusting the position of the rear frame section includes moving the rear frame section vertically relative to the main frame section.

Clause 19. The door of clause 17, wherein the discrete detent grooves correspond to discrete open positions of the door The method of clause 16, wherein adjusting the position of the rear frame section occurs before coupling the closed portion of the rear frame section to the main frame section.

Clause 20. The method of clause 10, wherein coupling the closed portion of the rear frame section to the main frame section includes contacting at least three surfaces of an upstanding member of the main frame section with the forward member of the rear frame section.

Clause 21. The method of clause 10, wherein the rear frame section is configured to support a cargo box of the utility vehicle, where the cargo box is configured to include a frame support member and a latching mechanism.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
   a plurality of ground engaging members;
   a frame assembly comprising a first frame assembly and a second frame assembly rearwards of the first frame assembly, the second frame assembly comprising:
   a pair of longitudinally extending upper frame members;
   a pair of longitudinally extending lower frame members, each of the pair of longitudinally extending lower frame members coupled to a respective longitudinally extending member of the first frame assembly;
   a cross-member extending between the pair of longitudinally extending upper frame members;
   a first vertically extending frame member coupled to the cross-member and coupled to a first longitudinally extending lower frame member of the pair of longitudinally extending lower frame members, the first vertically extending frame member positioned laterally intermediate the pair of longitudinally extending upper frame members; and
   a second vertically extending frame member coupled to the cross-member and coupled to a second longitudinally extending lower frame member of the pair of longitudinally extending lower frame members, the second vertically extending frame member positioned laterally intermediate the pair of longitudinally extending upper frame members; and
   a rear suspension assembly coupled between at least one ground engaging member of the plurality of ground engaging members and the frame assembly, the rear suspension assembly including a first control arm and a first shock absorber, wherein the first shock absorber is coupled between the cross-member and the first control arm.

2. The utility vehicle of claim 1, wherein an upper end of the first shock absorber is positioned adjacent the first vertically extending member.

3. The utility vehicle of claim 2, wherein the upper end of the first shock absorber is positioned laterally outboard of at least a portion of the first vertically extending member.

4. The utility vehicle of claim 1, wherein the rear suspension comprises a second control arm and a second shock absorber, wherein the second shock absorber is coupled between the cross-member and the second control arm.

5. The utility vehicle of claim 4, wherein the upper end of the first shock absorber is positioned outboard of at least a portion of the first vertically extending member and an upper end of the second shock absorber is positioned outboard of at least a portion of the second vertically extending member.

6. The utility vehicle of claim 4, wherein the upper end of the first shock absorber is positioned adjacent the first vertically extending member and the upper end of the second shock absorber is positioned adjacent the second vertically extending member.

7. The utility vehicle of claim 1, wherein the upper end of the first shock absorber is positioned laterally intermediate the first vertically extending frame member and a first longitudinally extending upper frame member of the pair of longitudinally extending upper frame members.

8. The utility vehicle of claim 1, wherein the cross-member is a single member extending between the pair of longitudinally extending upper frame members.

9. The utility vehicle of claim 1, wherein the first control arm is coupled to the frame assembly at a position laterally inboard of the first shock absorber.

10. The utility vehicle of claim 1, further comprising a second cross-member coupled between the pair of longitudinally extending upper frame members, the first vertically extending frame member and the second vertically extending frame member coupled to the second cross-member.

11. The utility vehicle of claim 10, further comprising a cargo bed assembly rotatably coupled to the second cross-member.

12. The utility vehicle of claim 1, further comprising a third vertically extending frame member coupled to a first longitudinally extending upper frame member of the pair of longitudinally extending upper frame members, the third vertically extending frame member positioned longitudinally rearwardly of the first vertically extending frame member.

13. The utility vehicle of claim 12, further comprising a drive assembly positioned longitudinally intermediate the first vertically extending frame member and the third vertically extending frame member.

14. The utility vehicle of claim 1, wherein the cross-member defines a pair of apertures, and the first shock absorber is coupled to the cross-member at a first aperture of the pair of apertures.

15. The utility vehicle of claim 14, wherein the rear suspension includes a second shock absorber and a second control arm, the second shock absorber coupled between the cross-member at a second aperture of the pair of apertures and the second control arm.

* * * * *